(12) United States Patent
Suga et al.

(10) Patent No.: US 6,543,848 B1
(45) Date of Patent: Apr. 8, 2003

(54) VEHICULAR TURNING SEAT

(75) Inventors: Yasuo Suga, Kariya (JP); Masamitsu Iwatani, Kariya (JP); Hiroyuki Kagei, Kariya (JP); Takafumi Hijikata, Kariya (JP); Tadashi Takenoshita, Kokubu (JP); Yoshiro Suehiro, Kokubu (JP); Chikanori Fujita, Kokubu (JP); Shoichi Uda, Kariya (JP); Yoshiyuki Miura, Kariya (JP); Kenji Murabayashi, Kariya (JP); Masanori Iwao, Kariya (JP)

(73) Assignee: Toyota Shatai Kabushiki Kaisha, Aichi (JP)

( * ) Notice: Subject to any disclaimer, the term of this patent is extended or adjusted under 35 U.S.C. 154(b) by 0 days.

(21) Appl. No.: 09/509,374
(22) PCT Filed: Aug. 28, 1998
(86) PCT No.: PCT/JP98/03872
§ 371 (c)(1),
(2), (4) Date: Oct. 10, 2000
(87) PCT Pub. No.: WO99/11488
PCT Pub. Date: Mar. 11, 1999

(30) Foreign Application Priority Data

| Sep. 1, 1997 | (JP) | 9-236054 |
|---|---|---|
| Dec. 17, 1997 | (JP) | 9-348113 |
| Jan. 21, 1998 | (JP) | 10-9718 |
| Feb. 23, 1998 | (JP) | 10-40344 |
| Mar. 25, 1998 | (JP) | 10-77678 |
| Apr. 10, 1998 | (JP) | 10-99296 |
| Apr. 10, 1998 | (JP) | 10-99296 |
| Apr. 28, 1998 | (JP) | 10-119476 |
| Apr. 28, 1998 | (JP) | 10-119477 |
| May 18, 1998 | (JP) | 10-135371 |
| Jun. 15, 1998 | (JP) | 10-167165 |

(51) Int. Cl.$^7$ ................................................. A47C 1/02
(52) U.S. Cl. ................................................. 297/344.24
(58) Field of Search ....................... 297/344.24, DIG. 4, 297/118, 130, 440.1, 344.26, 344.21, 344.22, 344.23, 344.1, 344.15, 344.19; 248/416, 425; 296/65.01, 65.06

(56) References Cited

U.S. PATENT DOCUMENTS 2,290,464 A 7/1942 Buchheit (List continued on next page.)

FOREIGN PATENT DOCUMENTS

| DE | 2655916 C2 | 7/1977 |
|---|---|---|
| EP | 0 656 277 A1 | 6/1995 |

(List continued on next page.)

OTHER PUBLICATIONS

U.S. patent application Ser. No. 09/788,884; filed Feb. 20, 2001; entitled "Rotating Vehicle Seat"; Specification and drawings 53 pages.
International Search Report (PCT/JP98/03872).
Office Action issued from the Australian Patent Office dated Dec. 24, 1999.
European Search Report dated Dec. 27, 1999.
Translation of Office Action issued from Japanese Patent Office dated Mar. 28, 2000 for Application No. 10–288198.
Translation of Office Action issued from Japanese Patent Office dated Mar. 28, 2000 for Application No. 10–298789.
Translation of Office Action issued from Japanese Patent Office dated Mar. 28, 2000 for Application No. 11–115074.

*Primary Examiner*—Milton Nelson, Jr.
(74) *Attorney, Agent, or Firm*—Patterson, Thuente, Skaar & Christensen

(57) ABSTRACT

A rotating vehicle seat allows space close to an occupant's feet to be used efficiently. The rotating seat has a seat body 2 supported by a rotary disc 13. The rotary disc 13 is mounted at a position that is displaced to a door opening side with respect to a center HP of a seat cushion. A pinion gear 6, an intermediate gear 36 and a rack 38 engage each other so that the rotational movement and the longitudinal movement of the seat body 2 are coupled to each other.

13 Claims, 67 Drawing Sheets

U.S. PATENT DOCUMENTS

| | | |
|---|---|---|
| 2,587,679 A | 3/1952 | Atkinson |
| 2,822,858 A | 2/1958 | Mussler |
| 4,483,653 A | 11/1984 | Waite |
| 4,733,903 A | 3/1988 | Bailey |
| 4,989,888 A | 2/1991 | Qureshi et al. |
| 5,094,420 A | 3/1992 | Aihara et al. |
| 5,149,113 A | 9/1992 | Alldredge |
| 5,466,111 A | 11/1995 | Meyer |
| 5,524,952 A | 6/1996 | Czech et al. |
| 5,636,884 A | 6/1997 | Ladetto et al. |
| 5,651,576 A | 7/1997 | Wallace |
| 5,720,462 A | 2/1998 | Brodersen |
| 5,769,480 A | 6/1998 | Gebhardt |
| 5,890,764 A | 4/1999 | Lee |
| 6,024,398 A | 2/2000 | Horton et al. |
| 6,416,272 B1 | 7/2002 | Suehiro et al. |

FOREIGN PATENT DOCUMENTS

| | | |
|---|---|---|
| FR | 2 495 451 | 12/1980 |
| JP | 53-19954 | 2/1978 |
| JP | 57-22922 | 2/1982 |
| JP | 57-22925 | 2/1982 |
| JP | 58-164825 | 11/1983 |
| JP | 60-92752 | 5/1985 |
| JP | 62-43330 | 2/1987 |
| JP | 62-76036 | 5/1987 |
| JP | 62173343 A | 7/1987 |
| JP | 62-283027 | 12/1987 |
| JP | 62-295660 | 12/1987 |
| JP | 63-176752 | 7/1988 |
| JP | 1-266031 | 10/1989 |
| JP | 3-71932 | 7/1991 |
| JP | 5-5551 | 1/1993 |
| JP | 5-28740 | 4/1993 |
| JP | 5-40027 | 5/1993 |
| JP | 5-56581 | 7/1993 |
| JP | 5-305112 | 11/1993 |
| JP | 5-93966 | 12/1993 |
| JP | 6-895 | 1/1994 |
| JP | 6-27298 | 4/1994 |
| JP | 6-63426 | 9/1994 |
| JP | 6-262971 | 9/1994 |
| JP | 7-4149 | 1/1995 |
| JP | 07323767 A | 12/1995 |
| JP | 8-300988 | 11/1996 |
| JP | 09048271 A | 2/1997 |
| JP | 9-86233 | 3/1997 |
| JP | 09183325 | 7/1997 |
| WO | WO 93/18318 | 9/1993 |
| WO | WO 98/43849 | 10/1998 |

VEHICULAR TURNING SEAT

FIELD OF THE INVENTION

The present invention relates to rotating vehicle seats that are designed so that passengers, such as elderly or handicapped persons, can easily get in or out of a vehicle.

BACKGROUND OF THE INVENTION

A rotating seat of this type has been constructed to be rotated to the side of a door opening with an occupant held in a seated position (as disclosed, for example, in Japanese Laid-Open Utility Model Publication No. 61-57047 and Japanese Laid-Open Patent Publication No. 62-173343). The rotating vehicle seat is typically disposed as far to the rear as possible in order to provide a wide space close to the occupant's feet. Therefore, the seats in the front and the rear, for example in a four-door sedan car, are disposed such that the seats are masked beside the center pillars and the rear pillars.

Therefore, if the seat is rotated while in the initial seated position, the pillar that is positioned beside the seat interferes with the rotation of the seat to the entry/exit position. Therefore, with the known rotating seat, the rotating seat is first moved forward in order to be moved outside of the range of interference with the pillar. Thereafter, the seat is rotated to the door opening side.

DISCLOSURE OF THE INVENTION

Thus, the known rotating seat is inconvenient to use because it requires troublesome operations of moving the rotating seat forward and then rotating it to the side of the door opening. Further, if the seat is positioned near the front, such that the seat can be rotated while in the seated position, the space close to occupant's feet will be sacrificed and the occupant will be forced to sit in an uncomfortable position.

The present invention has been made in view of the above problems, and its object is to provide a rotating vehicle seat that is convenient to use without sacrificing the space close to the occupant's feet.

To this end, the invention according to claim 1 provides a rotating vehicle seat that comprises a rotating support base for supporting a seat body in a manner that permits rotation around a center of rotation that is located at a point displaced to a door opening side with respect to a center of a seat cushion, a longitudinal support base for supporting the rotating support base to permit movement in a longitudinal direction of the vehicle, and coupling means for coupling the rotational movement and the longitudinal movement of the seat body, the coupling means including a pinion gear mounted beneath the seat body to the interior side of the center of rotation and a rack mounted on and extending in a longitudinal direction of the longitudinal support base, the rack engaging the pinion gear via an intermediate gear.

According to this rotating vehicle seat, when the seat body is rotated to the door opening side by means of the rotating support base, the seat body moves forward while rotating by engagement between the pinion gear and the rack via the intermediate gear. Therefore, even if the seat body is located in the rearmost position in order to provide a wide space close to the occupant's feet, the seat body can rotate by a simple rotational operation to the door opening side without interfering with a pillar or other portions of the vehicle. In other words, unlike the known rotating seat, it is not necessary to perform two operations of rotating the seat body and moving the seat body forward. Consequently, with the rotating vehicle seat according to claim 1 of the invention, it is possible to greatly improve ease of use while providing a wider space close to the occupant's feet.

Further, because the center of rotation of the seat body is located at a point that is displaced to a door opening side with respect to the center (HP: hip point) of the seat cushion, a pinion gear having a larger diameter can be mounted under the seat body to the interior side with respect to the center of rotation. Because the pinion gear having a larger diameter has a larger circumferential length, the distance of the longitudinal movement of the seat body, which is coupled to the rotational movement of the seat body, can be longer. Thus, the seat body can be moved a longer distance while rotating, for example, by about 90°. Therefore, the seated position of this rotating seat can be positioned more rearward so as to provide a wider space close to the occupant's feet, so that this rotating seat can be reasonably applied to various types of vehicles.

The pinion gear having a larger diameter can be also mounted to the door opening side with respect to the center of rotation when the center of rotation of the seat body (rotating support base) is located to the interior side with respect to the center of the seat cushion. In this case, however, when the seat body is rotated to the door opening side, the center of the seat cushion is displaced rearward. Therefore, the center of rotation, which is located more to the interior side, makes it more difficult to move the center of the seat cushion a long distance forward. In this respect, with the construction according to claim 1, because the center of rotation is located to the door opening side with respect to the center of the seat cushion, the moving distance of the center of the seat cushion is a total of the forward displacement by the rotation of the seat body plus the forward moving distance of the rotating support base. Therefore, the center of the seat cushion can be moved a longer distance forward.

The invention according to claim 2 provides the rotating vehicle seat as defined in claim 1, further comprising a lateral support base for moving the seat body in a lateral direction of the vehicle and a stopper member for preventing longitudinal movement of the seat body during lateral movement of the seat body, wherein the stopper member is disposed on the longitudinal support base to permit movement into and out of a longitudinal travelling path of the seat body, such that the stopper member moves out of the travelling path of the seat body to thereby allow the seat body to move longitudinally when the longitudinal support base is moved to an interior side end of the lateral support base, while the stopper member moves into the travelling path of the seat body to thereby prevent longitudinal movement of seat body when the longitudinal support base moves from the interior side end to the exterior side of the lateral support base.

According to this rotating vehicle seat, unlike the known rotating seat, a stopper member for restricting the longitudinal movement of the seat body is disposed on the longitudinal support base and not on the lateral support base. Therefore, whether the longitudinal support base is moved by the lateral support base in a horizontal direction, or in an inclining direction as the known rotating seat, the seat body can be prevented from moving longitudinally while moving laterally with respect to the vehicle.

Further, in the known rotating seat, the stopper means was provided on the lateral support base and thus required a size change according to the lateral moving distance of the longitudinal support base, which is not desirable for simplifying the construction or reducing the weight of the present rotating vehicle seat. With the construction according to claim 2, because the stopper member is provided on the longitudinal support base that moves laterally, the construction can be made compact irrespective of the lateral moving distance of the longitudinal support base, and thus the weight can be reduced.

The invention according to claim 3 provides the rotating vehicle seat as defined in claim 1, further comprising a lateral support base for moving the seat body in a lateral direction of the vehicle, the lateral support base being disposed between the rotating support base and the seat body and being constructed to move the seat body to a lower position as the seat body moves to the outside in the lateral direction of the vehicle.

According to this rotating vehicle seat, because the lateral support base is rotated by the rotating support base, unlike a known lateral support base, the lateral support base moves to a position in which its longitudinal sides extend in the longitudinal direction of the vehicle. Therefore, when the rotating vehicle seat of this invention is applied to a passenger's seat, a wider space can be provided between the passenger's seat and the driver's seat. Further, even if the motor is disposed on the rear end of the lateral support base in a manner to protrude from the lateral support base, the motor is moved to a position facing the rear seat. In this respect also, a wider space can be provided between the passenger's seat and the driver's seat. Thus, the space can be effectively utilized for various purposes, such as a passage to the rear seats.

The invention according to claim 4 provides the rotating vehicle seat as defined in claim 3, wherein the seat body can be detached from the lateral support base so as to be used as a wheelchair.

According to this rotating vehicle seat, the seat body can be-used separately as a wheelchair outside the vehicle, and when the seat body is connected as is to a lateral support base and moved into the vehicle, it can be also used as a passenger seat. Such a rotating seat does not require the wheelchair user to change from a vehicle seat inside the vehicle to a wheelchair outside the vehicle and vice versa, thereby making it easier for such a wheelchair user to enter and exit a vehicle.

Further, because the seat body can be used separately as a wheelchair and can be moved into the vehicle while maintaining the wheelchair function, the rotating seat is more convenient to use, compared with known rotating seats in which a wheelchair frame portion must be detached to use the seat body inside the vehicle.

Further, after having been used as a wheelchair, the seat body can be connected to the lateral support base by superposing and connecting the connecting base of the seat body on the inclined base. The inclined base is downwardly inclined toward the exterior side, and the connecting base is disposed parallel to the inclined base. With this construction, differences in the vertical position between the seat body and the lateral support base, if any, existing in the stage of moving the seat body as a wheelchair toward the lateral support base can be corrected by sliding contact between the connecting base and the inclined base that are parallel to each other. As a result, the seat body can be easily connected to the lateral support base.

On the contrary, in a known rotating seat, for example, a wheelchair is separated into a seat portion and a frame portion and only the seat portion is moved into a vehicle and used as a seat body. In order to move the seat body as a seat portion of the wheel chair, the seat body is moved along and between rails on the wheelchair frame and rails on the vehicle floor. In such a case, the vertical position of the rails on the wheelchair frame is required to correspond to the rails on the vehicle floor, and the difference in the vertical position of the seat body is not corrected, thereby requiring troublesome work in connecting the seat body.

The invention according to claim 5 provides the rotating vehicle seat as defined in claim 3, wherein the longitudinal support base and/or the lateral support base has a linear slide mechanism that consists of an outer rail, an inner rail and a plurality of steel balls disposed between the rails.

According to this rotating vehicle seat, the position of the fixed side or the moving side or both of one or both of the left and right linear slide mechanisms is adjusted in a direction perpendicular to the sliding direction. Thus, the force of pushing the steel balls 220c by the fixed rail and the moving rail in the linear slide mechanism 220 can be adjusted. Because a plurality of the steel balls are disposed between the V-shaped grooves, with the construction in which the fixed rail and the moving rail relatively push each other by an appropriate force, vertical and horizontal relative rattling of the rails can be prevented. As a result, the lateral support base and/or the longitudinal support base can slide smoothly without rattling.

The invention according to claim 6 provides the rotating vehicle seat as defined in claim 1, further comprising a swing extending mechanism that essentially consists of a quadric link mechanism, wherein the seat body can be moved laterally with respect to the vehicle by the swing extending mechanism and wherein the seat body can be detached from the swing extending mechanism so as to be used as a wheelchair.

According to this rotating vehicle seat, a wheelchair user can get in or out of the vehicle while he or she remains sitting in the wheelchair. Further, after the wheelchair user gets out of the vehicle while he or she remains sitting in the wheelchair inside the vehicle, the wheelchair can be detached from the lift-up mechanism and used in the same manner as a normal wheelchair. Therefore, unlike a known rotating seat, the wheelchair user does not need to change from a vehicle seat to a wheelchair or vice versa in the outside of the vehicle when getting into or out of the vehicle, thereby making such a wheelchair more convenient to use.

Particularly, the wheelchair can be connected as a whole, keeping the seat frame and the wheels as well as the seat section, to the lift-up mechanism so as to be moved between the inside and the outside of the vehicle. Therefore, the wheelchair user or the helper is only required to perform a simple operation of connecting the lift-up mechanism. Additional operations, such as separating the wheelchair into the seat section and the frame section, are not required. Also in this respect, such a wheelchair is more convenient to use.

Further, with a known construction in which the wheelchair is separated into the seat section and the frame section and only the seat section is moved into the vehicle, it is necessary to load the separated frame section separately into the vehicle. However, such labor is not necessary with a construction as described in claim 6 in which the whole wheelchair is moved and installed in the vehicle compartment. Also in this respect, the wheelchair is convenient to use, particularly for passengers' helpers, and the usability of the vehicle rotating seat can be improved.

In this specification, retaining the sitting attitude of the wheelchair means to retain the attitude of the wheelchair on the road. The attitude of the wheelchair means the attitude (orientation) of the wheelchair in which the wheelchair user sitting in the wheelchair can retain the sitting attitude comfortably without falling down or otherwise being injured.

Further, the state in which the vehicle chair "can be used separately" as a wheel chair refers to the state in which the vehicle chair has at least a seat section (seat body) and travelling wheels and can be used as a normal wheelchair.

The invention according to claim 7 provides the rotating vehicle seat as defined in claim 1, further comprising a swing extending mechanism that essentially consists of a quadric link mechanism, wherein the seat body can be moved laterally with respect to the vehicle by the swing extending mechanism and wherein the seat body can be detached from the swing extending mechanism so as to be used as a seat of a wheelchair.

According to this rotating vehicle seat, the seat holder with the seat body mounted thereon, can be moved by the lift-up mechanism from the vehicle compartment floor to the outside of the vehicle and vice versa, and can function as a seat section of the wheelchair when detached from the lift-up mechanism. Therefore, while sitting in the seat body, the passenger can move with the seat holder onto the seat frame of the wheelchair which is standing by outside the vehicle. Also, the passenger can move with the seat holder from the wheelchair into the vehicle while sitting in the seat body. As a result, the passenger's helper does not need to help the passenger to transfer from and to the wheelchair, so that the labor of the helper can be greatly reduced.

Further, because the seat body forms the seat section of the wheelchair together with the seat holder, the ride comfort of the wheelchair can be improved.

Additionally, the connecting and disconnecting structure of the seat holder is very simple in construction, which consists of the seat holder, the anchor plates, the lock bolts and the lock knobs. Therefore, such a structure can be readily applied to existing lift-up mechanisms.

The invention according to claim 8 provides the rotating vehicle seat as defined in claim 1, further comprising a swing extending mechanism that essentially consists of a quadric link mechanism, wherein the seat body can be moved laterally with respect to the vehicle by the swing extending mechanism and wherein an electric motor is used as a driving source for the swing extending mechanism, the motor having a threaded shaft oriented to the front of the seat.

According to this rotating vehicle seat, the threaded shaft of the ball screw is not directed to the rear of the seat, so that the threaded shaft is not offensive to an occupant sitting in a seat that is behind the rotating seat. With this construction, when the electric motor of the actuator is actuated, the threaded shaft is rotated and the nut is moved relatively with respect to the threaded shaft. However, because the nut is connected to the vehicle floor side, the threaded shaft and thus the actuator eventually move themselves and the quadric link mechanisms are extended and retracted.

The invention according to claim 9 provides the rotating vehicle seat as defined in claim 1, further comprising a swing extending mechanism that essentially consists of a quadric link mechanism, wherein the seat body can be moved laterally with respect to the vehicle by the swing extending mechanism, and further comprising a swing lock mechanism that functions only when an impact is applied while the vehicle is running, so as to prevent the seat body from moving forward with respect to the vehicle by the swing extending mechanism, while, in normal operations when the vehicle is stopped, permitting the seat body to be moved laterally with respect to the vehicle.

With this rotating vehicle seat, when a strong impact is exerted on the vehicle by abrupt deceleration of the vehicle, swinging movement of the seat body is prevented by the swing lock mechanism.

In the normal extending operations when the vehicle is stopped, if the swing extending mechanism is actuated to start to slowly extend the seat body to the outside, the swing lock mechanism is released by coupling with the movement of the seat body. On the other hand, in the process of returning the seat body from the exterior side to the interior side by the reverse swinging movement of the swing extending mechanism, the swing lock mechanism is automatically locked when the seat body has been returned to a predetermined position in the vehicle. Thus, by coupling with the swinging movement of the seat body, the swing lock mechanism is automatically locked and unlocked. The swing locked state can be maintained irrespective of the sliding position by the slide mechanism which is separately set as necessary. Therefore, while maintaining the swing locked state, the position of the seat body in the longitudinal direction of the vehicle can be adjusted by utilizing the slide mechanism.

Further, when abrupt impact is exerted on the seat body, the swing locked state can be maintained, so that the load onto the seat body can be transmitted to the vehicle floor.

Further, because the swing locked state can be maintained irrespective of the lateral sliding position, the swing lock mechanism of this embodiment can be applied irrespective of whether a lateral slide mechanism is provided or not.

The invention according to claim 10 provides the rotating vehicle seat as defined in claim 1, further comprising a swing extending mechanism that essentially consists of a quadric link mechanism, wherein the seat body can be moved laterally with respect to the vehicle by the swing extending mechanism, and further comprising a swing lock mechanism that functions to prevent the seat body from being moved forward with respect to the vehicle by the swing extending mechanism when the seat body is located in a position facing the front of the vehicle, while permitting the seat body to be moved laterally with respect to the vehicle by the swing extending mechanism when the seat body is rotated to the door opening side.

With this rotating vehicle seat, when the seat body is rotated to the position facing the front of the vehicle, the swing lock mechanism is locked by being coupled to this rotational movement of the seat body. And when the seat body starts to rotate to the door opening side, the swing lock mechanism is automatically unlocked by coupling with this rotational movement of the seat body. Thus, the swing lock mechanism is locked and unlocked by coupling with the rotational movement of the seat body. Therefore, unlike a known rotating seat, the users do not need to manually operate the swing lock mechanism, so that the usability of the rotating vehicle seat of this embodiment can be improved.

Further, the lock holder is engaged with the lock plate by physical engagement between the lock holder and the anchor hook. Therefore, as long as the seat body is held in the position facing the front of the vehicle, the seat body can be reliably maintained in the swing locked state, even in the event of occurrences generating a large impact or vibrations. However, if it is constructed, for example, such that a biasing force of a spring is used to maintain the engagement of the lock holder with the lock plate, when a strong impact or vibrations are exerted on the vehicle, the lock holder may be rotated against the biasing force of the spring by the inertial force, so that the swing lock may be released. With the construction of the invention as described in claim 10, there is no possibility of such occurrences.

The invention according to claim 11 provides the rotating vehicle seat as defined in claim 1, wherein the longitudinal support base includes a linear slide mechanism that consists of a fixed rail, a moving rail and a plurality of rolling elements disposed between the fixed rail and the moving rail, and wherein a guide rail is provided on and along one side of the moving rail, which is opposite to the side of the fixed rail and supports the moving rail to permit the moving rail to slide.

With this rotating vehicle seat, a guard rail is provided on and along the inner side of the inner rail in parallel to the outer rail to permit the inner rail to slide. Thus, the deformation of the inner rail can be minimized and the removal of the rolling elements can be prevented, so that the longitudinal movement of the linear guide mechanism can be maintained with stability.

The invention according to claim 12 provides the rotating vehicle seat as defined in claim 11, further including a hook that is provided on a travelling path of the moving rail such that a rear end portion of the moving rail can slide into and out of the hook.

With this rotating vehicle seat, the inner rails can be prevented from being raised by a belt load that will act on the seat belt in the event of hard braking or a collision when the vehicle is running. Further, the belt load can be absorbed via the hook to the floor side, so damage to the linear guide mechanism can be prevented.

The invention according to claim 13 provides the rotating vehicle seat as defined in claim 1, wherein a toothless portion is formed on an initial engagement portion of the intermediate gear and a deformed tooth is formed on an initial engagement portion of the pinion gear and engages the toothless portion, the deformed tooth having a thickness substantially corresponding to a length of the toothless portion, a height of the deformed tooth on a front end in a direction of starting engagement being smaller than normal teeth, and a height of the deformed tooth on a rear end in the direction of starting engagement being equal to normal teeth.

With this rotating vehicle seat, when the seat body is rotated to the door opening side (in the engagement starting direction), at the stage when the pinion gear starts to engage the intermediate gear, that is, when shifting from the non-coupling state to the coupling state, because the deformed tooth of the pinion gear first engages the intermediate gear and the height of the deformed tooth on the front end in the engagement starting direction is smaller than normal teeth, the deformed tooth engages the toothless portion of the intermediate gear without interfering with the tooth on the rearward side of the toothless portion in the engagement starting direction. Thus, the pinion gear smoothly engages the intermediate gear.

On the other hand, when the seat body rotates from the door opening side to the interior side to be returned to the position facing to the front of the vehicle (when rotated in the direction opposite to the engagement starting direction), at the stage of finishing the engagement between the pinion gear and the intermediate gear, that is, when shifting from the coupling state to the non-coupling state, because the deformed tooth of the pinion gear last engages the intermediate gear and the height of the deformed tooth on the rear end in the engagement starting direction is equal to normal teeth. Thus, the pinion gear securely engages the intermediate gear. Therefore, the engagement (coupling state) between the pinion gear and the intermediate gear is maintained all the way, and thus the seat body can be reliably returned to the rear end sliding position.

Further, because the seat body can be reliably returned to the rear end sliding position, in the case of using a slide lock mechanism that is coupled to the rotational movement of the seat body, the slide lock mechanism can function properly and reliably.

BEST MODES FOR PERFORMING THE INVENTION

Figure 1:
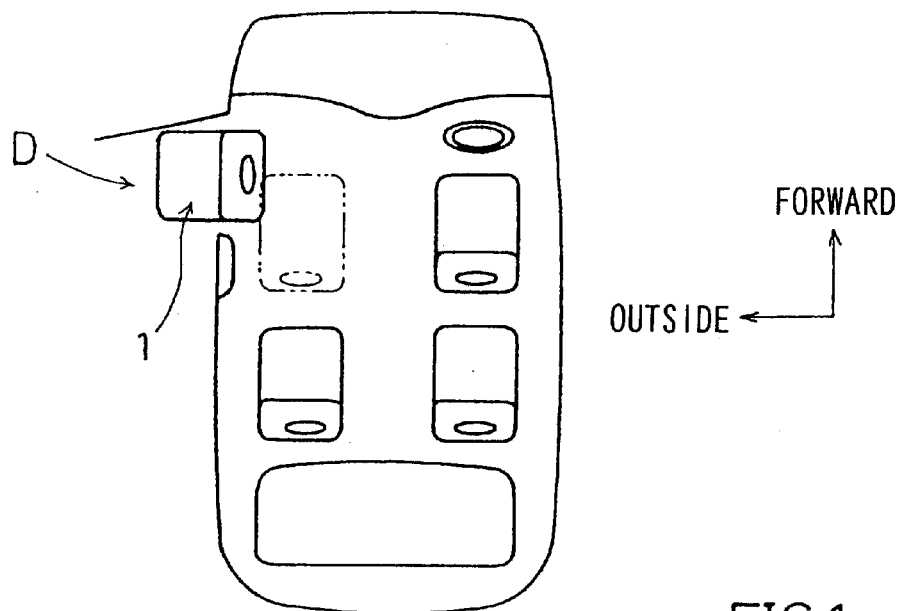
FIG. 1 is a plan view of a vehicle, showing a position of a rotating seat in the vehicle.

An embodiment of the present invention as defined in claim 1 (a first embodiment) will now be explained with reference to FIGS. 1 to 13. A rotating vehicle seat 1 (hereinafter referred to as a "rotating seat" as well) according to the first embodiment will be described as an example of application of a passenger's seat on the left of a driver's seat as shown in FIG. 1. The rotating seat 1 can be rotated by about 90° to the left (or counterclockwise) as viewed in FIG. 1 in order to move to the outside of a vehicle through a door opening D on the left of the rotating seat 1.

The rotating seat according to the first embodiment includes a seat body 2, a lift-up mechanism 50 for moving the seat body 2 laterally with respect to the vehicle (from the inside to the outside of the vehicle and vice versa), a rotating support base 10 for rotatably supporting the seat body 2 and the lift-up mechanism 50, and a longitudinal support base 30 for moving the seat body 2, the lift-up mechanism 50 and the rotating support base 10 longitudinally with respect to the vehicle. The seat body 2 and the lift-up mechanism 50 are shown in detail in FIGS. 2 and 3, and the rotating support base 10 and the longitudinal support base 30 are shown in detail in FIG. 4. In the drawings, the front of the vehicle is shown by a "forward" arrow, and the side having a door opening is shown by an "outside" arrow.

Figure 2:
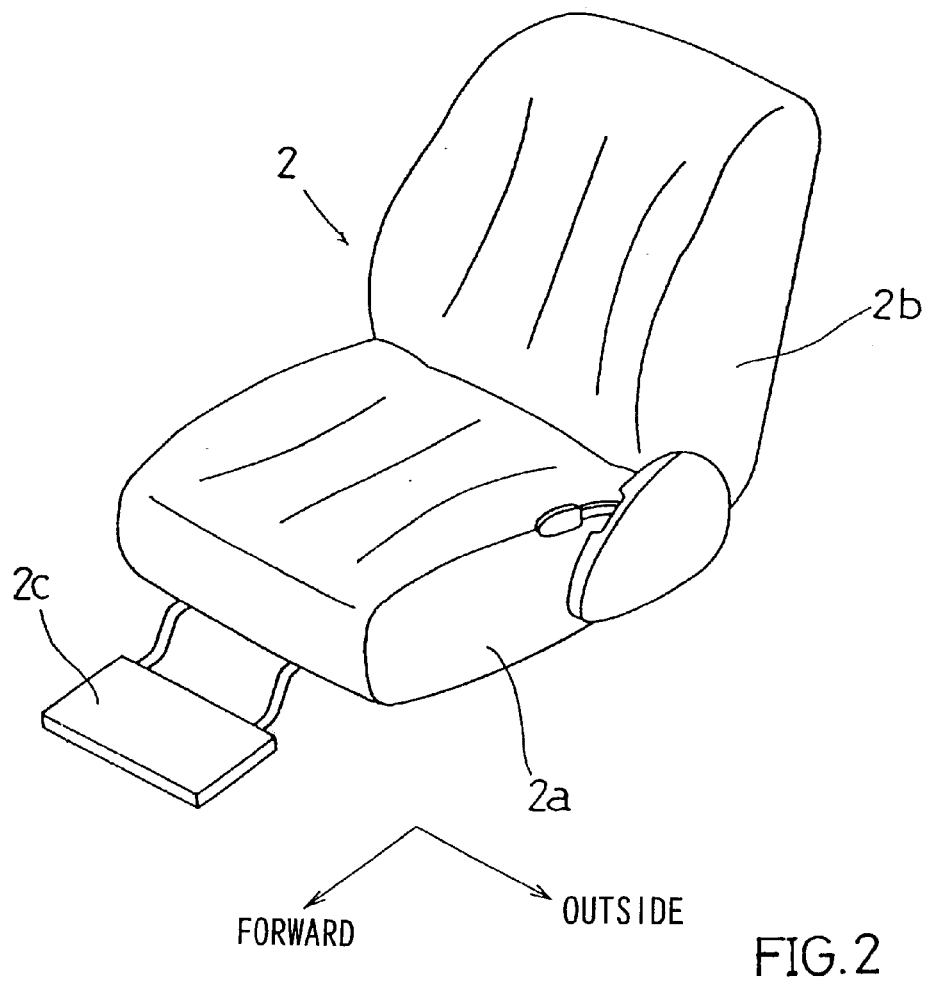
FIG. 2 is a perspective view of a seat body.

As shown in FIG. 2, the seat body 2 has a seat cushion 2a and a seat back 2b, and a footrest 2c for resting the occupant's feet thereon is mounted to the front of the seat cushion 2a. The seat body 2 is of a known type and has not been particularly modified to achieve this invention.

Figure 3:
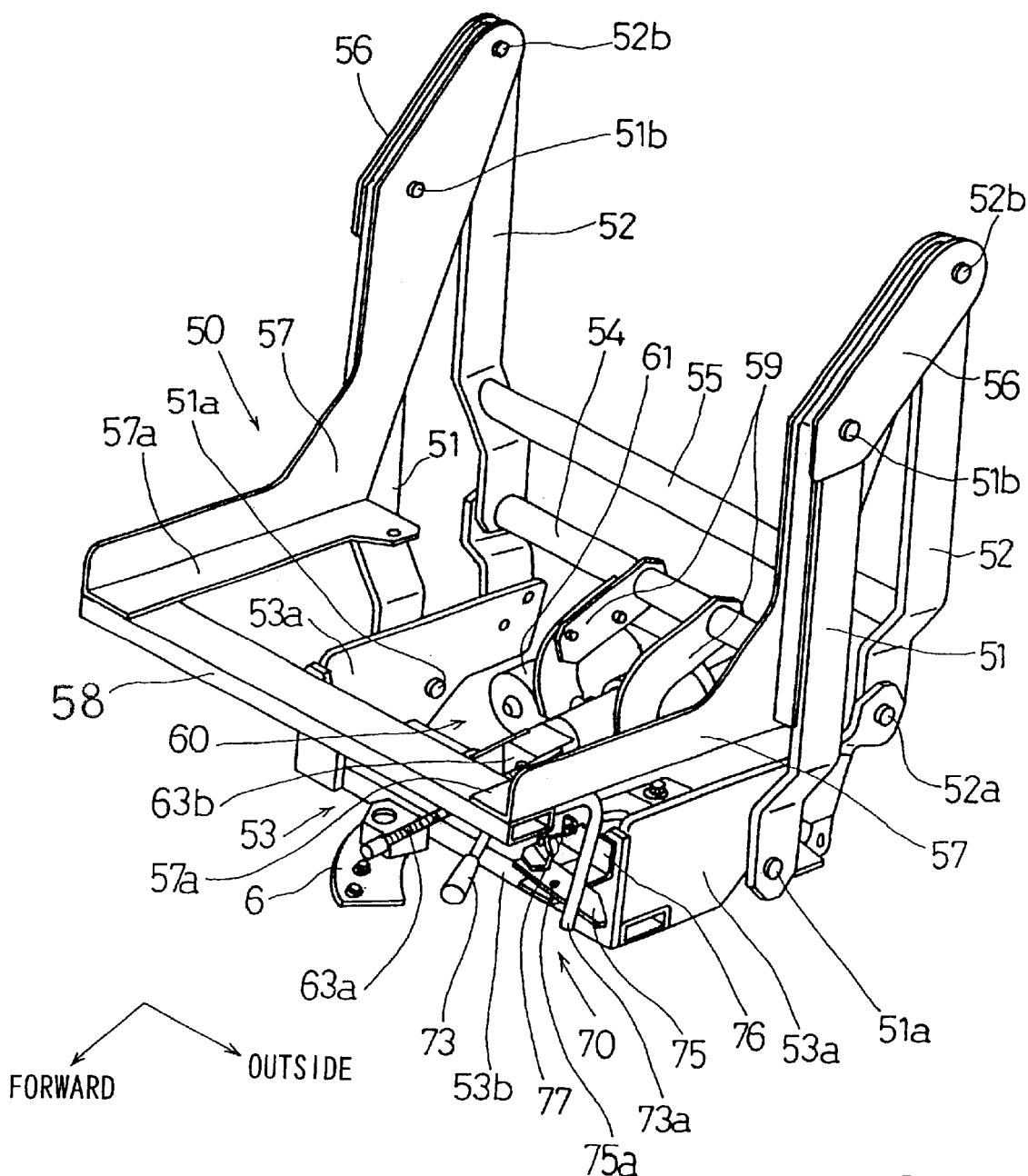
FIG. 3 is a perspective view of a lift-up mechanism.

The seat body 2 is mounted on the lift-up mechanism 50. As shown in FIG. 3, the lift-up mechanism 50 essentially consists of a pair of quadric link mechanisms 55. The lift-up mechanism 50 serves to move the seat body 2 from the inside to the outside of the vehicle and vice versa by extending and retracting the pair of quadric link mechanisms. Designated by numeral 53 is a base for the lift-up mechanism 50. The base 53 includes a bottom 53b and two side walls 53a extending vertically upwardly from both sides of the bottom 53b. Each of the quadric link mechanisms has a first link arm 51 and a second link arm 52. The link arms 51 and 52 are connected to the side walls 53a through pivots 51a and 52a, respectively, for pivotal longitudinal movement with respect to the vehicle body. The rear second link arms 52 are connected by connecting rods 54, 55 and pivot together. The ends of the lower connecting rods 54 are rotatably supported with respect the side walls 53a of the base 53 and thus the axis of the connecting rod 54 forms the pivotal fulcrum or pivot 52a of the second link arm 52.

The distal ends of the first and second link arms 51 and 52 are connected by a connecting arm 56 and an extending arm 57. The link arms 51 and 52 are rotatably connected through pivots 51b and 52b, respectively, with respect to the connecting arm 56 and the extending arm 57. The side wall 53a, the first link arm 51, the second link arm 52 and the extending arm 57 forms the quadric link mechanism.

Each of the extending arms 57 is generally L-shaped and extends forward. As shown in FIG. 3, a flange 57a is formed on the front end portion of the arm 57 and extends inwardly. Both front ends of the arms 57 arc connected by a reinforcing bar 58. The seat body 2 is mounted on both flanges 57a and the reinforcing bar 58 and is fixed by bolts (not shown).

Figure 5:
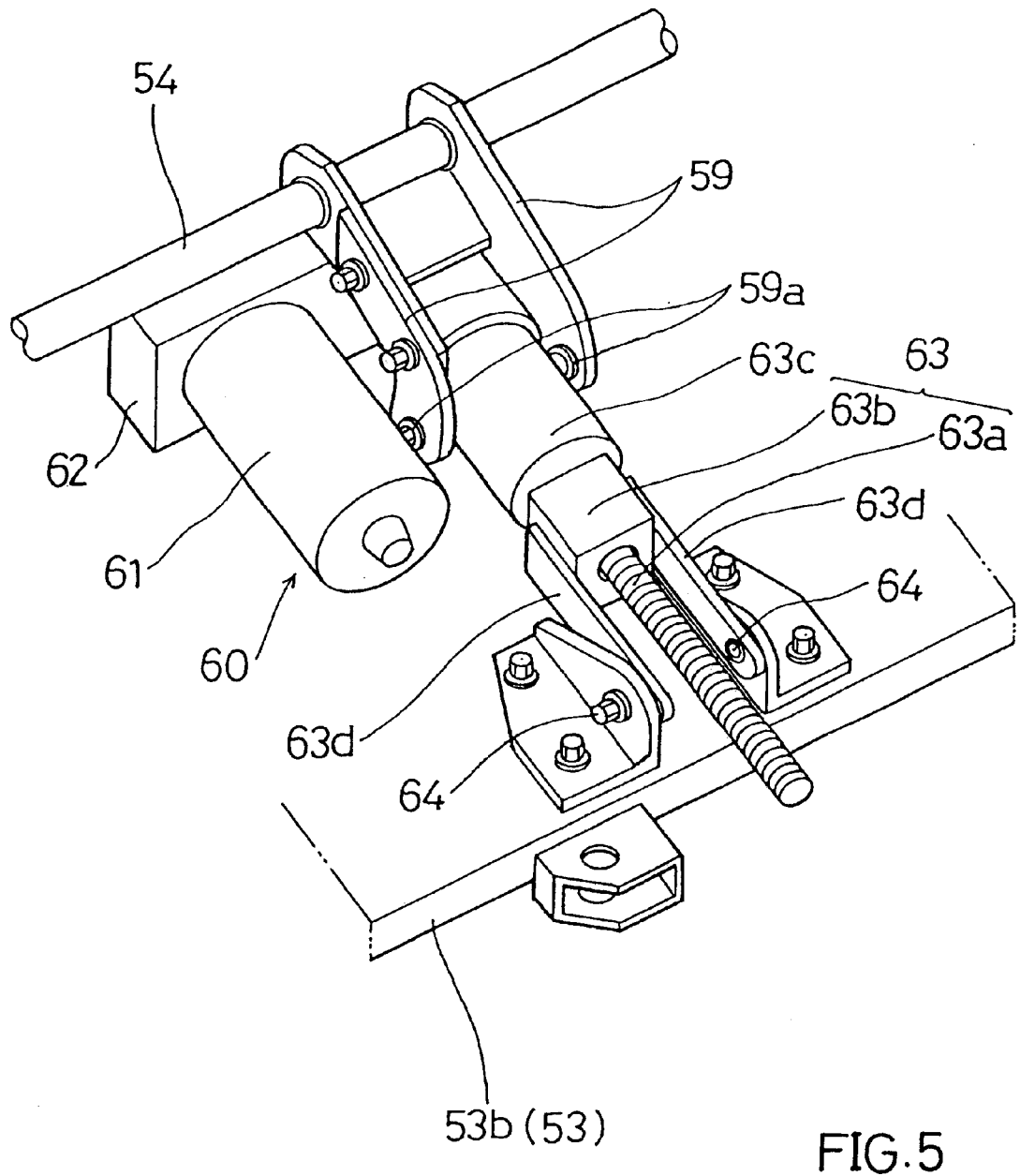
FIG. 5 is a perspective view of an actuator.

Two L-shaped support arms 59 are fixed in a generally medial portion of the lower connecting rod 54. An actuator 60 is mounted between the quadric link mechanisms and the vehicle floor by the support arms 59 and serves as a driving source for the lift-up mechanism 50. As shown in FIG. 5, the actuator 60 essentially consists of an electric motor 61, a gear box 62 and a ball screw 63. The ball screw 63 includes a threaded shaft 63a and a block-shaped nut 63b threadably engaged with the threaded shaft 63a. When the motor 61 is started, the threaded shaft 63a rotates by torque amplified by means of the gear box 62 and thus the nut 63b moves axially with respect to the threaded shaft 63a.

The threaded shaft 63a is rotatably supported by a cylindrical threaded shaft case 63c mounted on the output shaft side of the gear box 62. The threaded shaft case 63c is supported by the support arms 59 via the pivots 59a for vertical pivotal movement. Further, plate-like brackets 63d are mounted on both side surfaces of the nut 63b. A front end of each of the brackets 63d is connected by a shaft 64 to an upper surface of the bottom 53b of the base 53 near a front end thereof so as to permit vertical pivotal movement. In the first embodiment, as described above, the actuator 60 is assembled in an orientation to locate the threaded shaft 63a at the front of the seat body 2 and to locate the gear box 62 at the back of the seat body 2.

Figure 12:
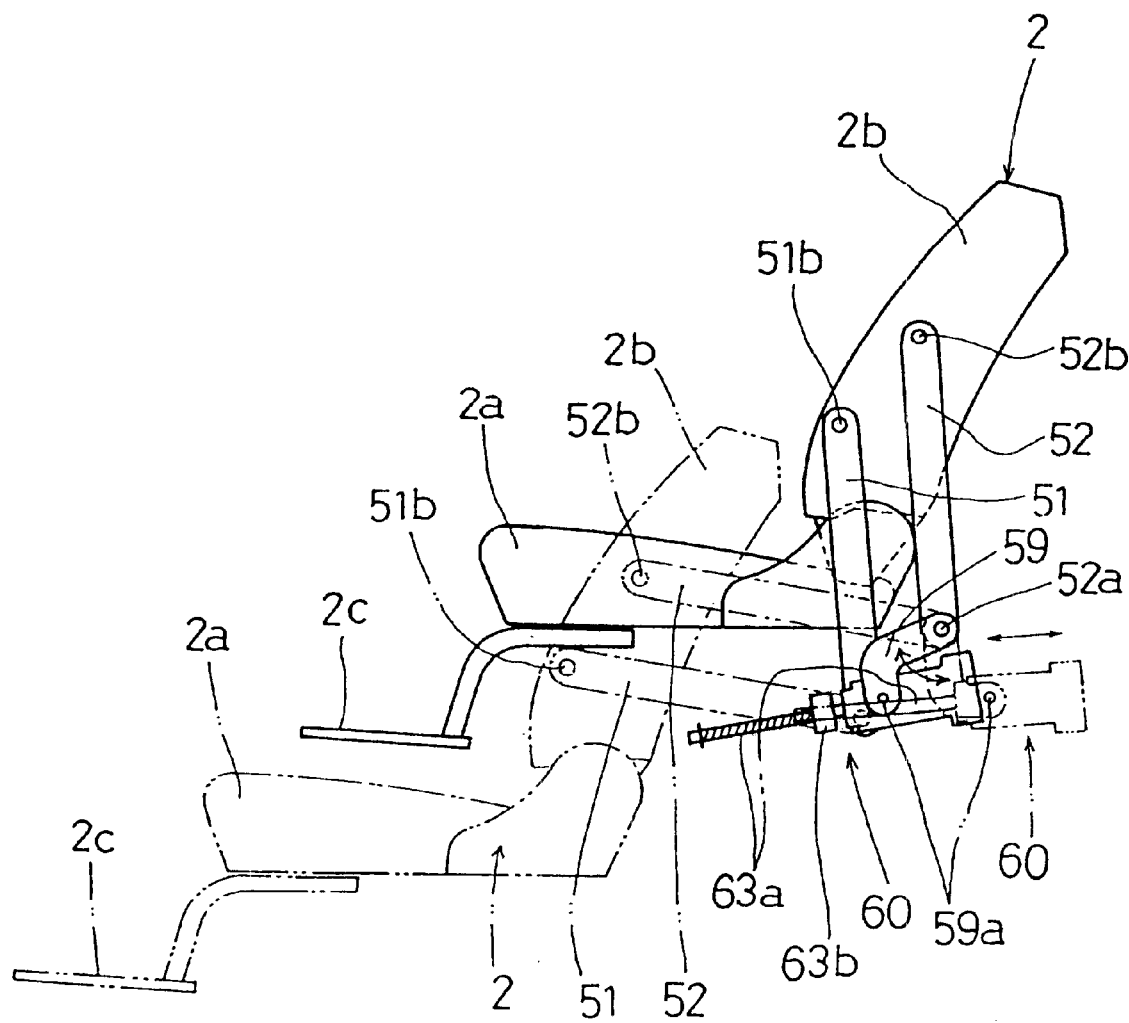
FIG. 12 is a side view of a lift-up mechanism, in which an actuator is arranged to have a gear box on the rear.

With the actuator 60 thus assembled, when the motor 61 is rotated in a forward direction with the seat body 2 being held facing the door opening side as will be described below, the threaded shaft 63a rotates and thus the nut 63b moves relative to the threaded shaft 63a toward the front end of the threaded shaft 63a. However, because the nut 63b can pivot vertically but cannot move longitudinally with respect to the seat body 2 (laterally with respect to the vehicle in this stage), the threaded shaft 63a and thus the actuator 60 move rearward of the seat body 2. This state is shown in FIG. 12. When the actuator 60 (excluding the nut 63b) moves rearward, the support arms 59 and the connecting rod 54 rotates counterclockwise as viewed in FIG. 3. As a result, the second link arms 52 pivot about the pivots 52a toward the outside of the vehicle (to the left as viewed in FIG. 12).

When the second link arms 52 pivot toward the outside of the vehicle and thus the first link arms 51 pivot likewise via the connecting arms 56, the extending arms 57 are extended toward the outside of the vehicle along a specified path. When the extending arms 57 are thus extended, the seat body 2 moves from the seated position inside the vehicle to a lower outside position (from a position shown by a solid line to a position shown by a broken line in FIG. 12). When the motor 61 then rotates in a reverse direction, the extending arms 57 move backward along the above-mentioned specified path, so that the seat body 2 is moved from the lower outside position back to the seated position inside the vehicle.

A rotation lock mechanism 70 for locking the movement of a rotating support base 10, which will be described below, is provided on the bottom 53b of the base 53 of the lift-up mechanism 50. Further, a circular-arc pinion gear 6 and a slide lock automatic release plate 7, which will be described below, are mounted to the underside of the bottom 53b. The pinion gear 6 engages a rack 38 through an intermediate gear 36 which will be described below, thereby providing a function of coupling the rotational movement with the longitudinal movement of the seat body 2. The slide lock automatic release plate 7 has a function of automatically releasing a slide lock mechanism 80, which will be described below.

Figure 4:
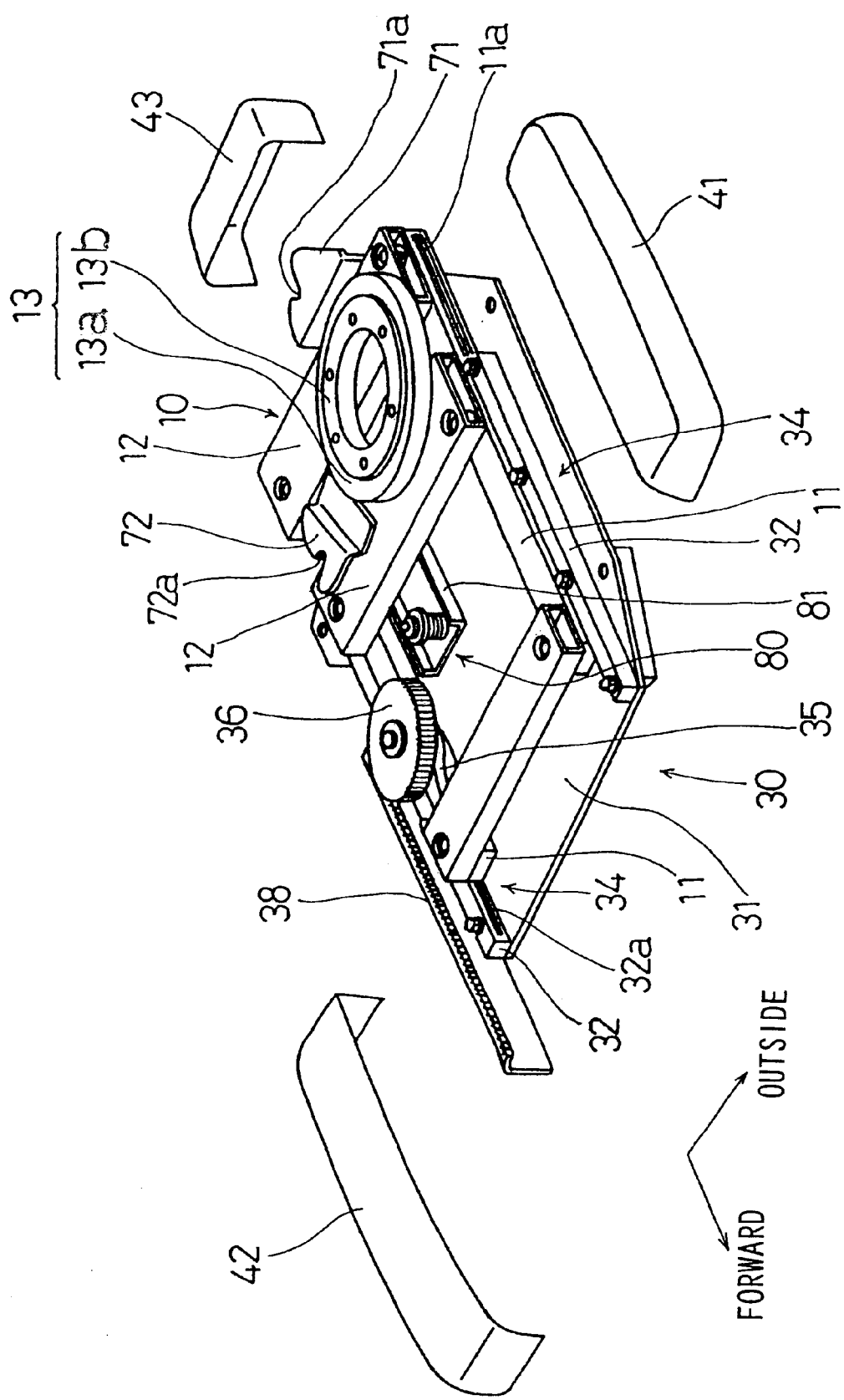
FIG. 4 is a perspective view of a rotating support base and a longitudinal support base.

The rotating support base 10 will now be explained. As shown in FIG. 4, two parallel moving retaining members 11 and bases 12 form the rotating support base 10. The retaining members 11 are spaced apart from each other by a given distance and each of the bases 12 is mounted on and extends between the retaining members 11. A rotary disc 13 is mounted on the topside of the bases 12. The rotary disc 13 has an outer ring 13a and an inner ring 13b, and a plurality of steel balls (not shown) are provided between the outer and inner rings 13a,13b so as to permit each of the rings 13a,13b to rotate smoothly with respect to the other without rattling. The outer ring 13a is secured to the topside of the bases 12, and the inner ring 13b is secured to the underside of the bottom 53b of the lift-up mechanism 50. With this arrangement, the lift-up mechanism 50 and thus the seat body 2 are rotatably supported on the topside of the rotating support base 10. As clearly seen from FIG. 6, the rotary disc 13 is mounted in a position corresponding to the exterior side end of the seat cushion 2a of the seat body 2. Therefore, when the seat body 2 is rotated by about 90° toward the outside of the vehicle, a hip point HP on the seat cushion 2a moves forward of the center of rotation (the rotary disc 13).

Figure 7:
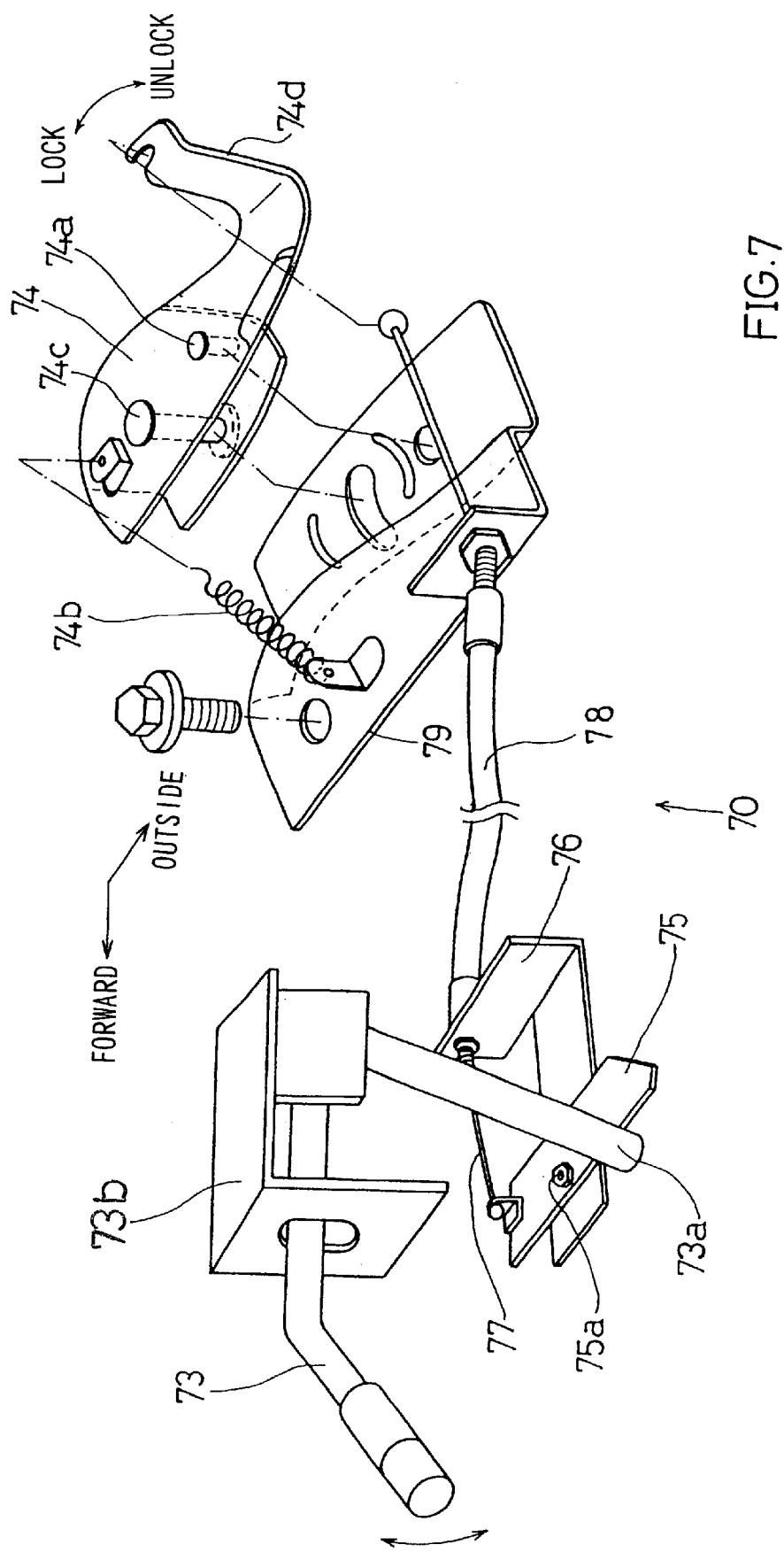
FIG. 7 is a perspective view of a rotation lock mechanism.

As shown in FIG. 4, two lock plates 71,72 are mounted on the back of the rotating support base 10 and near the right side edge (the interior side edge) on the base 10, respectively. The lock plates 71,72 serve to engage and disengage a lock pin 74c of a rotation lock member 74 mounted on the lift-up mechanism 50. The lock plates 71,72 are formed with lock recesses 71a,72a for receiving the lock pin 74c, respectively. As shown in FIG. 7, the rotation lock mechanism 70 on the lift-up mechanism 50 includes a lock release lever 73 and a rotation lock member 74. The lock release lever 73 is mounted on the underside of the left extending arm 57 on the front end thereof via a bracket 73b to permit vertical pivotal movement. The lock release lever 73 is biased in a direction to move the front end of the lever 73 upwardly by a tension spring (or alternatively a torsion spring) which is not shown.

A rear end (lower end) 73a of the rotation lock release lever 73 contacts one end of an intermediate member 75 that is mounted on the base 53 of the lift-up mechanism 50 near the front left corner thereof. The intermediate member 75 is supported by a shaft 75a for horizontal pivotal movement. Therefore, when the rotation lock release lever 73 is depressed against the biasing force, the rear end 73a is displaced rearward so as to push the one end of the intermediate member 75, thus rotating the intermediate member 75 counterclockwise.

One end of an operating wire 77 is connected to the other end of the intermediate member 75 and extends through the interior of a protective tube 78 to near the rear left corner of the base 53. The rotation lock member 74 is mounted on the rear left corner portion of the base 53 via a bracket 79 to permit horizontal rotation around a shaft 74a. The lock pin 74c is mounted on the rotation lock member 74 and located more to the interior side with respect to the shaft 74a. An engaging portion 74d is provided on the end of the exterior side of the rotation lock member 74. A tension spring 74b is mounted between the end of the interior side of the rotation lock member 74 and the bracket 79. With the tension spring 74b, the rotation lock member 74 is biased in a direction to pull the lock pin 74c, that is, in a direction (locking direction) to fit the lock pin 74c into the lock recesses 71a,72a of the lock plates 71,72.

Further, the other end of the operating wire 77 is connected to the engaging portion 74d. Therefore, when the intermediate member 75 is pushed by the rear end 73a of the rotation lock release lever 73 and thus rotates, the operating wire 77 is pulled forward. Therefore, the rotation lock member 74 is rotated in the unlocking direction (clockwise) against the biasing force of the tension spring 74b. Consequently, the lock pin 74c is disengaged from the lock recesses 71a,72a of the lock plates 71,72, so that the rotation lock is released. When the rotation lock has been released, the lift-up mechanism 50 and thus the seat body 2 are permitted to rotate.

When the rotational operation of the rotation lock release lever 73 is released, the rotation lock member 74 is returned to the locking direction by means of the tension spring 74b. Thus, the lock pin 74c is returned to a position that permits engagement with the lock plates 71,72. In this state, when the seat body 2 is rotated to the seated position or the sidewise position facing the door opening side, the lock pin 74c is engaged with the lock recess 71a (or 72a ) of the rotation lock plate 71(or 72), thus locking the seat body 2 to prevent rotation in that position. Specifically, the lock member 74 is locked by the rear rotation lock plate 71 when the seat body 2 is rotated to the seated position facing the front of the vehicle, while the lock member 74 is locked by the interior side rotation lock plate 72 when the seat body 2 is rotated to the sidewise position facing the door opening side.

As shown in FIG. 4, an auxiliary element 81 is mounted to the front base 12 of the rotating support base 10 and protrudes forward from under the base 12. The slide lock mechanism 80 is mounted on the protruding portion of the auxiliary element 81. The slide lock mechanism 80 is shown in detail in FIG. 9. The auxiliary element 81 has an insertion hole 81a into which a sleeve 82 is fitted. A cylindrical portion 83a of a retainer 83 extends through the sleeve 82 for axial movement. A compression spring 84 is disposed between a flange 83b of the retainer 83 and the auxiliary element 81. Thus, the retainer 83 is biased in a direction to move upward or in a direction to remove the cylindrical portion 83a out of a lock hole 31a.

A steel ball 85 is retained on the upper end of the retainer 83 so as to permit rotation and not to fall. The steel ball 85 is pressed against the slide lock automatic release plate 7 (FIG. 8) or the underside of the pinion gear 6 by the biasing force of the compression spring 84. The slide lock automatic release plate 7 is mounted on the underside of the pinion gear 6. When the steel ball 85 is pressed against the slide lock automatic release plate 7 as shown in a relative position (a) in FIG. 9, that is, when the seat body 2 is held in a position facing the front of the vehicle without being rotated, the retainer 83 is pressed downward by the amount of thickness of the slide lock automatic release plate 7 against the biasing force of the compression spring 84. Consequently, the lower end of the retainer 83 is inserted into the lock hole 31a that is formed in a base 31 of the longitudinal support base 30 (FIG.4). When the cylindrical portion 83a of the retainer 83 is inserted into the lock hole 31a, the rotating support base 10 and thus the seat body 2 are locked to prevent longitudinal movement with respect to the longitudinal support base 30.

On the other hand, when the seat body 2 is rotated to the door opening side, the pinion gear 6 and the slide lock automatic release plate 7 are rotated counterclockwise along an arc around the rotary disc 13. In this process, when the steel ball 85 is disengaged from the slide lock automatic release plate 7 as shown in relative positions (b) and (c) in the drawing, the retainer 83 is moved upward by the amount of thickness of the release plate 7 by the biasing force of the compression spring 84. Consequently, the lower end of the retainer 83 is pulled out of the lock hole 31a. Thus, the lock of the seat body 2 to prevent the longitudinal movement is automatically released. Although in FIG. 9, the slide lock mechanism 80 is shown located at a plurality of positions with respect to the pinion gear 6 and the slide lock automatic release plate 7, it is to be noted that the pinion gear 6 and the slide lock automatic release plate 7 actually move with respect to the slide lock mechanism 80 because the former are rotatable and the latter is fixed.

Figure 10:
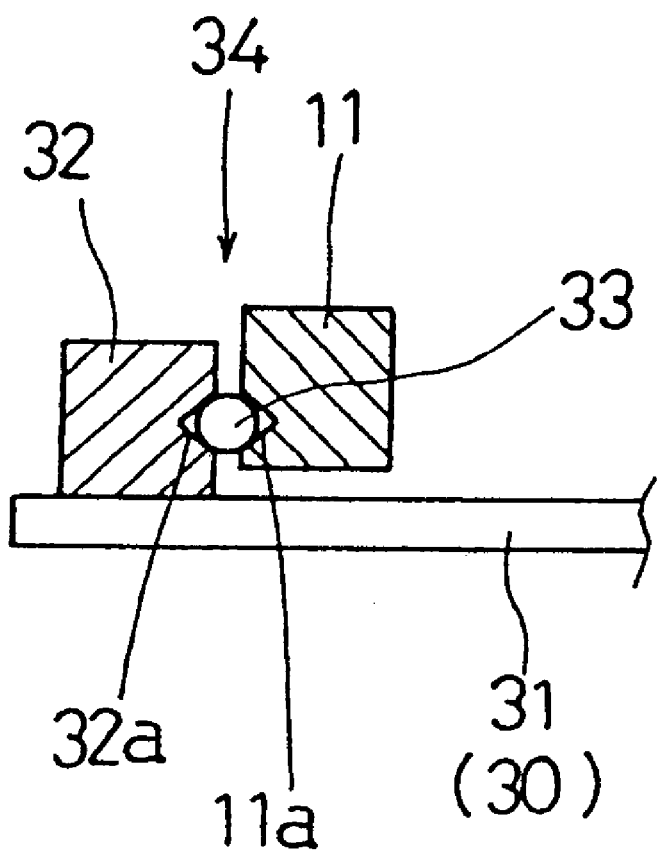
FIG. 10 is sectional view of a linear guide mechanism, taken along line (10)—(10) in FIG. 8.

As shown in FIG. 10, a V-shaped groove 11a is formed on the outer side surface of each of the two moving retaining members 11 of the rotating support base 10. A pair of parallel fixed retaining members 32 are mounted on and extend along both sides of the base 31 of the longitudinal support base 30 with a predetermined spacing therebetween. The fixed retaining members 32 are disposed along the outer side surface of the moving retaining members 11. A V-shaped groove 32a, which is similar to the groove 11a, is also formed in each of the fixed retaining members 32 on the side surface facing the moving retaining member 11. The groove 32a is disposed facing the groove 11a. A plurality of steel balls 33 are fitted in the grooves 11a,32a between the moving retaining members 11 and the fixed retaining members 32, to thereby form a pair of left and right linear guide mechanisms 34. The linear guide mechanisms 34 serve to permit the rotating support base 10 and thus the lift-up mechanism 50 and the seat body 2 to move smoothly without rattling in the longitudinal direction of the vehicle. The steel balls 33 comprise rolling elements as described in the scope of demand. However, the rolling elements are not limited to the steel balls 33, but also may be a cylindrical roller. Although not shown, the longitudinal support base 31 is secured to the vehicle floor by bolts, so that the rotating seat 1 is installed on a specified position (passenger's seat position) in the vehicle compartment.

Figure 8:
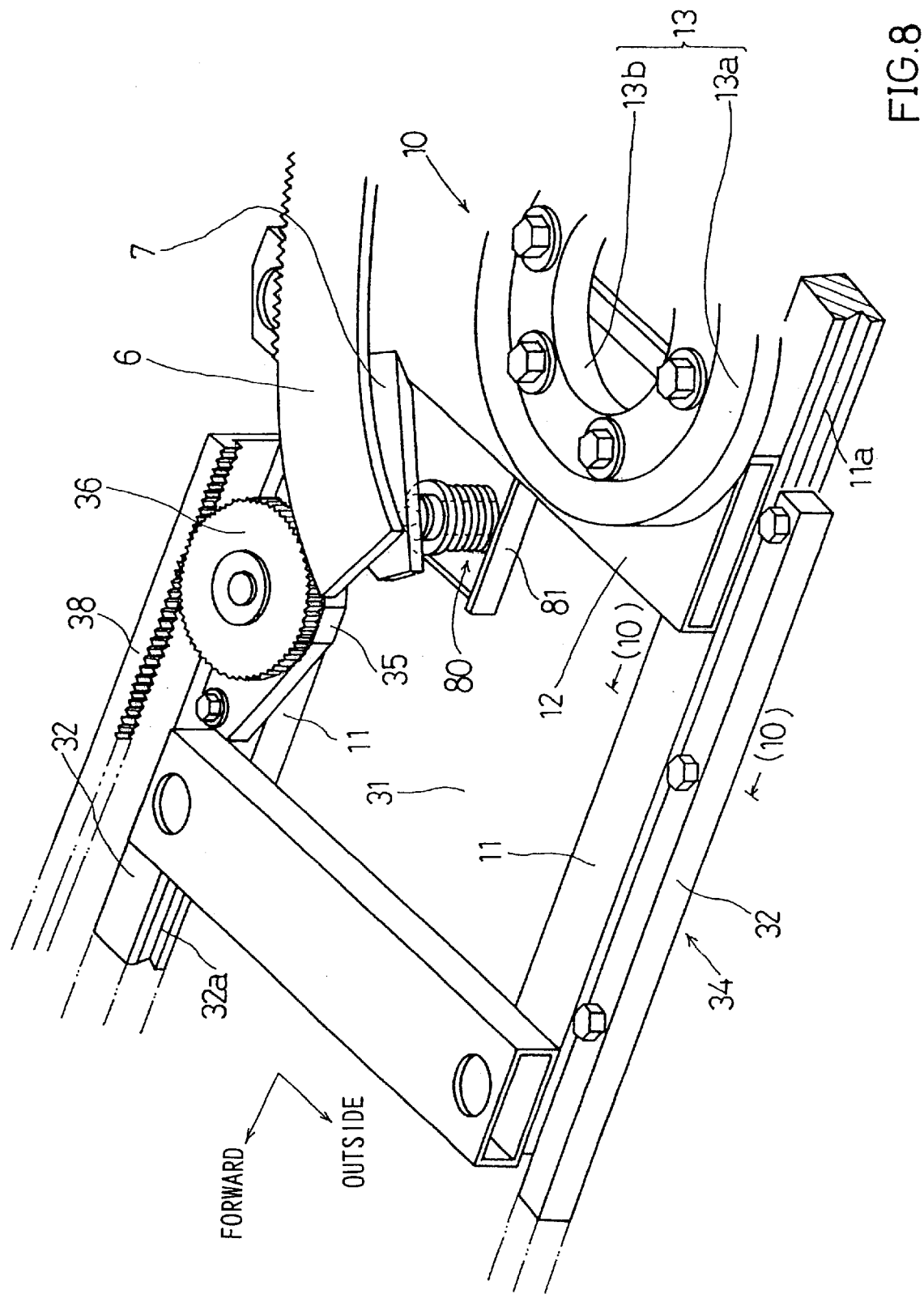
FIG. 8 is a perspective view of coupling means for coupling rotational movement and longitudinal movement of the seat body and a slide lock mechanism.

Coupling means that serves to couple the rotational movement and the longitudinal movement of the seat body 2 will now be described. As shown in FIGS. 4 and 8, a rack 38 is mounted on the side surface of the fixed retaining member 32 on the interior side. An intermediate gear 36 is rotatably mounted on the upper surface of the moving retaining member 11 via a support plate 35. The intermediate gear 36 engages the rack 38. The position and length of the rack 38 are chosen such that this engagement is maintained over the entire longitudinal moving range of the seat body 2.

Figure 6:
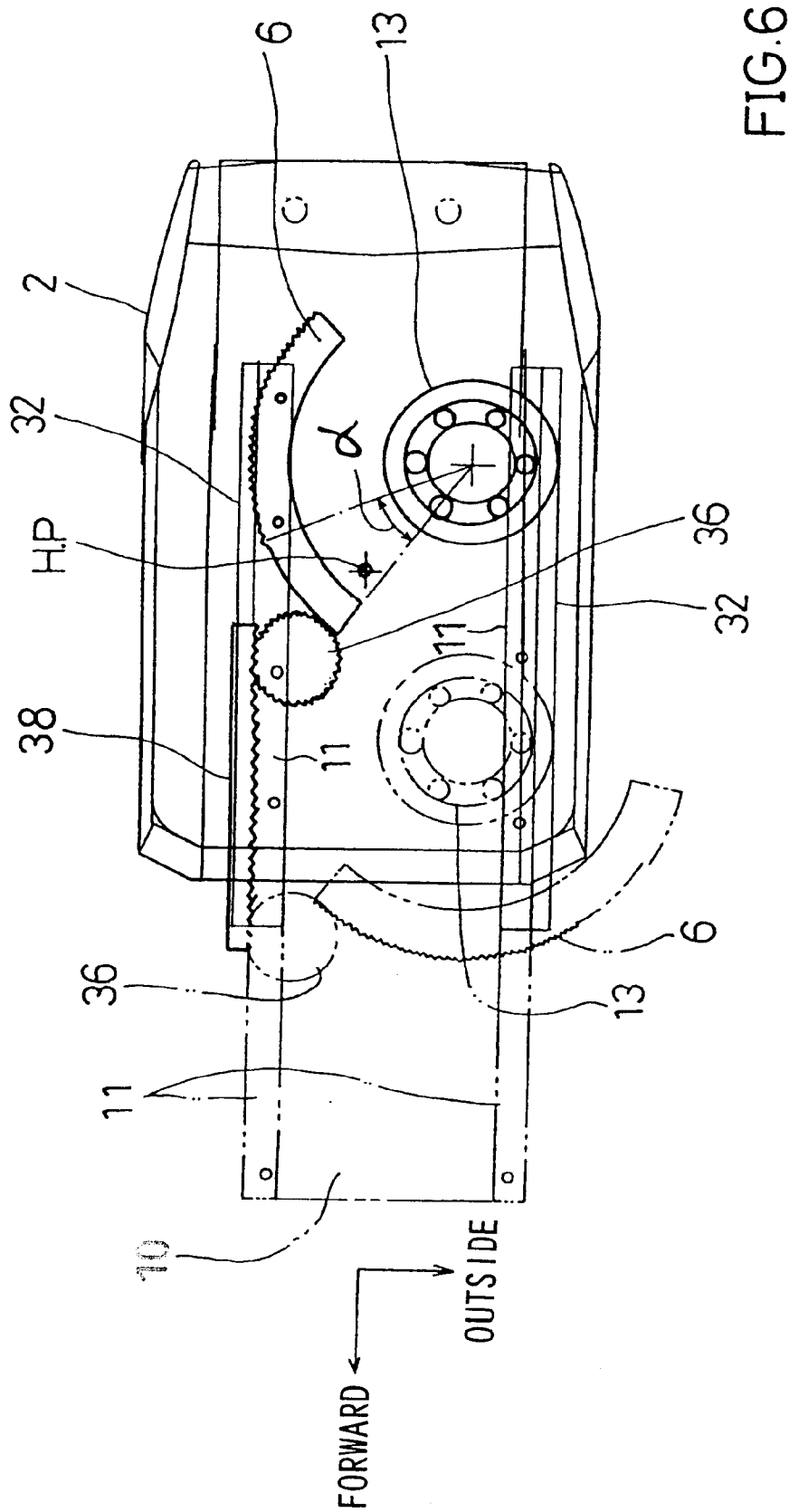
FIG. 6 is a plan view of coupling means for coupling a rotational movement and a longitudinal movement of the seat body.

As shown in FIGS. 6 and 8, the pinion gear 6 has a circular-arc shape extending in a range of about 90° $\theta$ and no engagement teeth are provided within a predetermined angular range $\alpha$ (about 26° in the first embodiment) on the initial engagement side (the counterclockwise end side). Therefore, the pinion gear 6 does not engage the rack 38 within the initial range of about 26° at the beginning of rotation, in which the seat body 2 is rotated from the initial seated position (the position facing the front of the vehicle, as shown by solid line in FIG. 6) to the door opening side (in the counterclockwise direction). Thus, the seat body 2 only rotates without moving forward (in the "non-coupling range").

When the seat body 2 is further rotated to the door opening side, the pinion gear 6 engages the intermediate gear 36. Thus, the intermediate gear 36 rotates in synchronization with the rotational movement of the seat body 2. By being in engagement with the rack 38, the intermediate gear 36 moves forward with respect to the vehicle while rotating. As a result, the rotating support base 10 moves forward of the vehicle, and thus the seat body 2 rotates while moving forward (in the "coupling range").

Figure 9:
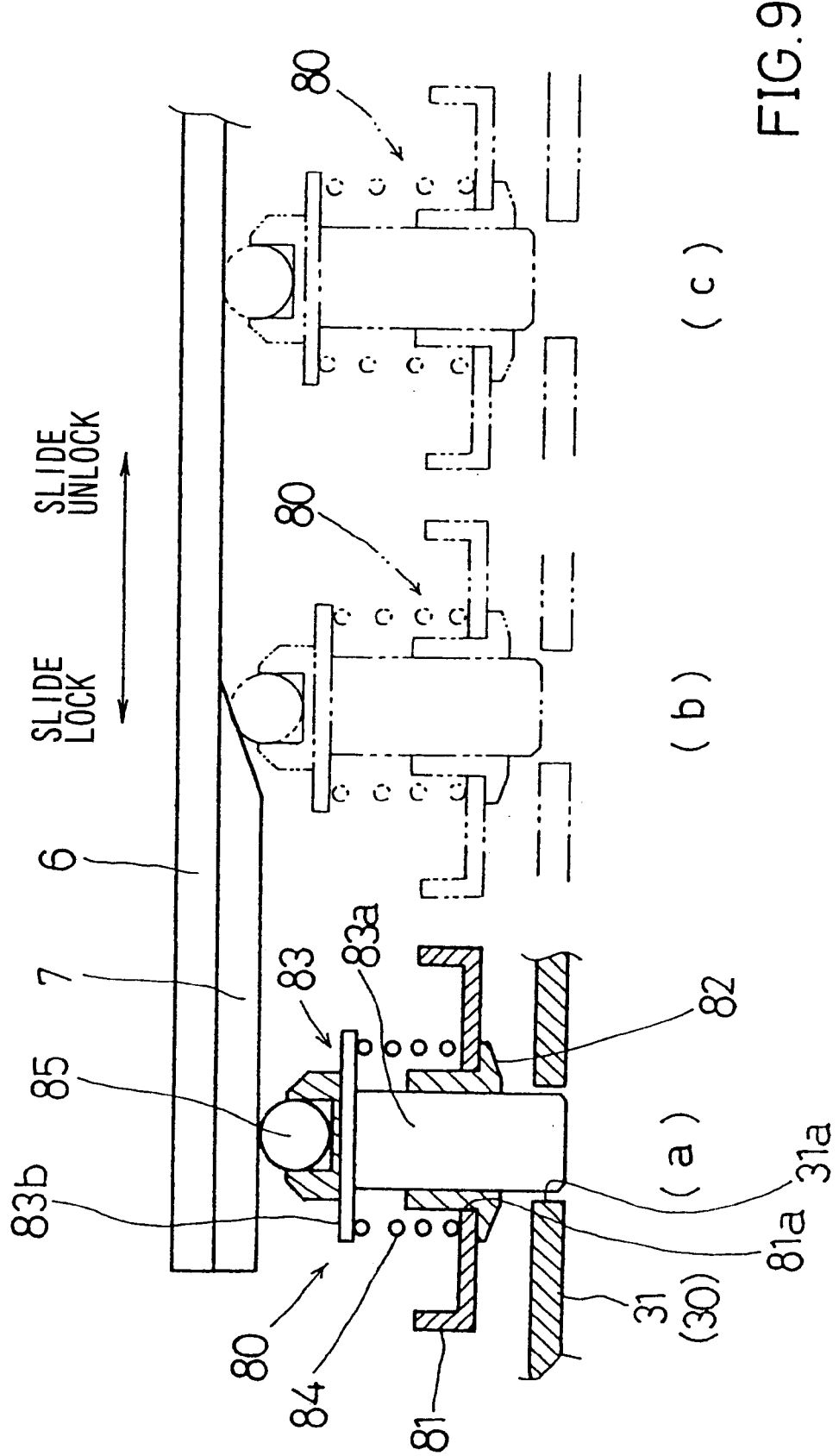
FIG. 9 is a sectional view of the slide lock mechanism in (a) the state of slide lock, in (b) the moving state of a retainer and in (c) the state of slide lock release.

The timing when the steel ball 85 is disengaged from the slide lock automatic release plate 7 to release the slide lock (when it reaches to the relative position (b) in FIG. 9) is chosen to be immediately before the pinion gear 6 engages the intermediate gear 36 by rotation of the seat body 2. Specifically, within the initial range of about 26° at the beginning of rotation of the seat body 2 from the initial seated position to the door opening side, the steel ball 85 abuts against the slide lock automatic release plate 7 and the cylindrical portion 83a of the retainer 83 is held inserted into the lock hole 31a (in the relative position (a) in FIG. 9). Thus, the seat body 2 is held locked to prevent movement in the longitudinal direction.

When the seat body 2 rotates by about 26°, the steel ball 85 is disengaged from the slide lock automatic release plate 7 to release the slide lock (in the relative position (b) in FIG. 9). Then, the retainer 83 is displaced upwardly by the biasing force of the compression spring 84, and thus the cylindrical portion 83a is moved out of the lock hole 31a (in the relative position (c) in FIG. 9). Consequently, the seat body 2 is allowed to move longitudinally (i.e. "automatic release of the slide lock"). Thereafter, the steel ball 85 is held pressed against the underside of the pinion gear 6 and thus the slide lock release state is maintained until the seat body 2 reaches the sideways position facing the door opening side.

On the other hand, before the seat body 2 has rotated by about 64° from the sideways position facing the door opening side toward the seated position, the retainer 83 of the slide lock mechanism 80 is held displaced upwardly, so that the slide lock is released. Thus, the seat body 2 moves rearward while rotating toward the seated position (clockwise). When the seat body 2 rotates by about 64° from the sideways position to the seated position, the seat body 2 returns to the rearmost position in the longitudinal direction with respect to the vehicle. At the same time, the steel ball 85 is engaged with the slide lock automatic release plate 7. As a result, the retainer 83 is depressed against the biasing force of the compression spring 84 and the cylindrical portion 83a is inserted again into the lock hole 31a. Thus, the seat body 2 is locked to prevent longitudinal movement in the rearmost position (in the relative position (b) in FIG. 9). Thereafter, the seat body 2 only rotates about 26° to be returned to the seated position facing the front of the vehicle.

Thus, the automatic locking and unlocking of the slide lock mechanism 80 is timed to the coupling of the rotation and the longitudinal movement of the seat body 2. The slide lock automatic release plate 7 is configured to have a proper dimension and shape and is mounted in such a position that allows such locking and unlocking.

Covers 41,42,43 cover the left and right sides and the rear side so as to prevent foreign materials from entering through the sides to thus prevent malfunctioning and further to improve the appearance.

The most typical operation procedures for the rotating seat 1 thus constructed will now be described with reference to FIGS. 11(A) to 11(D). In these drawings, the rearmost position and the front position in the longitudinal moving range of the seat body 2 are shown by L0 and L1, respectively, with reference to the center of the rotation of the seat body 2 (i.e. the center of the rotation of the rotary disc 13); and the interior side position and the exterior side position in the lateral moving range are shown by W0 and W1, respectively.

Figure 11A:
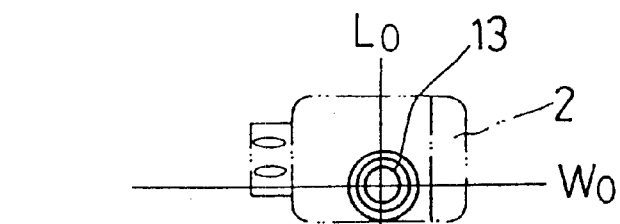
FIG. 11(A) is a plan view of the seat body, illustrating the movement of the rotating vehicle seat of the first embodiment and showing the seat body in a seated positions.
Figure 11B:
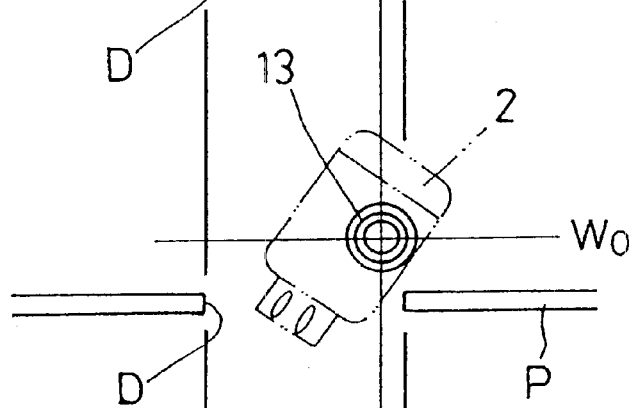
FIG. 11(B) is a plan view of the seat body, illustrating the movement of the rotating vehicle seat of the first embodiment and showing the seat body rotated by about 40° to the door opening side.

FIG. 11(A) shows the seat body 2 in the seated position. An operator depresses the rotation lock release lever 73 to release the rotation lock mechanism 70 in this seated position, and then rotates the seat body 2 to the door opening D (counterclockwise in FIG. 11). FIG. 11(B) shows the seat body 2 thus rotated about 26°. During this period, the pinion gear 6 and the rack 38 do not engage with each other, so that the seat body 2 only rotates. At this stage, the seat body 2 is brought to a position just before the seat cushion 2a of the seat body 2 interferes with the rear portion of the door opening D or a rear pillar P. Therefore, if the seat body 2 is further rotated as it is, the seat body 2 will interfere with the pillar P so that the seat body 2 cannot be rotated to the sideways position facing the door opening D.

When the seat body 2 is rotated by about 26°, however, the slide lock release plate 7 is disengaged from the steel ball 85 of the slide lock mechanism 80 to thus allow the retainer 83 to move upwardly. Thus, the cylindrical portion 83a is moved out of the lock hole 31a, so that the seat body 2 is allowed to move forward (i.e. "automatic release of the slide lock"). At the same time, the pinion gear 6 and the intermediate gear 36 start to engage with each other.

Figure 11C:
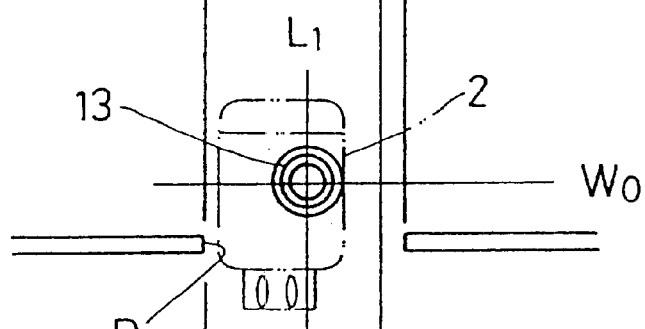
FIG. 11(C) is a plan view of the seat body, illustrating the movement of the rotating vehicle seat of the first embodiment and showing the seat body in a sideways position.

Therefore, when the seat body 2 is further rotated thereafter, coupling with this rotational movement, the seat body 2 moves forward by engagement between the pinion gear 6 and the intermediate gear 36 and by engagement between the intermediate gear 36 and the rack 38. The seat body 2 thus moves forward while rotating the remaining about 64°. As a result, as shown in FIG. 11(C), the seat body 2 turns to the sideways position facing the door opening D and moves to the front position L1. Because the seat body 2 is thus moved forward while rotating, the occupant's foot or the footrest is prevented from interfering with the front end of the door opening D. In this respect, if the seat body is rotated after being moved to the front position like the prior art, the occupant's foot will interfere with the door opening (vehicle body). Such a problem can be eliminated by moving the seat body forward while rotating, as in the first embodiment.

When the seat body 2 turns to the sideways position, the lock pin 74c is locked by the rotation lock plate 72 on the interior side of the rotating support base 10, so that the seat body 2 is locked to prevent rotation in the sideways position. The seat body 2 is also locked to prevent longitudinal movement by being locked to prevent rotation. With engagement between the pinion gear 6 and the intermediate gear 36 and engagement between the intermediate gear 36 and the rack 38, the rotational movement and the longitudinal movement of the seat body 2 are coupled to each other.

Figure 11D:
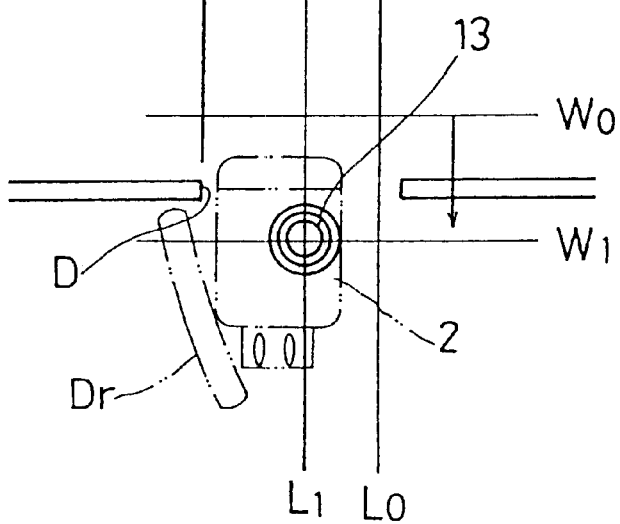
FIG. 11(D) is a plan view of the seat body, illustrating the movement of the rotating vehicle seat of the first embodiment and showing the seat body moved to the exterior.

Next, the electric motor 61 on the lift-up mechanism 50 is rotated in the normal direction to extend the extending arms 57 to the exterior side so as to move the seat body 2 from the interior side position W0 shown in FIG. 11(C) to the exterior side position W1 shown in FIG. 11(D). In this process, the seat body 2 is lowered down to a specified level while moving to the exterior side position W1. After the seat body 2 has been lowered down to the specified level outside, the electric motor 61 and thus the lift-up mechanism 50 are stopped. In this state, the occupant may leave the seat. Thus, the seat body 2 is gradually displaced to a lower level (for example, to the same level as a wheelchair) while moving to the exterior of the vehicle through the door opening D. If the occupant wishes to move directly from the exterior side position W1 to the wheelchair, the occupant can easily move from the seat body 2 to the wheelchair. Further, in the first embodiment, in which the seat body 2 is moved laterally with respect to the vehicle by using the quadric link mechanism, the seat body 2 can be lowered and raised by a larger amount even in less lateral space, compared with a construction that moves by means of a slide mechanism. Therefore, the seat body 2 can be moved to a sufficiently lower level even in a van having a compartment floor at a relatively high level.

Further, as shown in FIG. 11(D), in the process in which the seat body 2 is moved to the exterior of the vehicle by operation of the lift-up mechanism 50, even if wind pushes against the opened door Dr in a direction that would close the door, the door is held in the opened position by the seat cushion 2a of the seat body 2. Therefore, the door does not interfere with the occupant's entry/exit.

In order to return the seat body 2, which has thus been moved to the exterior side position W1, to the original seated position, the electric motor 61 is rotated in the reverse direction to move the lift-up mechanism 50 in the backward direction. Thus, the seat body 2 is returned to the interior side position W0 shown in FIG. 11 (C), while being raised. When the seat body 2 has been returned to the interior side position W0, the electric motor 61 and thus the lift-up mechanism 50 are stopped. Thereafter, the rotation lock mechanism 70 is released and the seat body 2 is manually rotated to the interior side. In this stage, the engagement between the pinion gear 6 and the intermediate gear 36 and the engagement between the intermediate gear 36 and the rack 38 are maintained, and the seat body 2 moves from the front position L1 to the rearmost position L0 while rotating to the interior side.

When the seat body 2 is rotated by about 64° from the sideways position to the interior side, the seat body 2 is returned to the rearmost position L0 shown in FIG. 11(B). Thereafter, the seat body 2 is further rotated by about 26° to be returned to the seated position shown in FIG. 11(A). In this rotational range of about 26°, the pinion gear 6 is disengaged from the intermediate gear 36 and the slide lock release plate 7 is moved onto the steel ball 85 of the slide lock mechanism 80. As a result, the slide lock mechanism 80 is returned to the locked state, so that the seat body 2 only rotates without moving in the longitudinal direction.

With the rotating vehicle seat 1 having the above construction according to the first embodiment, the seat body 2 is supported by the lift-up mechanism 50, the rotating support base 10 and the longitudinal support base 30. The pinion gear 6 and the rack 38 that engage with each other via the intermediate gear 36, are disposed between the lift-up mechanism 50 and the longitudinal support base 30. Therefore, the rotational movement and the longitudinal movement of the seat body 2 are coupled to each other. Thus, for example, even in the case of a sedan type car having a narrow door opening D, the seat body 2 can be turned to the door opening D without interfering with a pillar or other portions of the car and without the occupant's foot interfering with the edge of the door opening D. Therefore, usability can be greatly improved.

Further, because the rotary disc 13 is mounted on the exterior side end under the seat cushion, a larger space can be provided under the interior side of the seat cushion. Therefore, the pinion gear 6 that is mounted may be of a large diameter. With the larger diameter pinion gear 6, the longitudinal moving distance of the seat body 2 can be increased. Therefore, the rotating seat 1 can be suitably utilized, especially in a van that requires a relatively long longitudinal moving distance for the seat body. Furthermore, because the center of rotation of the seat body 2 is positioned closer to the exterior side than the hip point HP, the seat body can be moved forward with respect to the vehicle simply by rotating the seat body 2 to the exterior side. Also in this respect, a longer longitudinal moving distance of the seat body 2 can be provided.

Further, in this embodiment, the linear guide mechanism 34 that consists of the moving retaining member 11, the fixed retaining member 32 and the plurality of steel balls 33 fitted into the grooves 11a,32a of the retaining members 11,32, is used as a linear guide mechanism for moving the seat body 2 longitudinally with respect to the seat body. With this mechanism, the seat body 2 can be moved smoothly without rattling in the longitudinal direction of the vehicle. In this respect, if a linear guide mechanism that consists of a rail having a U-shaped cross section and a roller inserted for rolling movement into the interior of the rail is used, a proper clearance is required between the roller and the rail in order to move the seat body smoothly. Such a clearance, however, causes the seat body to rattle. The linear guide mechanism 34 of this embodiment can eliminate such a problem and can provide a rotating seat 1 having excellent supporting rigidity (without rattling).

Further, because the quadric link mechanism is used as a mechanism for moving the seat body 2 laterally with respect to the vehicle, the seat body 2 can be lowered and raised between a higher seat position and a lower outside position near the ground even in a limited space, or in a short moving distance, in the lateral direction of the vehicle. On the other hand, if a mechanism that is constructed to permit the seat body 2 to simply slide along a rail that is inclined in the lateral direction of the vehicle is used, a wider space is required in the lateral direction of the vehicle, even for the same vertical moving distance. Therefore, the lift-up mechanism 50 that essentially consists of the quadric link mechanism, permits the seat body 2 to be lowered and raised by a large amount between the vehicle floor and the ground, without requiring a large space in the lateral direction of the vehicle even in a car having a relatively great height, such as a van, as in the first embodiment.

Various changes or modifications may be added to the above-described first embodiment. For example, in the above embodiment, while only the lift-up mechanism 50 is electrically driven, the rotating support base 10 and the longitudinal support base 30 may also be electrically driven. Alternatively and to the contrary, the lift-up mechanism 50 may be manually operated like the rotating support base 10 and the longitudinal support base 30.

Further, if the seat body 2 is not required to move to the outside of the vehicle, the quadric link mechanism of the lift-up mechanism 50 and the actuator 60 may be omitted.

Further, although the first embodiment has been described with respect to a rotating seat for a passenger's seat, the rotating seat according to this invention is applicable to other seat positions, such as a rear seat and a driver's seat.

Figure 13:
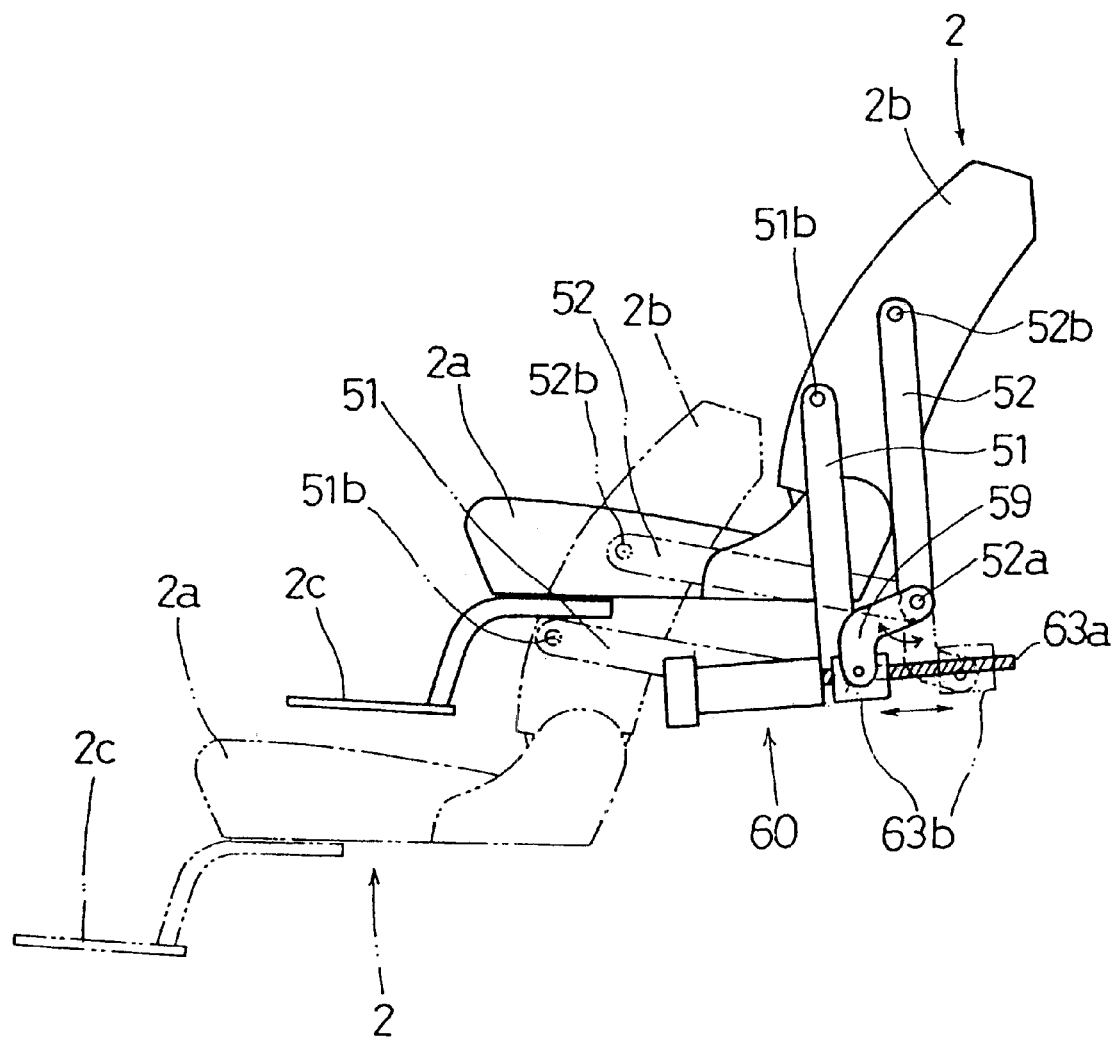
FIG. 13 is a side view of a lift-up mechanism, in which an actuator is arranged to have a threaded shaft on the rear.

As disclosed, for example, in Japanese Laid-Open Patent Publication No. 9-48271, a swing-down type lift-up mechanism using a quadric link mechanism has been provided as a lift-up mechanism for a rotating vehicle seat. Such a swing-down type lift-up mechanism uses an actuator that is formed by combination of a motor and a ball screw. As shown in FIG. 13, in the prior art, the actuator 60 is assembled such that, with the threaded shaft 63a of the ball screw being oriented to the rear of the seat, the nut 63b of the ball screw is connected to the link arm 59 of the link mechanism. The threaded shaft case for rotatably supporting the threaded shaft is connected to the vehicle floor. With this prior art construction, when the electric motor of the actuator 60 is started, the threaded shaft 63a rotates and the nut 63b moves along the threaded shaft 63a. The link arms 51,52 swing with the movement of the nut 63b to thereby move the seat body 2 to the outside of the vehicle or back to the seated position in the inside of the vehicle.

However, if the rotating vehicle seat having the above-described prior art swing-down type lift-up mechanism is used, because the actuator 60 is assembled with the threaded shaft 63a being oriented to the rear of the seat (to the right as viewed in the drawing), the threaded shaft 63a protrudes close to the feet of the occupant sitting in a seat behind the rotating seat. Therefore, the protruding threaded shaft may contact and soil the clothes of the occupant in the back seat, which may distress or offend the back seat occupant. The invention as described in claim 8 is provided to solve this problem.

In the rotating vehicle seat 1 according to the first embodiment that has been described above, the actuator 60 is assembled in the quadric link type lift-up mechanism 50 in an orientation to locate the threaded shaft 63a at the front of the seat body 2 and to locate the gear box 62 at the back of the seat body 2. Thus, unlike the prior art, the threaded shaft 63a does not protrude toward a person sitting in a seat behind the rotating seat. Therefore, the occupant in the back seat does not need to be worried that his or her clothes may be soiled by the threaded shaft or be offended by the soiled clothes.

Further, the actuator 60 moves rearward of the seat body 2 only when the seat body 2 is moved to a lower position outside the vehicle. Specifically, the actuator 60 is located back to the forward position when the seat body 2 is in the seated position in the inside of the vehicle, such as when the vehicle is running. Therefore, the actuator 60 is kept out of the back seat occupant's way.

Further, with this quadric link type lift-up mechanism 50, the seat body 2 can be lowered and raised between a higher seat position and a lower outside position near the ground even in a limited space, or in a short moving distance, in the lateral direction of the vehicle. On the other hand, if a mechanism that is constructed to permit the seat body 2 to simply slide along a rail that is inclined in the lateral direction of the vehicle is used, a wider space is required in the lateral direction of the vehicle, even for the same vertical moving distance. Therefore, the lift-up mechanism 50 that essentially consists of the quadric link mechanism, permits the seat body 2 to be greatly lowered and raised between the vehicle floor and the ground, without requiring a large space in the lateral direction of the vehicle even in a car having a relatively great height, such as a van, as in the first embodiment.

An embodiment of the present invention as defined in claim 2 (a second embodiment) will now be described.

Figure 19:
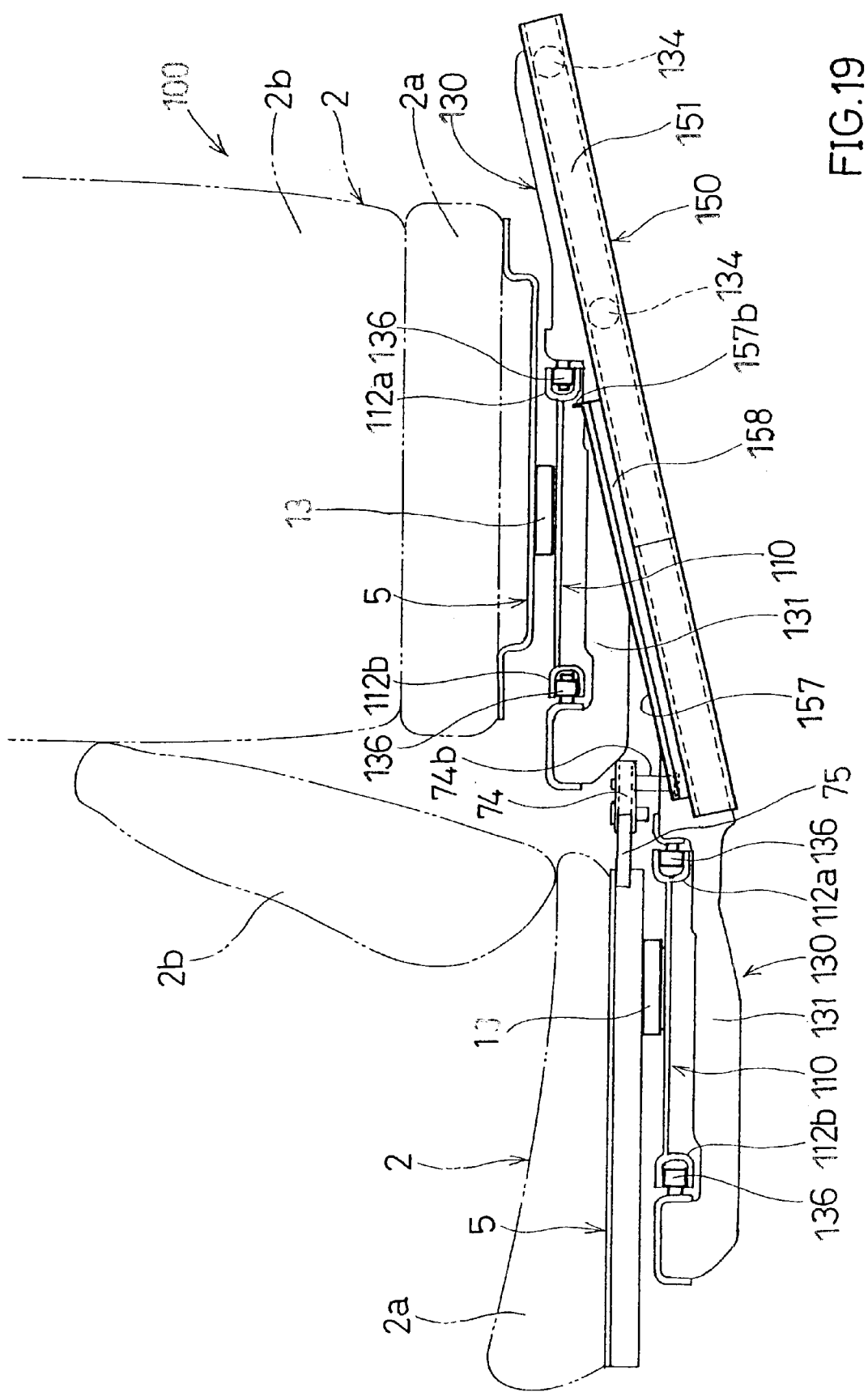
FIG. 19 is a side view showing the positional relationship of a stopper member with the seat base, the rotating support base and the longitudinal support base in each operational position.
Figure 20:
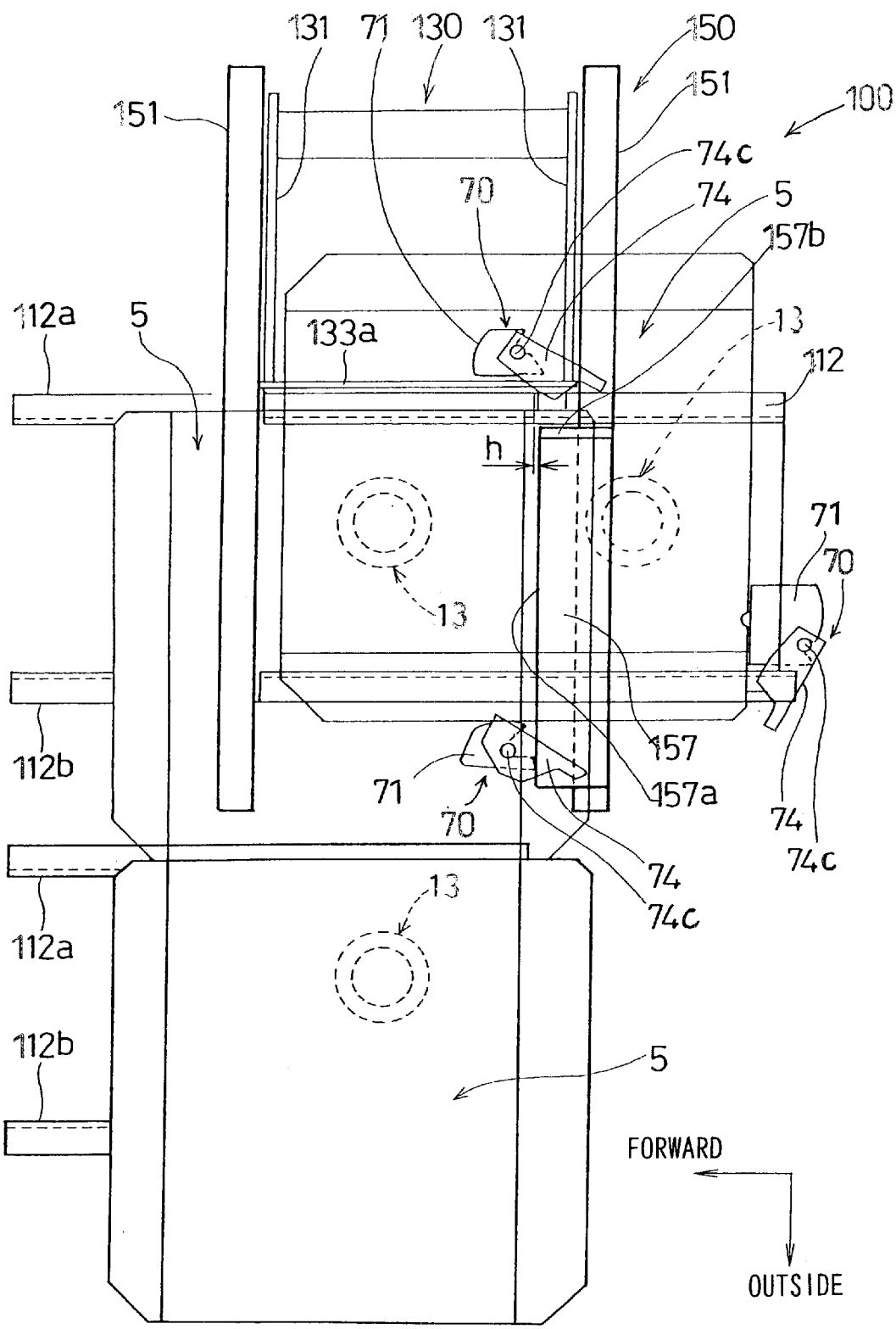
FIG. 20 is a plan view showing the positional relationship of the stopper member with the seat base and the rotating support base in each operational position.

Although the rotating vehicle seat 1 of the first embodiment has a quadric link type lift-up mechanism 50 provided to move the seat body 2 laterally with respect to the vehicle, rotating vehicle seats that include a slide-type lateral moving means using a linear slide mechanism instead of the quadric link type lift-up mechanism 50 are provided. A rotating vehicle seat 100 of this type is shown in FIGS. 19 and 20. The seat body 2 is rotatably supported by the rotary disc 13 on a rotating support base 110 via the seat base 5 mounted on the underside of the seat body 2. The rotating support base 110 is supported by a longitudinal support base 130 to permit movement in the longitudinal direction of the vehicle (in a direction perpendicular to the plane of the drawing as viewed in FIG. 19; in the lateral direction as viewed in FIG. 20). In FIG. 20, the seat body 2 is not shown, and only the seat base 5 is shown.

A coupling mechanism, which is similar to that of the first embodiment, is also incorporated in this slide-type rotating vehicle seat 100. Specifically, a rack is mounted on the longitudinal support base 130, an intermediate gear that engages the rack is mounted on the rotating support base 110, and a pinion gear that engages the intermediate gear is mounted on the seat body 2. Thus, by coupling with the rotational movement of the seat body 2, the seat body 2 moves longitudinally with respect to the vehicle.

The longitudinal support base 130 is supported by a slide-type lateral support base 150 to permit movement in the lateral direction of the vehicle (in the lateral direction as viewed in FIG. 19; in the vertical direction as viewed in FIG. 20).

For a rotating seat in which the seat body 2 moves laterally with respect to the vehicle by using the slide-type lateral support base 150, the seat body 2 needs to be restricted in its longitudinal movement and rotational movement during its lateral movement. Therefore, in order to reliably restrict the seat body 2 in its longitudinal movement and rotational movement during its lateral movement and also to reliably restrict the seat body 2 in its lateral movement in its seated position, the rotating vehicle seat 100 has been provided with a stopper 157 that is mounted via a base 158 on the upper surface of a slide rail 151 on the rear side of the lateral support base 150. As shown in the drawing, the stopper 147 is about half the length of the slide rail 151 and is mounted on and along the. slide rail 151 so as to extend from about the middle to substantially the exterior side end of the slide rail 151. As shown in FIG. 20, the front side edge (the left side edge as viewed in the drawing) of the stopper 157 protrudes from the front side edge of the slide rail 151 by a predetermined amount and comprises a first stopper portion 157*a* . Further, as shown in FIG. 19, the interior side end of the stopper 157 is upwardly bent to be generally L-shaped and comprises a second stopper portion 157*b*.

When the seat body 2 is in the seated position, as shown in FIG. 20, the rotating support base 10 is in the rearmost position and the seat body 2 is in the seated position facing the front of the vehicle. In the seated position, the seat body 2 is locked to prevent rotation by means of the rotation lock mechanism 70, which was described in the first embodiment.

With the seat body 2 in the seated position, the second stopper portion 157*b* of the stopper 157 is positioned adjacent to the exterior side of the interior side slide rail 112*a*. The position of the second stopper portion 157*b* or the length of the stopper 157 is determined so as to realize this condition. Therefore, the second stopper portion 157*b* stops the rotating support base 10 and thus the seat body 2 from moving toward the exterior side. Because the lateral movement of the seat body 2 in the seated position is thus stopped by the second stopper portion 157*b* of the stopper 157, the lateral position of the seat body 2 in the seated position can be reliably locked.

When the rotation lock mechanism 70 is released and the seat body 2 is rotated to the exterior side, the seat body 2 moves forward while rotating by the action of the coupling mechanism. When the seat body 2 is rotated to the sideways position and moved to the front position in the longitudinal sliding range, the rear end of the interior side slide rail 112*a* of the rotating support base 110 moves forward (to the left as viewed in FIG. 20) of the second stopper portion 157*b* of the stopper 157 and moves by a slight distance h forward of the first stopper portion 157*a* of the stopper 157. Thus, lateral movement of the rotating support base 110 is allowed. At this time, the seat body 2 is locked in the sideways position to prevent rotation.

In this state, the seat body 2 can be moved to the exterior side by means of a linear driving mechanism which is not shown. In this process of moving the seat body 2 to the exterior side, a small clearance h is maintained between the rear end of the interior side slide rail 112*a* of the rotating support base 110 and the first stopper portion 157*a* of the stopper 157. Thus, the longitudinal support base 130 and thus the seat body 2 are allowed to move to the exterior side. On the other hand, the longitudinal support base 130 is stopped from moving rearward by the first stopper portion 157*a* being positioned to the rear (to the right as viewed in FIG. 20) of the slide rails 112*a*. As a result, the rearward movement of the seat body 2 is stopped and thus the rotational movement of the seat body 2 is also stopped.

While the seat body 2 in the sideways position is, as described above, locked to prevent rotation by means of the rotation lock mechanism 70, the rotation lock mechanism 70 can be released at any time, irrespective of the position of the seat body 2. Therefore, if the rotation lock mechanism 70 is inadvertently released, the seat body 2 can rotate and can also move rearward by being coupled to the rotational movement. If the seat body 2 rotates or moves rearward while moving to the exterior side, the seat body 2 and the occupant will interfere with the pillar at the door opening, so that the seat body 2 cannot move smoothly to the exterior side. In this respect, by providing the stopper 157, the rearward movement and the rotational movement of the seat body 2 are stopped in the process of movement of the seat body 2 to the exterior side. Therefore, even if the rotation lock mechanism 70 is inadvertently released, the seat body 2 can be moved straight to the exterior side without interference of the seat body 2 and the occupant with the pillar at the door opening.

Further, in the process of moving the seat body 2 to the exterior side, as described above, the rear end of the slide rail 112a passes along the side of the first stopper portion 157a, so that the seat body 2 is stopped from moving rearward. Further, the seat body 2 moves to the exterior side with the lock member 74 of the rotation lock mechanism 70 being held engaged with the lock plate 71. Therefore, the lock pin 74c of the rotation lock member 74 that passes along the side of the first stopper portion 157a, also causes the seat body 2 to be stopped from moving rearward.

When the seat body 2 reaches the end position on the exterior side, the rear end of the exterior side slide rail 112a of the rotating support base 110 is disengaged from the side of the first stopper portion 157a. However, the lock pin 74b is still positioned to the side of the first stopper portion 157a, so that the seat body 2 is stopped from moving rearward and rotating in the end position as well.

The above-described stopper 157 can work properly when the pair of left and right slide rails 112a,112b of the longitudinal support base 130 are disposed on a horizontal plane and the slide rail 151 of the lateral support base 150 is disposed in an inclined position, as shown in FIG. 19. If the slide rail 151 is not disposed in an inclined position, but rather in a horizontal position, when the seat body 2 is moved into the inside of the vehicle, the slide rail 112a is disengaged from the stopper 157; however, the slide rail 112b abuts against the stopper 157 to thereby stop the rearward movement of the seat body 2, so that the stopper 157 cannot work. In light of this problem, in the construction in which the slide rail 151 is disposed in a horizontal position, a notch may be provided on the stopper 157 in order that, when the seat body 2 is in an interior retracted position, the slide rail 112a of the longitudinal support base 130 is located in a position to be allowed to pass to the interior side of the second stopper portion 157b of the stopper 157 and the seat body 2 can be allowed to move longitudinally at the position of the slide rails 112b. With this construction, however, during lateral movement of the longitudinal support base 130, the slide rail 112b is disengaged from the stopper 157 to the outside and the slide rail 112a enters the notch. In this state, the longitudinal movement cannot be stopped.

The invention as described in claim 2 has been made to solve the above-mentioned problems. It is, accordingly, an object of the invention to provide a rotating vehicle seat in which, whether the lateral support base is disposed in a horizontal position or in an inclined position, the seat body can be moved longitudinally with respect to the vehicle when the longitudinal support base is in the inside of the vehicle, and which further includes a restricting arrangement that serves to restrict the longitudinal movement of the seat body when the longitudinal support base is moving longitudinally along the lateral support base.

A rotating vehicle seat 190 of the second embodiment has a retaining mechanism 141 provided on the rear side (interior side) of the longitudinal support base 130. In the following description, components that do not require modifications to the first embodiment will be identified by the same numerals.

Figure 14:
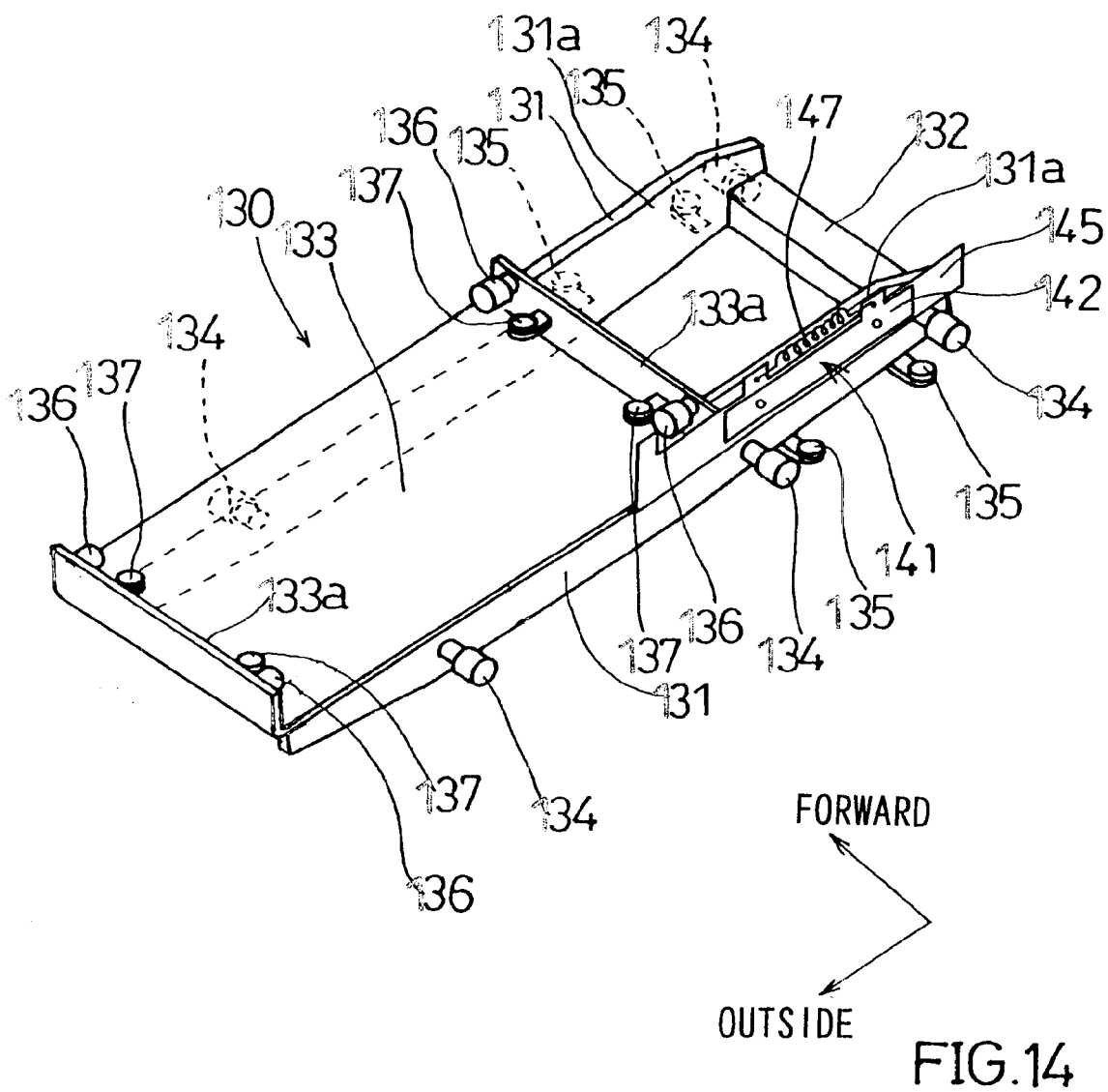
FIG. 14 is a perspective view of a longitudinal support base according to an embodiment of the invention as described in claim 2 (a second embodiment)
Figure 17:
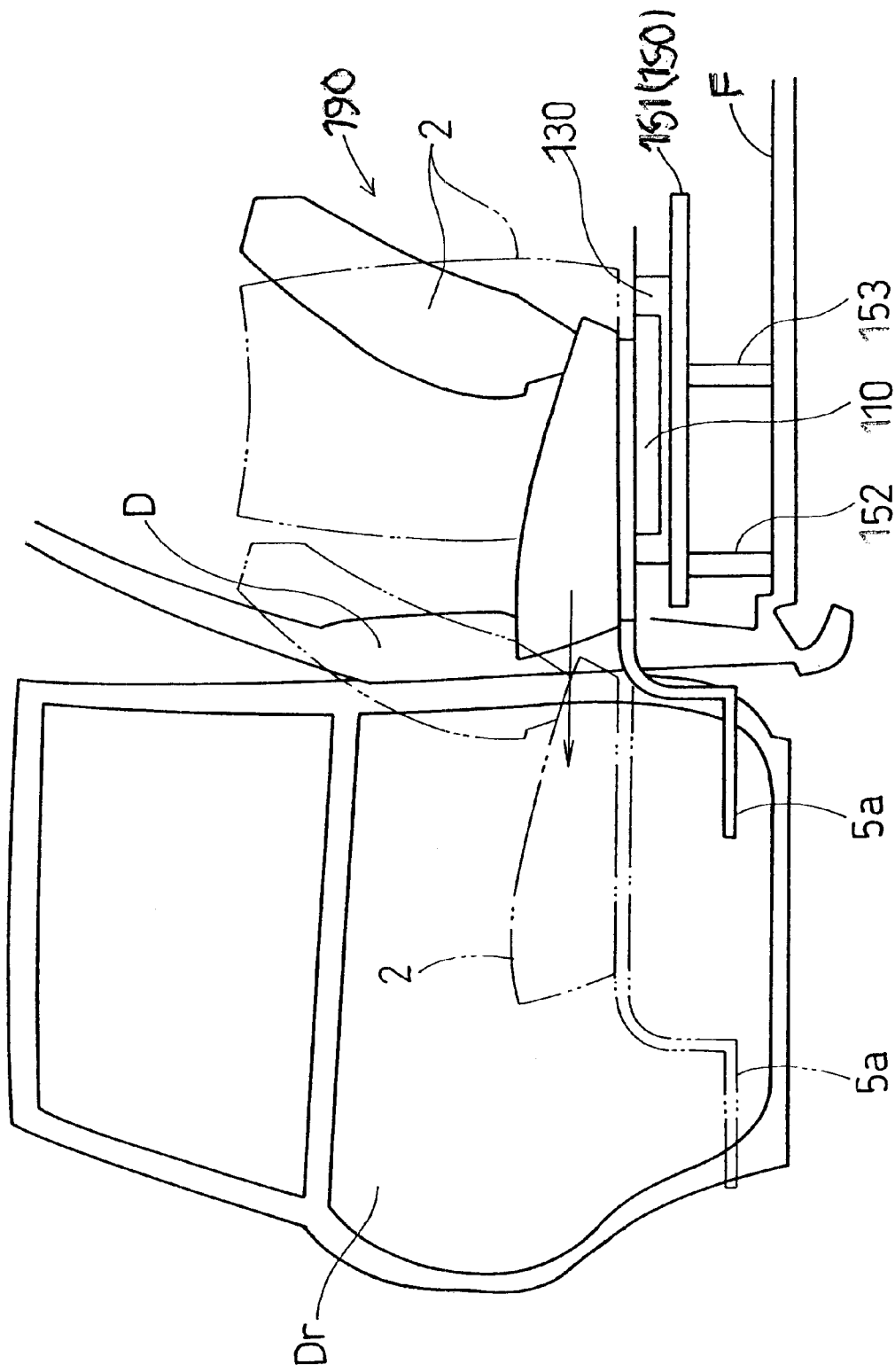
FIG. 17 is a side view of the seat body, illustrating its horizontal movement from the inside to the outside of the vehicle.

The lateral support base 150 has a pair of slide rails 151 having a U-shaped cross-section. The slide rails 151 support vertical rollers 134 and lateral rollers 135 of the longitudinal support base 130, which are shown in FIG. 14, to permit rolling movement. The slide rails 151 are disposed parallel to each other at a predetermined spacing in the lateral direction of the vehicle. As shown in FIG. 17, the slide rails 151 are supported horizontally on the vehicle floor F by an exterior side pedestal 152 and an interior side pedestal 153 that have the same vertical length.

As shown in FIG. 14, the longitudinal support base 130 has a pair of main frames 131 and a pair of support frames 132. The main frames 131 are disposed in the predetermined spacing provided between the slide rails 151 of the lateral support base 150. One of the support frames 132 extends across the interior side ends of the main frames 131 and the other extends across the exterior side ends of the main frames 131. A base 133 is mounted in a predetermined range on the exterior side of the frame formed by the main frames 131 and the support frames 132. A bent edge 133a is formed on the exterior and interior side ends of the base 133. An upright portion 131a is formed on the interior side of each of the main frames 131.

Two vertical rollers 136 and two horizontal rollers 137 are rotatably mounted on the interior surface of each of the bent edges 133a of the base 133. The vertical rollers 136 and the horizontal rollers 137 support the slide rails 112 of the rotating support base 110 (see FIG. 19). Further, three vertical rollers 134 and two horizontal rollers 135 are rotatably attached to the sides of the each main frame 131. The vertical rollers 134 and the horizontal rollers 135 are inserted for rolling movement into the interior of the slide rails 151 of the lateral support base 150.

The restricting arrangement 141 is provided on one of the upright portions 131a that is formed on the interior side of the main frame 131 on the rear side (the right side as viewed in the drawing) of the longitudinal support base 130. The restricting arrangement 141 serves to restrict the rearward movement of the rotating support base 110 during the movement of the longitudinal support base 130 to the outside. The restricting arrangement 141 is shown in detail in FIG. 16. The restricting arrangement 141 includes a guide plate 142, a stopper member 145 and a coil spring 147. A pair of guide pins 143 are mounted with a predetermined spacing therebetween on the upright portion 131a of the main frame 131. The guide plate 142 is connected to the upright portion 131a via the guide pins 143 such that the guide plate 142 is disposed in a position generally opposed to and with a predetermined spacing from the upright portion 131a. The guide plate 142 has a generally rectangular plate-like shape, and a projection 142b extends from a predetermined location of an upper edge 142a of the guide plate 142. A hole 142c for receiving an end of the coil spring 147 is formed through the projection 142b.

Figure 15:
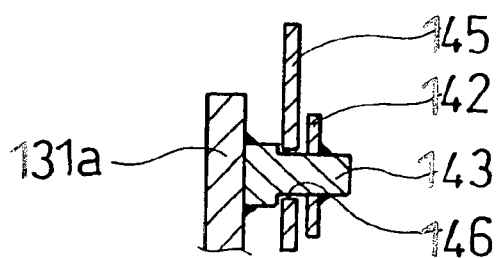
FIG. 15 is a sectional view taken along line I—I in FIG. 16.
Figure 16:
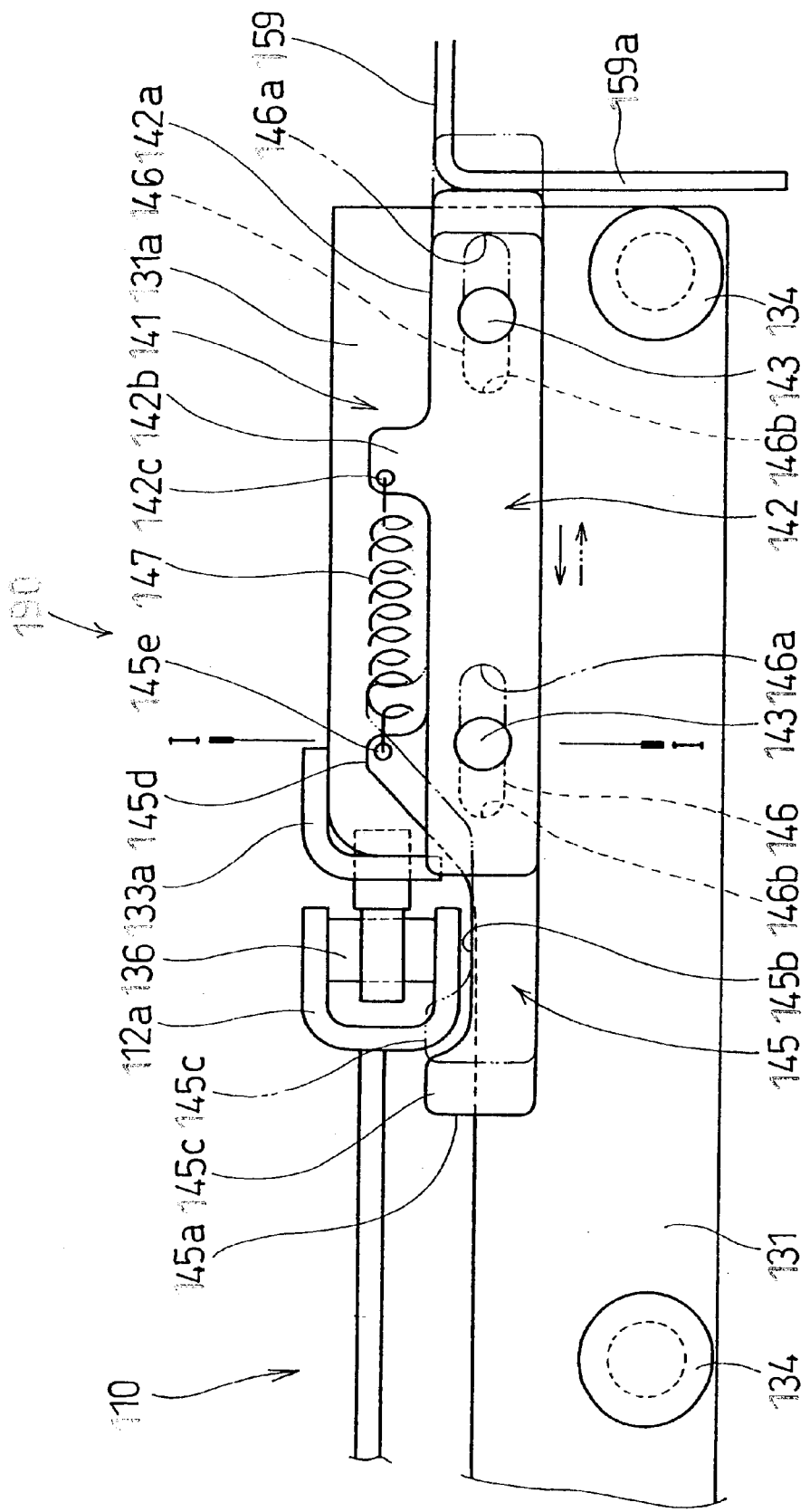
FIG. 16 is a side view of a restricting arrangement that is connected to a main frame of a longitudinal support base that is slidably mounted on a horizontally disposed lateral support base.

As shown in FIG. 15, the stopper member 145 is slidably mounted between the guide plate 142 and the upright portion 131a. As shown in FIG. 16, the stopper member 145 has a generally rectangular shape, which is longer in length than the guide plate 142. A recess 145b is formed on the stopper member 145 near an outer end 145a on the exterior side and serves to permit the interior side slide rail 112a of the rotating support base 110 to move. A stopper portion 145c is formed on the outer end 145a. Further, a projection 145d extends from the stopper member 145 so as to be continuous with the recess 145b and to have a height corresponding to the projection 142b of the guide plate 142. A hole 145e for receiving the other end of the coil spring 147 is formed through the projection 145d. The stopper member 145 also has a pair of slide slots 146 of a predetermined length for receiving the guide pins 143.

The stopper member 145 thus constructed is slidably supported between the upright portion 131a of the main frame 131 and the guide plate 142 via the slide slots 146 by the guide pins 143. Further, the stopper member 145 is biased toward the interior side by the coil spring 147 connected between the projections 142b,145d through the receiving holes 142c,145e.

The operation of the restricting arrangement 141 will now be described with the movement of the seat body 2 with reference to FIGS. 11(A) to 11(D) which have been described in the first embodiment. When the seat body 2 is in the seated position (FIG.11(A)), as shown in FIG. 16, the stopper member 145 of the restricting arrangement 141 that is mounted on the main frame 131 of the longitudinal support base, is in contact with a bent portion 159a of an end plate 159 that is mounted on the end of each of the slide rails 151 of the lateral support base 150. Specifically, the stopper member 145 has been moved to the exterior side via the slide slots 146 against the spring force of the coil spring 147, and an interior side end 146a of the slide slot 146 is in contact with the guide pin 143.

In this state, the recess 145b of the stopper member 145 is located in a position to permit the interior side slide rail 112a of the rotating support base 110 to move longitudinally. When the sliding rails 112a, 112b have been moved rearward, the seat body 2 is in a seated position.

When the seat body 2 is in the seated position, the rotation lock mechanism 70 is released to rotate the seat body 2 to the side of the door opening D (counterclockwise in FIG. 11) (FIG.11(B)). Within a predetermined angular range at the beginning of rotation, the pinion gear and the rack of the coupling mechanism do not engage with each other, so that the seat body 2 only rotates without moving forward. When the seat body 2 has been rotated to the exterior side by the predetermined angle, the slide lock mechanism 80 is unlocked, so that the seat body 2 can move forward and at the same time, the pinion gear and the rack start to engage with each other. Therefore, when the seat body 2 is further rotated thereafter, coupling with this rotational movement, the seat body 2 moves forward by engagement between the pinion gear and the rack. The seat body 2 thus moves forward while rotating. As a result, the seat body 2 turns to the sideways position facing the side of the door opening D and moves to the front position L1 (FIG. 11(C)).

When the seat body 2 turns to the sideways position, the rear end of the interior side slide rail 112a of the rotating support base 110 is disengaged from the recess 145b of the stopper member 145 and is moved slightly forward of the stopper member 145. Then, the lock member 74 is locked by the rotation lock plate 72 on the rear right side of the rotating support base 110, so that the seat body 2 is locked to prevent rotation in the sideways position.

Next, when the seat body 2 is moved from the interior side position W0 shown in FIG. 11(C) to the exterior side position W1 shown in FIG. 11(D), the restricting arrangement 141 mounted on the main frame 131 of the longitudinal support base 130 also moves together with the seat body 2. As a result, the stopper member 145, which has abutted against the end plate 159 mounted on the slide rail 151 of the lateral support base 150 and has thus been moved to the exterior side against the spring force of the coil spring 147, is moved to the interior side by the restoring force of the coil spring 147, as shown in FIG. 16 by a broken line. At the same time, the stopper portion 145c moves toward the end of the slide rail 112a. When an end 146b of the slide slot 146 contacts the guide pin 143, the stopper portion 145c is positioned facing the end of the slide rail 112a, so that longitudinal movement of the slide rails 112a and thus longitudinal movement of the seat body 2 are stopped. In this state, the seat body 2 is moved to the position shown in FIG. 11(D), in which the occupant may leave the seat.

In order to return the seat body 2, which has thus been moved to the exterior side position W1, to the original seated position, the linear slide mechanism of the lateral support base 150 is actuated in the reverse direction to return the seat body 2 to the interior side position W0 shown in FIG. 11(C). When the seat body 2 comes to a position slightly before the interior side position W0, the interior side end of the stopper member 145 of the restricting arrangement 141 mounted on the main frame 131 of the longitudinal support base 130, starts to contact the end plate 159 of the lateral support base 150. Thus, the stopper member 145 moves to the exterior side against the spring force of the coil spring 147. When the end 146a of the slide slot 146 contacts the guide pin 143, the stopper portion 145c is located to the exterior side of the position in which the stopper portion 145c faces the slide rail 112a, and the recess 145b is located in a position to permit the slide rail 112a to move longitudinally. In this state, the rotation lock mechanism 70 is released and the seat body 2 is manually rotated to the interior side. In this stage, the pinion gear and the rack of the coupling mechanism are held in engagement with each other, and the seat body 2 moves from the front position L1 to the rearmost position L0 while rotating to the interior side.

When the seat body 2 is rotated by a predetermined angle from the sideways position to the interior side, the seat body 2 is returned to the rearmost position L0 shown in FIG. 11(B). Thereafter, the seat body 2 is further rotated to be returned to the seated position shown in FIG. 11(A). In the latter half of the rotational range, the pinion gear is disengaged from the rack and the slide lock release plate 7 is also disengaged from the roller 82. As a result, the slide lock mechanism 80 is returned to the locked state, so that the seat body 2 only rotates without moving in the longitudinal direction.

As described above, the rotating vehicle seat 190 of the second embodiment includes the rotating support base 110 for rotatably supporting the seat body 2, the longitudinal support base 130 for supporting the rotating support base 110 to permit movement in the longitudinal direction of the vehicle, the lateral support base 150 for horizontally moving the seat body 2 in the lateral direction of the vehicle, and the coupling mechanism for coupling the rotational movement and the longitudinal movement of the seat body 2. In this rotating seat 190, the restricting arrangement 141 is mounted on the lateral support base 150 in a manner that permits lateral movement with the longitudinal support base 130, and serves to restrict the longitudinal movement of the longitudinal support base 130 at a position other than a particular position (seated position) within the lateral moving range of the longitudinal support base 130.

Therefore, in the restricting arrangement 141 of the second embodiment, when the seat body 2 is in the seated position, the stopper member 145 abuts against the end plate 159 of the lateral support base 150. Thus, the stopper member 145 moves to the exterior side and the recess 145b is located in a position to permit the longitudinal movement of the slide rail 112a. When the seat body 2 is rotated to the sideways position facing the door opening side while sliding by the coupling means, the rear end of the slide rail 112a is located more to the front of the vehicle than the stopper member 145 with a slight spacing therebetween. The longitudinal support base 130 horizontally moves to the exterior side along the lateral support base 150 that is disposed horizontally. As a result, the stopper portion 145*c* of the stopper member 145 moves by the restoring force of the coil spring 147 to a position that faces the end of the slide rail 112*a*. This state is maintained over the range of horizontal movement of the seat body 2 to the exterior side, so that the rearward movement of the slide rail 112*a* can be restricted.

Further, because the restricting arrangement 141 is connected in parallel to the upright portion 131*a* of the rear main frame 131, even if, for example, the length of the slide rail 151 of the lateral support base 150 is changed, the relationship between the stopper member 145 of the restricting arrangement 141 and the slide rail 112*a* is not changed, so that no change is required to the position of the restricting arrangement 141. Unlike the stopper member 157 in the above-mentioned known rotating seat, the stopper member 157 does not need to be changed to a longer one when the slide rail 151 is changed to a longer one. Thus, a reduction of the weight can be achieved. Further, the restricting arrangement 141 provides greater economies in that it can also be applied to an existing device which is similar to the rotating seat 190.

Figure 18:
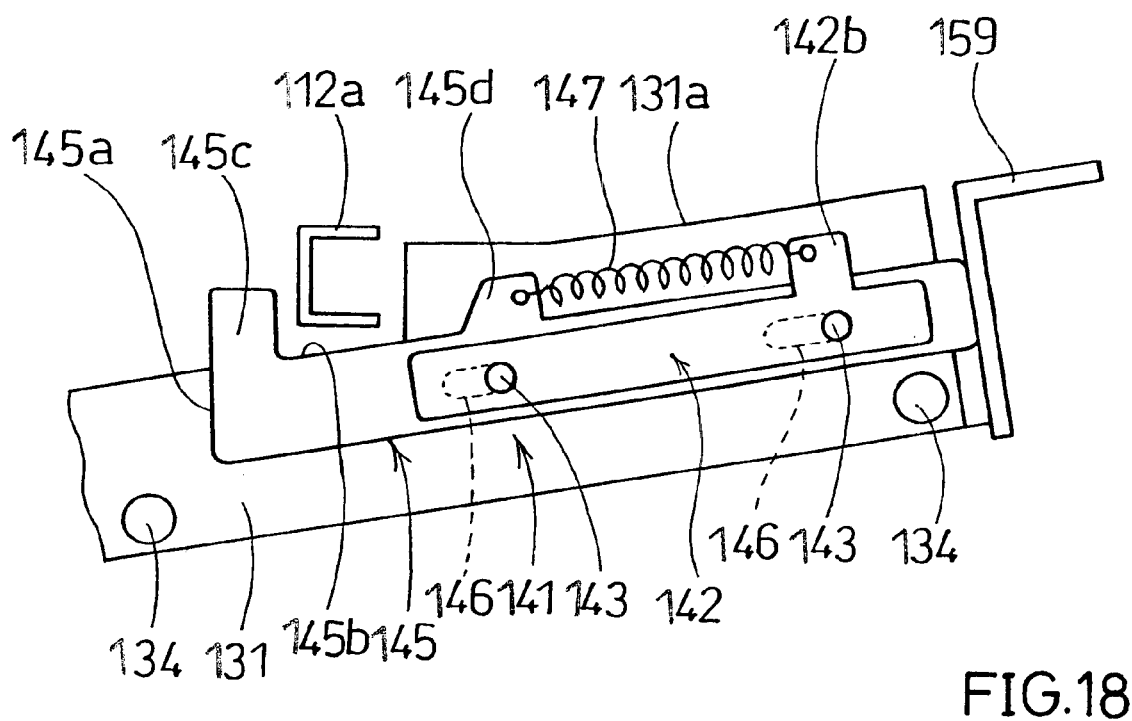
FIG. 18 is a side view of a restricting arrangement that is connected to a main frame of a longitudinal support base that is slidably mounted on an obliquely disposed lateral support base.

Although, in the second embodiment, the lateral support base 150 has been described as being disposed horizontally, the lateral support base 150 may be disposed in an inclined position, as in the known rotating seat. In this case, preferably, as shown in FIG. 18, the stopper portion 145*c* of the stopper member 145 may be shaped to correspond to the position of the slide rail 112*a*.

Further, although the stopper member 145 has been described as being constructed to move into or out of the travelling path of the seat body by moving in the lateral direction of the vehicle, the stopper member may be in the form of, for example, a solenoid actuator. In this case, a sensor may be also provided to detect when the seat body reaches the interior side end of the lateral support base. The solenoid actuator is operated based on the output signal of the sensor, and the rod of the actuator protrudes into the longitudinal travelling path of the seat body. Such a construction (electrical) may be applied to restrict the longitudinal movement during the lateral movement of the seat body.

Figure 21:
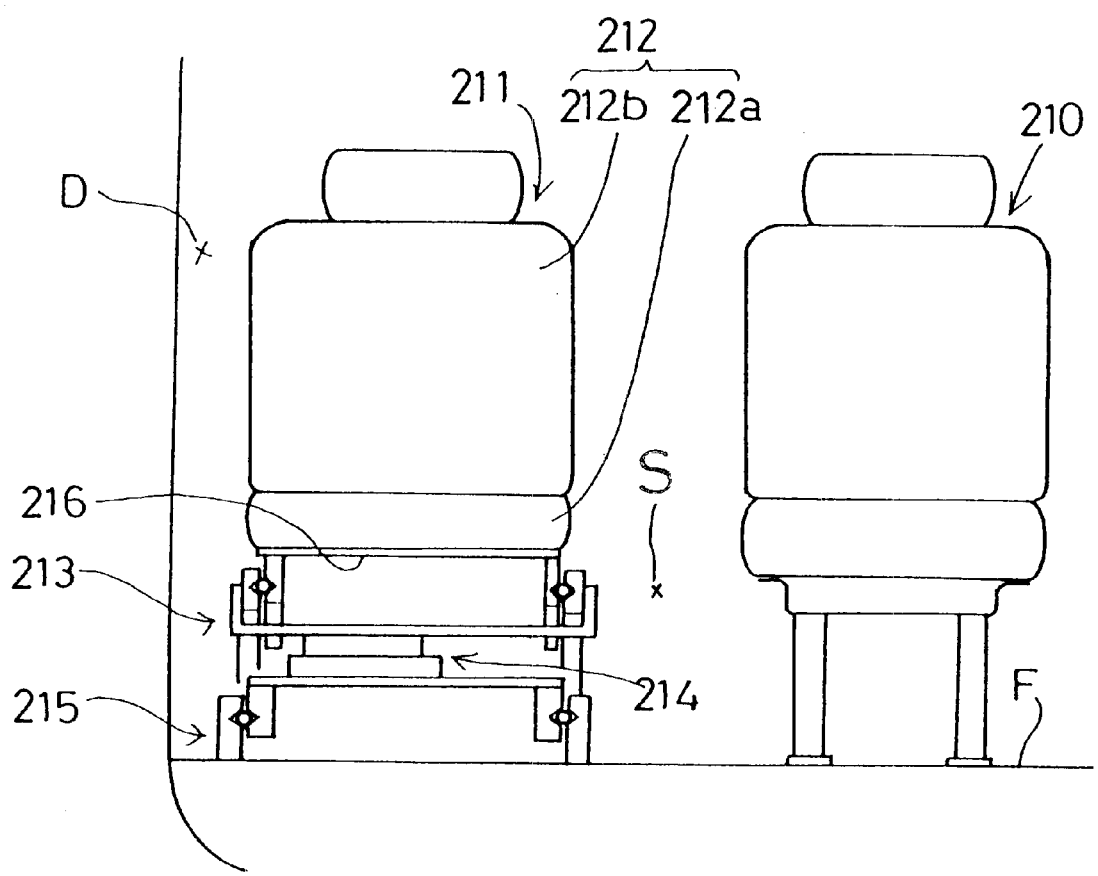
FIG. 21 is a view showing an embodiment of the invention as described in claim 3 (a third embodiment), in which a passenger's seat as a rotating vehicle seat and a driver's seat are shown as viewed from the rear of the vehicle, and in which the seat body of the rotating vehicle seat is shown in a position facing the front of the vehicle.

An embodiment of the invention as described in claim 3 or 5 (a third embodiment) will now be explained with reference to FIGS. 21 to 32, 83 and 84. FIG. 21 shows the interior of the vehicle, with a driver's seat 210 and a passenger's seat 211. In this embodiment, a rotating vehicle seat will be described as being applied to the passenger's seat 211. A door opening D is located on the left of the passenger's seat 211. In the drawings, the front of the vehicle is shown by a "forward" arrow, and the side having a door opening is shown by an "outside" arrow.

The passenger's seat in the form of the rotating vehicle seat 211 according to this embodiment includes a seat body 212, a lateral support base 213 for supporting the seat body 212 to permit sliding movement in the lateral direction of the vehicle, a rotating support base 214 for rotatably supporting the lateral support base 213 and a longitudinal support base 215 for supporting the rotating support base 214 to permit sliding movement in the longitudinal direction of the vehicle.

Figure 23:
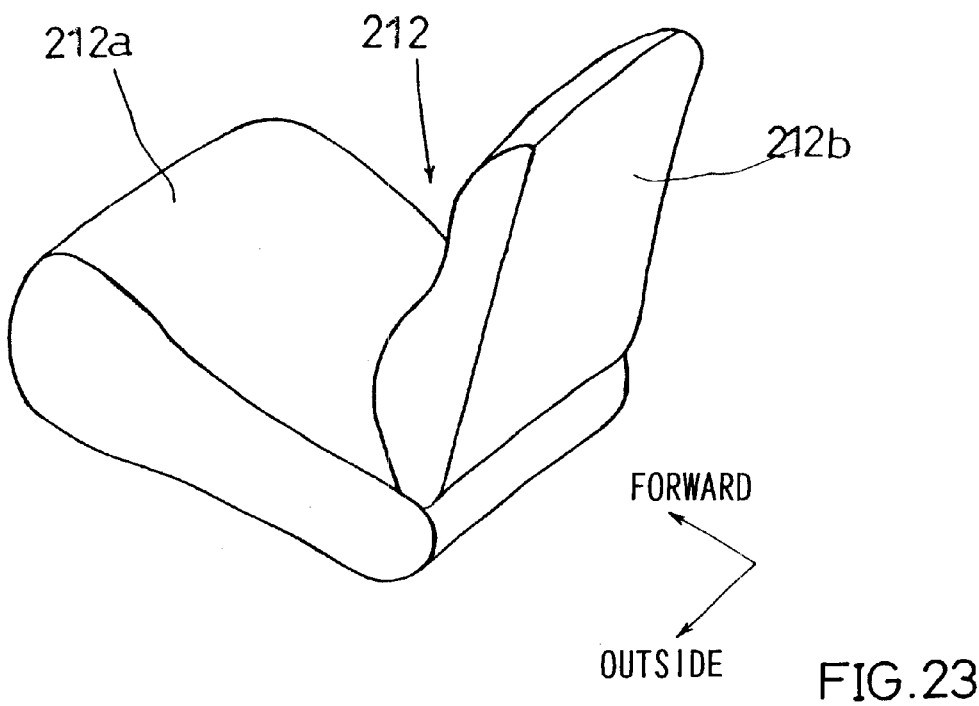
FIG. 23 is a perspective view of the seat body.
Figure 24:
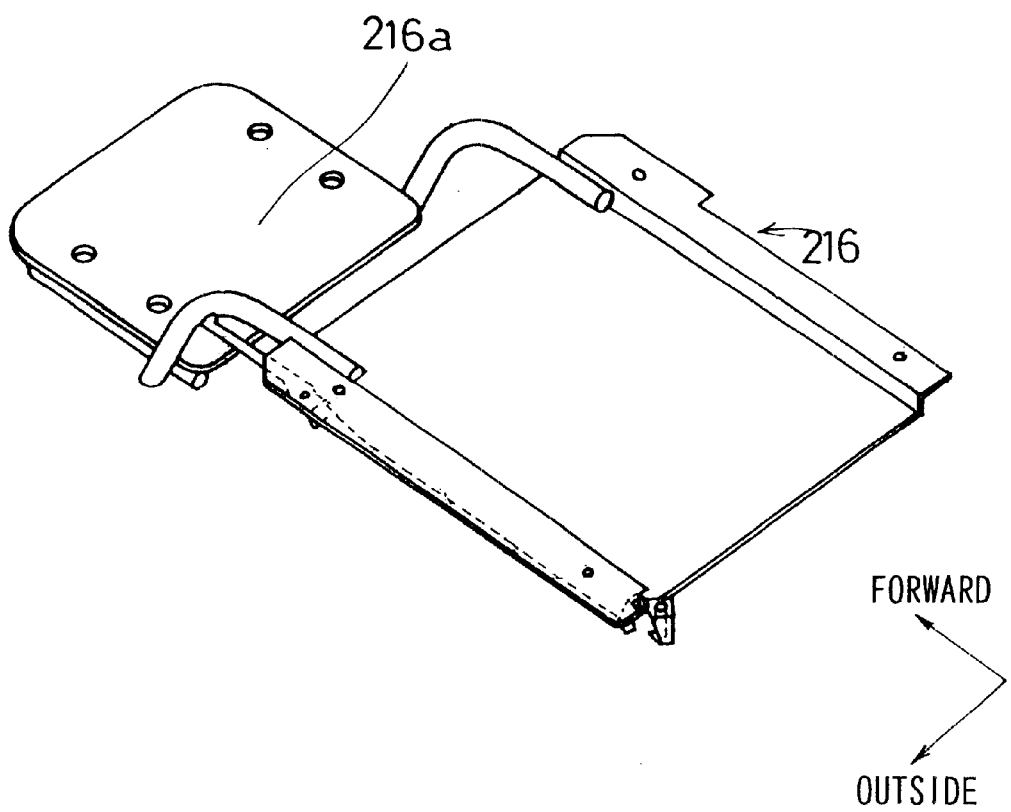
FIG. 24 is a perspective view of a seat holder.

As shown in FIG. 23, the seat body 212 has a seat cushion 212*a* and a seat back 212*b*. A seat holder 216 having a footrest 216*a*, as shown in FIG. 24, is mounted on the underside of the seat cushion 212*a*. The seat body 212 is mounted on the lateral support base 213 via the seat holder 216.

Figure 25:
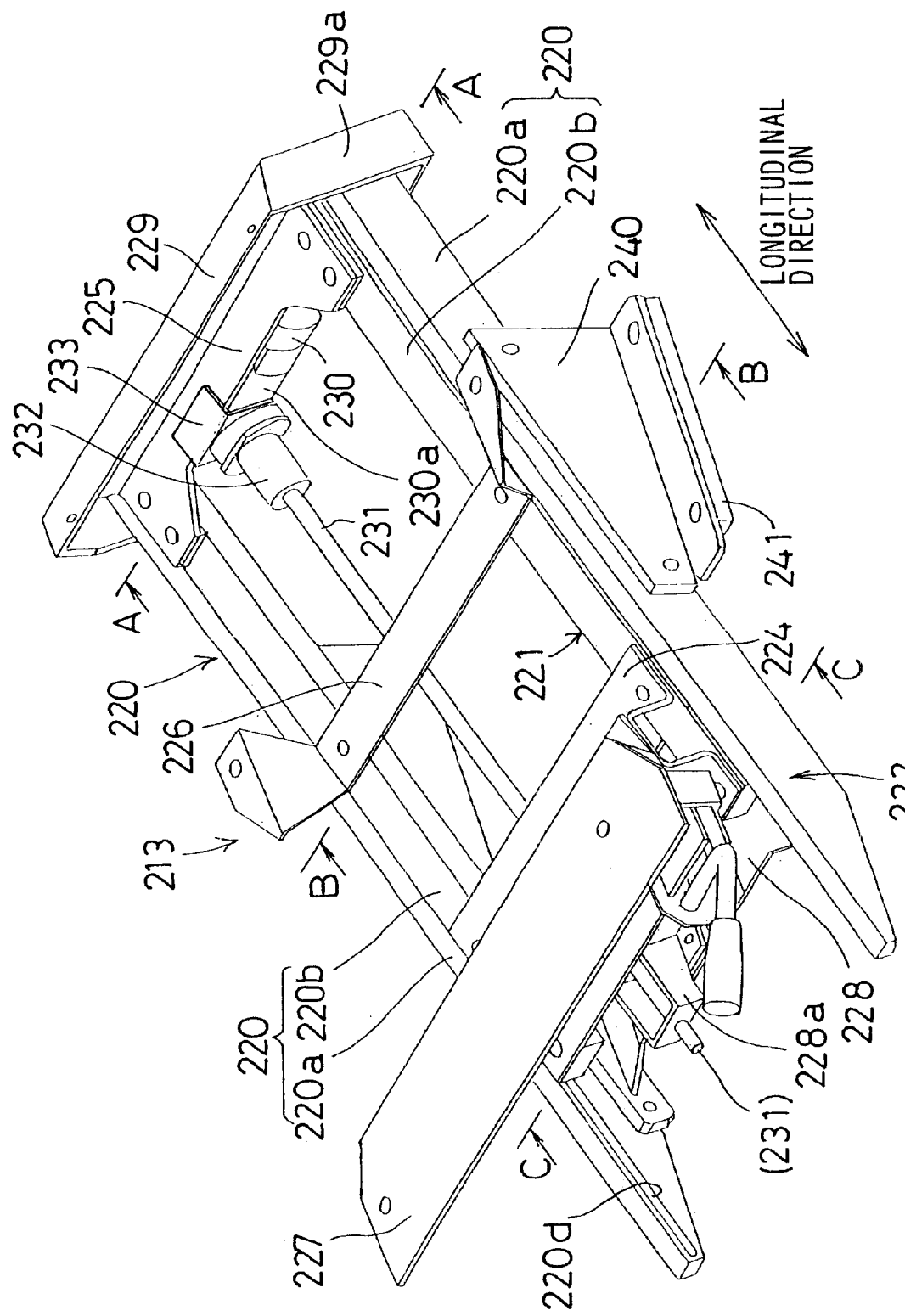
FIG. 25 is a perspective view of a lateral support base.
Figure 26:
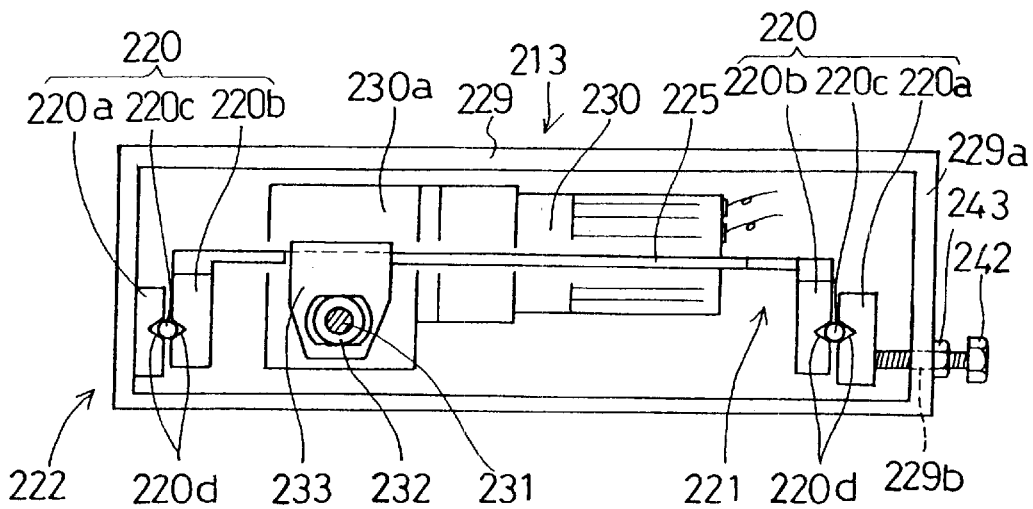
FIG. 26 is sectional view taken along line A—A in FIG. 25, showing a position adjusting mechanism provided on the rear of a fixed rail.
Figure 27:
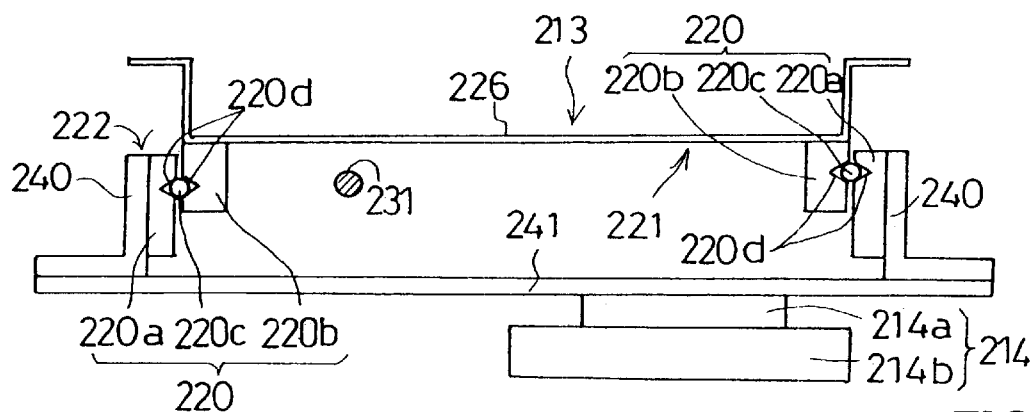
FIG. 27 is sectional view taken along line B—B in FIG. 25, showing a position adjusting mechanism provided around the medial portion of the fixed rail.
Figure 28:
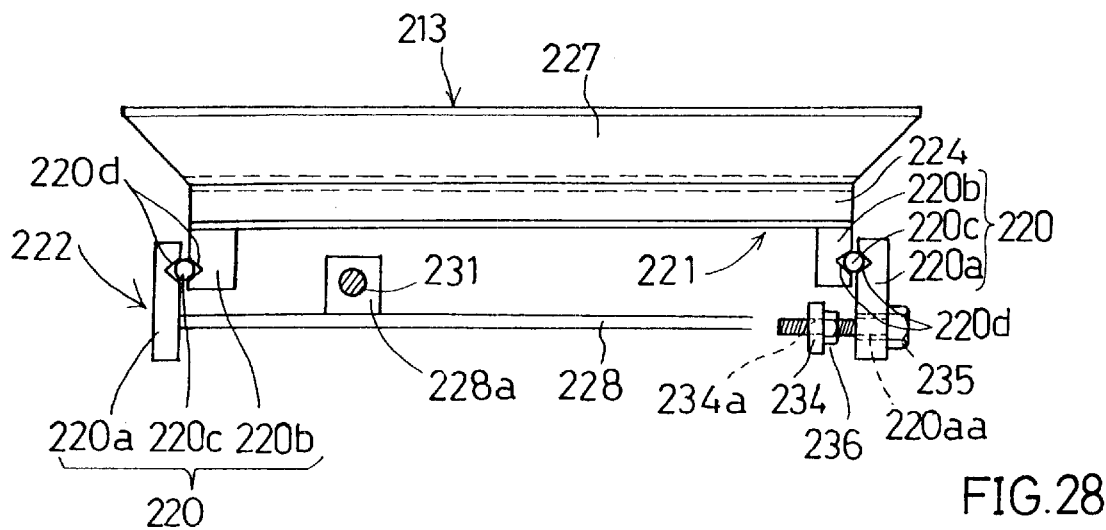
FIG. 28 is sectional view taken along line C—C in FIG. 25, showing a position adjusting mechanism provided on the front of the fixed rail.

As shown in FIG. 25, the lateral support base 213 has a pair of right and left linear slide mechanisms 220. As shown in FIGS. 26 to 28, each of the linear slide mechanisms 220 includes a fixed rail 220*a*, a moving rail 220*b* and a plurality of steel balls 220*c* disposed between V-shaped grooves 220*d* of the rails 220*a* and 220*b*.

As shown in FIG. 25, the moving rails 220*b* are connected to each other at the front ends and the rear ends by connecting bases 224 and 225, respectively, thus forming a frame on the sliding side (slide frame 221). Brackets 226, 227 are mounted across the moving rails 220*b* in a generally medial portion of the slide frame 221 and on and along the front connecting base 224*a*, respectively. The seat holder 216 is mounted on the brackets 226,227. Thus, the seat body 212 is mounted on the slide frame 221 and thus the lateral support base 213.

A generally box-like connecting base 229 is mounted across the rear ends of the fixed rails 220*a*. As a driving source for the lateral support base 213, a motor 230 is mounted to the connecting base 229. One end of a threaded shaft 231 is connected to the motor 230 via a reduction gear train 230*a*. Further, the front ends of the fixed rails 220*a* are also connected to each other by a connecting base 228. The other end of the threaded shaft 231 is rotatably supported by a bracket 228*a* mounted on the connecting base 228. Thus, the fixed rails 220*a* are also formed in one piece by the connecting bases 228,229, thereby forming a slide fixed frame 222.

A nut 232 is secured to the connecting base 225 of the slide frame 221 by the bracket 233 and is adapted to engage the threaded shaft 231. When the motor 230 is started, the threaded shaft 231 rotates and thus the nut 232 moves on and along the threaded shaft 231. As a result, the slide frame 221 and thus the seat body 212 move in the lateral direction of the vehicle (in the sliding direction of the linear slide mechanism 220).

The position of one of the fixed rails 220*a* (on the front as viewed in FIG. 25) can be adjusted in a direction perpendicular to the sliding direction (toward or away from the other fixed rail 220*a*). When such position adjustment is made properly, the spacing between the fixed rails 220*a* can be adjusted to thereby provide a proper pre-load on the linear slide mechanisms 220. As a result, rattling in a direction perpendicular to the sliding direction (in the vertical direction and in the horizontal direction) can be minimized. This position adjusting mechanism is shown in detail in FIGS. 26 to 28.

As shown in FIG. 27, an L-shaped bracket 240 is mounted in a generally medial portion in the sliding direction of each of the fixed rails 220*a*. The bracket 240 is fixed on a rotating base 241. The lateral support base 213 is mounted on an inner ring 214*a* of a rotating support base 214, which will be described below, by the rotating base 241. The right one (as viewed in FIG. 27) of the brackets 240 can adjust its position in the lateral direction in the drawing, so that the spacing between the medial portions in the sliding direction of the fixed rails 220*a* can be adjusted.

FIG. 26 shows the position adjusting mechanism at the rear of the fixed rails 220*a*. A threaded hole 229*a* is formed through a right side wall 229*a* (as viewed in the drawing) of the box-like connecting base 229, and an adjusting bolt 242 is threadably inserted through the threaded hole 229*b*. The adjusting bolt 242 extends through the side wall 229*a* and abuts against an outer surface of the fixed rail 220*a*. Therefore, the spacing between the fixed rails 220*a* can be changed by adjusting the amount of insertion of the adjusting bolt 242. The amount of insertion of the adjusting bolt 242 can be fixed by tightening a nut 243.

FIG. 28 shows a position adjusting mechanism at the front of the fixed rails 220a. An auxiliary portion 234 is mounted on the front end of the connecting base 228. A threaded hole 234a is formed through the auxiliary portion 234. An insertion hole 220aa is formed through the front portion of the fixed rail 220a, and an adjusting bolt 235 is inserted through the insertion hole 220aa. The adjusting bolt 235 is also threadably inserted through the threaded hole 234a. Therefore, the spacing between the fixed rail 220a and the auxiliary portion 234 can be adjusted by adjusting the amount of insertion of the adjusting bolt 235 through the threaded hole 234a. Thus, the spacing between the fixed rails 220a can be adjusted. The amount of insertion of the adjusting bolt 235 can be fixed by tightening a nut 236.

As described above, the position of one of the fixed rails 220a can be adjusted in the direction perpendicular to the sliding direction, at three positions on the front, middle and rear in the sliding direction. In this way, the force of pushing the steel balls 220c in the linear slide mechanisms 220 can be adjusted so as to provide a proper pre-load on the rear linear slide mechanisms 220. As a result, the seat body 212 can slide smoothly in the lateral direction of the vehicle without rattling.

Figure 31:
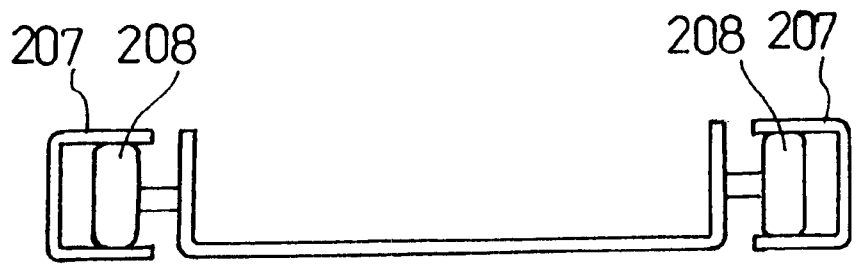
FIG. 31 is a front view of a lateral support base incorporating a known linear slide mechanism.

In this respect, a known linear slide mechanism is constructed, for example, such that the rails 207 is formed by bending a band steel plate using a stamping process into a generally U-shaped cross-section as shown in FIG. 31 and the rails 207 support rollers 208 to permit the rollers 208 to move within the interior of the rails 207. In this construction, it is difficult to correct rattling in the vertical direction, because of the press bending inaccuracy of the rails 207, and a pre-load cannot be exerted.

Figure 32:
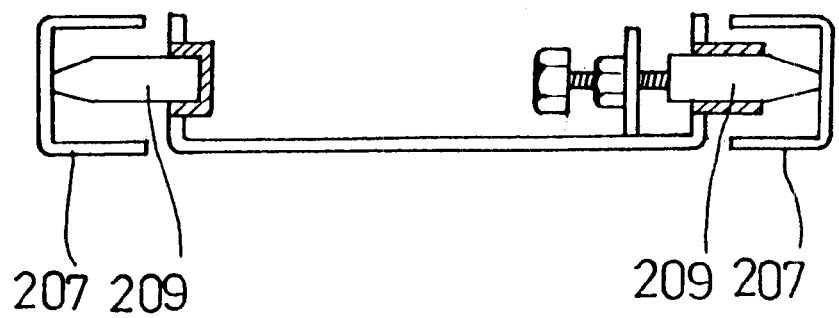
FIG. 32 is a front view of the lateral support base incorporating the known linear slide mechanism, including a mechanism for minimizing horizontal rattling.

Further, the above-mentioned known linear slide mechanism, as shown in FIG. 32 in which a resin piece 209 is pressed against the U-shaped rails, requires a means for minimizing horizontal rattling. The linear slide mechanisms 220 according to this embodiment, which is constructed by disposing the steel balls 220c between the V-shaped grooves 220d, can easily provide sliding movement without rattling in the vertical and horizontal directions, and does not require such means in the known linear slide mechanism.

Figure 29:
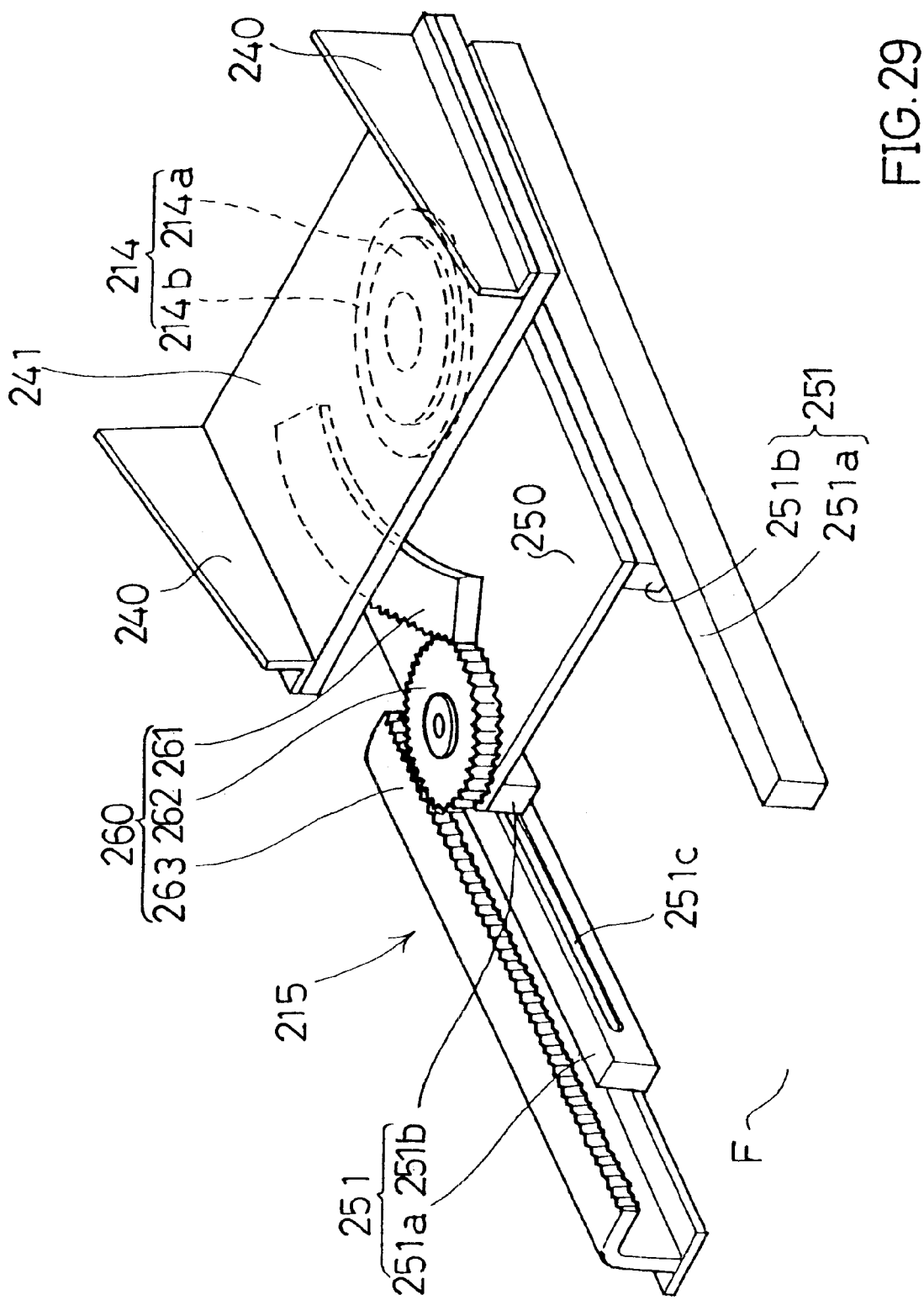
FIG. 29 is a perspective view of a rotating support base and a longitudinal support base.

The rotating support base 214 and the longitudinal support base 215 are shown in detail in FIG. 29. The rotating support base 214 serves to rotate the lateral support base 213 and the seat body 212 by about 90° between the position facing the front of the vehicle and the position facing the door opening side D. The longitudinal support base 215 serves to move the rotating support base 214, the lateral support base 213 and the seat body 212 in the longitudinal direction of the vehicle.

The lateral support base 213 is mounted on the inner ring 214a of the rotating support base 214 by means of the brackets 240 and the rotating base 24, as described above. The rotating support base 214 also incorporates a slide mechanism of the same type as the above-mentioned linear slide mechanism 220. Specifically, V-shaped grooves, which are not shown, are formed in the outer peripheral surface of the inner ring 214a and in the inner peripheral surface of the outer ring 214b, respectively. A plurality of steel balls are disposed between the V-shaped grooves. With the rotating support base 214 thus constructed, the seat body 212 can be rotated smoothly without rattling.

The rotating support base 214 is mounted on a main base 250 of the longitudinal support base 215. The main base 250 is mounted on the vehicle floor F via a pair of right and left linear slide mechanisms 251 to permit longitudinal movement. The linear slide mechanisms 251 are constructed similarly to the above-mentioned linear slide mechanisms 220. Specifically, each of the linear slide mechanisms 251 consists of a fixed rail 251a, a moving rail 251b and a plurality of steel balls (not shown) disposed between V-shaped grooves 251c that are formed in both rails 251a, 251b. Further, although it is not shown, one of the fixed rails 251a incorporates a position adjusting mechanism similar to that of the linear slide mechanism 220. Thus, an appropriate pre-load is exerted on the linear slide mechanisms 251, so that the main base 250 can slide smoothly in the longitudinal direction of the vehicle without rattling.

Figure 30:
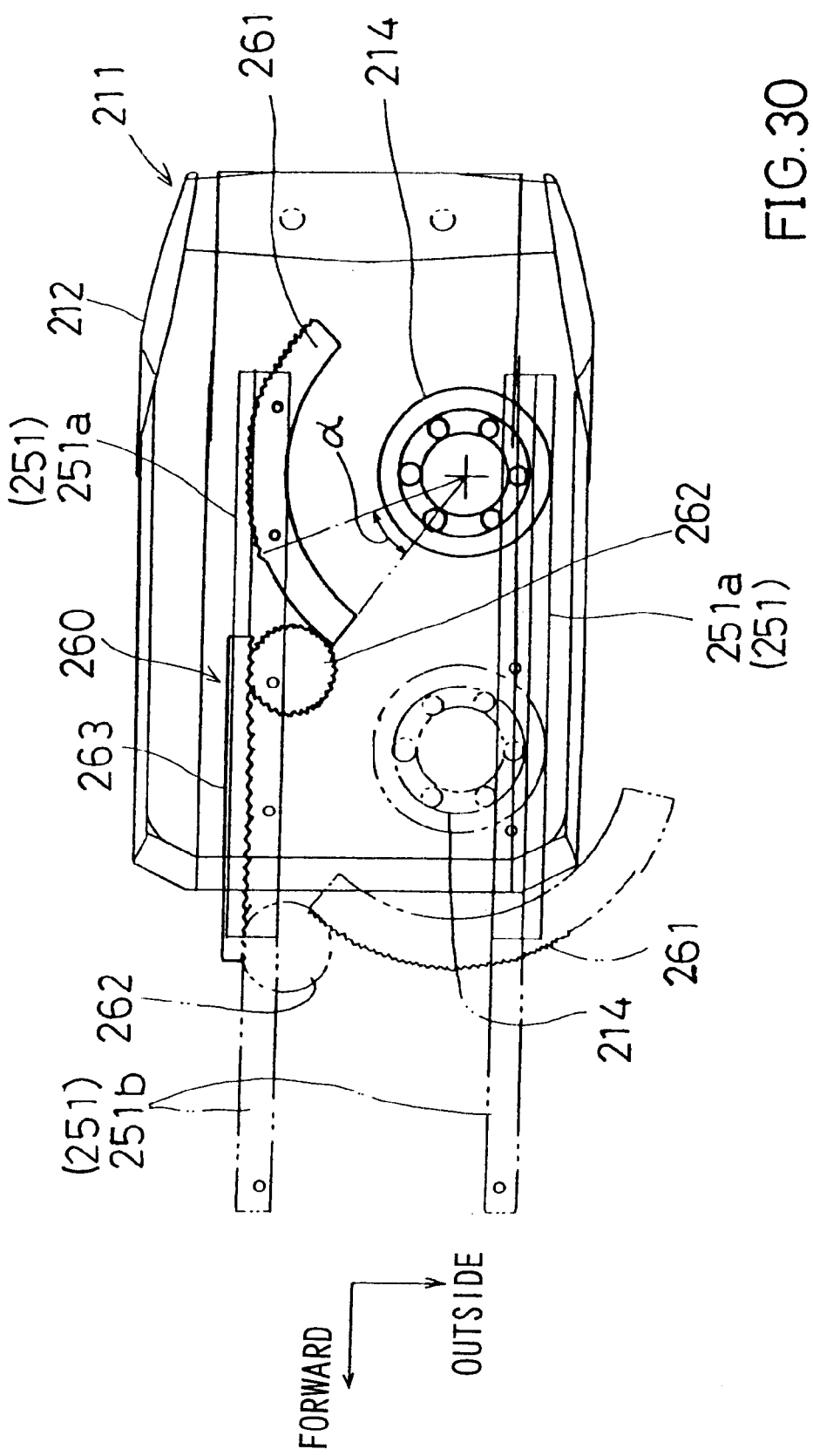
FIG. 30 is a plan view of coupling means for coupling longitudinal sliding movement and rotational movement to a door opening side of the seat body.

A coupling mechanism 260 serves to couple the rotational movement and the longitudinal sliding movement of the seat body 212. The coupling mechanism 260 consists of a circular-arc pinion gear 261 mounted to the underside of the rotating base 241, an intermediate gear 262 mounted on the main base 250 and a rack 263 mounted on the vehicle floor F. The pinion gear 261 engages the intermediate gear 262, and the intermediate gear 262 engages the rack 263. As shown in FIG. 30, the pinion gear 261 does not have any engagement teeth within a predetermined range of an angle α (26° in this embodiment) on the forward portion thereof as viewed in the drawing. Therefore, the pinion gear 261 does not engage the intermediate gear 262 within the range of the angle α. Thus, the rotational movement of the seat body 212 is not coupled to the longitudinal sliding movement of the seat body 212 (in the "non-coupling range"). After the seat body 212 has been rotated by the angle α from the position facing the front of the vehicle to the side of the door opening D, the pinion gear 261 starts to engage the intermediate gear 262. Thereafter, by engaging the pinion gear 261 with the intermediate gear 262 and the intermediate gear 262 with the rack 263, the rotational movement of the seat body 212 to the side of the door opening D is coupled to the longitudinal sliding movement of the seat body 212.

On the other hand, when the seat body 212 is rotated from the side of the door opening D to a position facing the front of the vehicle, the seat body 212 slides rearward with respect to the vehicle (to the right as viewed in FIG. 30) by being coupled with this rotational movement. Thus, a wider space can be provided close to the occupant's feet. With the coupling mechanism 260 thus constructed, the rotational movement and the longitudinal sliding movement of the seat body 212 can be made in a single operation, so that the usability of the vehicle rotating seat 211 can be improved.

The rotating vehicle seat 211 having the above-described construction according this embodiment, is held in a state shown in FIG. 21 while the vehicle is running. In this state, the seat body 212 is located in the position facing the front of the vehicle within the moving range in the rotational direction and the rear sliding end is within the moving range in the longitudinal direction with respect to the vehicle. The lateral support base 213 is in a positional orientation in which its longitudinal sides (along the linear slide mechanism 220) extend in the longitudinal direction of the vehicle. On the other hand, when the occupant of the rotating seat 211 tries to get into or out of the vehicle, the seat body 212a is rotated to the door opening D. At this time, the seat body 212 is first rotated by the angle at to the door opening D, and thereafter, the seat body 212 slides forward with respect to the vehicle by coupling with the rotational movement. The seat body 212 thus slides forward while rotating to the door opening side. When the seat body 212 is rotated by about 90°, the seat body 212 moves to the front position in the longitudinal direction of the vehicle. At this stage, the rotational operation is stopped. The state in this stage is shown by a solid line in FIG. 22.

Figure 22:
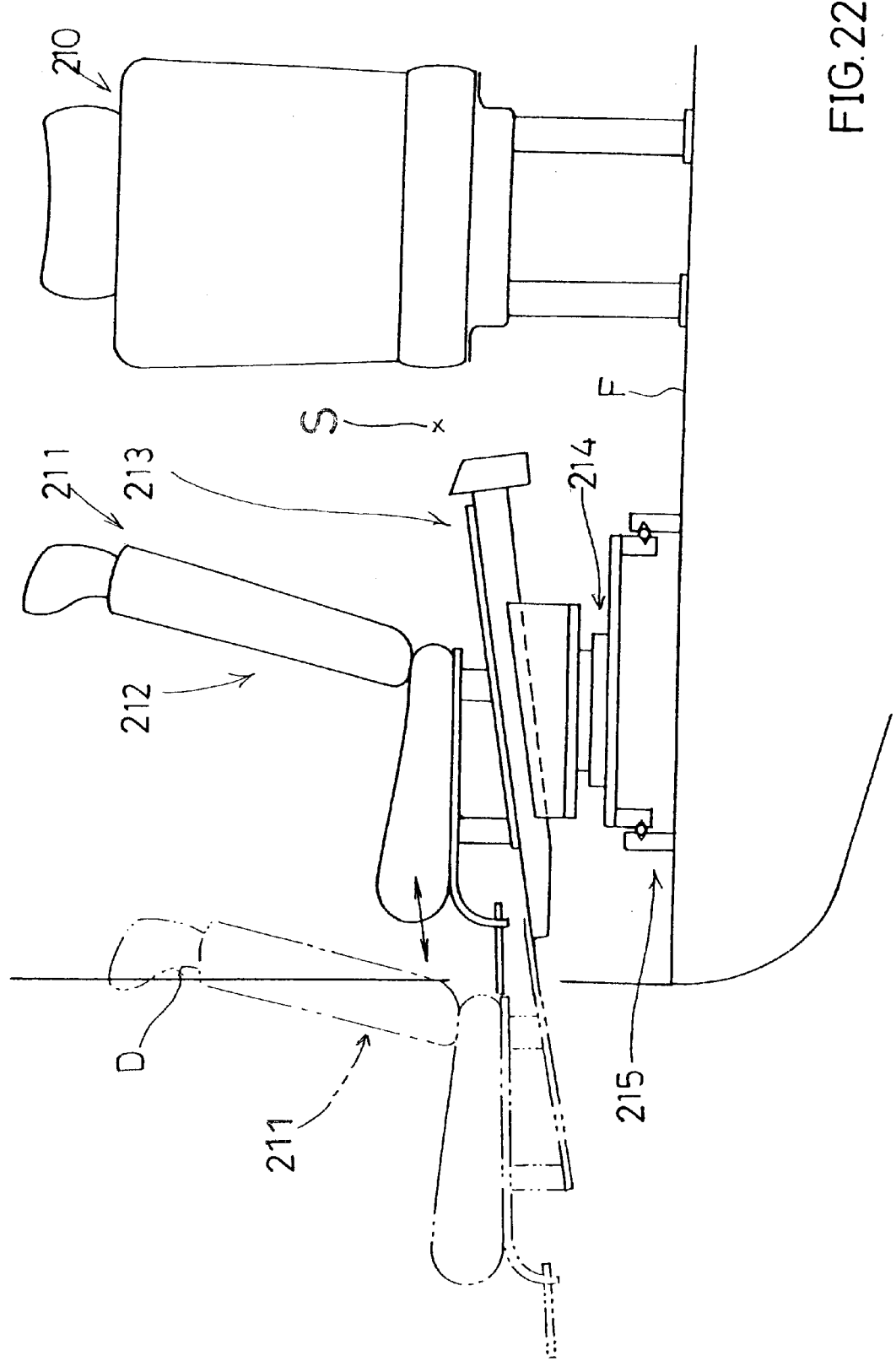
FIG. 22 is also a view of the rotating vehicle seat and the driver's seat as viewed from the rear of the vehicle, in which the seat body of the rotating vehicle seat is shown in a position facing the door opening side and the seat body is shown sliding in the lateral direction of the vehicle.

In the state shown by a solid line in FIG. 22, the seat body 212 is in a position facing the door opening D within the moving range in the rotational direction and the front sliding end is within the moving range in the longitudinal direction with respect to the vehicle. The lateral support base 213 is in a positional orientation in which its longitudinal sides extend in the lateral direction of the vehicle. In this stage, the seat body 212 is in a rearmost position (the interior side position, or the right end position as viewed in FIG. 22) within the moving range in the lateral direction with respect to the vehicle. In this state, when the driving motor 230 of the lateral support base 213 is started, the threaded shaft 231 is rotated and thus the sliding frame 221 moves. As a result, the seat body 212 is moved to the outside of the vehicle (to the position shown by a broken line in FIG. 22). The seat body 212 can be returned to the inside of the vehicle by rotating the motor 230 in the reverse direction. The seat body 212 is first moved in the lateral direction back to the interior side position, and then the seat body 212 is rotated to the position facing the front of the vehicle. The seat body 212 also slides rearward with respect to the vehicle by coupling with the rotational movement. The lateral support base 213 also rotates together with the seat body 212 to be finally moved back to a position in which its longitudinal sides extend in the longitudinal direction of the vehicle.

In the rotating vehicle seat 211 thus constructed, the lateral support base 213 is rotated by the rotating support base 214 between the position in which its longitudinal sides extend in the longitudinal direction of the vehicle and the position in which its longitudinal sides extend in the lateral direction of the vehicle. When the vehicle is running (when the occupant is sitting in the seat), the lateral support base 213 is in a position in which its longitudinal sides extend in the longitudinal direction of the vehicle. Therefore, as shown in FIG. 21, the lateral support base 213 is not extended to the driver's seat 210 when the vehicle is running. Thus, sufficient space S can be provided between the driver's seat 210 and the passenger's seat 211 and can be effectively utilized for various purposes such as a passage to the rear seats.

Further, although the motor 230 is disposed on the rear portion of the lateral support base 213, the lateral support base 213 is located in a position in which its longitudinal sides extend in the longitudinal direction of the vehicle while the vehicle is running. Therefore, the motor 230 is located toward the rear seat and not toward the driver's seat, while the vehicle is running. In this respect, too, a space S can be sufficiently provided between the driver's seat 210 and the passenger's seat 211.

Further, sufficient space S provided between the driver's seat 210 and the passenger's seat 211 is also useful as a space for installing a parking brake lever, a console box or similar components.

Additionally, the position of one of the fixed rails 220a of the linear slide mechanisms 220 in the lateral support base 213 can be adjusted in a direction perpendicular to the sliding direction. When such position adjustment is performed properly, an appropriate pre-load can be exerted on the linear slide mechanisms 220. As a result, the seat body 212 can slide smoothly without rattling.

Figure 83:
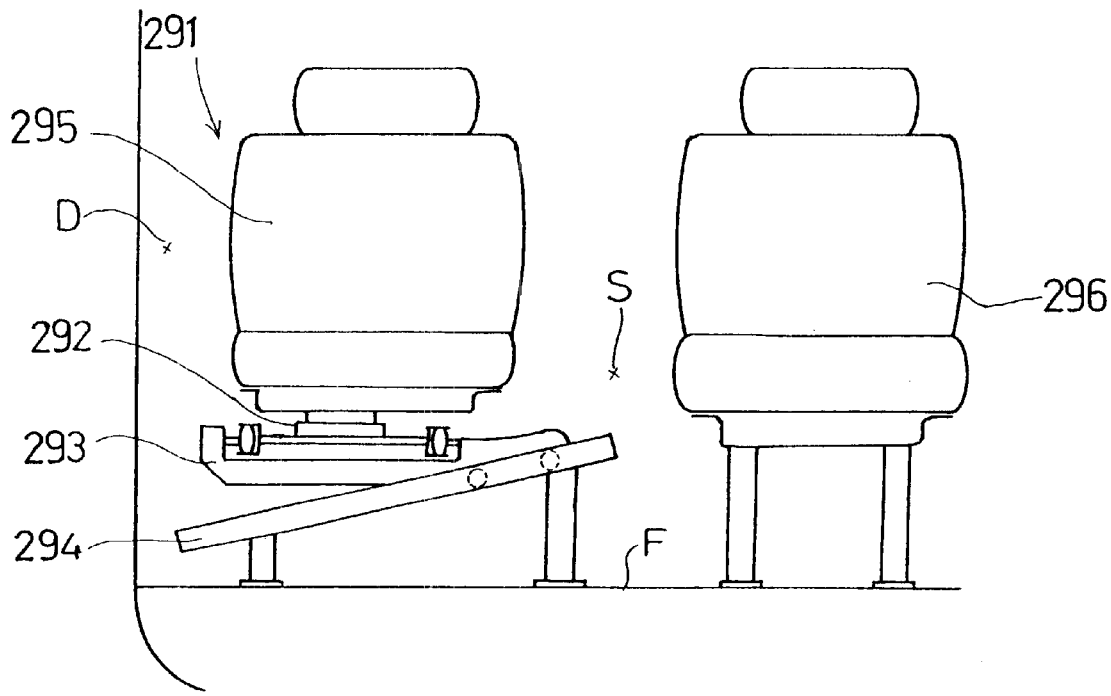
FIG. 83 is a view of a known rotating vehicle seat and a driver's seat as viewed from the rear of the vehicle, which is shown in relation to the third embodiment.
Figure 84:
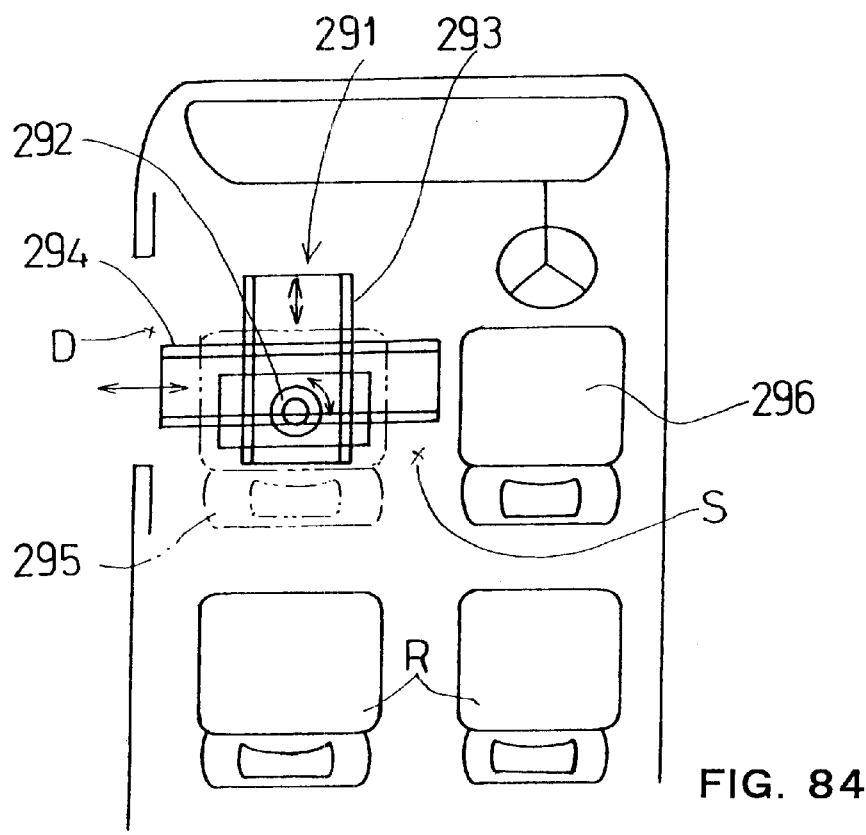
FIG. 84 is a plan view of vehicle compartment with the known rotating vehicle seat applied to a passenger's seat, which is also shown in relation to the third embodiment.

In this respect, as shown in FIGS. 83 and 84, a known rotating vehicle seat 291 includes a rotating support base 292 for rotatably supporting a seat body 295 between a position facing the front of the vehicle and a position facing the door opening D, a longitudinal support base 293 for supporting the rotating support base 292 to permit movement in the longitudinal direction of the vehicle (in the vertical direction as viewed in FIG. 84), and a lateral support base 294 for supporting the longitudinal support base 293 to permit sliding movement in the lateral direction of the vehicle (in the lateral direction as viewed in FIGS. 83 and 84). The lateral support base 294 is fixed in a position in which its longitudinal sides extend in the lateral direction of the vehicle. Therefore, the lateral support base 294 requires a large space in the lateral direction of the vehicle.

Therefore, when the rotating vehicle seat 291 is used as a passenger's seat, the space S between the passenger's seat 291 and the driver's seat 296 is occupied by the lateral support base 294. Accordingly, space S cannot be utilized, for example, as a passage to rear seats R (which passage permits passengers to move between the passenger's seat 291 or the driver's seat 296 and the rear seats R).

Further, although it is not shown, the lateral support base 294 has a linear driving mechanism as its driving source that essentially consists of a motor and a ball screw. The motor of this linear driving mechanism is mounted in a manner to protrude from the rear sliding end (the right end as viewed in the drawing) toward the driver's seat. In this respect, too, it is difficult to utilize space S effectively as a passage to the rear seats R.

Additionally, space S provided between the driver's seat 296 and the passenger's seat 291 may be utilized to install a parking brake lever or a stored box such as a console box, but with some limitations.

According to the invention as described in claim 3 (the third embodiment), the above-noted prior art problems can be eliminated.

Various modifications or changes may be added to the above-described third embodiment. For example, it has been described to have a construction in which positional adjustment in the lateral direction can be made at three positions in the vicinities of the front end, middle and rear end in the sliding direction; but it also may be constructed such that the adjustment can be made at one or two positions, or four positions or more. Further, the description provides a construction such that the position of one of the fixed rails 220a is adjusted; but it also may be constructed such that the positions of both fixed rails 220a are adjusted. Additionally, it also may be constructed such that the position of the moving rail 220b may be adjusted so as to provide an appropriate pre-load on the linear slide mechanisms 220.

Figure 33:
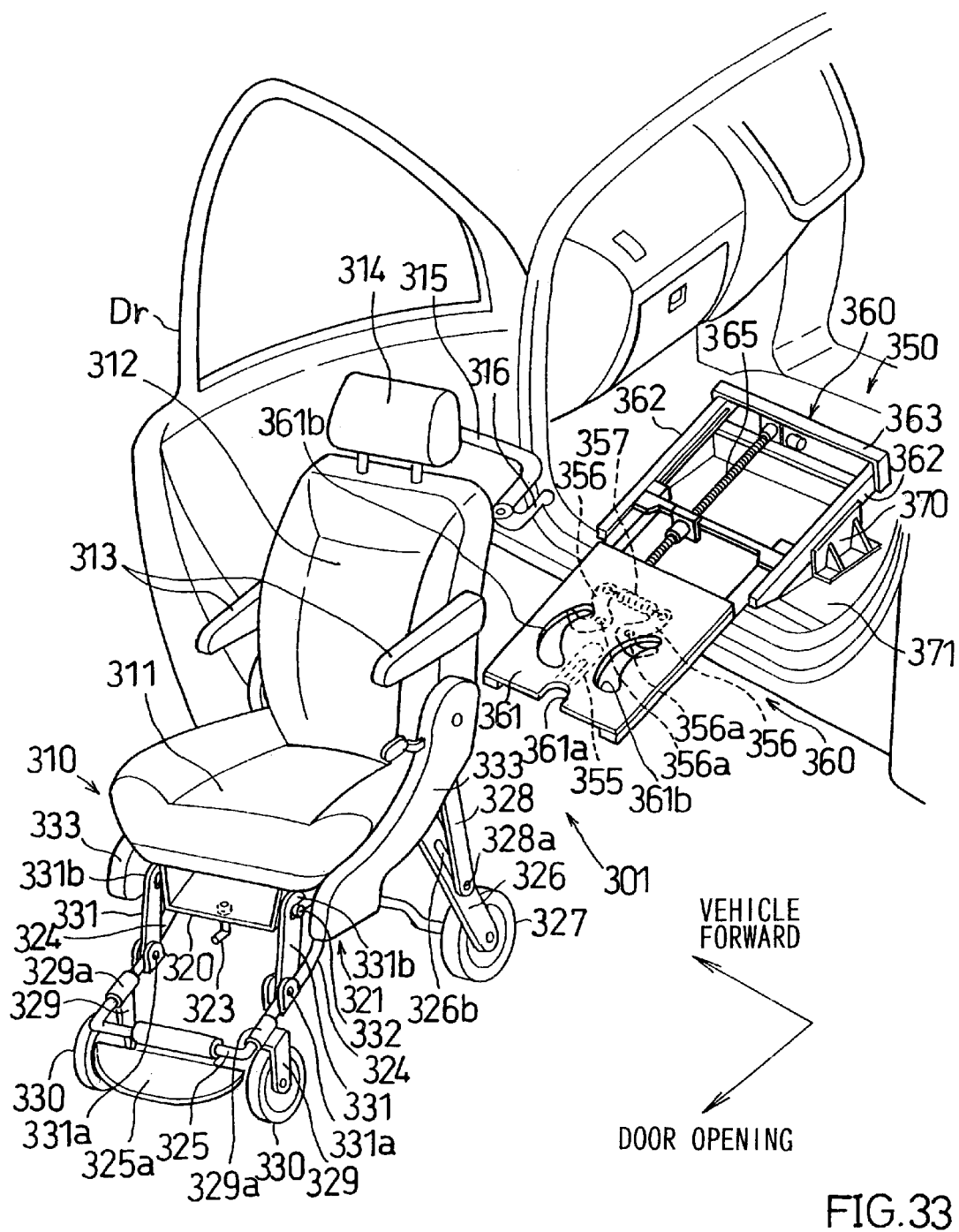
FIG. 33 is a perspective view showing an embodiment of the invention, in which a seat body is shown detached from a lift-up mechanism.
Figure 34:
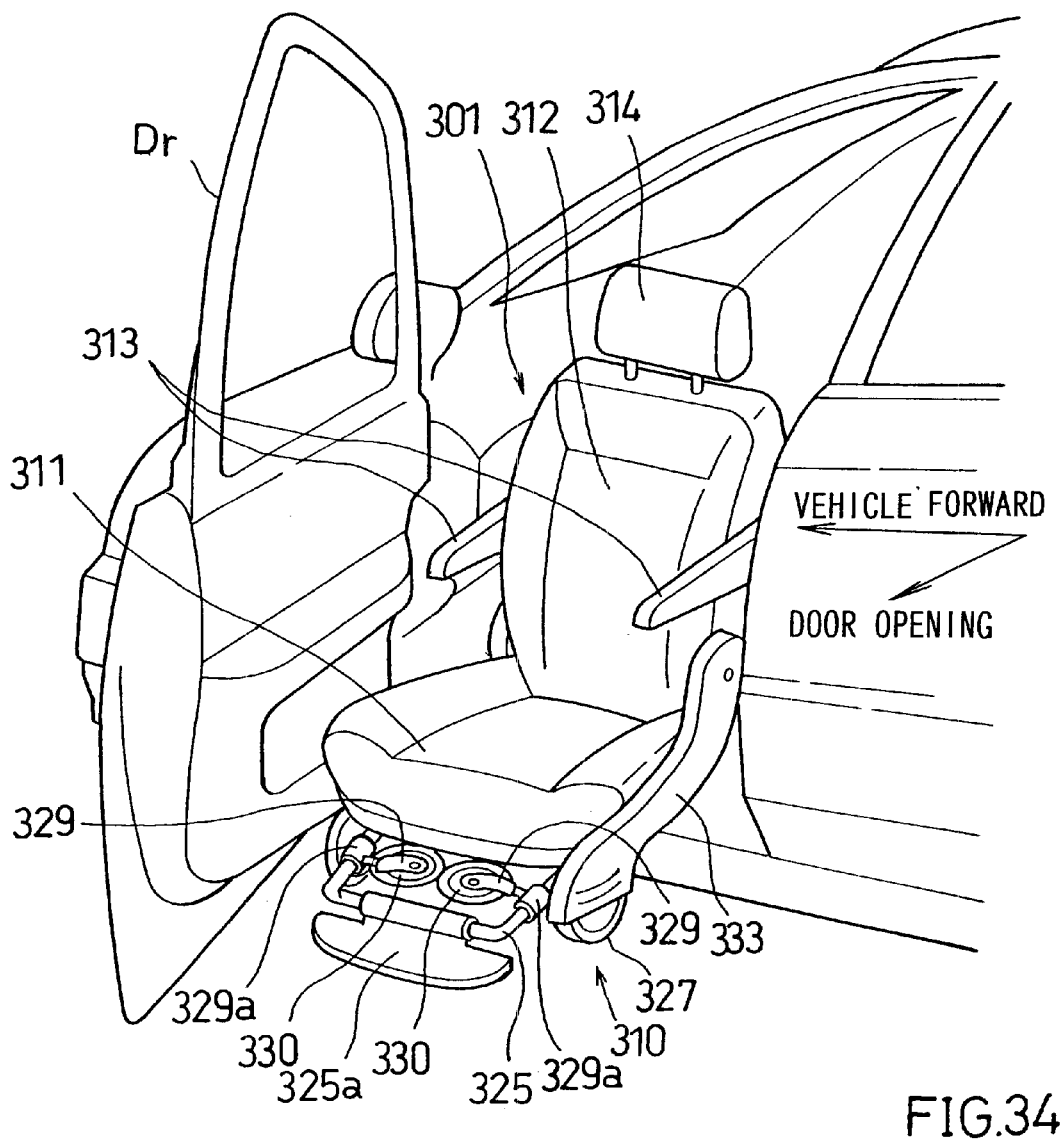
FIG. 34 is also a perspective view showing the embodiment of the invention, in which the seat body is shown being connected to the lift-up mechanism and moved into the vehicle.

An embodiment (a fourth embodiment) of the invention as described in claim 4 will now be described with reference to FIGS. 33 to 40. FIGS. 33 and 34 show a complete rotating vehicle seat 301 according to this embodiment. In FIG. 33, a seat body 310 is shown separated from a lift-up mechanism 350 so as to be used separately as a wheelchair. In FIG. 34, the seat body 310 is shown connected to a lateral support base 360 to be moved into the inside of the vehicle.

The rotating vehicle seat 301 of this embodiment generally consists of a seat body 310 that can be used separately as a wheelchair and a lift-up mechanism 350 for moving and placing the seat body 310 in the inside of the vehicle by connecting the seat body 310.

The seat body 310 includes a seat cushion 311 and a seat back 312. Arm rests 313 and a head rest 314 are provided on both sides of and on the top of the seat back 312, respectively. Further, a handle 315 having a brake lever 316 is mounted on the back of the seat back 312 to be operated by the passengers' helpers.

Figure 36:
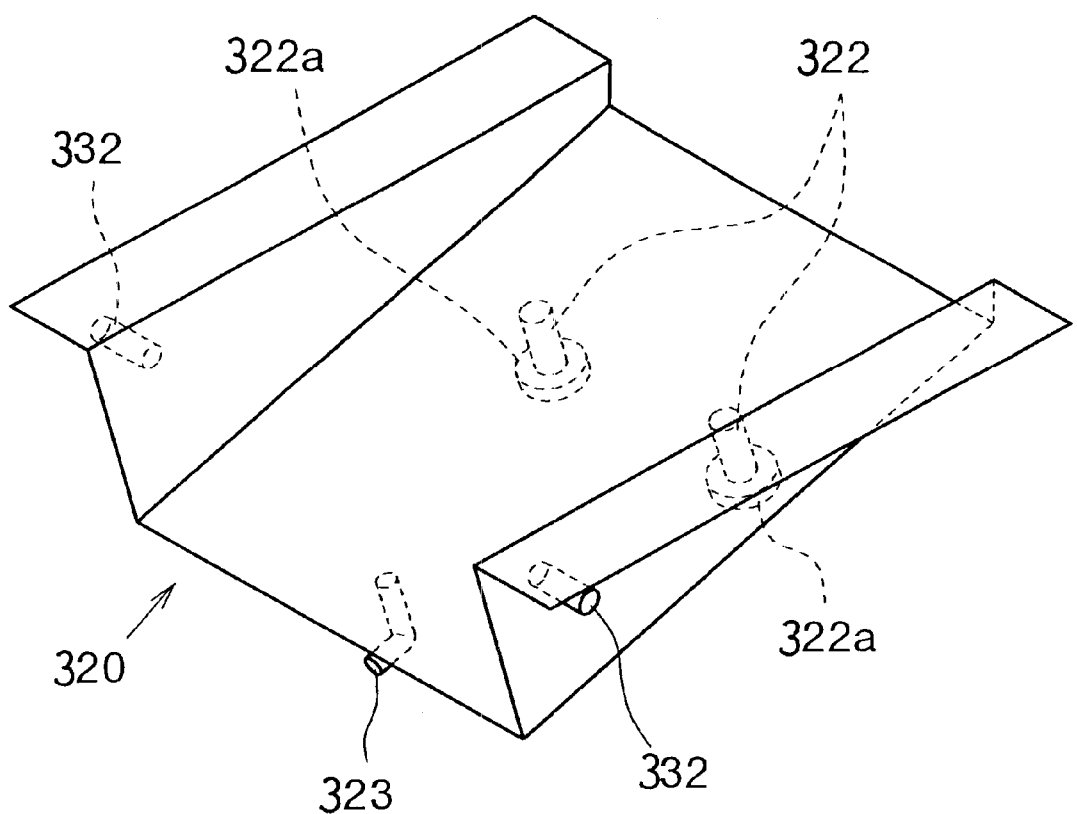
FIG. 36 is a perspective view of a connecting base.

A connecting base 320 is mounted on the underside of the seat cushion 311, and retractable wheel frames 321 are mounted on both sides of the connecting base 320. FIG. 36 shows the connecting base 320 separately. An underside of the connecting base 320 is disposed in parallel with an inclined base 361 of the lateral support base 360 when the seat body 310 is placed on the ground as a wheelchair. A pair of right and left connecting pins 322 and a hook 323 are mounted on the underside of and on the middle of the front end of the connecting base 320, respectively. A flange 322a having a predetermined diameter is formed on a distal end of each of the connecting pins 322. The function of the flange 322a will be described below.

Figure 35:
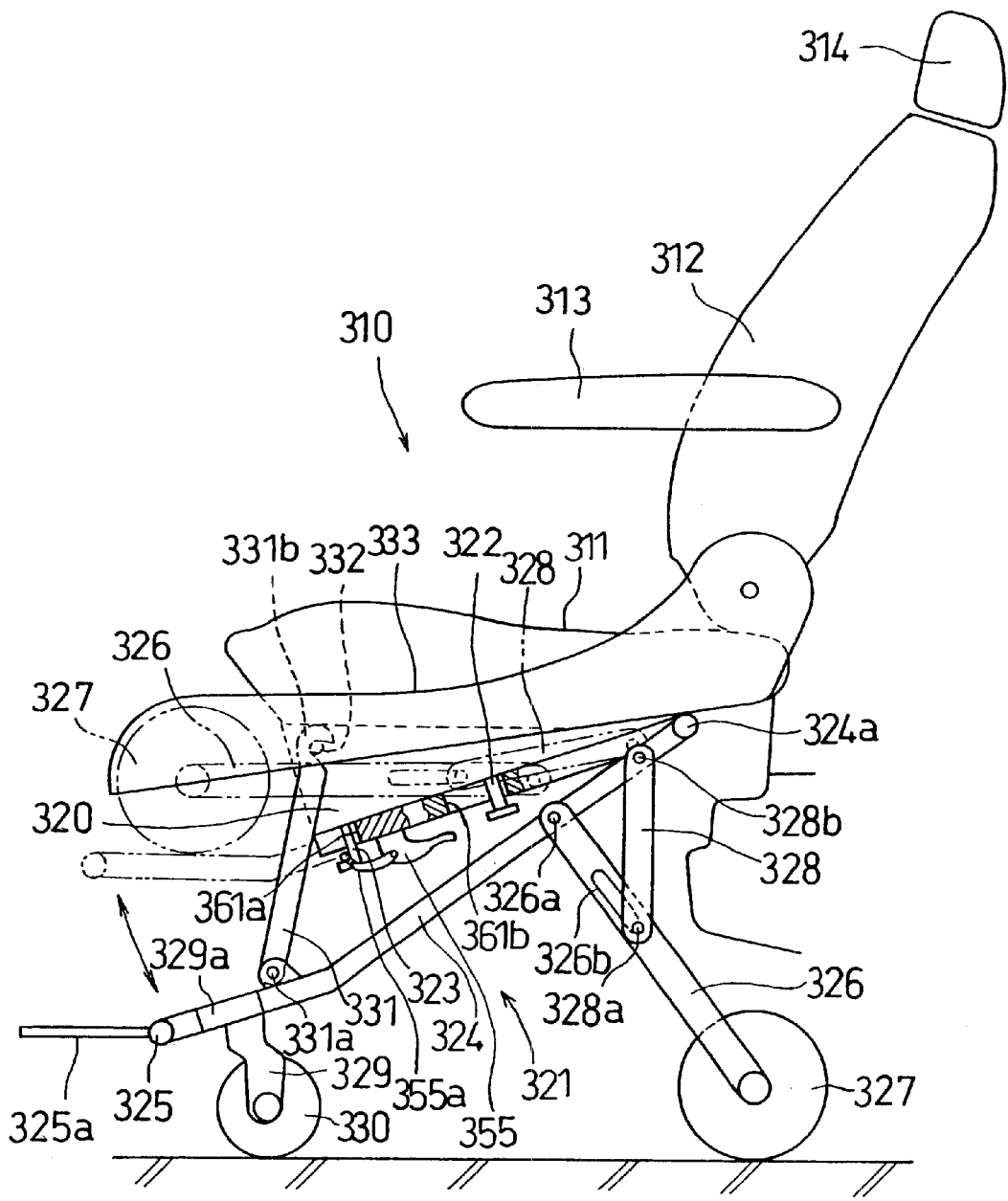
FIG. 35 is a side view of the seat body connected to an inclined base of the lift-up mechanism, in which a solid line depicts a wheel frame in an extended state and a broken line depicts the wheel frame in a stored state.

As shown in FIG. 35, each of the right and left wheel frames 321 mounted on both sides of the connecting base 320 includes a main arm 324 that pivots vertically.

The main arm 324 is supported through a shaft 324a near the rear end of the side of the connecting base 320 for vertical pivotal movement. The front ends of the main frames 324 are connected by a U-shaped connecting arm 325, and a foot rest 325a is mounted on the connecting arm 325.

An upper end of a rear wheel arm 326 is connected to the main arm 324 near the rear end through a shaft 326a for vertical pivotal movement. A rear wheel 327 is rotatably supported on the lower end of the rear wheel arm 326. A slot-like connecting groove 326b is formed in a generally medial portion of the rear wheel arm 326. A lower end of an auxiliary arm 328 is connected to the connecting groove 326b through a shaft 328a for rotation and movement along the groove 326b. An upper end of the auxiliary arm 328 is pivotally connected to the main arm 324 between the shaft 326a and the shaft 324a by a pivot 328b.

A front wheel 330 is rotatably supported on the front end of the main arm 324 by a bracket 329. The bracket 329 has a tubular portion 329a. The tubular portion 329a is supported around the main arm 324 coaxially with and rotatably around the axis of the main arm 324. Thus, the bracket 329 is connected to the main arm 324 to permit rotation around the axis of the main arm 324. Therefore, the front wheel 330 can be extended to an operating position by rotating the bracket 329 downwardly around the axis of the main arm 324, while it can be retracted inwardly of the main arm 324 to a stored position by rotating the bracket 329 upwardly around the axis of the main arm 324. FIG. 34 shows the front wheels 330 in a stored position.

Further, a lower end of a lock arm 331 is rotatably supported on the front end of the main arm 324 by a shaft 331a. A hook-shaped portion 331b is formed on the upper end of the lock arm 331. The hook-shaped portion 331b is removably engaged on a lock pin 332 that is mounted on and extends laterally from the side of the connecting base 320.

The wheel frames 321 thus constructed are connected to each other by the connecting arm 325 and thus can be retracted together. Specifically, as shown in FIG. 35 by solid line, the main arms 324 are pivoted downwardly so as to be extended, and then the lock arm 331 is rotated to an upstanding position and the hook-shaped portion 331b is engaged on the lock pin 332. Thus, the main arms 324 are locked in the extended position.

Subsequently, the brackets 329 are rotated downwardly, so that the front wheels 330 are extended. At the same time, the rear wheel arms 326 are rotated downwardly, so that the rear wheels 327 are extended. With such rotation of the rear wheel arms 326, each of the auxiliary arms 328 is pivoted downwardly around the pivot 328b while allowing the shaft 328a to move relatively along the connecting groove 326b. Each of the rear wheel arms 326 is pivoted from forward to rearward (from the left to the right as viewed in FIG. 35) beyond a vertical line through the shaft 326a. The auxiliary arm 328 and the main arm 324 form a truss on the rearward position and exert a load on the rear wheel arm 326. By thus extending the wheel frames 321, the seat body 310 can be used separately as a wheelchair.

The wheel frames 321 are stored when the seat body 310 is moved into the vehicle. Specifically, when the seat body 310, which has been used as a wheelchair, is moved into the vehicle, the seat body 310 is connected to the lateral support base 360 of the lift-up mechanism 350. In this state, the wheel frames 321 are stored along the sides of the seat cushion 311. In order to store the wheel frames 321, the hook-shaped portion 331b of the lock arm 331 is first disengaged from the lock pin 332, which allows the main arms 324 to rotate upwardly. Then, the main arms 324 are rotated upwardly, and at the same time, the brackets 329 are rotated upwardly, so that the front wheels 330 are stored between the main frames 324. The stored state of the front wheels 330 is clearly shown in FIG. 34.

Further, the rear arms 326 are rotated upwardly so as to be stored generally along the sides of the seat cushion 311. Wheel covers 333 for covering the rear wheel arms 326 and the rear wheels 327 are provided on both sides of the seat cushion 311.

The main arms 324, the front wheels 330 and the rear wheels 327 thus stored, can be retained by respective position retaining means (not shown) in the stored position.

By thus storing the wheel frames 321, the seat body 310 can be installed substantially in the same vertical position as other seats in the vehicle (fixed seats in the vehicle, such as a driver's seat) when the seat body 310 has been moved into a specified position in the vehicle. Therefore, the passenger in this rotating seat can sit at the same height as the other passengers in the vehicle.

The lift-up mechanism 350 installed within the vehicle will now be described. The lift-up mechanism 350 includes a lateral support base 360, a rotating support base 380, and a longitudinal support base 390. The lateral support base 360 connects and supports the seat body 310 to permit sliding movement in the lateral direction of the vehicle. The rotating support base 380 rotatably supports the lateral support base 360 and thus supports the seat body 310 to permit rotation between the position facing the door opening side and the position facing the front of the vehicle. The longitudinal support base 390 supports the rotating support base 380 and thus the seat body 310 to permit sliding movement in the longitudinal direction of the vehicle.

Figure 37:
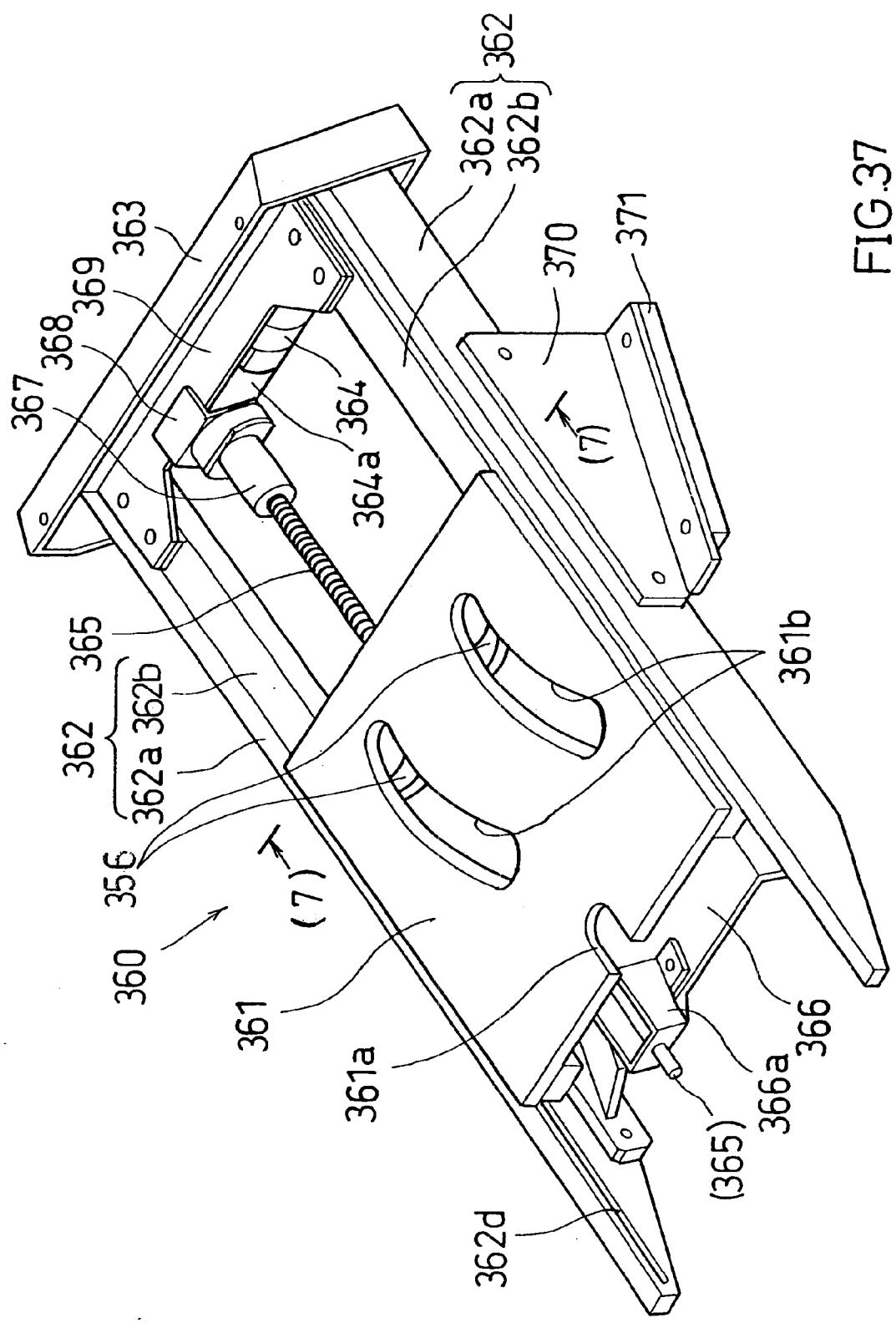
FIG. 37 is a perspective view of a lateral support base.
Figure 39:
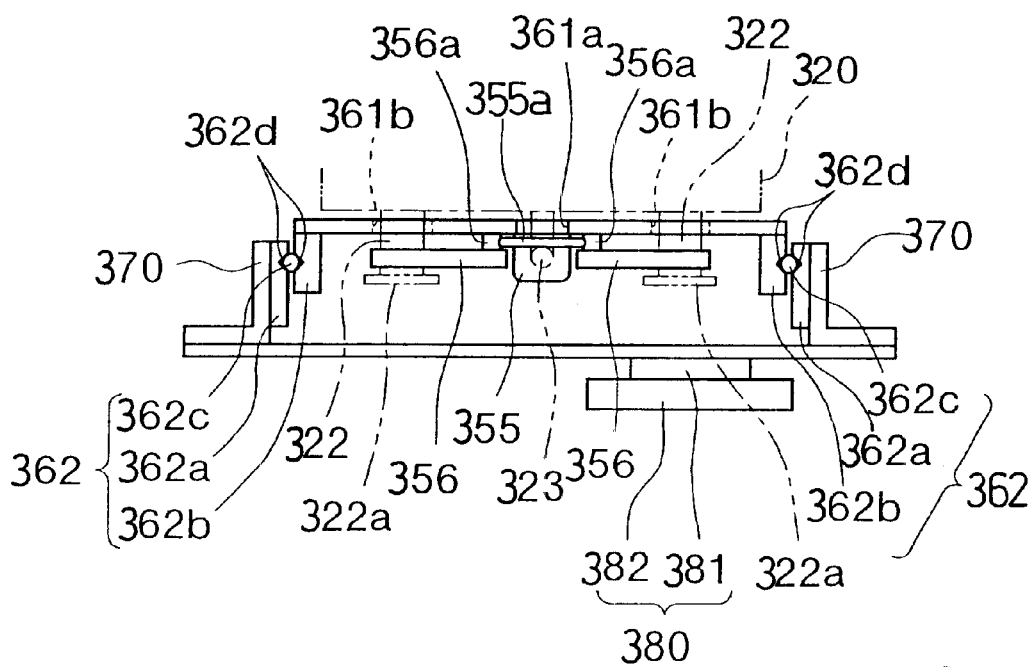
FIG. 39 is sectional view taken along line (7)—(7) in FIG. 37.

As shown in FIGS. 37 and 39, the lateral support base 360 includes a pair of right and left linear slide mechanisms 362. Each of the linear slide mechanisms 362 includes a fixed rail 362a, a moving rail 362b and a plurality of steel balls 362c disposed between V-shaped grooves 362d of the rails 362a and 362b.

The inclined base 361 and a connecting frame 369 are mounted on and extend between the moving rails 362b on the forward portions and on the rear ends, respectively.

The inclined base 361 is disposed in parallel to the connecting base 320 of the seat body 310. The seat body 310 is superposed on and connected to the inclined base 361, so that the seat body 310 is connected to the lift-up mechanism 350.

A cutout portion 361a is formed on a medial portion of the front edge of the inclined base 361 and receives a hook 323 on the side of the seat body 310 when the seat body 310 is connected to the lift-up mechanism 350. Further, a pair of connecting openings 361b are formed through the inclined base 361 to the rear of the inclined base 361.

Each of the connecting openings 361b has a slot shape that is wider toward the exterior side of the vehicle. The wide portion of the connecting opening 361b on the exterior side has a width that permits insertion of the flange 322a of the connecting pin 322. A narrower portion of each of the connecting openings 361b on the interior side has a width that is smaller than the diameter of the flange 322a and that permits insertion of a stem of the associated connecting pin 322.

Further, as shown in FIG. 33, the connecting openings 361b are curved more away from the door panel Dr of the vehicle on the exterior side than on the interior side.

Figure 38:
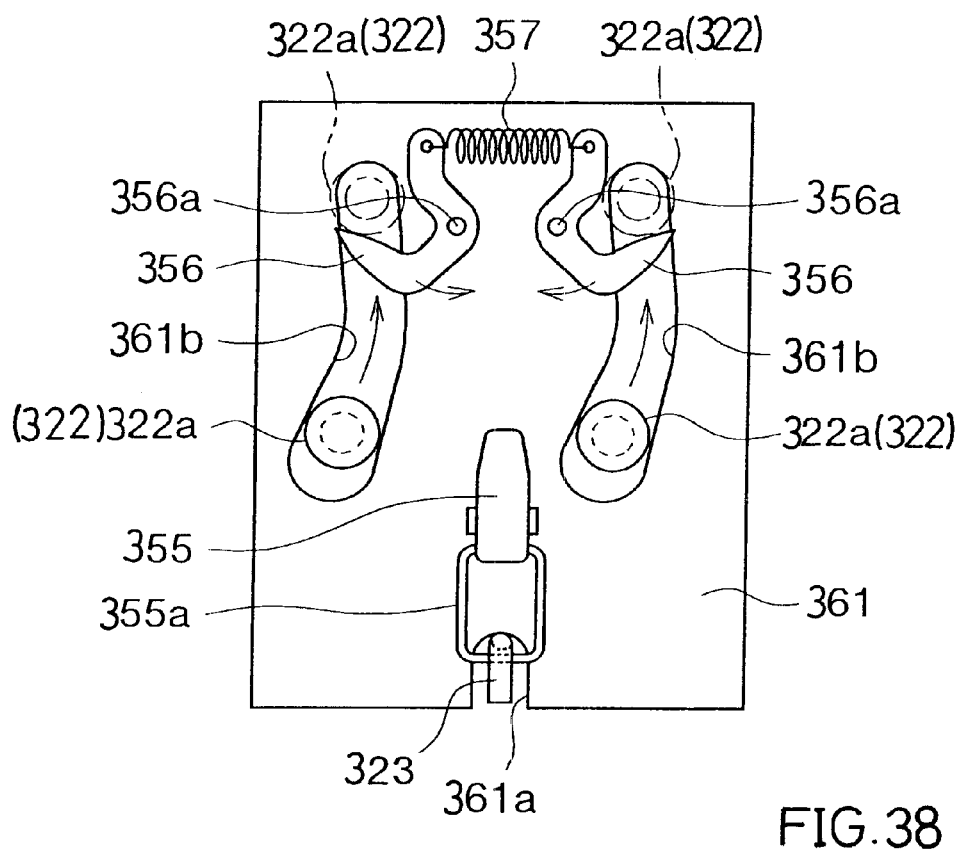
FIG. 38 is a underside view of the inclined base.

As shown in FIGS. 38 and 39, a toggle clamp 355 is mounted on the underside of the inclined base 361 at a position corresponding to the cutout portion 361a. Further, a hook-shaped stopper 356 is also mounted on the underside of the inclined base 361 inwardly of and beside each of the connecting openings 361b for rotation around a pivot 356a. A tension spring 357 is disposed between the head portions of the stoppers 356, so that a free end of each of the stoppers 356 is biased in a direction that moves across the connecting openings 361b.

A generally box-like connecting frame 363 is mounted across the rear ends of the fixed rails 362a. As a driving source for the lateral support base 360, a motor 364 is mounted to the connecting frame 363. One end of a threaded shaft 365 is connected to the motor 364 via a reduction gear train 364a. Further, the front ends of the fixed rails 362a are also connected to each other by a connecting frame 366. The other end of the threaded shaft 365 is rotatably supported by a bracket 366a mounted on the connecting frame 366.

A nut 367 is secured to the connecting frame 369 by the bracket 368 and is adapted to engage the threaded shaft 365. When the motor 364 is started, the threaded shaft 365 rotates and thus the nut 367 moves along the threaded shaft 365. As a result, the moving rails 362b slide with respect to the fixed rails 362a, and thus the inclined base 361 moves in the lateral direction of the vehicle (in the sliding direction of the linear slide mechanism 362).

An L-shaped bracket 370 is mounted in a generally medial portion in the sliding direction of each of the fixed rails 362a. The bracket 370 is fixed on a rotating base 371. The lateral support base 360 is mounted on an inner ring 381 of a rotating support base 380, which will be described below, by the rotating base 371.

The rotating support base 380 also incorporates a slide mechanism similar to the above-mentioned linear slide mechanism 362. Specifically, V-shaped grooves are formed in the outer peripheral surface of the inner ring 381 and in the inner peripheral surface of the outer ring 382, respectively. A plurality of steel balls are disposed between the V-shaped grooves. With the rotating support base 380 thus constructed, the lateral support base 360 and thus the seat body 310 can be rotated smoothly without rattling.

Figure 40:
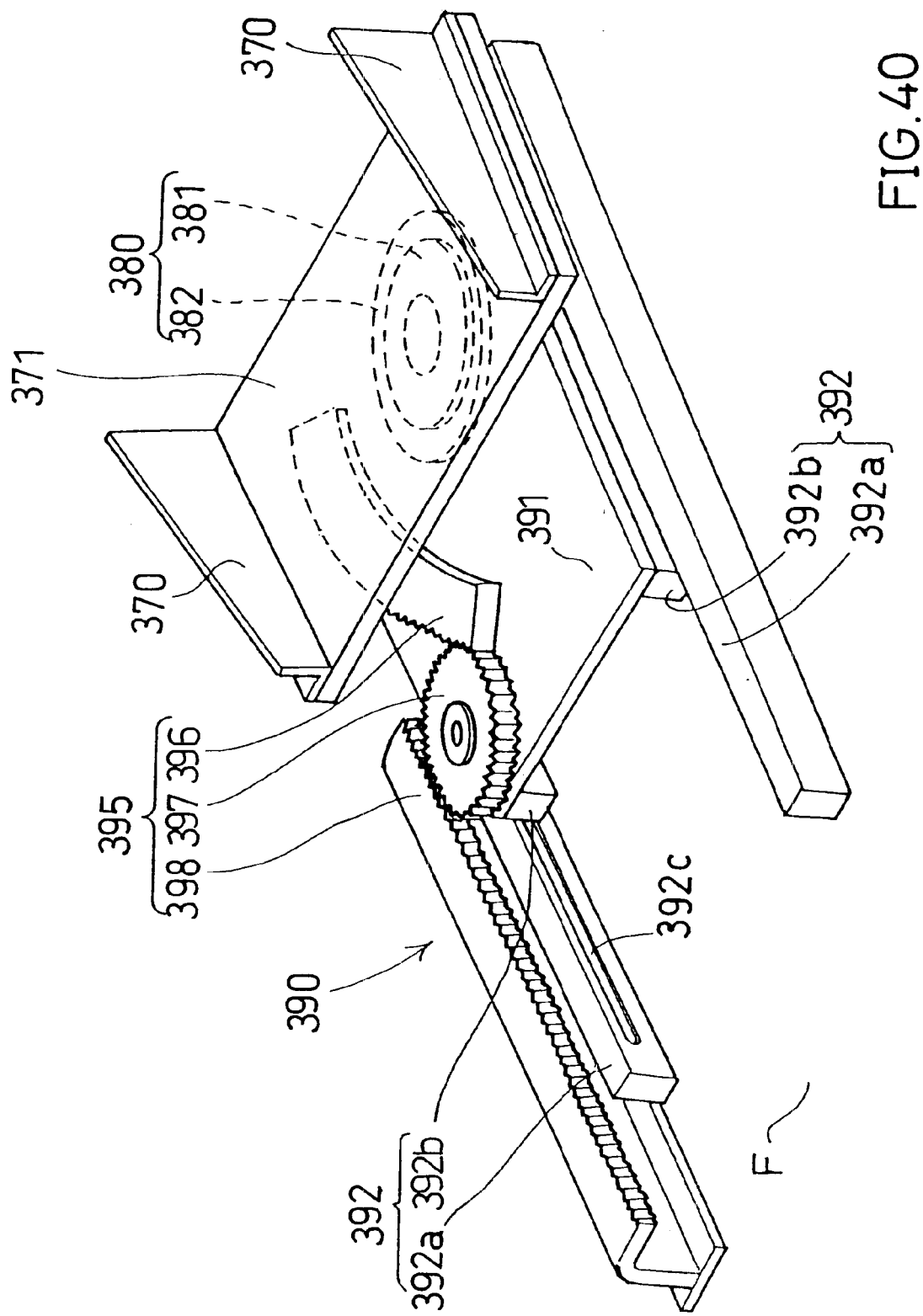
FIG. 40 is a perspective view of a rotating support base and a longitudinal support base.

As shown in FIG. 40, the rotating support base 380 is mounted on a main base 391 of the longitudinal support base 390. The main base 391 is mounted on the vehicle floor F via a pair of right and left linear slide mechanisms 392 to permit longitudinal movement. The linear slide mechanisms 392 are constructed similarly to the above-mentioned linear slide mechanisms 362. Specifically, each of the linear slide mechanisms 392 consists of a fixed rail 392a, a moving rail 392b and a plurality of steel balls (not shown) disposed between V-shaped grooves 392c that are formed in both rails 392a, 392b.

A coupling mechanism 395 serves to couple the rotational movement and the longitudinal sliding movement of the seat body 310. The coupling mechanism 395 consists of a circular-arc pinion gear 396 mounted to the underside of the rotating base 371, an intermediate gear 397 mounted on the main base 391 and a rack 398 mounted on the vehicle floor F. The pinion gear 396 engages the intermediate gear 397, and the intermediate gear 397 engages the rack 398.

By engaging the pinion gear 396 with the intermediate gear 397 and the intermediate gear 397 with the rack 398, the seat body 310 slides forward with respect to the vehicle while rotating. On the other hand, when the seat body 310 is rotated from the door opening side to the position facing the front of the vehicle, the seat body 310 slides rearward with respect to the vehicle by coupling with this rotational movement. Thus, a wider space can be provided close to the occupant's feet. With the coupling mechanism 395 thus constructed, the rotational movement and the longitudinal sliding movement of the seat body 310 can be made in a single operation, thereby making the rotating vehicle seat 301 more convenient to use and further simplifying the steps of getting into and out of the vehicle.

With the rotating vehicle seat 301 having the above construction, the seat body can be detached from the vehicle so as to be used separately as a wheelchair outside the vehicle, as well as a passenger seat inside the vehicle.

Representative operations for moving the seat unit 310 from the outside to the inside after having used the seat unit 310 separately as a wheelchair, will now be described in further detail. The lateral support base 360 is directed to the door opening side (so as to slide in the lateral direction of the vehicle) and the inclined base 361 is moved to the outside end (to the front). Then, with the wheelchair user sitting in the seat body 310, the seat body 310 is moved backward toward the lateral support base 360 such that the connecting base 320 of the seat body 310 is superposed on the inclined base 361 of the lateral support base 360. The connecting pins 322 of the connecting base 320 are inserted into the connecting openings 361b of the inclined base 361.

The connecting openings 361b are curved in a manner that the exterior side ends are directed rearward of the vehicle, as described above. Therefore, when the connecting pins 322 are inserted into the connecting openings 361b, the seat body 310 can be moved toward the lift-up mechanism 350 in a manner to be rotated from behind the door Dr so as not to interfere with the door Dr.

In this stage of moving the seat body 310 toward the lateral support base 360 so as to be rotated from behind the door Dr and inserting the connecting pins 322 into the connecting openings 361b, each of the connecting pins 322 first enters the wider portion of the connecting opening 361b. As shown in FIG. 38 by a solid line, the wider portion of the connecting opening 361b can receive the flange 322a of the connecting pin 322, thereby allowing the connecting pin 322 to be inserted into and removed from the connecting opening 361b. After the connecting pin 322 has been inserted into the wider portion, the seat body 310 is further moved backward to allow the connecting pin 322 to be moved toward the narrower portion of the connecting opening 361b. The width of the narrower portion is smaller than the diameter of the flange 322a of the connecting pin 322. Therefore, the flange 322a interferes with both sides of the associated connecting opening 361b, thereby preventing removal of the connecting pin 322 from the connecting opening 361*b*. As a result, the connecting base 320 is locked in the state superposed on the inclined base 361, and thus the seat body 310 is locked in the state connected to the lift-up mechanism 350.

The end portion of each of the stoppers 356 extends across the connecting opening 361*b* as the connecting pin 322 moves from the wider portion to the narrower portion of the connecting opening 361*b*. Therefore, the connecting pin 322 moves to the narrower portion of the connecting opening 361*b*, while pushing the end portion of the stopper 356 to rotate the stopper 356 around the pivot 356*a* in the unlocking direction (counterclockwise as for the left stopper 356 and clockwise as for the right stopper 356 as viewed in FIG. 38) against the tension spring 357.

When the connecting pin 322 moves into the narrower portion while rotating the stopper 356 in the unlocking direction, the stopper 356 rotates in the locking direction (clockwise as for the left stopper 356 and counterclockwise as for the right stopper 356 as viewed in FIG. 38) by the tension spring 357. Thus, the end portion of the stopper 356 is returned to the locking position extending across the connecting opening 361*b*. When the connecting pin 322 thus enters the narrower portion (as shown by a broken line in FIG. 38), as described above, the flange 322*a* of the connecting pin 322 engages both sides of the connecting opening 361*b*, thus preventing the connecting pin 322 from being removed from the connecting opening 361*b*. Further, the stopper 356 prevents the connecting pin 322 from moving to the wider portion. Therefore, the connecting pins 322 are reliably engaged with the connecting opening 361*b*.

At the same time that the connecting pin 322 is moved into the connecting opening 361*b*, the hook 323 is inserted into the cutout portion 361*a* of the inclined base 361. When the hook 323 is engaged within the cutout portion 361*a* and the connecting pin 322 moves into the narrower portion of the inclined base 361, the connecting base 320 is substantially superposed on the inclined base 361. Thereafter, when an engagement portion 355*a* of the toggle clamp 355 is engaged with the hook 323, the connecting base 320 is locked in the state superposed on the inclined base 361. Thus, the connection of the lift-up mechanism 350 to the seat body 310 is completed.

After the seat body 310 has been thus connected to the lift-up mechanism 350, the wheel frames 321 are retracted in the aforementioned procedure. Thus, the wheel frames 321 are retracted and stored along the underside and the sides of the seat cushion 311.

After the seat body 310 has been connected to the lift-up mechanism 350 and the wheel frames 321 have been stored, the lift-up mechanism 350 is actuated to move the connected seat body 310 to the inside of the vehicle. Specifically, the motor 364 of the lateral support base 360 is first actuated to move the connected seat body 310 to the interior side. When the seat body 310 is moved to the end of the interior side in the lateral direction, the motor 364 is stopped.

Subsequently, the seat body 310 is manually moved from the position facing to the door opening side to the position facing to the front of the vehicle. Because the lift-up mechanism 350 of this embodiment has the coupling mechanism 395 as described above, the seat body 310 moves rearward with respect to the vehicle in synchronization with the rotational movement of the seat body 310. When the seat body 310 is rotated to the position facing the front of the vehicle, the seat body 310 is moved to the rear end position of the sliding movement by means of the longitudinal support base 390. Thus, a wider space is provided close to the occupant's feet. During this process, the wheelchair user can remain sitting in the seat body 310.

On the other hand, in order to move the seat body 310 from being installed in the vehicle compartment as described above to the outside for use as a wheelchair, while the wheelchair user is sitting in the seat body 310, the wheelchair user helper manually rotates the seat body 310 by about 90° from the position facing the front of the vehicle to the door opening side. By coupling with the rotational movement, the seat body 310 moves forward with respect to the vehicle. Subsequently, when the seat body 310 has been rotated to the position facing the door opening side, the motor 364 of the lateral support base 360 is actuated to move the seat body 310 to the outside in the lateral direction of the vehicle. After the seat body 310 has been moved to the outside end position in the lateral direction of the vehicle, the motor 364 is stopped.

After the seat body 310 has been moved to the outside end position in the lateral direction of the vehicle, the wheel frames 321 are extended in the above-described procedure.

Subsequently, the toggle clamp 355 is unlocked to disengage the engagement portion 355*a* from the hook 323. At the same time, the stoppers 356 are rotated away from the connecting opening 361*b*. In this state, the seat body 310 is moved forward manually, for example. When the seat body 310 is moved forward, the connecting pin 322 moves the end of the stopper 356 from the narrower portion of the connecting opening 361*b* toward the wider portion. When the connecting pin 322 moves to the wider portion of the connecting opening 361*b*, which wider portion has a width large enough that the flange 322*a* of the connecting pin 322 can be inserted into the wider portion, the connecting pin 322 is permitted to move out of the connecting opening 361*b*. Further, at this stage, the hook 323 is disengaged from the cutout portion 361*a*.

After the connecting pin 322 has been permitted to withdraw from the connecting opening 361*b*, the connecting base 320 is moved away from the inclined base 361 by moving the seat body 310 forward. Thus, the seat body 310 can be detached from the lift-up mechanism 350. The seat body 310, which has thus been detached from the lift-up mechanism 350, can be separately used as a wheelchair.

With the rotating vehicle 301 thus constructed, the seat body 310 can be separately used as a wheelchair, and when the seat body 310 is connected as is to the lateral support base 360. and moved into the vehicle, the seat body 310 can be also used as a vehicle seat. Such a rotating seat does not require the wheelchair user to change from a vehicle seat inside the vehicle to a wheelchair outside the vehicle and vice versa, thereby making it easier for such a wheelchair user to enter and exit a vehicle.

Further, because the seat body can be used separately as a wheelchair and can be moved into the vehicle while keeping the function of a wheelchair (mainly a function of moving by means of the seating mechanism and the wheel frames 321), the rotating seat is more convenient to use, compared with a known rotating seat in which a wheelchair frame portion is detached when used inside the vehicle.

Further, after having been used as a wheelchair, the seat body 310 can be connected to the lateral support base 360 by superposing and connecting the connecting base 320 of the seat body 310 on the inclined base 361. The inclined base 361 is downwardly inclined toward the exterior side, and the connecting base 321 is disposed in parallel to the inclined base 361. With this construction, differences in the vertical position between the seat body 310 and the lateral support base 360, if any, existing in the stage of moving the seat body 310 as a wheelchair toward the lateral support base 360, can be corrected by sliding contact between the connecting base 321 and the inclined base 361 that are parallel to each other. As a result, the seat body 310 can be easily connected to the lateral support base 360.

Further, the right and left wheel frames 321 mounted on the sides of the seat body 310 can be retracted and stored along the underside and the sides of the seat cushion 311. As a result, the vertical position of the seat body 310 when installed inside the vehicle can be lowered. Therefore, the rotating vehicle seat 301 can be easily installed inside the vehicle in substantially the same vertical position as other seats fixed in the vehicle, such as a driver's seat. Consequently, the passenger can be seated in substantially the same vertical position as other passengers in the vehicle.

Further, with the rotating vehicle seat 301 of this embodiment, because the connecting openings 361b are curved more away from the door panel Dr of the vehicle on the exterior side than on the interior side, the seat body 310 can be moved toward the lift-up mechanism 350 in a manner so as to rotate from behind the door Dr and not interfere with the door Dr. Thus, the seat body 310 can be smoothly connected to and detached from the lift-up mechanism 350 while efficiently using the limited space.

Various changes or modifications may be added to the above-described embodiment. For example, in this embodiment, it has been described that the connecting base 320 is superposed on and secured to the inclined base 361 by engaging the connecting recess with the connecting projection, so that the seat body 310 is connected to the lift-up mechanism 350. The means for securing the connecting base to the inclined base may be changed to various other forms. For example, three hooks may be arranged on the connecting base, and three toggle clamps may be arranged on the inclined base to correspond to the three hooks. The toggle clamps may engage the respective hooks to thereby secure the connecting base to the inclined base.

Further, although the connecting recess in the form of the connecting opening 361b has been described as being formed through the inclined base 361, even if the engagement between the connecting recess and the connecting projection is used to secure the connecting base to the inclined base, the connecting recess may not necessarily be formed through the inclined base 361, and any recess that can engage the connecting projection on the seat body side may be used. When the connecting recess is formed so as not to extend through the inclined base 361, the stopper 356 may be disposed on the upper surface of the inclined base.

Further, although the connecting pin as a connecting projection has been described as being provided on the connecting base 320, with the connecting recess being provided in the inclined base 361, they may be provided vice versa. Specifically, the connecting projection may be provided on the inclined base, and the connecting recess may be provided in the connecting base.

Figure 41:
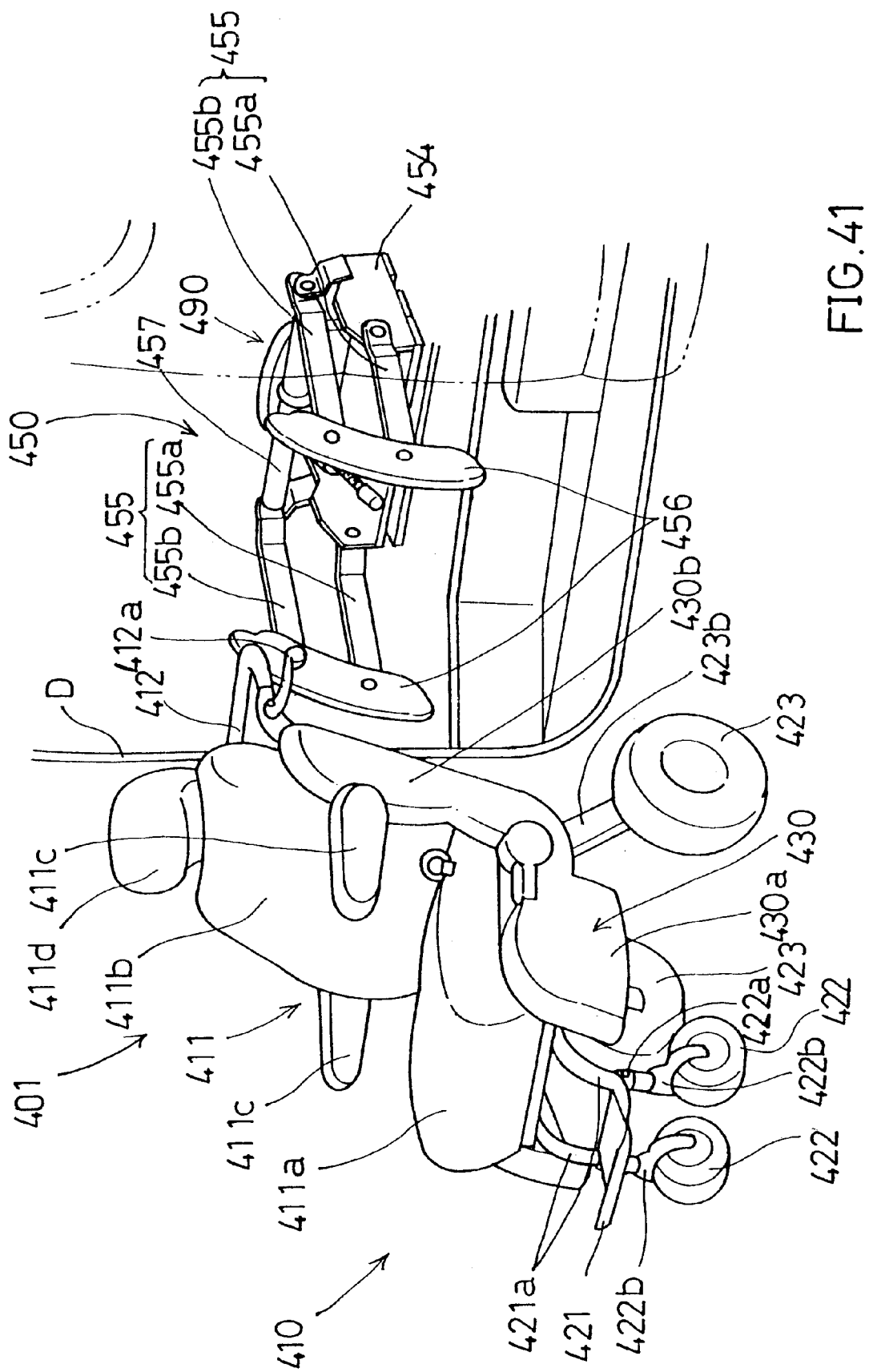
FIG. 41 is a perspective view showing an embodiment of the invention, in which a wheelchair is shown detached from a lift-up mechanism.

An embodiment (a fifth embodiment) of the invention as described in claim 6 will now be described with reference to FIGS. 41 to 50. FIG. 41 shows a rotating vehicle seat 401 of this embodiment. The rotating vehicle seat 401 has a wheelchair 410 and a lift-up mechanism 450.

The wheelchair 410 includes a seat body 411 having a seat cushion 411a and a seat back 411b, a seat frame 420 having a generally L-shaped side surface for supporting the seat body 411, and coverings 430 also having generally L-shaped side surfaces and attached to both sides of the seat frame 420.

A footrest 421 is mounted to the front portion of the seat frame 420 via a pair of support arms 421a.

Figure 43:
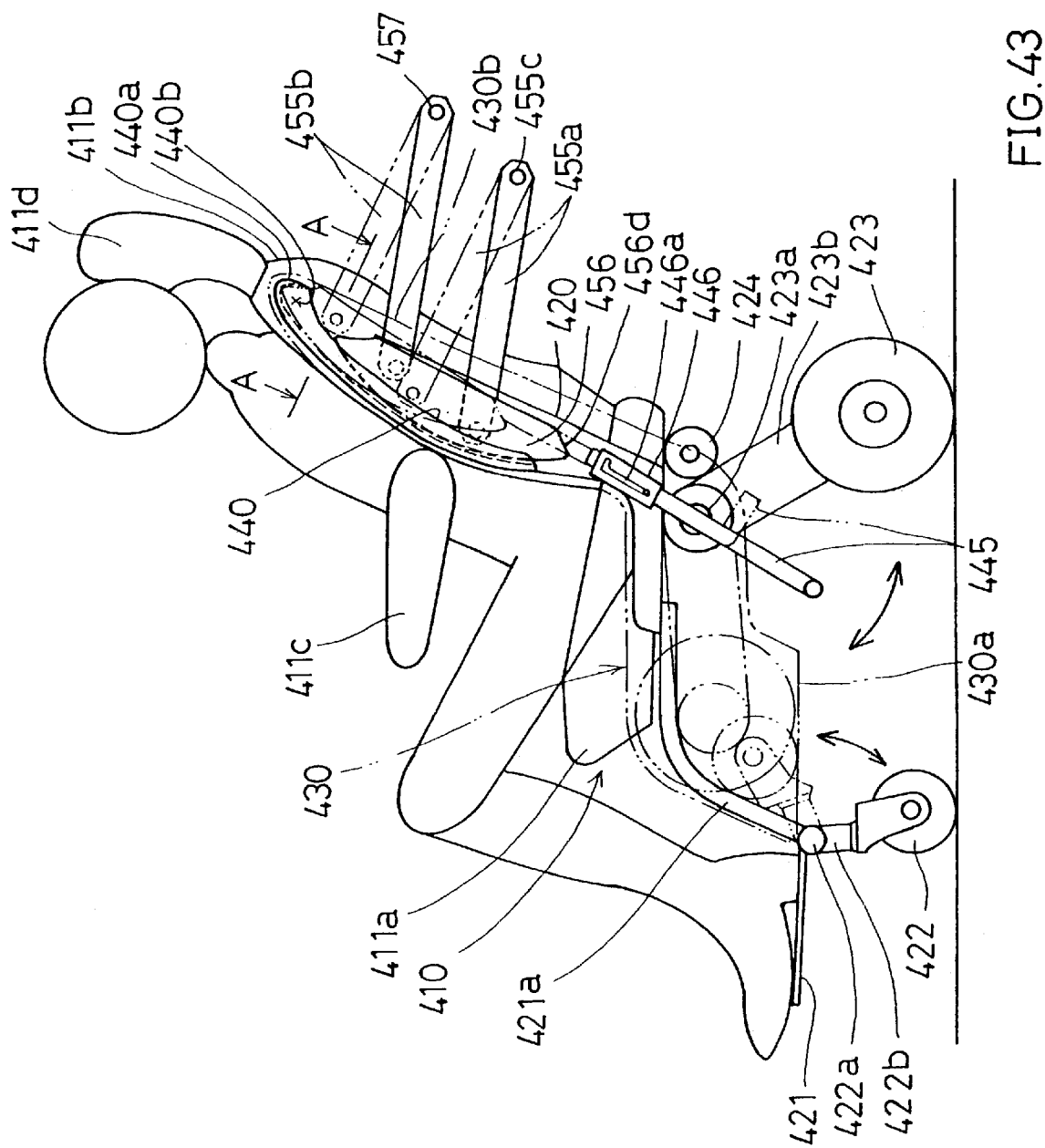
FIG. 43 is a side view of the rotating vehicle seat, showing a connecting mechanism for connecting the lift-up mechanism to the wheelchair.

A pair of front wheels 422 are mounted to the front ends of the support arms 421a. Each of the front wheels 422 is mounted to an end of a front wheel stay 422b and swing vertically. The other end of the front wheel stay 422b is connected to the support arm 421a by a pivot 422a, which pivot 422a permits the front wheel stay 422b to swing vertically. As shown in FIG. 43 by a broken line, by rotating the front wheel stay 422b upward, the front wheel 422 can be stored (retracted) in a wheel storage section 430a that is provided in the front portion of the covering 430. On the other hand, as shown in FIG. 43 by a solid line, by rotating the front wheel stay 422b downward to be placed on the ground, the front wheel 422 can be allowed to function as a travelling wheel.

A pair of rear wheels 423 are mounted on the rear portion of the underside of the seat frame 420. As shown in FIG. 43, each of the rear wheels 423 is also mounted to an end of a rear wheel stay 423b and swing vertically. The other end of the rear wheel stay 423b is connected to a lower surface of the frame 420 by a shaft 423a, which shaft 423a permits the rear wheel stay 423b to swing vertically. Like the front wheels 422, the rear wheel 423 can be stored in the wheel storage section 430a of the covering 430 by rotating the rear wheel stay 423b upward. Further, the rear wheel 423 can be allowed to function as a travelling wheel by rotating the rear wheel stay 423b downward to be placed on the ground. In FIG. 43, a broken line depicts the rear wheel 423 stored in the wheel storage section 430a, and a solid line depicts the rear wheel 423 extended downward and placed on the ground.

Although it is not shown, a tension spring is disposed in each of the front and rear wheel stays 422b, 423b in a manner that permits the biasing force to be exerted in both directions for storing and extending the wheels. Thus, the front wheels 422 and the rear wheel 423 can be held in a stored position within the wheel storage section 430a or in an extended position.

As shown in FIG. 43, a cushion bar 424 that is covered with an elastic rubber is mounted at the back (on the right as viewed in the drawing) of a shaft 423a of each of the rear wheels 423. The cushion bar 424 is in contact with the rear wheel stays 423b of the rear wheels 423 and can absorb shocks that will be transmitted from the road surface to the rear wheels 423. In other words, the cushion bar 424 functions as a shock absorber.

Figure 44:
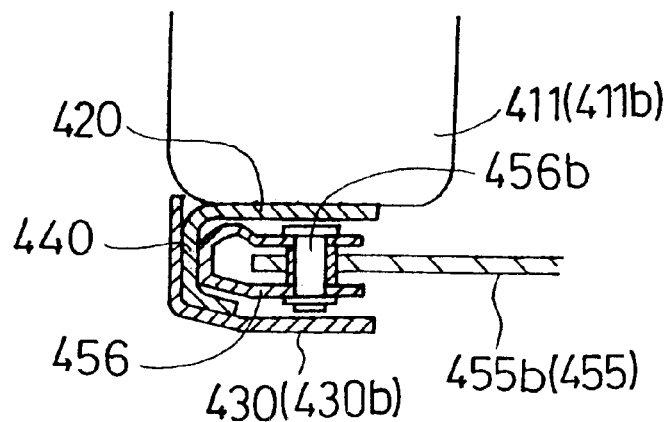
FIG. 44 is sectional view taken along line A—A in FIG. 43, showing a connecting plate inserted into a connecting recess.
Figure 45:
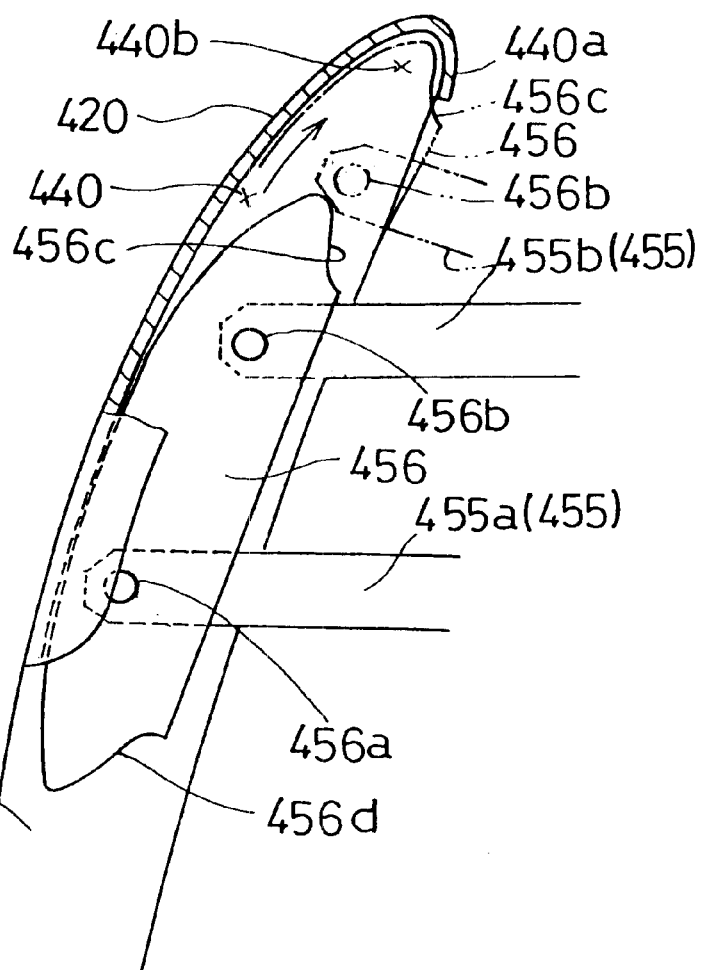
FIG. 45 is a side view showing an upper end of the connecting plate engaged into a catching recess of the connecting recess.

Each of the right and left coverings 430 has an upright portion 430b along the sides of the seat back 411b. A connecting recess 440 is defined within each upright portion 430b and works when the wheelchair 410 is connected to the lift-up mechanism 450. The connecting recess 440 is defined along the seat frame 420 and has a vertically elongated curved configuration having a U-shaped cross section that is open to the rear as shown in FIG. 44. As shown in FIGS. 43 and 45, a bent portion 440a is formed on the upper portion of the connecting recess 440 and defines a catching recess 440b.

Figure 46:
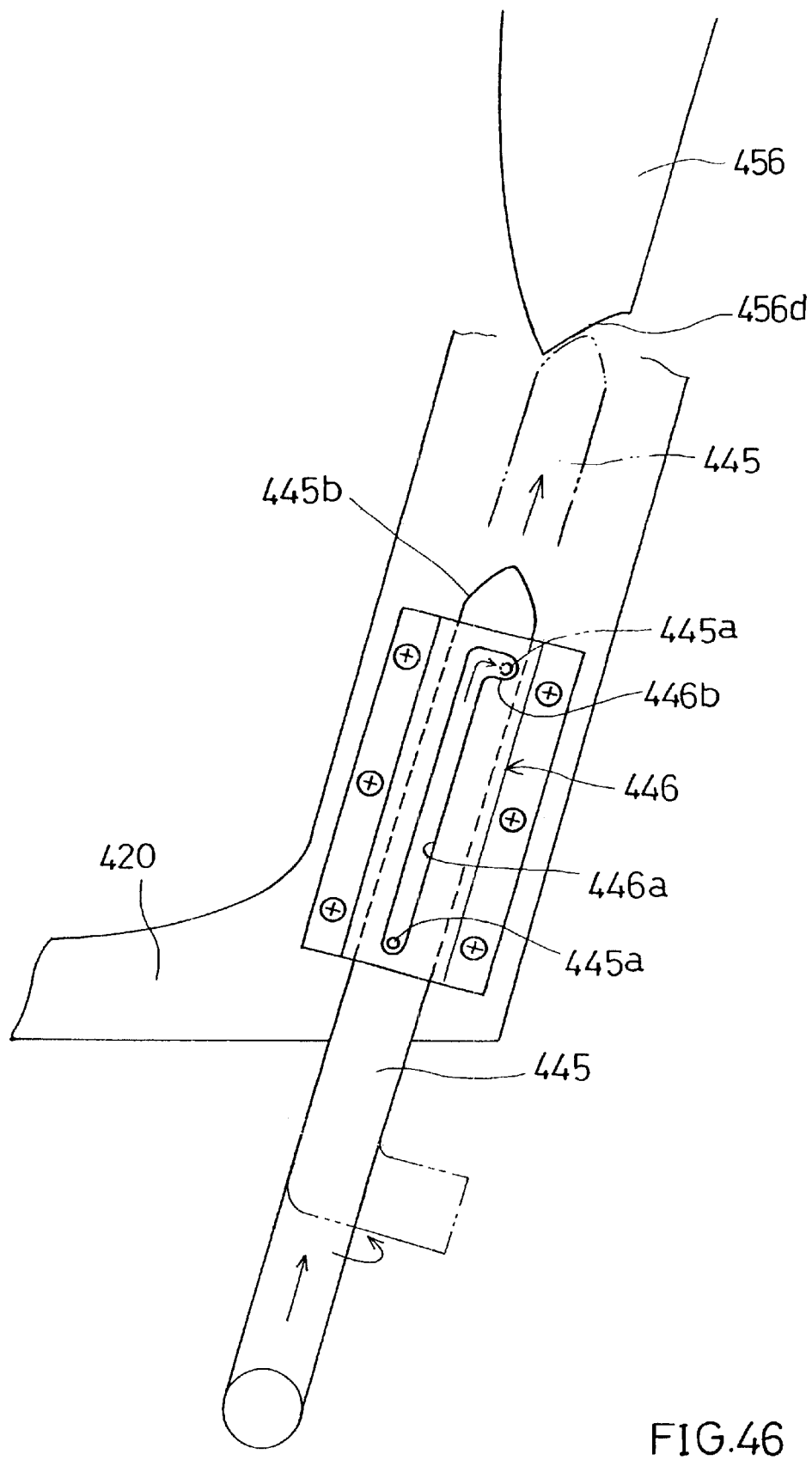
FIG. 46 is a side view showing the supporting state of a lock lever 25.

A lock bar 445 is provided in the lower portion of each connecting recess 440 on the each side of the seat frame 420 and can lock the connection between the wheelchair 410 and the lift-up mechanism 450. As shown in FIG. 46, a retaining bracket 446 supports each of the lock bars 445 and permits vertical movement. A vertically extending guide slot 446a is formed in the retaining bracket 446 and receives a guide pin 445a mounted on the lock bar 445. Thus, the lock bar 445 is permitted to move vertically within the range in which the guide pin 446a can move in the guide slot 446a.

A lock retaining portion 446b is formed by making a cut in the upper end of the guide slot 446a of the retaining bracket 446 in a direction generally perpendicular to the slot 446a. When the lock bar 445 is moved upward to the upper end and then rotated around its axis by about 90°, the guide pin 445a enters the lock retaining portion 446b through the guide slot 446a, thereby holding the lock bar 445 in the upper end locking position. When the lock bar 445 is held in the upper end locking position, as will be described below, a lower end portion 456d of the connecting plate 456 of the lift-up mechanism 450 is locked to prevent movement, and thus the connection of the lift-up mechanism 450 is locked. In order to release this locked state, the lock bar 445 is rotated in the reverse direction to move the guide pin 445a from inside the lock retaining portion 446b into the guide slot 446a, and then, the lock bar 445 is allowed to move downwardly under its own weight.

As shown in FIGS. 43 and 46, an upper end portion 445b of the lock bar 445 has a conical shape so as to fit with the lower end portion 456d of the connecting plate 456. Further, a lower end portion of the lock bar 445 is bent into an L-shape, and may be conveniently used to rotate the lock bar 445 by about 90° as described above. Connecting and disconnecting operations for the lift-up mechanism 450 will be further described below.

Figure 42:
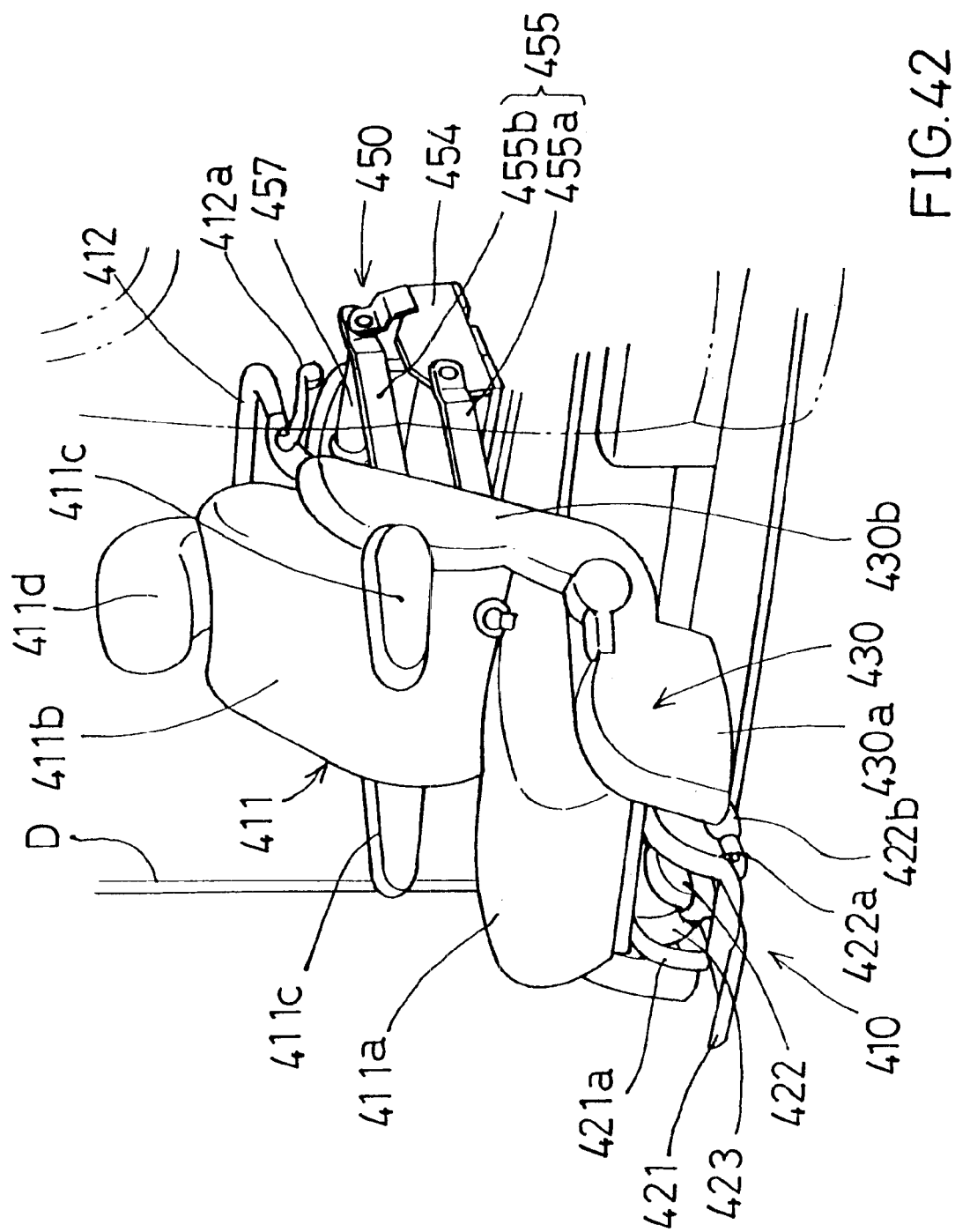
FIG. 42 is also a perspective view showing the embodiment of the invention, in which the wheelchair is shown connected to the lift-up mechanism and lifted up above the ground.

A pair of arm rests 411c are provided on both sides of the seat back 411b in a manner that permits vertical pivotal movement so as to store and extend the arm rests 411c. Further, a head rest 411d is provided on the top of the seat back 411b. Further, as shown in FIGS. 41 and 42, a handle 412 is mounted on the back of the seat frame 420 to be operated by the passengers' helper. The handle 412 is formed by bending a pipe into a U-shape, and is connected to extend across both sides of the seat back 411. A brake lever 412a for operating a brake for the rear wheels is mounted on the side of the handle 412. In FIG. 43, the handle 412 is not shown.

The lift-up mechanism 450 installed inside the vehicle will now be explained in further detail. The lift-up mechanism 450 includes a main base 452, a rotary disc 453, a swing base 454, and a pair of quadric link mechanisms 455. A pair of slide rails 451 are installed on the vehicle compartment floor F and longitudinally movably support the main base 452. The rotary disc 453 is mounted on the main base 452 and the swing base 454 is mounted on the rotary disc 453. The link mechanisms 455 are provided on both sides of the swing base 454.

In this embodiment, a drive mechanism for moving the main base 452 longitudinally with respect to the vehicle is not provided. Therefore, the main base 452 is manually moved longitudinally with respect to the vehicle. The main base 452 can be locked at a desired position in the longitudinal direction of the vehicle by a slide lock mechanism (not shown). An electrically powered drive mechanism, such as the combination of a motor and a rack and pinion device, may be used to move the main base 452 longitudinally with respect to the vehicle.

An inner ring 453a and an outer ring 453b are assembled together to form the rotary disc 453 and to permit rotation with respect to each other. The outer ring 453b is fixed on the main base 452 and the inner ring 453a is fixed on the underside of the swing base 454. The swing base 454 is supported by the rotary disc 453 to permit rotation of about 90° between the position facing the front of the vehicle and the position facing the lateral side of the vehicle (facing the door opening D; see FIGS. 41 and 42). The swing base 454 can be locked in the two positions, one facing the front of the vehicle and the other facing the lateral side of the vehicle, by a rotation lock mechanism (not shown).

Figure 49:
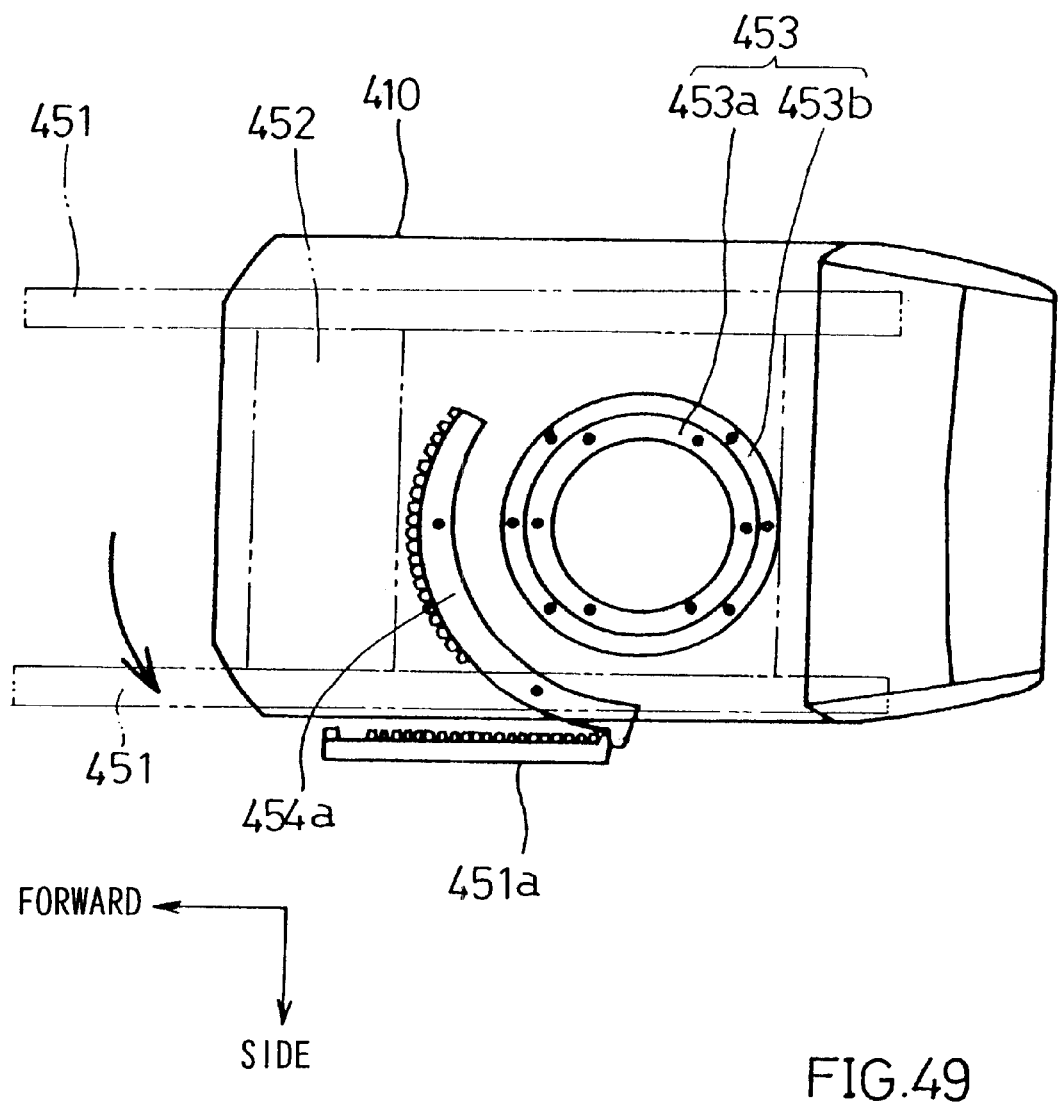
FIG. 49 is a plan view of coupling means for coupling a rotational movement of a swing base and a sliding movement of a main base.

Further, as shown in FIG. 49 (not shown in FIG. 47), an arc-shaped pinion gear 454a is mounted on the underside of the swing base 454, and a rack 451a is disposed on the vehicle interior floor F along the slide rail 451 on the door opening side (the lower one in FIG. 49) and engages the pinion gear 454a. With this arrangement, the rotational movement of the swing base 454 is coupled to the sliding movement of the main base 452. Specifically, when the wheelchair 410 inside the vehicle is rotated from the position facing the front of the vehicle toward the door opening D, because the pinion gear 454a does not have any engagement teeth on the initial engagement side as shown in FIG. 49, only the swing base 454 rotates at the beginning of rotation. After the wheelchair 410 has been rotated by a predetermined angle, the pinion gear 454a starts to engage the rack 451a. Thus, the rotational movement of the swing base 454 is thereafter coupled to the forward sliding movement of the main base 452. As a result, the wheelchair 410 moves forward with respect to the vehicle while rotating to the door opening D. With such a coupling mechanism, by a simple rotational operation without the need for a forward sliding operation, the wheelchair 410 can be moved to a proper position to be extended to the exterior side, thereby making the wheelchair more convenient to use. Similarly, when the wheelchair 410 is rotated from outside to inside the vehicle by a simple rotational operation toward the front of the vehicle, the wheelchair 410 can be moved rearward with respect to the vehicle. By such a rearward sliding movement of the wheelchair 410, a wider space can be provided close to the occupant's feet.

Each of the quadric link mechanisms 455 has two link arms 455a and 455b. The lower ends of the front link arms 455a are connected by pivots 455c to both side portions of the swing base 454 to permit vertical rotation. The lower ends of the rear link arms 455b are connected by a connecting rod 457. Thus, the link arms 455b rotate vertically with respect to the swing base 454 via the connecting rod 457.

An electric cylinder 490 is connected to the connecting rod 457 and serves as a drive source for driving the link mechanisms 455. The electric cylinder 490 will be described below in detail.

The connecting plate 456 is connected to the distal end of each link mechanism 455. The link arms 455a and 455b are pivotally connected to the connecting plate 456 via pivots 456a and 456b.

As shown in FIGS. 43 and 44, the connecting plate 456 has a generally flat plate-like shape and can be inserted into the connecting recess 440 of the wheelchair 410 without providing substantially any clearance. Further, as shown in FIG. 45, the upper portion 456c of the connecting plate 456 is shaped so as to permit insertion into the catching recess 440b of the connecting recess 440 without providing any clearance. When the upper portion 456c of the connecting plate 456 is inserted into the catching recess 440b, a bent portion 440a prevents the upper portion 456c from displacing in a disengaging direction (in a rightward direction as viewed in FIG. 43).

Further, the upper end 445b of the lock bar 445 is pressed against the lower end portion 456d of the connecting plate 456, thereby preventing the lower end portion 456d from displacing in a disengaging direction (in a rightward direction in FIG. 43). Thus, the connecting plate 456 is prevented from being removed from the connecting recess 440, and the wheelchair 410 is connected to the lift-up mechanism 450.

Figure 48:
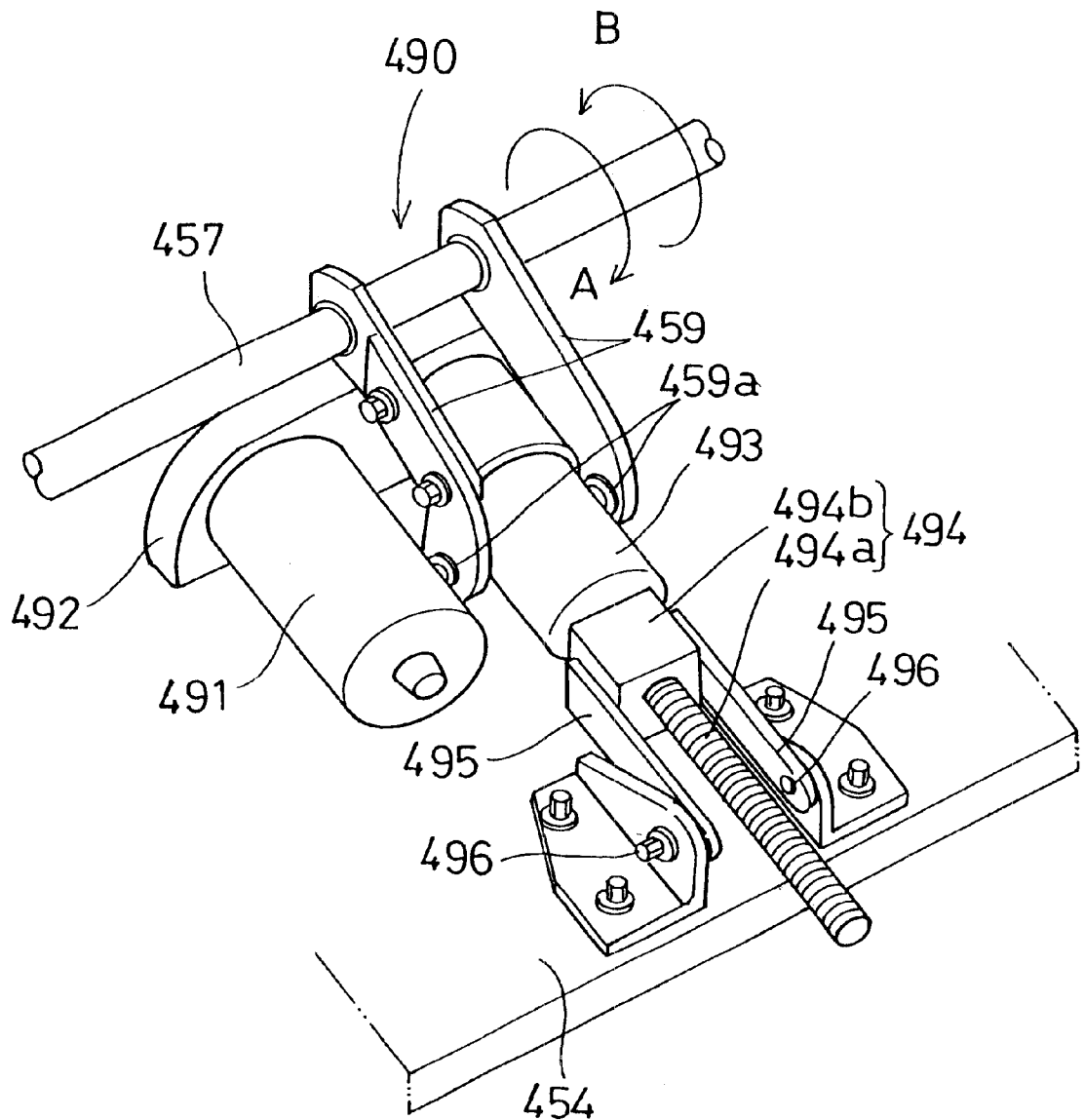
FIG. 48 is a perspective view of an entire electric cylinder.

The electric cylinder 490 is shown in detail in FIG. 48. Two L-shaped support arms 459 are fixed in a generally medial portion of the connecting rod 457, and the electric cylinder 490 is mounted to the connecting rod 457 via the support arms 459. The electric cylinder 490 essentially consists of an electric motor 491, a gear box 492 and a ball screw 494. The ball screw 494 includes a threaded shaft 494a and a block-shaped nut 494b threadably engaged with the threaded shaft 494a. When the motor 491 is started, the threaded shaft 494a rotates by torque amplified by means of the gear box 492 and thus the nut 494b moves axially with respect to the threaded shaft 494a.

The threaded shaft 494a is rotatably supported by a cylindrical threaded shaft case 493 mounted on the gear box 492. The threaded shaft case 493 is supported between the ends of the support arms 459 via the shafts 459a for vertical pivotal movement. Further, two plate-like brackets 495 are mounted on both side surfaces of the nut 494b. A front end of each of the brackets 495 is connected by a shaft 496 to the bottom of the swing base 454 near a front end thereof for vertical pivotal movement.

With the electric cylinder 490 thus assembled, when the motor 491 is rotated in a forward direction with the wheelchair 410 being held facing the door opening D, the threaded shaft 494a rotates and thus the nut 494b moves relative to the threaded shaft 494a toward the front end of the threaded shaft 494a. However, because the nut 494b is fixed by the pivots 496 between the support arms 495 that can pivot vertically, the threaded shaft 494a eventually moves rearward in the axial direction (upward as viewed in FIG. 48) while rotating. The threaded shaft case 493 also moves rearward together with the threaded shaft 494a. Thus, the support arms 459 and the connecting rod 457 rotate in the direction shown by arrow A in FIG. 48. As a result, the rear link arms 455b and thus the quadric link mechanisms 455 pivot in the direction shown by arrow C in FIG. 47 (toward the outside of the vehicle), which movement is an extending movement of the link mechanisms 455 toward the outside of the vehicle. By this extending movement, the connecting plates 456 are moved to the outside of the vehicle through the door opening D.

When the motor 491 is then rotated in a reverse direction, the threaded shaft 494a moves forward in the axial direction (downward as viewed in FIG. 48) and the connecting rod 457 rotates in the direction shown by arrow B in FIG. 48. As a result, the quadric link mechanisms 455 pivot in the direction shown by arrow D in FIG. 47 (toward the inside of the vehicle), and thus the connecting plates 456 are moved back to the inside of the vehicle.

Representative operations for connecting and detaching the wheelchair 410 using the lift-up mechanism 450 will now be described in further detail. The following operations can be performed with the wheelchair user sitting in the seat body 411, and the wheelchair user can be moved to a specified position in the vehicle compartment while sitting in the seat body 411.

In FIG. 41, the wheelchair 410 is shown as being detached from the lift-up mechanism 450. In the lift-up mechanism 450, the main base 452 is shown moved to the front end of the slide rails 451 and the swing base 454 is directed to the exterior side. The quadric link mechanisms 455 are shown rotated to the extended position. In the wheelchair 410, on the other hand, the front and rear wheels 422 and 423 are shown extended from the wheel storage section 430a in a state in which the wheelchair 410 can be used separately, that is, the wheelchair 410 is ready for use as a normal wheelchair on the roads. As mentioned above, the wheelchair user remains sitting in the seat body 411.

The wheelchair 410 can be connected to the lift-up mechanism 450 and moved inside the vehicle by the following representative procedure. First, the wheelchair 410 is placed sufficiently close to the lift-up mechanism 450 with its back toward the lift-up mechanism 450. The connecting plates 456 of the lift-up mechanism 450 are then inserted into the connecting recesses 440 of the wheelchair 410. Thereafter, the electric motor 491 of the electric cylinder 490 is rotated in a reverse direction, so that the link mechanisms 455 slightly pivot toward the raised position. The upper portions 456c of the connecting plates 456 are then inserted into the catching recesses 440b of the connecting recesses 440.

Subsequently, the lock bars 445 are moved upward such that the upper end portion 445b abuts against the lower end portion 456d of the connecting plate 456. Thereafter, the lock bar 445 is rotated around its axis by about 90° so as to allow the guide pin 445a to enter the lock retaining portion 446b. Thus, the lock bar 445 is held in the upper end locking position. By the above-described operation of the lock bar 445, the upper end portion 445b and the lower end portion 456d of the connecting plate 456 are locked to prevent movement by the catching recess 440b and the lock bar 445, respectively. Thus, the connecting plate 456 is fixedly connected to the back of the wheelchair 410.

After the lift-up mechanism 450 has been thus connected to the wheelchair 410, the electric cylinder 490 of the lift-up mechanism 450 is actuated to move the link mechanisms 455 toward the raised position (toward the interior side). As a result, the wheelchair 410 is lifted up above the ground. At this stage, the lift-up mechanism 450 is stopped and the front and rear wheels 422, 423 are stored in the wheel storage section 430a. This state is shown in FIG. 42.

Figure 47:
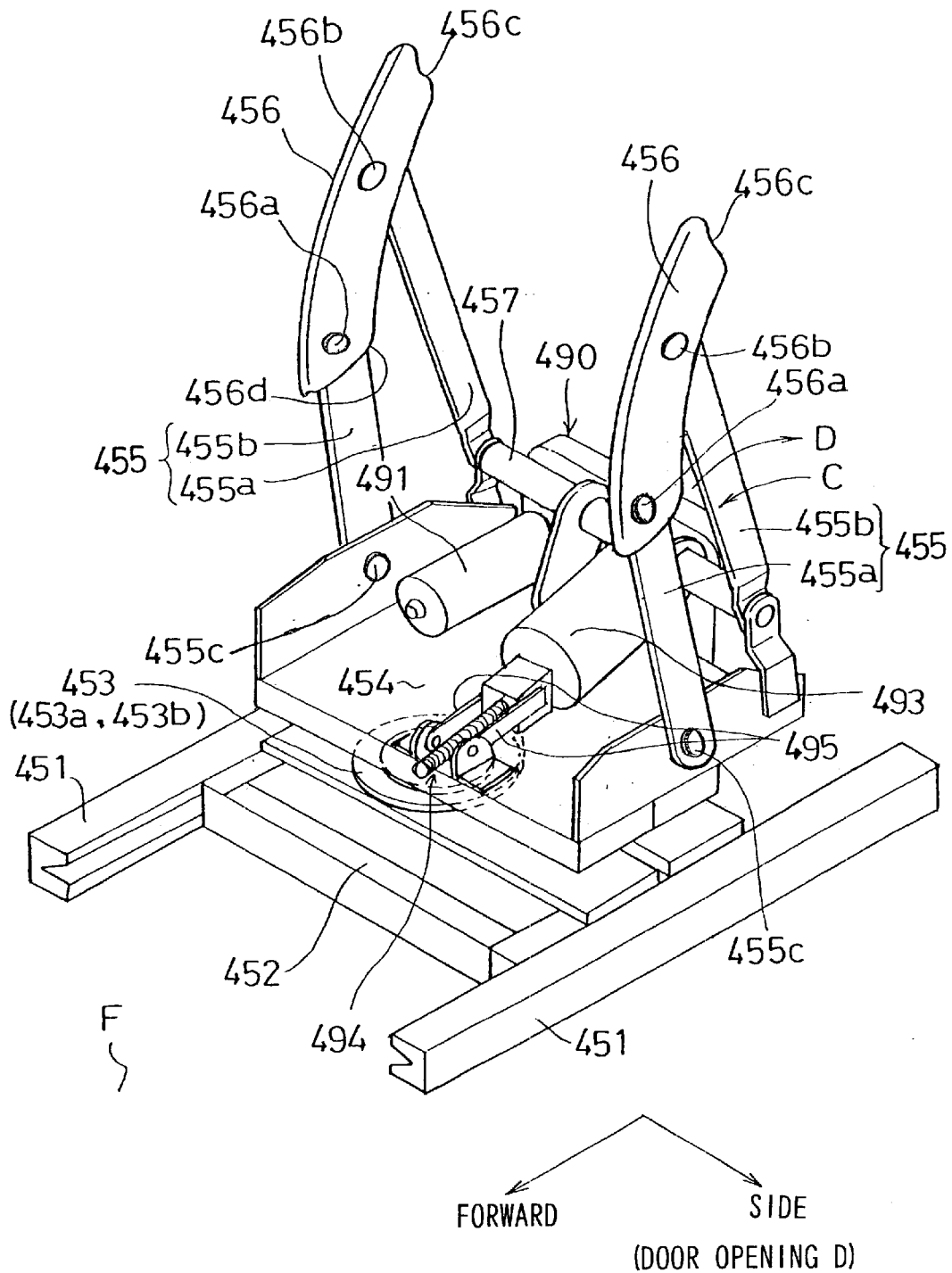
FIG. 47 is a perspective view of the entire lift-up mechanism.

After the front and rear wheels 422, 423 have been stored, the lift-up mechanism 450 is again moved toward the interior side to move the connected wheelchair 410 into the inside of the vehicle. As shown in FIG. 47, when the quadric link mechanisms 455 are moved to the raised position and the wheelchair 410 is moved substantially above the swing base 454, the electric cylinder 490 is stopped to stop the lift-up mechanism 450. At this stage, the quadric link mechanisms 455 are locked in the raised position by a swing lock mechanism (not shown), and thus the wheelchair 410 is held above the swing base 454.

After the wheelchair 410 has thus been moved into the vehicle compartment, the wheelchair 410 and the swing base 454 are manually rotated together by about 90° so as to face the front of the vehicle. At this time, as described above, by engaging the pinion gear 454a with the rack 451a, the wheelchair 410 slides rearward with respect to the vehicle while rotating to the position facing the front of the vehicle. Also in this stage, the wheelchair user remains sitting in the seat body 411. Therefore, by the above-described operations, the wheelchair user is brought into the seated position facing the front of the vehicle in a specified position within the vehicle.

On the other hand, by reversing the above-described procedure, the wheelchair 410 can be moved from the specified position within the vehicle to the outside of the vehicle. Also in this procedure, the wheelchair user may remain sitting in the seat body 411, and need not move from a vehicle seat to a wheelchair. With the wheelchair user sitting in the seat body 411, the wheelchair 410 is moved forward with respect to the vehicle while being rotated to the door opening side. Thereafter, the lift-up mechanism 450 is moved to the extended position to move the wheelchair 410 to the outside. When the wheelchair 410 has been moved all the way to the outside, the lift-up mechanism 450 is stopped and the front and rear wheels 422,423 are extended. Thereafter, the lift-up mechanism 450 is again moved to the extended position to place the wheelchair 410 on the ground.

After the wheelchair 410 has been placed on the ground, the lift-up mechanism 450 is again stopped and the lock bar 445 is moved downward to release the lock of the connecting plate 456. In this unlocked state, when the lift-up mechanism 450 is again extended, the connecting plate 456 moves downward. Thus, the lower end portion 456c is disengaged from the catching recess 440b. At this stage, the wheelchair 410 is moved forward so that the wheelchair 410 is detached from the lift-up mechanism 450.

The wheelchair 410 thus detached from the lift-up mechanism 450 can be moved separately and used just like a normal wheelchair.

As described above, with the rotating vehicle seat 401 according to this embodiment, the wheelchair 410 that can be used as a normal wheelchair, can be moved as a whole (retaining the seat frame 420, the front and rear wheels 422,423, etc.) into the vehicle and can be used as a passenger seat in the vehicle. Without switching from a vehicle seat to a wheelchair or vice versa, the wheelchair user can be seated in a specified position in the vehicle compartment and can also move from the seated position in the vehicle to the outside. Thus, the wheelchair user can remain sitting in the seat body 411 of the wheelchair 410, thereby making it easier for such a passenger to enter and exit a vehicle and making such a wheelchair more convenient to use.

Further, with the construction in which the entire wheelchair 410 is moved by the lift-up mechanism 450, separation and reassembly of the seat body are not required, although such operations were required in a known construction in which the wheelchair must be separated into the seat body and the wheel side section and only the seat body moves into the vehicle. Also in this respect, such a wheelchair is more convenient to use. Moreover, the labor of separately loading the separated wheel side section into the vehicle is not necessary.

Further, with the construction in which the connecting recesses 440 are provided on both sides of the seat back to engage the connecting plates 456, the seat back can recline.

Figure 50:
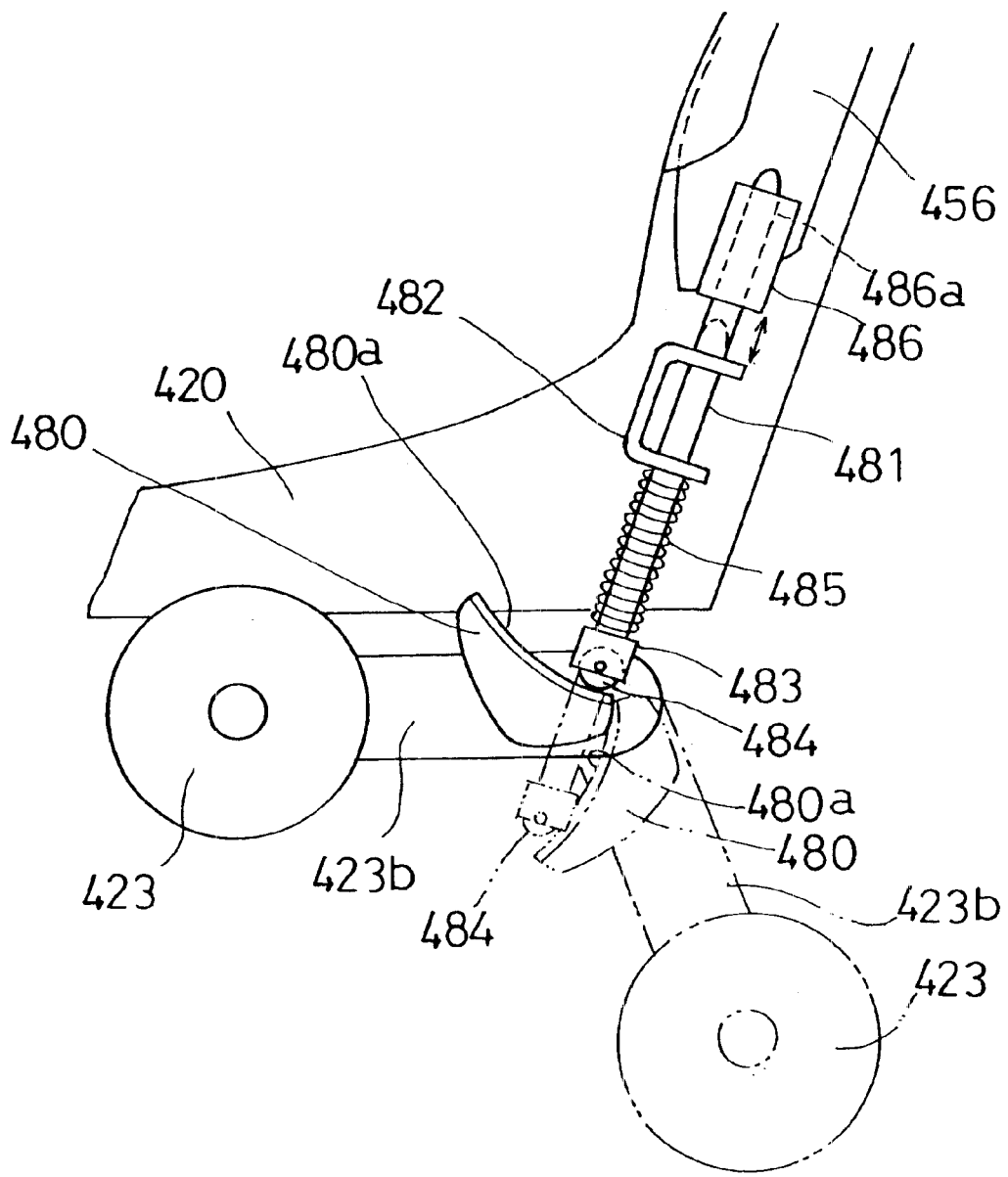
FIG. 50 is a side view of a lock bar of a coupled locking type and components therearound.

Another example of the lock bar 445 will now be explained. Although the above-described lock bar 445 is constructed to be moved vertically by manual operation so as to lock and unlock the connecting plates 456, the lock bar may be constructed such that the locking and unlocking operations are coupled to the retracting and extending operations of the rear wheels 423. This example is shown in FIG. 50. Components having the same construction as in the above-described example will not be described and are identified by the same numerals.

A cam plate 480 is mounted on the side of each of the rear wheel stays 423b that can be vertically rotated by the shaft 423a. A circular-arc cam surface 480a is formed on the upper surface of the cam plate 480. The cam surface 480a extends away from the center of rotation of the rear wheel stay 423b (the shaft 423a) and is displaced downward as the rear wheel stay 423b is rotated downward. A lock bar 481 is mounted above the cam surface 480a.

The lock bar 481 is supported on the each side of the seat frame 420 by a bracket 482 to permit vertical movement. A guide roller 484 is rotatably mounted on the lower end of each lock bar 481 via a retaining block 483. A compression spring 485 is disposed between the retaining block 483 and the bracket 482 and urges the lock bar 481 downward. The guide roller 484 is pressed against the cam surface 480a of the cam plate 480 by the biasing force of the compression spring 485.

A lock block 486 is mounted on a lower portion of each of the connecting plates 456 and has a lock hole 486a for receiving the lock bar 481.

As shown in FIG. 50 by a broken line, when the rear wheels 423 are extended by rotating the rear wheel stays 423b downward, the cam surface 480a is positioned in the lowermost position. Thus, the guide roller 484 pressed against the cam surface 480a, and thus the lock bar 45 are held in the lowermost position (unlocked position). Therefore, the upper end of the lock bar 481 is away from the lock hole 486a of the lock block 486.

In this state, the connecting plates 456 are inserted in the connecting recesses 440 by moving the wheelchair 410 backward, and thereafter, the lift-up mechanism 450 is actuated to move the connecting plates 456 upward. Thus, the upper portions 456c of the connecting plates 456 are inserted into the catching recesses 440b, thereby preventing the rearward displacement of the connecting plates 456. This point is the same as the above-described first example of this embodiment.

After the upper portions 456c of the connecting plates 456 are inserted into the catching recesses 440b, the lift-up mechanism 450 is further moved to the inside of the vehicle, so that the front and rear wheels 422,423 of the wheelchair 410 are raised. In this state, the front and rear wheels 422,423 are stored in the wheel storage section 430a of the covering 430. At this time, when the rear wheel stays 423b are rotated upward, each of the cam surfaces 480a is relatively displaced upwardly, thereby moving the lock bar 45 upward against the biasing force of the compression spring 485. As shown in FIG. 50 by a solid line, when the rear wheel stays 423b are rotated to bring the rear wheels 423 completely into the stored state, each cam surface 480a is relatively displaced to the uppermost position. Thus, the lock bar 481 is moved to the upper moving end and the upper end of the lock bar 481 is inserted into the lock hole 486a of the lock block 486.

When the upper end of the lock bar 481 is inserted into the lock hole 486a of the lock block 486, the lower end of the connecting plate 456 is prevented from displacing rearward (to the right as viewed in FIG. 50). Consequently, the connecting plates 456 are securely held within the connecting recesses 440. Thereafter, by operating the lift-up mechanism 450 as described above, the wheelchair 410 can be moved from the outside to a specified position inside the vehicle.

On the other hand, when the wheelchair 410 is moved from the inside to the outside of the vehicle and then the rear wheels 423 are extended, the cam surface 480a is relatively displaced downward. Thus, the lock bar 481 is moved downward by the biasing force of the compression spring 485. As a result, the upper end of the lock bar 481 is removed from the lock hole 486a of the lock block 486, thereby releasing the lock of the lower end of the connecting plate 456.

Thus, each lock bar 481 is moved upward or downward in synchronization with retracting or extending operation of the rear wheels 423. As a result, the lower end of the connecting plate 456 is locked or unlocked. Therefore, unlike the lock bar 445, the lock bar 481 does not require direct operation by the user. In this respect, usability of the rotating vehicle seat 401 can be further improved. With respect to the locking and unlocking operations, it may be constructed such that only the locking operation is coupled to the retracting operation of the wheels (the rear wheels 423) and the unlocking operation is manually performed separately.

Further, although in the above embodiment, the connecting recesses 440 are provided on both sides of the seat body 411, they may be provided at other location such as on the back of the seat back. Or, the connecting recess may be provided at one location on the center of the back of the seat back, instead of being providing at two locations. In this case, it can be constructed such that the ends of the link mechanisms 455 of the lift-up mechanism are connected to each other and one connecting plate is provided on the middle of this connecting portion. The one connecting plate is adapted to be inserted into the connecting recess that is provided at one location on the center of the back of the seat back. Further, the number of quadric link mechanisms of the lift-up mechanism may be one, instead of two.

An embodiment of the invention as defined in claim 7 (a sixth embodiment) will now be explained with reference to FIGS. 51 to 54. A rotating vehicle seat 501 according to the sixth embodiment includes a seat body 502, a lift-up mechanism 550 for moving the seat body 502 from the vehicle compartment floor to the outside of the vehicle and vice versa, a rotating support base for rotatably supporting the seat body 502 and the lift-up mechanism 550, and a longitudinal support base for moving the seat body 502, the lift-up mechanism 550 and the rotating support base longitudinally with respect to the vehicle. The lift-up mechanism 550 is shown in detail in FIG. 51.

With respect to the lift-up mechanism 550, description concerning the same aspects as the first embodiment will be omitted. The rotating support base and the longitudinal support base are identical to those of the first embodiment and thus, such description will be omitted.

In the sixth embodiment, the seat body 502 is mounted on a base 553 of the lift-up mechanism 550 via the quadric link mechanism. The seat body 502 has a seat cushion 502a and a seat back 502b, and the seat body 502 is mounted on a seat holder 521.

Figure 51:
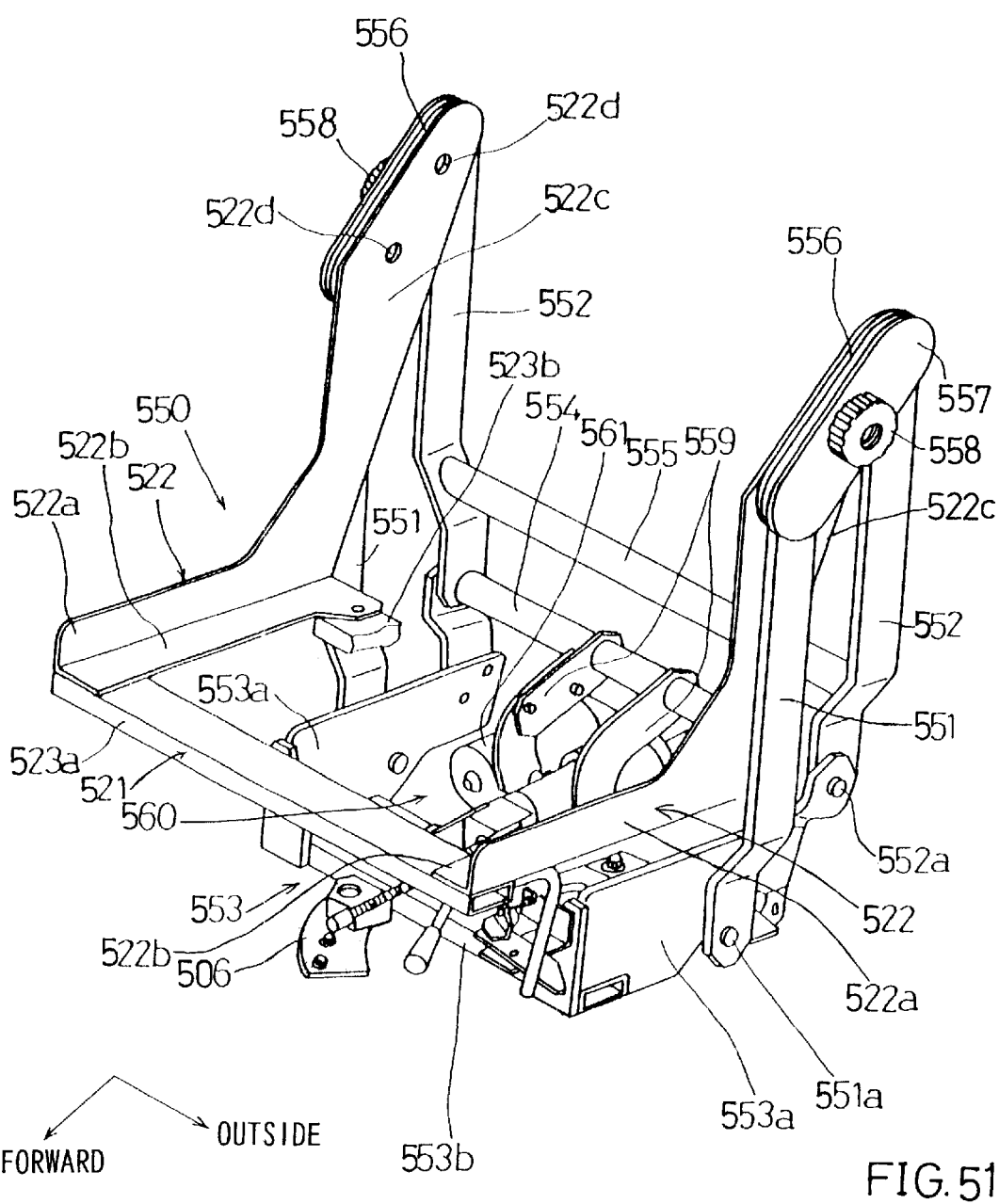
FIG. 51 is a perspective view of a lift-up mechanism according to a sixth embodiment of the invention.

As shown in FIG. 51, the seat holder 521 has a generally frame-like configuration that comprises a pair of generally L-shaped side plates 522, a flange portion 522b extending inwardly along the lower edge of a horizontal portion 522a of each of the side plates 522, and front and rear horizontal frames 523a,523b connecting the front and rear ends of the underside of the flange portions 522b, respectively. Each of the side plates 522 has an inclined portion 522c integrally formed on the proximal end of the horizontal portion 522a of the side plate 522 and is configured to extend along the side surface of the seat back 502b of the seat body 502. Two pin holes 522d are formed in the upper portion of each of the inclined portions 522c at a predetermined spacing therebetween. The pin holes 522d are used to connect the seat holder 521 to the quadric link mechanism of the lift-up mechanism 550. A lock bolt 524 having a predetermined length extends outwardly from a medial portion between the pin holes 522d. Hooks 525 are mounted on the front and rear horizontal frames 523a, 523b with a predetermined spacing and serve to detachably connect the seat holder 521 to a wheelchair 590 which will be described below. Further, a footrest 526 for resting the occupant's feet thereon is retractably mounted to a generally medial portion of the front horizontal frame 523a (see FIG. 54).

The seat body 502 thus connected to the seat holder 521 is detachably connected to the lift-up mechanism 550. As shown in FIG. 51, the lift-up mechanism 550 essentially consists of a pair of right and left quadric link mechanisms. The lift-up mechanisms 550 serve to move the seat body 502 together with the seat holder 521 from the inside to the outside of the vehicle and vice versa by extending and retracting the pair of quadric link mechanisms. Each of the quadric link mechanisms has a first link arm 551 and a second link arm 552. The link arms 551 and 552 are connected to side walls 553a of the base 553 of the lift-up mechanism 550 through pivots 551a and 552a, respectively, for pivotal movement in the longitudinal direction of the vehicle. The rear second link arms 552 are connected by connecting rods 554,555 and pivot together. The ends of the lower connecting rods 554 are pivotally supported with respect to the side walls 553a of the base 553 and thus the axis of the connecting rod 554 forms the pivotal fulcrum or pivot 552a of the second link arm 552.

Figure 52:
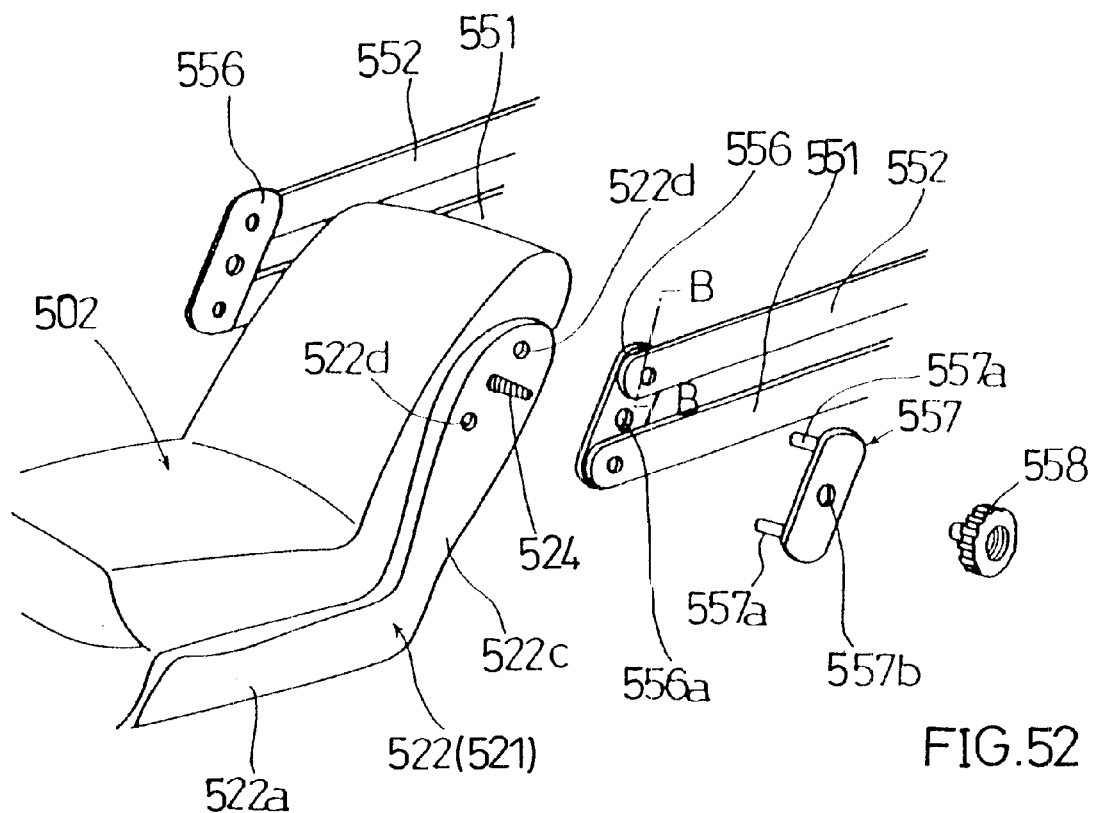
FIG. 52 is a perspective view of a seat holder with a seat body mounted thereon, which is shown separated from the distal ends of the quadric link mechanisms.
Figure 53:
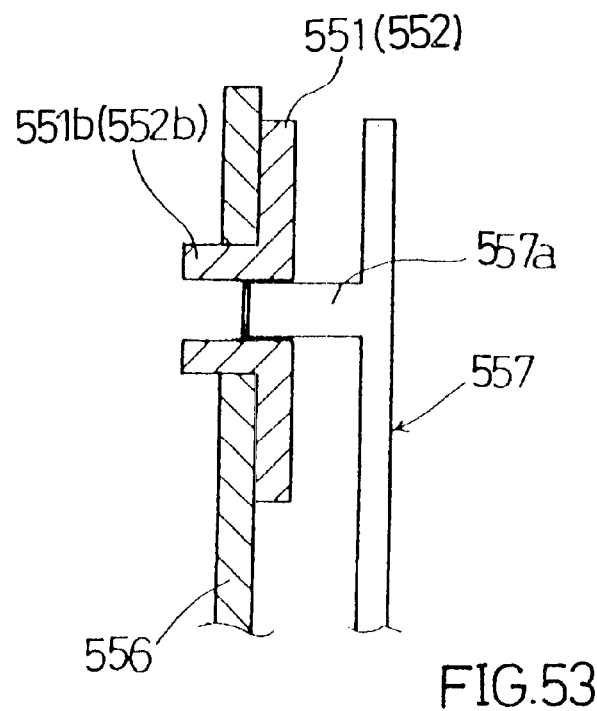
FIG. 53 is sectional view taken along line B—B in FIG. 52.

As shown in FIGS. 52 and 53, the distal ends of the first and second link arms 551 and 552 are removably connected to the seat holder 521. In order to provide such connection, insertion sleeves 551b,552b are integrally formed with the first and second link arms 551 and 552 and extend inwardly from a predetermined position on the distal ends of the link arms 551, 552. The insertion sleeves 551b,552b are adapted to rotatably fit into the pin holes 522d of the side plates 522 of the seat holder 521. Further, a generally rectangular connecting arm 556 having insertion holes connects the insertion sleeves 551b and 552b, so that the insertion sleeves 551b,552b can be fitted into the pin holes 552d of the seat holder 521. Further, an insertion hole 556a is formed on a generally medial portion of the connecting arm 556 such that the lock bolt 524 extending from the side plate 522 extends through the insertion hole 556a. On the other side of the link arms 551,552 opposite from the side having the connecting arm 556, an anchor plate 557 is provided to connect and disconnect the four-join link mechanism to and from the seat holder 521.

As shown in FIG. 52, the anchor plate 557 has a generally rectangular shape substantially corresponding to the connecting arm 556. Two anchor pins 557a having a predetermined length extend from one side of the anchor plate 557 with a predetermined spacing therebetween and are inserted into the insertion sleeves 551b,552b of the link arms 551, 552. An insertion hole 557b is formed between the anchor pins 557a through the anchor plate 557, through which hole 557b the lock bolt 524 extending from the side plate 522 extends. On the side of the distal ends of the link arms 551, 552 having the above-described arrangement, the lock bolt 524 of each of the side plates 522 of the seat holder 521 is inserted through the insertion hole 556a of the connecting arm 556, with the seat body 502 mounted on the seat holder 521. And, the insertion sleeves 551b,552b are fitted into the pin holes 522d. In this state, the anchor pins 557a of the anchor plate 557 are inserted into the insertion sleeves 551b,552b from the outside. At this time, the lock bolt 524 is inserted through the insertion hole 557b. Then, a lock knob 558 is threadably engaged on the lock bolt 524 protruding from the insertion hole 557b. Thus, the seat holder 521, with the seat body 502 mounted thereon, is connected to the distal ends of the right and left quadric link mechanisms.

Two L-shaped support arms 559 are fixed in a generally medial portion of the lower connecting rod 554. An actuator 560 is mounted between the quadric link mechanisms and the vehicle floor by the support arms 559 and serves as a driving source for the lift-up mechanism 550. The drive system of the lift-up mechanism 550, including the actuator 560, is identical to that of the first embodiment and the description will be omitted.

With the drive system including the actuator 560, when an electric motor 561 is rotated in a forward direction with the seat body 502 being held facing the door opening side, the second link arms 552 pivots about the pivots 552a toward the outside of the vehicle (to the left as viewed in FIG. 51).

When the second link arms 552 pivot toward the outside of the vehicle and thus the first link arms 551 pivot likewise via the connecting arms 556 and the anchor plate 557, the seat holder 521 (the side plate 522) is extended toward the outside of the vehicle along a specified path. When the seat holder 521 is thus extended, the seat body 502 moves from the seated position inside the vehicle to a lower outside position. When the motor 561 is then rotated in a reverse direction, the seat holder 521 moves backward along the above-mentioned specified path, so that the seat body 502 is moved from the lower outside position back to the seated position inside the vehicle.

Figure 54:
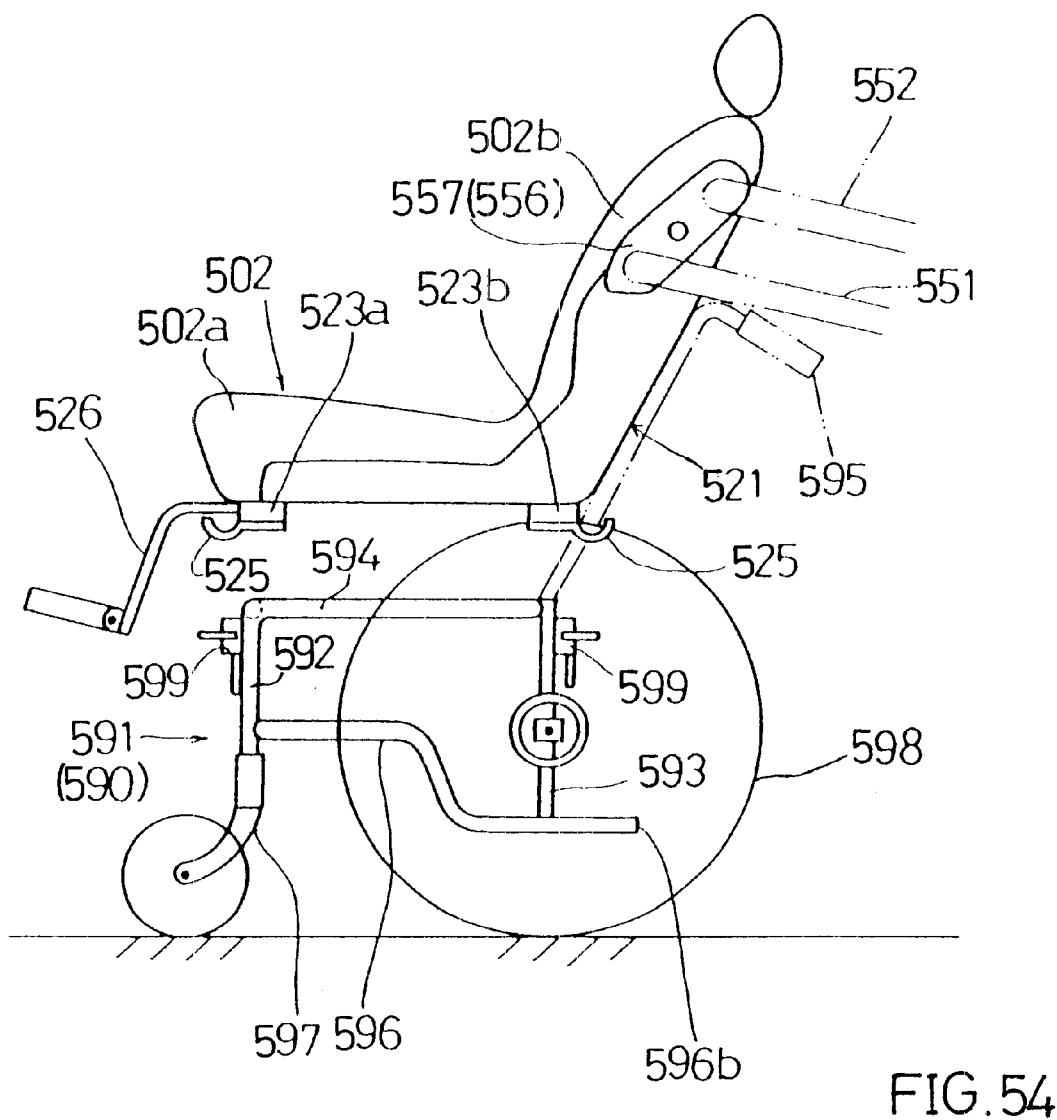
FIG. 54 is a side view illustrating a relation between the wheelchair and the seat holder with the seat body mounted thereon.

A wheelchair 590 will now be described. The wheelchair 590 is designed for the seat body 502 that is removably connected to the lift-up mechanism 550 via the seat holder 521. The wheelchair 590 is of a common type in most points, in which leftright symmetric body frames 591, as shown in FIG. 54, are connected by a cross bar (not shown) and constructed to hold and carry the seat holder 521 with the seat body 520 mounted thereon. The wheelchair 590 folds laterally inwardly.

Each of the body frames 591 includes a front frame 592, a rear frame 593 and a seat frame 594 extending horizontally across the frames 592,593 at a predetermined vertical position. Although it is not shown, an arm frame is provided above the seat frame 594. Further, the rear frame 593 extends upwardly and has a handle portion 595 formed on the upper end. A lower frame 596 is provided below the seat frame 594 and is bent. The front end of the lower frame 596 is connected to a lower portion of the front frame 592. The rear portion of the lower frame 596 is connected to the lower end of the rear frame 593 and further extends rearward by a predetermined length, thus forming an extending portion 596b. A caster 597 is connected to the lower end of the front frame 592 via a bearing, and a large wheel 598 is rotatably connected to the rear frame 593 at a predetermined vertical position.

The right and left body frames 591 thus constructed are connected to each other by the cross bar to permit folding. Lever latches 599 are mounted in a predetermined position on the upper portions of the front frames 592 and the rear frames 593 and engage the hooks 525 on the front and rear frames 523a, 523b of the seat holder 521.

The operation procedures in the inside of the vehicle of rotating and moving the rotating vehicle seat 501 thus constructed are the same as the first embodiment and such description will be omitted.

When the seat body 502 is rotated to the door opening D (counterclockwise to the position shown in FIG. 11(C)), the operator gets the wheelchair 590 ready for use and places the wheelchair 590 by the door opening D near a position to which the seat holder 521 with the seat body 502 mounted thereon will reach down. Thereafter, the electric motor 561 on the lift-up mechanism 550 is rotated in the normal direction to extend the seat holder 521 to the exterior side by means of the quadric link mechanisms so as to move the seat body 502 from the interior side position W0 to the exterior side position W1 (see FIG. 11). In this process, the seat body 502 is lowered down to a specified level while moving to the exterior side position W1. Thus, the front and rear frames 523a, 523b of the seat holder 521 are placed on the right and left seat frames 594 of the wheelchair 590. After the seat body 502 has been lowered down to the specified level outside, the electric motor 561 and thus the lift-up mechanism 550 are stopped.

In this state, the latches 599 mounted on the front frames 592 and the rear frames 593 of the wheelchair 590 are engaged with the hooks 525 on the seat holder 521. Then, the lock knobs 558 on the distal ends of the link arms 551,552 are removed, and the anchor plates 557 are removed. In this state, the wheelchair 590 is moved forward so that the seat holder 502 with the seat body 502 mounted thereon is separated from the distal ends of the quadric link mechanisms. The anchor pins 557a of the removed anchor plates 557 are inserted into the pin holes 522d of the seat holder 521, and the lock knobs 558 are threadably engaged on the lock bolts 524 protruding from the insertion holes 557b. Thus, the anchor plates 557 are fixedly attached on the seat holder 521. Thus, the passenger in the seat body 502 can be moved onto the wheelchair 590 while sitting inside the vehicle, and can use the wheelchair 590 to move around.

In order to move the seat holder 521 together with the seat body 502 in which the passenger is sitting from the wheelchair 590 back to the vehicle, the passenger's helper rotates the quadric link mechanisms of the lift-up mechanism 550 from the door opening D toward the outside of the vehicle, and to a position in which the seat holder 521 was detached. Then, the right and left anchor plates 557 attached on the seat holder 521 of the wheelchair 590 are removed together with the lock knobs 558. The upper portions of the inclined frames 522c of the right and left side plates 522 are then positioned between the connecting arms 556 that are connected between the distal ends of the link arms 551,552. The pin holes 522d are aligned and engaged with the insertion sleeves 551b,552b. Subsequently, the anchor pins 557a of the anchor plates 557 are inserted into the pin holes 522d of the seat holder 521, and the lock knobs 558 are threadably engaged on the lock bolts 524. Thus, the seat holder 521 with the seat body-502 mounted thereon is connected to the distal ends of the quadric link mechanisms. In this state, the latches 599 of the wheelchair 590 are disengaged from the hooks 525 on the seat holder 521.

In order to return the seat body 502, which has thus been moved to the exterior side position W1, to the original seated position, the electric motor 561 is rotated in the reverse direction to move the lift-up mechanism 550 in the backward direction. Thus, the seat body 502 is returned to the interior side position W0 while being moved upward. When the seat body 502 has been returned to the interior side position W0, the electric motor 561 and thus the lift-up mechanism 550 are stopped. Thereafter, the rotation lock mechanism, which is not shown, is released and the seat body 502 is manually rotated to the interior side. Thus, the passenger can leave the wheelchair 590 and get into the vehicle while sitting in the seat body 502 mounted on the seat holder 521.

Thus, the seat holder 521 with the seat body 502 mounted thereon, can be moved by the lift-up mechanism 550 from the vehicle compartment floor to the extended position outside the vehicle and vice versa, and can function as a seat section of the wheelchair 590 when detached from the lift-up mechanism 550. Therefore, the passenger can move together with the seat holder 521 onto the seat frame 594 of the wheelchair 590 which is standing by outside the vehicle, while sitting in the seat body 502. Also, the passenger can move together with the seat holder 521 from the wheelchair 590 into the vehicle while sitting in the seat body 502. As a result, the passenger's helper does not need to help the passenger to transfer from and to the wheelchair, so that the helper's labor can be greatly reduced.

Further, because the seat body 502 forms the seat section of the wheelchair 590 together with the seat holder 521, the ride comfort of the wheelchair 590 can be improved.

Additionally, the connecting and disconnecting structure of the seat holder 521 is very simple in construction, which consists of the seat holder 521, the anchor plates 557, the lock bolts 524 and the lock knobs 558. Therefore, such a structure can be readily applied to existing lift-up mechanisms.

An embodiment of the invention as defined in claim 9 (a seventh embodiment) will now be explained with reference to FIGS. 55 to 61. The seventh embodiment of this invention relates to a vehicle rotating seat in which the seat body can be moved laterally with respect to the vehicle by means of a swing mechanism that essentially consists of a quadric link mechanism, and more particularly, to a swing lock mechanism for locking the swing movement of the seat body in the rotating seat.

A vehicle rotating seat is well known which includes a rotary disc disposed on a vehicle compartment floor, a lateral slide mechanism mounted on the rotary disc, and a swing mechanism that essentially consists of a quadric link mechanism. In the known rotating seat, the seat body is directed to the door opening side by the rotary disc, and in this state, the seat body is moved laterally with respect to the vehicle to the exterior side by means of the lateral slide mechanism, and thereafter, the seat body is moved to the outside of the vehicle through the door opening.

With this known rotating seat, the passenger only has to get in and out of the seat body outside the vehicle, and does not need to move himself or herself to get into or out of the vehicle. Therefore, the passenger can easily get into or out of the vehicle.

In this known rotating seat, however, the seat body is locked to prevent sliding movement only at the rear end in the interior side of the lateral slide mechanism. Therefore, when the seat body slides forward of the vehicle in the position facing the front of the vehicle (in which position the lateral slide mechanism extends longitudinally with respect to the vehicle), the slide lock is released. Consequently, in the known rotating seat, the above-described lateral slide mechanism cannot be utilized as a mechanism for adjusting the position of the seat body in the longitudinal direction of the vehicle.

The invention as described in claim 9 has been made in view of the above problem, and its object is to provide a rotating vehicle seat which includes a swing lock mechanism that can maintain the swing locking state irrespective of the sliding position of the lateral slide mechanism, whereby, in the state in which the seat body is in the position facing the front of the vehicle and the swing locking state is maintained, the lateral slide mechanism can be utilized to adjust the position of the seat body in the longitudinal direction of the vehicle.

Figure 55:
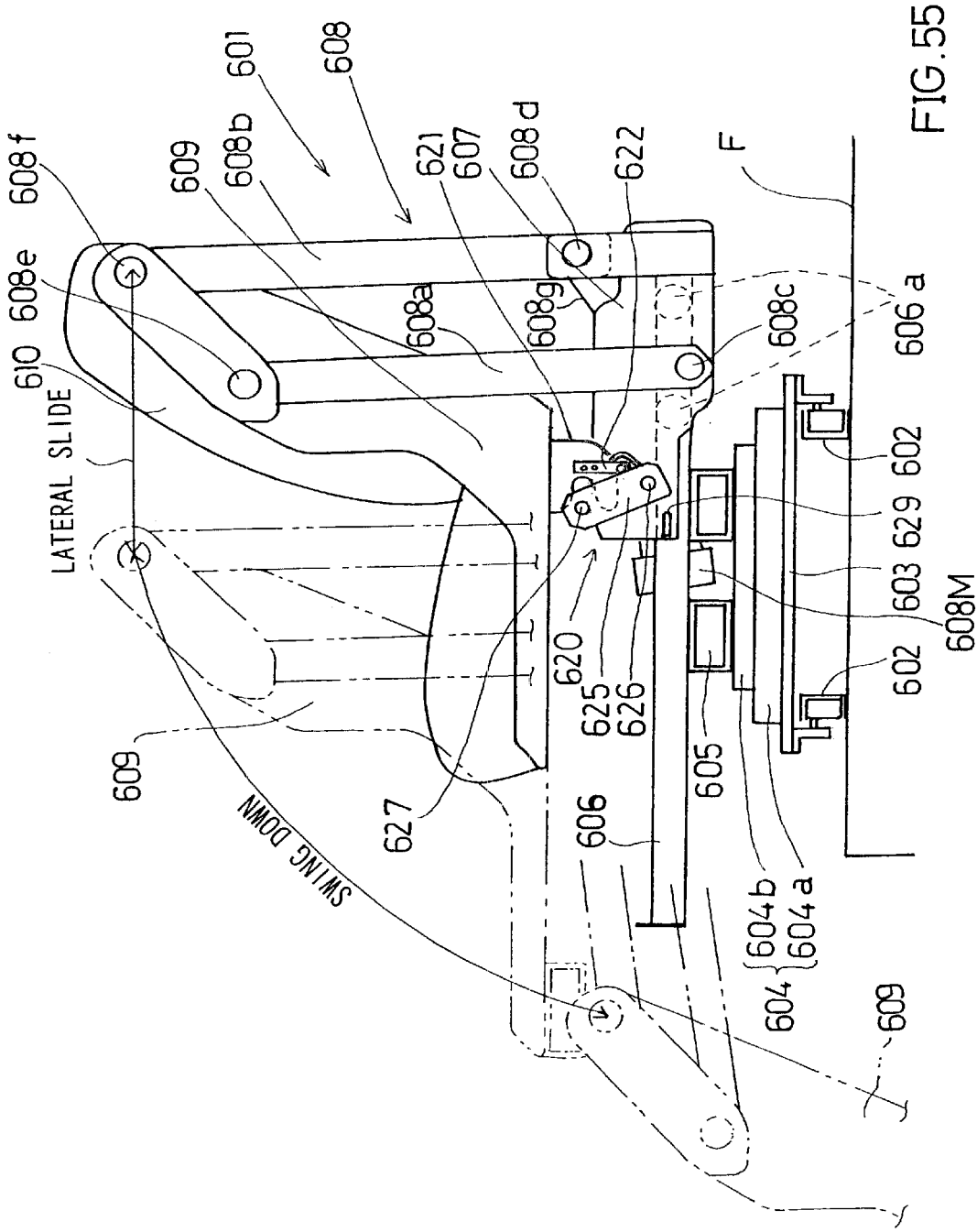
FIG. 55 is a side view of a rotating vehicle seat according to a seventh embodiment of the invention, in which the right-left direction as viewed in the drawing corresponds to the lateral direction with respect to the vehicle.

FIG. 55 schematically shows a structure of a rotating vehicle seat 601 according to the seventh embodiment of the invention. In FIG. 55, the right-left direction as viewed in the drawing corresponds to the lateral direction with respect to the vehicle, and the direction perpendicular to the plane of the drawing corresponds to the longitudinal direction of the vehicle. Accordingly, in FIG. 55, a seat body 601 is shown in the position facing the lateral side of the vehicle or the door opening side.

The basic components of the rotating vehicle seat 601 do not require any particular modifications in this embodiment, but will now be briefly explained. Designated by numeral 602 are a pair of longitudinal slide rails mounted on the vehicle floor F and extending in the longitudinal direction of the vehicle. A main base 603 is mounted on the vehicle floor F via the longitudinal slide rails 602 to permit longitudinal movement. A rotary disc 604 has an outer ring 604a and an inner ring 604b and is mounted on the upper surface of the main base 603. A pair of lateral slide rails 606 are mounted on the upper surface of the inner ring 604b via a sub base 605. A swing base 607 is mounted on the lateral slide rails 606 to permit sliding movement within a limited range via the lateral slide rails 606.

When the seat body 610 is rotated to the door opening side by the rotary disc 604 as shown in FIG. 55, the lateral slide rails 606 are also directed to the door opening side. In this state, the seat body 610 can slide to the exterior side ("lateral slide").

Designated by numeral 606a are guide rollers rotatably mounted in four positions on the front and rear portions of both sides of the swing base 607. When the guide rollers 607 roll within and along the interior of the lateral slide rails 606 having a generally U-shaped cross section, the swing base 607 slides within the limited range.

A seat holder 609 is mounted on the swing base 607 via a pair of right and left quadric link mechanisms 608 (a pair in the direction perpendicular to the plane of the drawing as viewed in FIG. 55). Two link arms 608a,608b of each of the quadric link mechanisms 608 are rotatably connected to the swing base 607 and the seat holder 609 by shaft 608c,608d, 608e,608f. The seat body 610 is mounted on the seat holder 609.

When an electric cylinder mounted on the swing base 607 is actuated as a driving source to rotate a driving arm 608g that is secured to the rear shaft 608d, the quadric link mechanisms 608 pivot in the lateral direction of the vehicle (in the right-left direction as viewed in FIG. 55). The electric cylinder essentially consists of an electric motor 608M and a ball screw and does not require any particular modification to achieve this embodiment (cf. the driving system of the first embodiment). In FIG. 55, the back of the electric motor 608M is shown.

The above-described sliding movements in the longitudinal and lateral directions of the vehicle are performed manually by users. However, such sliding movements may be electrically powered by an electric motor as a driving source. The longitudinal and lateral sliding movements can be locked on the front and rear ends in the sliding direction or in any position between the front and rear ends by means of a longitudinal slide lock mechanism and a lateral slide lock mechanism, respectively. Further, the rotational movement by the rotary disc 604 can be locked to prevent rotation in the positions of the seat body 610 facing the front of the vehicle and to the door opening side (rotation lock mechanism). In these points, any particular modifications are not necessary.

With the above-described construction, after the seat body 610 has been directed to the door opening side and locked to prevent rotation, the seat body 610 is manually moved from the rear most position in the lateral sliding movement, which is shown by a solid line in the drawing, to the front position, which is shown by a broken line in the drawing. The lateral sliding movement is locked in the front position. Thereafter, when the electric cylinder is actuated, the quadric link mechanisms 608 pivot to the exterior side, so that the seat body 610 is also extended to the exterior side position shown by the broken line.

In order to return the seat body 610 from this extended position, the electric cylinder is rotated in the reverse direction to move the seat body 610 back to the front position of the lateral sliding movement. Thereafter, the lateral slide lock mechanism is unlocked and the seat body 610 is manually moved back to the rearmost position in the lateral sliding movement. The lateral slide lock mechanism is locked in the rearmost position. After the seat body 610 has thus been moved back to the rearmost position in the lateral sliding movement, the rotation lock mechanism is unlocked and the seat body 610 is rotated by about 90° to the position facing the front of the vehicle. In this position, the rotational movement is locked. Thereafter, the main base 603 and thus the seat body 610 are returned to the rearmost position of the longitudinal sliding movement and then locked in position. Thus, the entry of the passenger into the vehicle is completed. On the other hand, by reversing the above-described procedure, the passenger can get out of the vehicle to the outside while sitting in the seat body 610. Thus, the passenger can get into a predetermined position in the vehicle compartment and can also get out of the vehicle, while sitting in the seat body 610, so that the passenger can easily enter and exit the vehicle.

In the rotating vehicle seat 601 thus constructed, a swing lock mechanism 620 is provided between the seat holder 609 and the swing base 607 and serves to lock the swinging movement of the seat body 610 when the vehicle is abruptly decelerated. The rotating vehicle seat 601 according to this embodiment features the swing lock mechanism 620, and more specifically, that the swinging movement of the seat body 610 is locked irrespective of the sliding position of the lateral slide rails 606.

Figure 56:
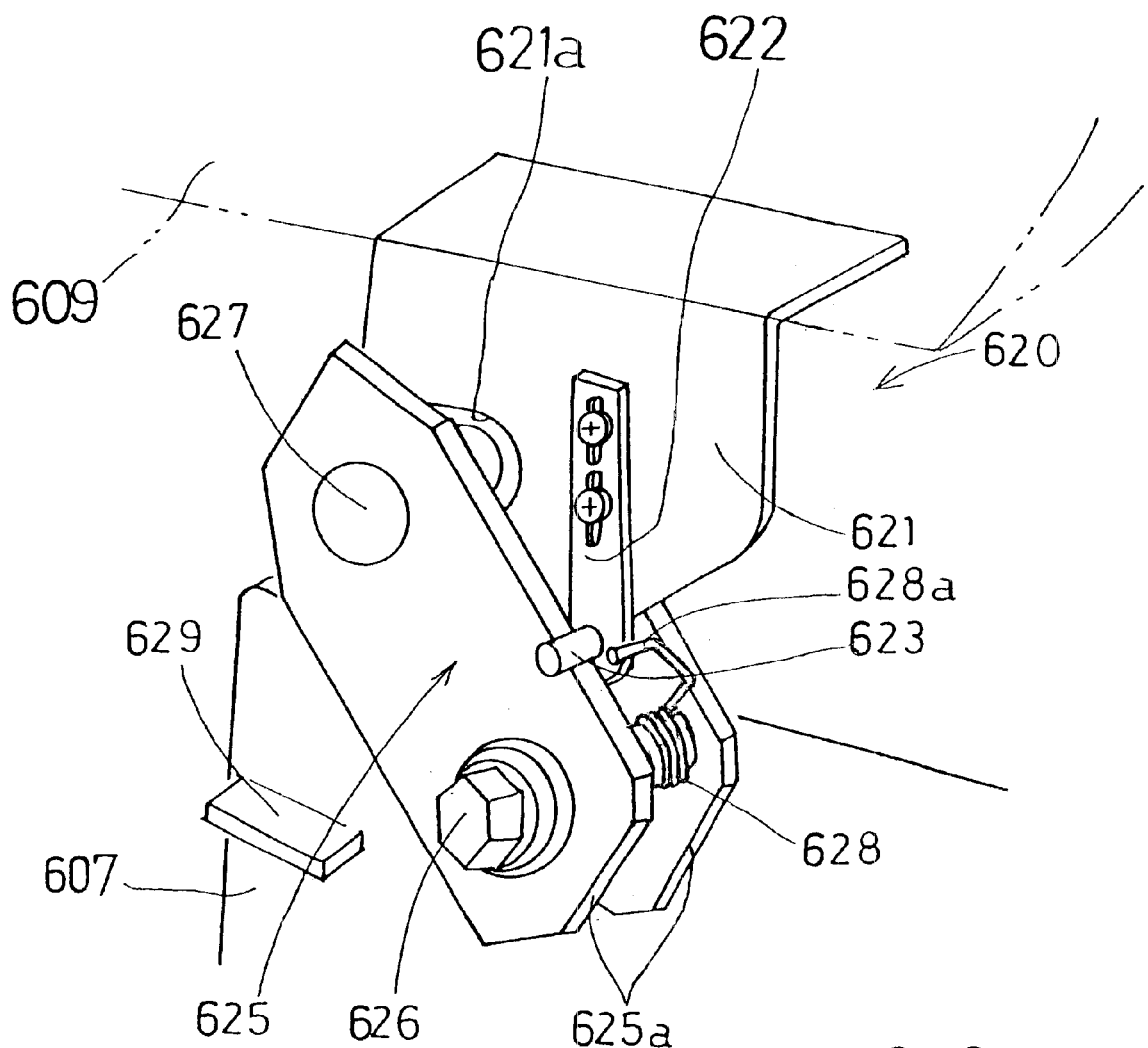
FIG. 56 is a perspective view of an entire swing lock mechanism, in which a seat holder and a swing base are not shown.

The swing lock mechanism 620 is shown in detail in FIG. 56. A lock plate 621 is mounted to the underside of the side edge of the seat holder 609. A lock recess 621a is formed in the front edge of the lock plate 621. An auxiliary strip plate 622 is attached on the outside surface of the lock plate 621. An operating pin 623 is mounted on and extends laterally outwardly from the lower portion of the outside surface of the auxiliary plate 622. The position of the auxiliary plate 622 can be adjusted vertically.

A lock holder 625 is mounted on the side surface of the swing base 607 for vertical pivotal movement around a pivot 626. The lock holder 625 is formed by fixing two plates 625a in parallel to each other with a predetermined spacing therebetween by the pivot 626. A torsion spring 628 is disposed around the pivot 626 between the plates 625a. Although it is not shown, one end of the torsion spring 628 is fixed to one of the plates 625a. The other end of the torsion spring 628 is bent into a generally L-shape to form a free end 628a that is not fixed to any components. The torsion spring 628 has a function of imparting upward rotational force to the lock holder 625, which will be described in detail below.

A lock pin 627 extends across and is fixed to the distal ends of the plates 625a. When the lock pin 627 is engaged in the lock recess 621a of the lock plate 621, the seat body 610 is locked to prevent swinging movement.

A stopper plate 629 is mounted on and extends laterally outwardly from the side surface of the swing base 607 below the lock holder 625, and serves to limit the downward pivotal end of the lock holder 625. When the lock holder 625 pivots until it contacts the stopper plate 629, the lock holder 625 lies generally horizontally. At this time, the lock pin 627 is completely out of the travelling path of the lock plate 621, thus permitting the seat body 610 to be extended.

Figure 57:
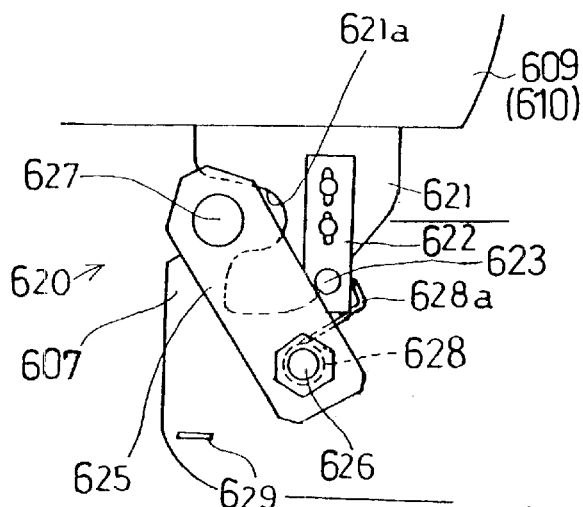
FIG. 57 is a side view of the swing lock mechanism in the locked state.

In FIGS. 55 to 57, a solid line depicts the seat body which is locked to prevent swinging movement. In this locked state, the quadric link mechanisms 608 are in the most raised position, and thus, the seat holder 609 is positioned furthest to the interior side (to the right as viewed in FIG. 55) with respect to the swing base 607. In such a swing locked state, the lock pin 627 is substantially engaged in the lock recess 621a of the lock plate 621. Further, the free end 628a of the torsion spring 628 is pressed by the rear edge of the auxiliary plate 622. Thus, the torsion spring 628 provides a biasing force, and the lock holder 625 is pivoted around the shaft 626 toward the raised position by the biasing force. As a result, as described above, the lock pin 627 is engaged in the lock recess 621a of the lock plate 621. Further, in this locked state, the operating pin 623 is in contact with the upper edge of the outside plate 625a of the lock holder 625.

Figure 58:
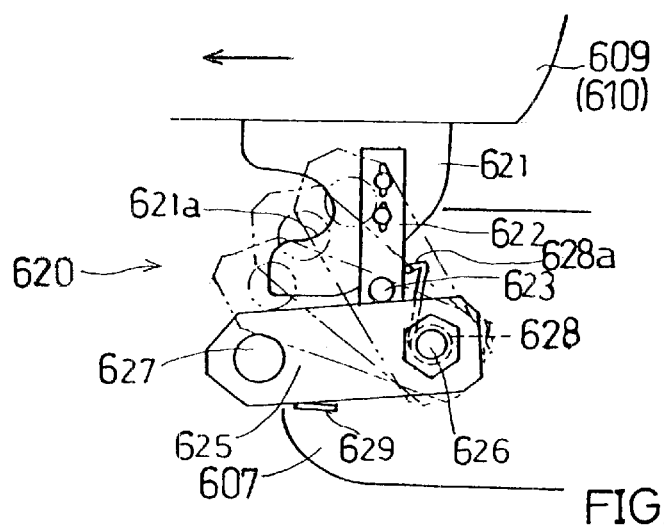
FIG. 58 is a side view of the swing lock mechanism in the unlocked state.
Figure 59:
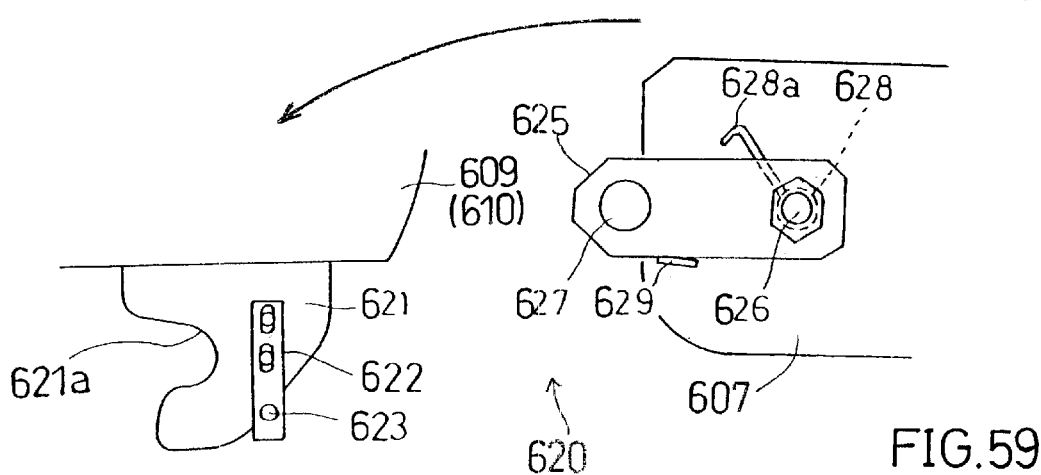
FIG. 59 is a side view of the swing lock mechanism in the unlocked state, with seat body being in the extended position outside the vehicle.

In the swing locked state, when the electric cylinder is actuated to start the swinging movement, the swing lock mechanism 620 is unlocked as shown in FIGS. 57 to 59. When the electric cylinder is actuated, the seat holder 609 and the seat body 610 start to move horizontally to the exterior side with the movement of the quadric link mechanisms 608. At this time, as shown in FIG. 58, the lock plate 621 also moves likewise. As described above, the operating pin 623 is mounted on the auxiliary plate 622 of the lock plate 621 and is held in contact with the upper edge of the outside plate 625a of the lock holder 625. Further, at this time, the lock holder 625 is held in the generally raised position by the biasing force of the torsion spring 628. Therefore, when the lock plate 621 starts to move in the generally horizontal direction, the lock holder 625 is pressed by the operating pin 623 to thereby start to rotate downward. The timing when the lock holder 625 starts to pivot downward with the movement of the lock plate 621 must be set such that the lock plate 621 does not interfere with the lock pin 627. Such timing can be properly set by adjusting the vertical position of the auxiliary plate 622.

Further, at this time, the free end 628a of the torsion spring 628 is still pressed against the auxiliary plate 622. Thus, the biasing force of the torsion spring 628 acts on the lock holder 625. Therefore, the movement of the operating pin 623 causes the lock holder 625 to pivot downward against the biasing force of the torsion spring 628.

As the lock holder 625 pivots downward, the lock pin 627 is gradually disengaged from the lock recess 621a of the lock plate 621. When the lock plate 621 further moves to the exterior side while the lock pin 627 is gradually disengaged from the lock recess 621a, the pressing force of the auxiliary plate 622 pressing the free end 628a of the torsion spring 628 is reduced, and thus the biasing force of the torsion spring 628 is gradually reduced.

When the lock holder 625 is further pivoted downward to a generally horizontal position as shown in FIG. 58, the pressing force of the auxiliary plate 622 against the free end 628a of the torsion spring 628 is not substantially applied. Further, the pressing force of the operating pin 623 against the plate 625a is not substantially applied. Therefore, the lock holder 625 will then pivot downward under its own weight until it contacts the stopper plate 629. Thus, the lock plate 621 is completely out of the travelling path of the lock plate 621 (in the unlocked state). After the lock plate 621 has thus been disengaged from the lock holder 625, the electric cylinder is further rotated to move the quadric link mechanisms 608 to the extended position. As a result, the seat body 610 is moved to the outside of the vehicle along a predetermined path. The swing lock mechanism 620 in this stage is shown in FIG. 59.

On the other hand, by reversing the above-described procedure, the seat body 610 can be returned from the outside extended position to the inside of the vehicle. Specifically, when the electric cylinder is rotated in the reverse direction, the quadric link mechanisms 608 move to the raised position, and thus the seat body 610 and the seat holder 609 are moved along the same path back to the interior side. As shown in FIG. 59, in the unlocked state in which the lock plate 621 is away from the lock holder 625, the lock holder 625 is held in contact with the stopper plate 629 under its own weight and in a generally horizontal position. In this state, the free end 628a of the torsion spring 628 does not contact any components, and thus the spring 628 does not exert any biasing force.

As shown in FIG. 58, when the seat body 610 is returned generally above the swing base 607, the lock plate 621 is returned above the lock holder 625, and the rear edge of the auxiliary plate 622 contacts the free end 628a of the torsion spring 628. In this state of contact, when the seat body 610 is further moved toward the interior side, the free end 628a of the torsion spring 628 is pressed rearward (toward the interior side). Therefore, the torsion spring 628 provides the biasing force to rotate the lock holder 625 to the raised position. The biasing force is gradually increased as the auxiliary plate 622 moves toward the interior side.

In this stage, however, the front of the lock plate 621 has not yet passed over the lock pin 627 rearward (to the right as viewed in the drawing) with respect to the lock pin 627. Therefore, the lock holder 625 still must be held in the generally horizontal position. To this end, in this embodiment, in the stage in which the biasing force of the torsion spring 628 begins to be exerted, the operating pin 623 on the auxiliary plate 622 again contacts the upper edge of the lock holder 625. As shown in FIG. 58, the contact position is set to be located on the left of the shaft 626 (the center of rotation) of the lock holder 625 in the beginning of contact, so that the lock holder 625 is prevented from rotating toward the raised position. Therefore, in this stage, the lock holder 625 is still held in a generally horizontal position, and only the biasing force of the torsion spring 628 gradually increases.

Subsequently, when the quadric link mechanisms 608 are returned to the generally raised position and the seat body 610 is returned to the generally original position, the front end of the lock plate 621 completely passes above the lock pin 627 and the operating pin 623 passes above the shaft 626 of the lock holder 625. As a result, the lock holder 625 is permitted to rotate toward the raised position. The timing when the lock holder 625 starts to rotate together with the movement of the lock plate 621 is properly set by adjusting the vertical position of the auxiliary plate 622 or by properly setting the position of the shaft 626.

The operating pin 623 has a function of limiting the rotation of the lock holder 625 toward the raised position (in the swing locking direction) in the process of returning the seat body 610 to the inside of the vehicle. On the other hand, the operating pin 623 has another function of rotating the lock holder 625 downward (in the unlocking direction) in-the process of extending the seat body 610 to the outside of the vehicle.

When the lock holder 625 is thus permitted to rotate toward the raised position, the free end 628a of the torsion spring 628 is sufficiently biased by the auxiliary plate 622, so that the biasing force increases enough to rotate the lock holder 625 to the raised position. Therefore, at this time, the lock holder 625 is rotated to the raised position, and the lock pin 627 is engaged in the lock recess 621a of the lock plate 621. Thus, the swing lock mechanism 620 is locked.

When the quadric link mechanisms 608 are returned all the way to the raised position and the seat body 610 is returned above the swing base 607, the swinging movement is completed and the electric cylinder is stopped. In this swing lock state, the free end 628a of the torsion spring 628 is pressed by the auxiliary plate 622, so that the lock holder 625 is still biased toward the raised position by the biasing force of the torsion spring 628. Therefore, the lock pin 627 is held within the lock recess 621a of the lock plate 621, and thus, the swing locked state is maintained.

The "swing locked state" in this embodiment refers to the state in which the seat body 610 can be prevented from swinging in the event of abrupt deceleration of the vehicle, and more specifically, to the state in which lock holder 625 is moved to the raised position and the lock pin 627 is held within the lock recess 621a of the lock plate 621. Therefore, even in this swing locked state, swinging movement which is involved in the normal entry/exit operations during stop of the vehicle, is not limited at all. Therefore, the user can swing the seat body 610 without a special unlocking operation.

In the event of abrupt deceleration of the vehicle when the vehicle is running, a large gravity G (acceleration of gravity) is exerted on the seat body 610. In this case, while the front portion of the vehicle sinks, inertial force of displacing the front portion of the vehicle relatively upwardly, is applied to the seat body 610 by elastic deformation of the quadric link mechanisms 608 or other factors. At this time, the force of the operating pin 623 pressing the lock holder 625 is greatly reduced. As a result, the lock plate 621 is engaged with the lock pin 627 of the lock holder 625, so that the swinging movement of the seat body 610 is mechanically locked.

As described above, with the rotating vehicle seat 601 according to this embodiment, when the extending movement of the seat body 610 to the exterior side is started, the swing lock mechanism 620 is unlocked simultaneously. On the other hand, when the seat body 610 is returned to the interior side, the swing lock mechanism 620 is automatically locked in the final stage. The lock plate 621 for achieving the swing lock is provided on the seat holder 609, and the lock holder 625 is provided on the swing base 607.

Thus, with the rotating vehicle seat 601 according to this embodiment, the swinging movement is locked and unlocked irrespective of the lateral sliding position. Therefore, the swinging movement of the seat body 610 is locked by the swing lock mechanism 620 in the front end lateral sliding position as well. The problem of the known rotating seat does not occur in which the swinging movement is unlocked in any position other than the rear end lateral sliding position.

With this construction, the lateral slide rails 606 can be utilized as longitudinal slide rails. Specifically, when the seat body 610 is in the position facing the front of the vehicle (the normal seated position), the position of the seat body 610 in the longitudinal direction of the vehicle can be adjusted by the lateral slide rails 606 as well as the longitudinal slide rails 602.

Figure 60:
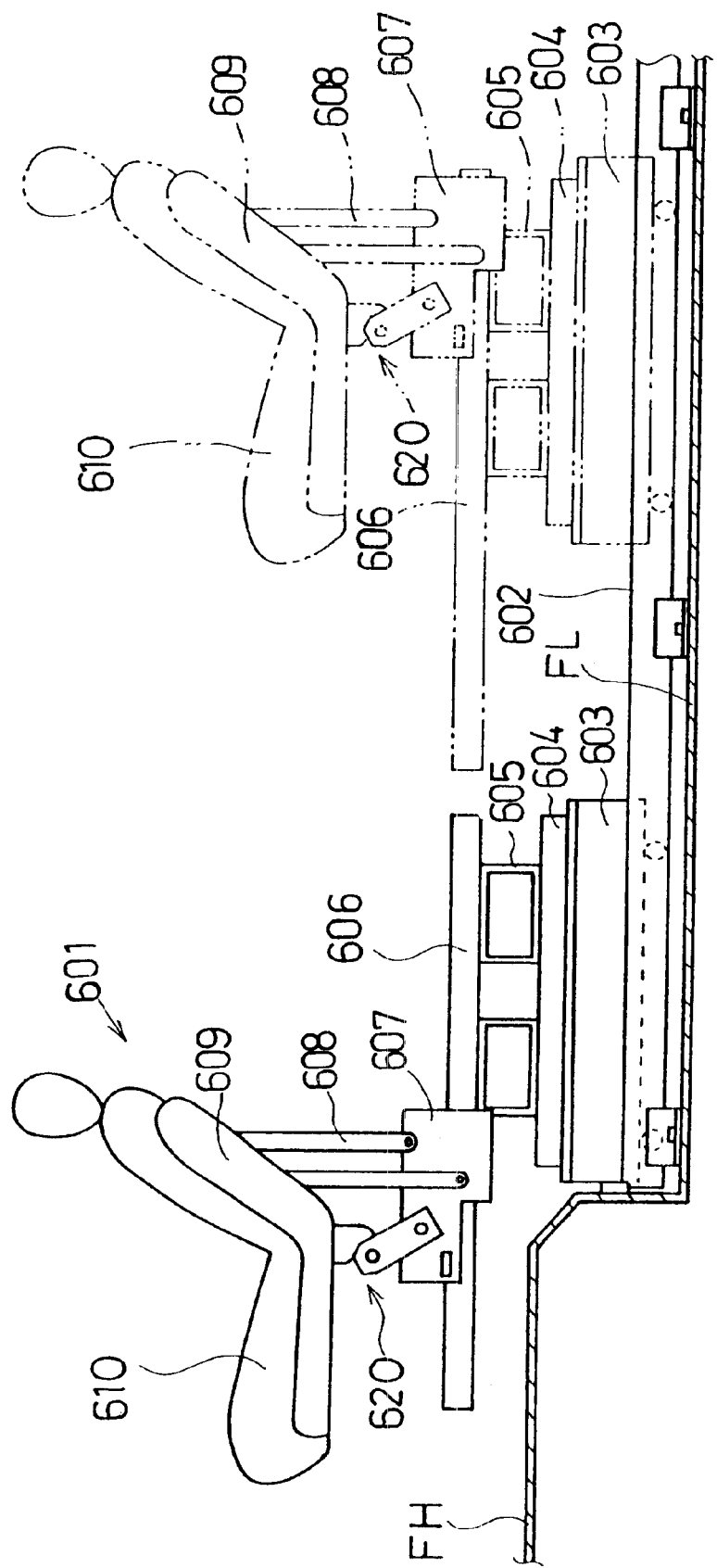
FIG. 60 is a side view of the rotating vehicle seat, in which lateral slide rails are utilizes as longitudinal slide rails.

For example, in a vehicle, such as a van, in which the front seat floor FH (on which a driver's seat and a passenger's seat are installed) is set at a higher lever than the rear seat floor FL (on which rear seats are installed) as shown in FIG. 60, the rotating vehicle seat 601 can be moved from the rear seat floor FL substantially to the passenger's seat on the front seat floor FH, if the passenger's seat on the front seat floor FH is removed.

Specifically, the seat body 610 cannot be moved to the passenger's seat on the front seat floor FH only by means of the longitudinal slide rails 602, because a step exists between the rear seat floor FL and the front seat floor FH. As described above, the lateral slide rails 606 are located at a position higher than the longitudinal slide rails 602. Therefore, when the longitudinal slide rails 602 are used for the longitudinal sliding movement of the seat body 610 on the rear seat floor FL, and the lateral slide rails 606 are used at the front end of the rear seat floor FL to further move the seat body 610 forward with respect to the vehicle, the seat body 610 can be moved onto the front seat floor FH.

When the rotating vehicle seat 601 is moved into the vehicle through the door opening to the side of the rear seat floor FL and then moved to the passenger's seat as described above, the passenger (for example, a handicapped person) can sit alongside the driver. Therefore, the passenger can sit more comfortably without having an awkward feeling (by being specially handled and treated differently by being required to sit in the rear seat).

Thus, with the rotating vehicle seat 601 according to this embodiment, the swing lock mechanism 620 functions irrespective of the sliding position, so that the lateral slide mechanism can be utilized as a longitudinal slide mechanism. Therefore, as described above, the longitudinal sliding movement of the rotating vehicle seat 601 can be extended to the front seat floor FH, so that the variety of the application styles (seat variations) can be increased.

Further, the swing lock mechanism 620 in this embodiment is not constructed to utilize the sliding movement by means of the slide rails 606. Therefore, the swing lock mechanism 620 can be easily applied to other seats that do not have the lateral slide mechanism.

Further, the swing lock mechanism 620 in this embodiment is constructed to provide swing lock and unlock using a fully mechanical system and without using an actuator, such as an electric motor or a cylinder. Therefore, without the need for a power source or an air source and without the need for installation of electric wiring or air piping, ease of assembling and excellent maintainability can be obtained. Further, reliable locking and unlocking operations can be maintained for a longer period of time.

Further, by properly determining the thickness of the auxiliary plate 622 or the diameter of the operating pin 623 such that the auxiliary plate 622 or the operating pin 623 has a lower impact resisting strength than the other components, the auxiliary plate 622 or the operating pin 623 can be set so as to break when an external impact force exceeding a predetermined value is applied on the slide lock mechanism 260. As a result, even if the lock plate 621 is momentarily displaced forward of the vehicle together with the seat body 610, the auxiliary plate 622 or the operating pin 623 breaks and can no longer press (rotate in the unlocking direction) the lock holder 625. As a result, the slide lock mechanism 260 can be maintained in the locked state. With this construction, even if a large acceleration G (acceleration of gravity) is exerted on the passenger or the rotating vehicle seat 601, the swing locked state is reliably maintained, so that the safety of the passenger can be secured.

Figure 61:
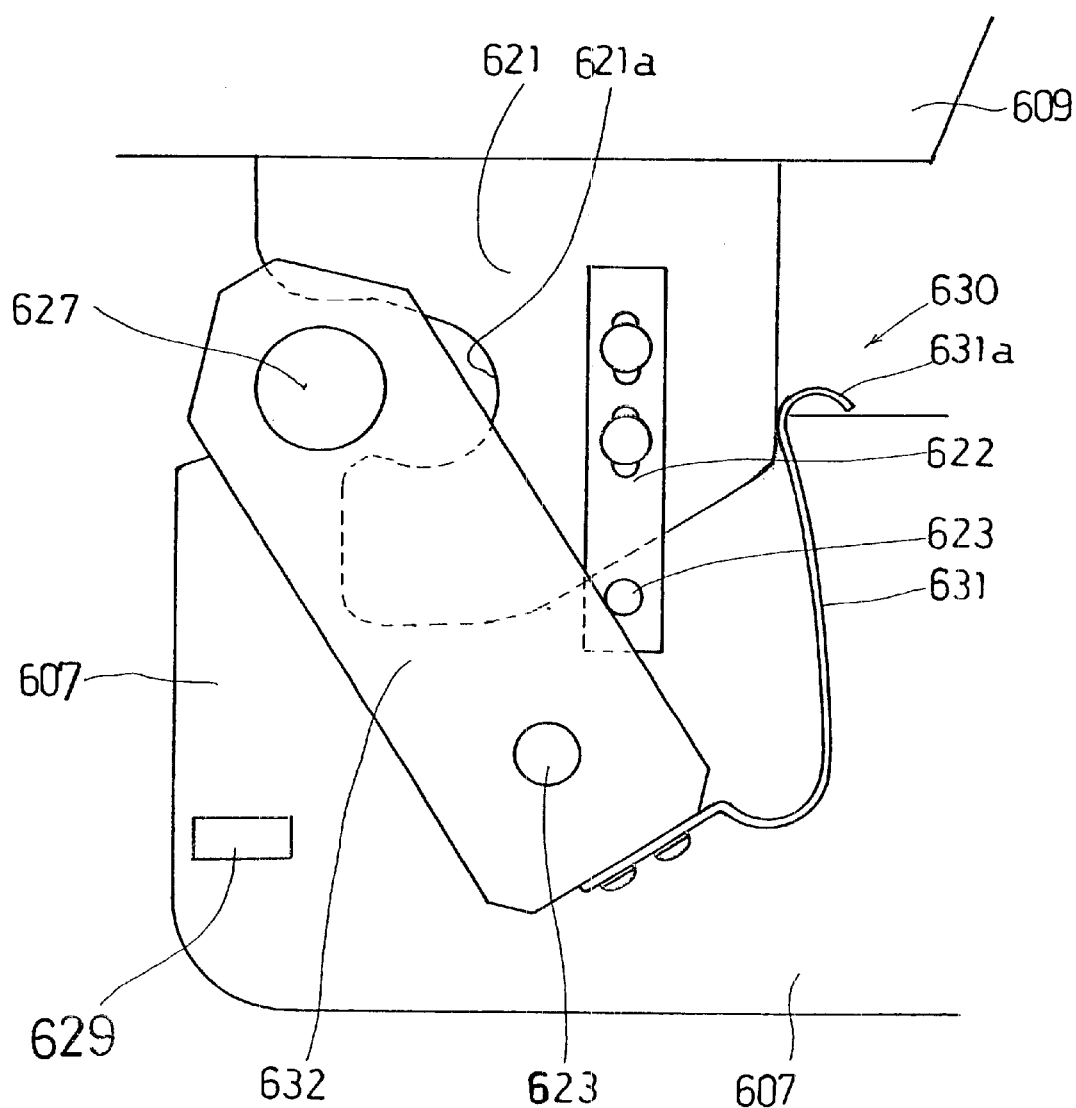
FIG. 61 is a side view of a modification of a swing lock mechanism in the seventh embodiment.

Various changes or modifications may be added to the above-described seventh embodiment. For example, while the torsion spring 628 has been described as being used as means for imparting the biasing force to rotate the lock holder 625 to the raised position, a plate spring 631 may be used instead of the torsion spring 628. A swing lock mechanism 620 using a plate spring 631 is shown in FIG. 61. In this construction, the lower end of the plate spring 631 is secured to the rear end surface of the lock holder 632. The plate spring 631 extends upward to the back of the lock plate 621. In this example, as shown in the drawing, a free end 631a of the plate spring 631 contacts the rear end of the lock plate 621. The remaining construction of the lock holder 632 is the same as the seventh embodiment. Further, like the seventh embodiment, the auxiliary plate 622 is mounted on the lock plate 621, and the operating pin 623 is mounted on the auxiliary plate 622. The operation of the operating pin 623 is the same as the seventh embodiment. The same effect as the seventh embodiment can be obtained with this swing lock mechanism 30.

An embodiment of the invention as described in claim 10 (an eighth embodiment) will now be explained with reference to FIGS. 62 to 68.

In a swing-down type rotating vehicle seat in which the seat body is mounted to permit swinging movement to the outside of the vehicle through the door opening by the quadric link mechanisms, it is necessary to lock all operating mechanisms at least when the vehicle is running (in the state in which the passenger is sitting facing the front of vehicle). To this end, a rotating vehicle seat of this type is provided with a swing lock mechanism for locking the swinging movement.

However, in a known swing lock mechanism, locking and unlocking operations are performed manually. Such operations are troublesome, and in this respect, the usability of this type of the rotating vehicle seat is impaired. It is, accordingly, an object of the invention as described in claim 10 to provide a rotating vehicle seat which includes a swing lock mechanism that can automatically lock and unlock the swinging movement of the seat body without the need for special operations by the user.

Figure 62:
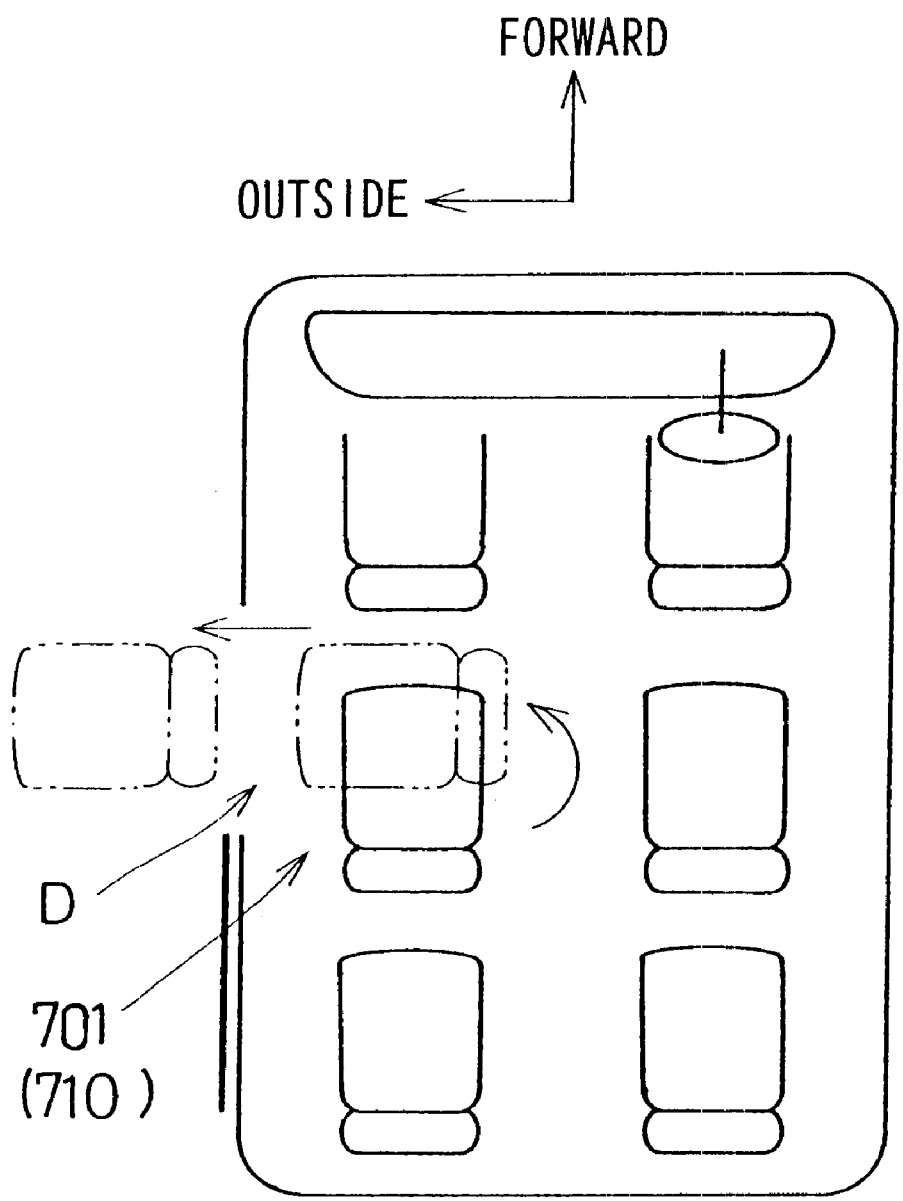
FIG. 62 is a schematic plan view of a vehicle having a rotating vehicle seat according to an eighth embodiment of the invention.

As shown in FIG. 62, in the eighth embodiment, a rotating vehicle seat 701 will be described. The rotating vehicle seat 701 is set on the left side of the vehicle, and the door opening D is provided on the left of the rotating vehicle seat 701. When a seat body 710 is rotated by about 90° to the left from the position facing the front of the vehicle, which is shown by a solid line in the drawing, the seat body 710 is moved to the position facing the door opening D, which is shown by a broken line. In this state, the seat body 710 can be moved to the outside of the vehicle through the door opening D.

Figure 63:
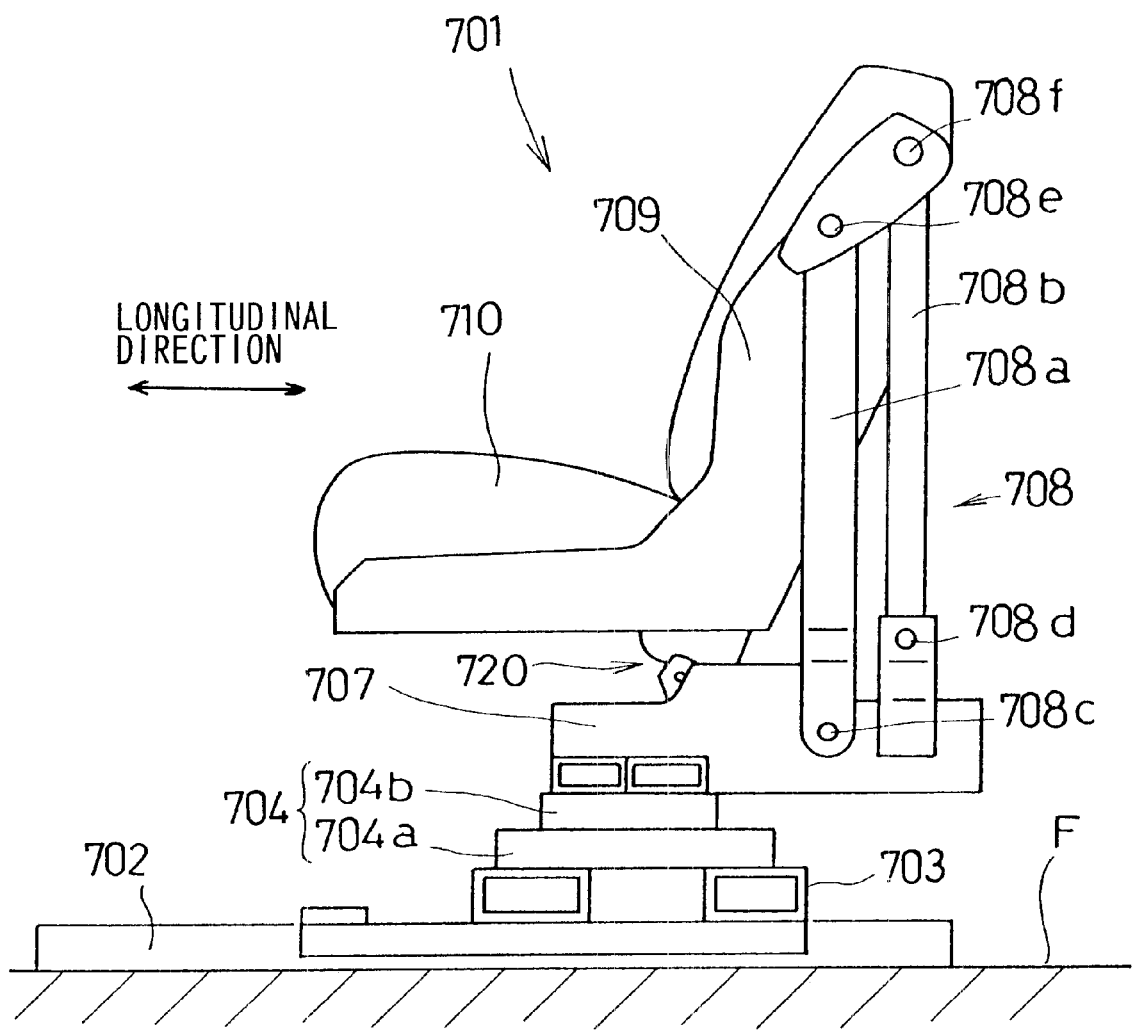
FIG. 63 is a side view of the rotating vehicle seat according to the eighth embodiment.

The rotating vehicle seat 701 is shown in detail in FIG. 63. The rotating vehicle seat 701 is shown in the position facing the front of the vehicle in FIG. 63.

The basic components of the rotating vehicle seat 701 do not require any particular modifications in this embodiment as compared with each of the foregoing embodiments, but will now be briefly explained. Designated by numeral 702 is a pair of parallel longitudinal slide rails mounted on the vehicle floor F and extending in the longitudinal direction of the vehicle. A main base 703 is mounted on the vehicle floor F via the longitudinal slide rails 702 to permit longitudinal movement. A rotary disc 704 has an outer ring 704a and an inner ring 704b and is mounted on the upper surface of the main base 703. The rotary disc 704 is mounted in a position displaced from the center to the exterior side on the main base 703 (a position displaced toward this side of the plane of FIG. 63) (see FIG. 64).

A swing base 707 is mounted on the upper surface of the inner ring 704*b* of the rotary disc 704. A seat holder 709 is mounted above the swing base 707 via a pair of right and left quadric link mechanisms 708 (a pair in the direction perpendicular to the plane of the drawing as viewed in FIG. 63). Two link arms 708*a*,708*b* of each of the quadric link mechanisms 708 are rotatably connected to the swing base 707 and the seat holder 709 by pivots 708*c*,708*d*,708*e*,708*f*. The seat body 710 is mounted on the seat holder 709.

When an electric cylinder (not shown) mounted on the swing base 707 is actuated as a driving source to rotate a driving arm that is secured to the rear shaft 708*d*, the quadric link mechanisms 708 pivot in the lateral direction of the vehicle (in the right-left direction as view in FIG. 63). The electric cylinder as a driving source essentially consists of an electric motor and a ball screw and does not require any particular modification to achieve this embodiment.

The sliding movement of the seat body 710 in the longitudinal direction of the vehicle is performed manually by users. However, the sliding movement may be electrically powered by an electric motor as a driving source. The longitudinal sliding movement can be locked on the front and rear ends in the sliding direction or in any position between the front and rear ends by means of a lock mechanism. Further, the rotational movement by the rotary disc 704 can be locked against rotation in the positions of the seat body 710 facing the front of the vehicle and to the door opening D. In these points, no particular modifications are necessary.

With the above-described construction, when the seat body 710 is rotated and directed to the door opening D, and in this state, the electric cylinder is actuated to rotate the quadric link mechanisms 708 to the exterior side, the seat body 710 can be extended to the exterior side position through the door opening D. Thus, the passenger can get out of the vehicle while sitting in the seat body 710.

In order to return the seat body 710 into the vehicle, the electric cylinder is rotated in the reverse direction to move the quadric link mechanisms 708 to the raised position, and thereafter, the seat body 710 is rotated by about 90° from the position facing the front of the vehicle and then moved rearward with respect to the vehicle. Thus, the entry of the passenger into the vehicle is completed. Therefore, the passenger can get into a predetermined position in the vehicle compartment and can also get out of the vehicle while sitting in the seat body 710, so that the passenger can easily get into and out of the vehicle.

In the rotating vehicle seat 701 thus constructed, a swing lock mechanism 720 is provided between the seat holder 709 and the swing base 707 and serves to lock the swinging movement of the seat body 710. The rotating vehicle seat 701 according to this embodiment features the swing lock mechanism 720. The swing lock mechanism 720 will now be described in further detail.

Figure 64:
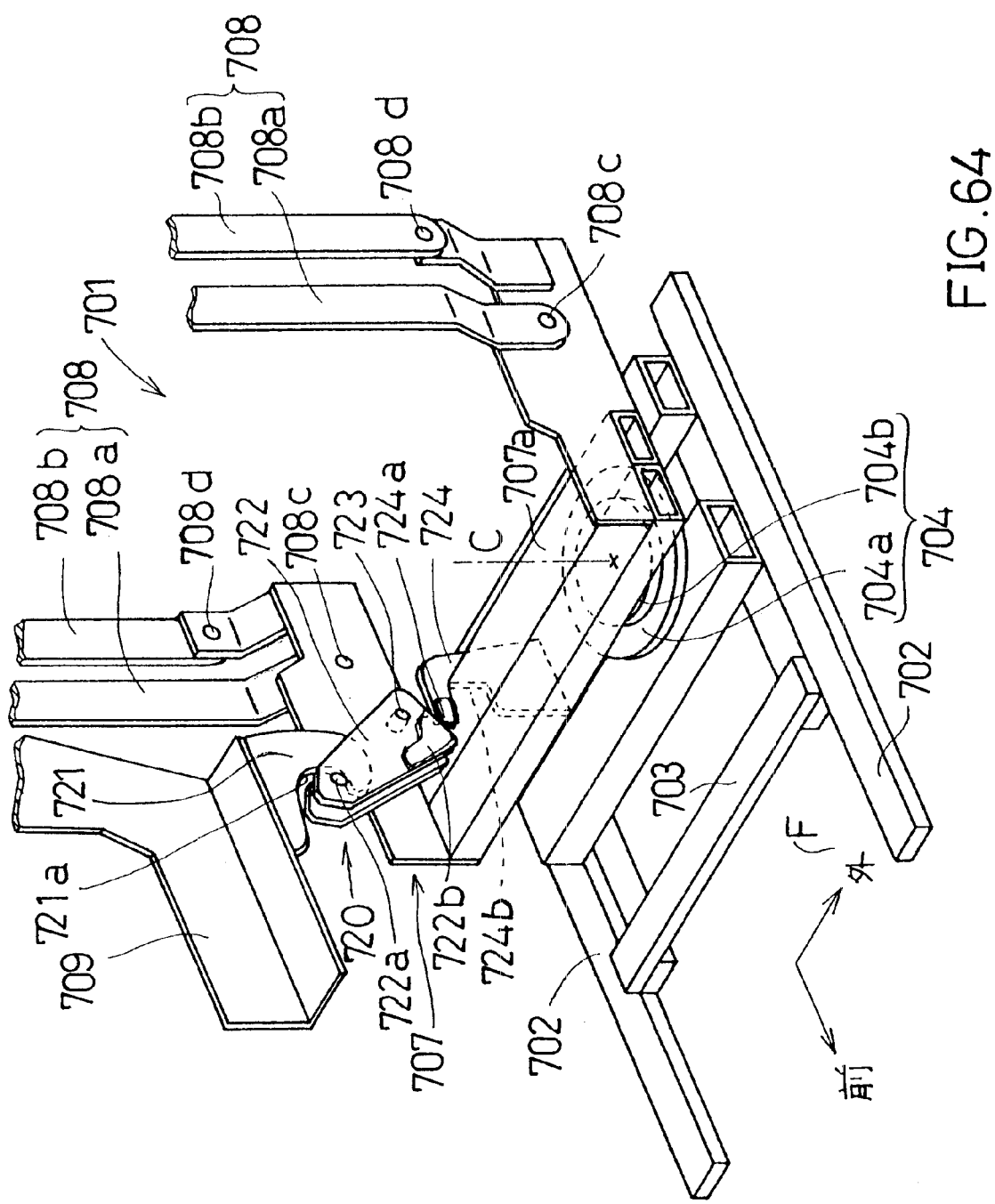
FIG. 64 is a perspective view of a swing lock mechanism.
Figure 65:
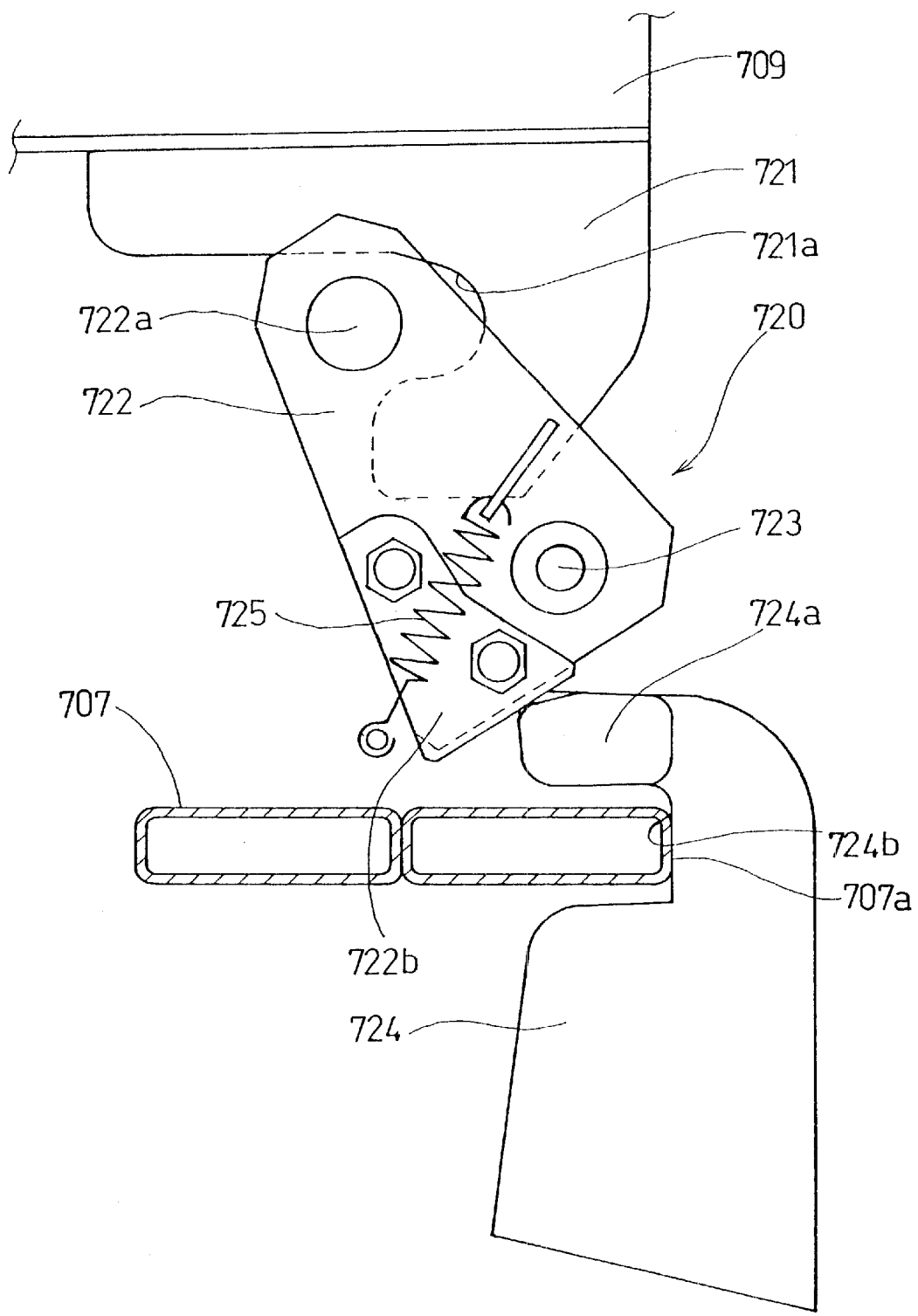
FIG. 65 is a side view of the swing lock mechanism.
Figure 66:
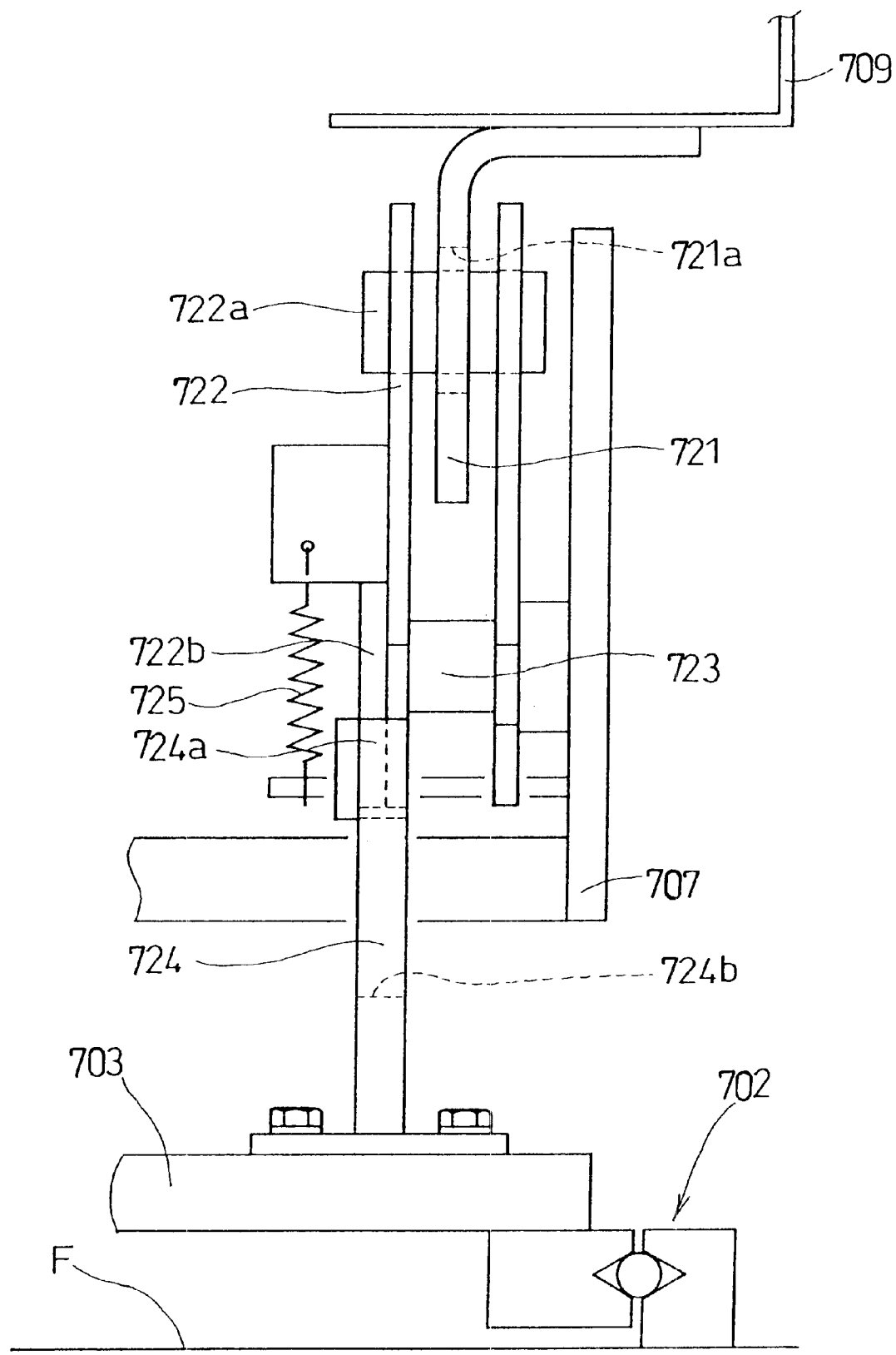
FIG. 66 is an end view of the swing lock mechanism.

The swing lock mechanism 720 is shown in detail in FIGS. 64 to 66. A lock plate 721 is mounted to the underside of the right end portion of the seat holder 709. A lock recess 721*a* is formed in the front edge of the lock plate 621. A lock pin 722*a* of a lock holder 722 is engaged in the lock recess 721*a* of the lock plate 721, as will be described in detail below, and thus the seat body 710 is locked to prevent swinging movement.

The lock holder 722 is mounted on the right side portion of the swing base 707 for vertical pivotal movement around a pivot 723. The pivot 723 (the center of rotation of the lock holder 722) is located near the rear corner of the lock holder 722. A tension spring 725 (which is not shown in FIG. 64) is disposed between the lock holder 722 and the swing base 707. The lock holder 722 is biased downward by the tension spring 725.

When the lock holder 722 pivots upward around the pivot 723 against the tension spring 725, the lock pin 722*a* on the distal end of the lock holder 722 is engaged in the lock recess 721*a* of the lock plate 721. Thus, the seat body 710 is locked to prevent swinging movement.

An anchor hook 724 is mounted on the main base 703 that rotatably supports the swing base 707, and the anchor hook 724 is located near the end of the main base 703 and more to the interior side than the rotary disc 704 on the main base 703. The anchor hook 724 extends raised into the travelling path of the lock holder 722 that pivots together with the rotation of the swing base 707. The anchor hook 724 serves to couple the vertical pivotal movement of the lock holder 722 to the rotational movement of the swing base 707. Specifically, when the seat body 710 is located in the position facing the front of the vehicle, a position adjusting plate 722*b* that is mounted on the lower front corner portion of the lock holder 722, contacts a distal end portion 724*a* of the anchor hook 724. In this contact state, when the seat body 710 is further rotated, the lower front corner portion of the lock holder 722 is pushed upward via the position adjusting plate 722*b*, so that the lock holder 722 pivots upward around the pivot 723. The timing when the lock holder 722 pivots can be adjusted by adjusting the position of the position adjusting plate 722*b*.

On the other hand, when the seat body 710 is rotated to the door opening side, the lower front corner portion (the position adjusting plate 722*b*) of the lock holder 722 is disengaged from the distal end portion 724*a* of the anchor hook 724. As a result, the lock holder 722 is permitted to pivot downward. Thus, the lock holder 722 pivots downward under its own weight and by the biasing force of the tension spring 725. When the lock holder 722 pivots downward around the pivot 723, the lock pin 722*a* is disengaged from the lock recess 721*a* of the lock plate 721, and thus the swing lock of the seat body 710 is released.

A generally U-shaped recess 724*b* is formed in the front end of the anchor hook 724. When the seat body 710 is located in the position facing the front of the vehicle, as shown in FIGS. 64 and 65, a rear end portion 707*a* of the swing base 707 is engaged into the recess 724*b* of the anchor hook 724. With this construction, the swing base 707 and thus the seat body 710 are prevented from excessive rotation in the direction opposite to the door opening D.

With the rotating vehicle seat 701 of this embodiment, when the seat body 710 is rotated, the swing lock mechanism 720 is locked or unlocked by coupling with the rotation of the seat body 710. Therefore, unlike known rotating seats, the users do not need to manually operate the swing lock mechanism, so that the usability of the rotating vehicle seat can be improved.

Particularly, with the rotating vehicle seat 701 of this embodiment, when the position adjusting plate 722*b* on the lower front corner portion of the lock holder 722 is pushed up by contact with the distal end portion 724*a* of the anchor hook 724, the lock holder 722 rotates upward and is held in the locked position. However, if it is constructed, for example, such that a biasing force of a spring is used to rotate the lock holder to the locked position and to hold it in the locked position, in the event of a collision from behind or during driving on a bad road, the lock holder may be rotated to the unlocked position against the biasing force of the spring by the impact (inertial force) generated by the collision from behind or by vibrations generated by driving on a bad road. As a result, the seat body 710 may be extended forward with respect to the vehicle. In this respect, with the construction of this embodiment, as long as the seat body 710 is held in the position facing the front of the vehicle by a separately provided rotation lock mechanism, the lock holder 722 is pushed up by the anchor hook 724 and mechanically held in the swing locked position. Therefore, even in the event of occurrences generating a big impact or vibrations, the seat body 710 can be reliably maintained in the swing locked state.

Further, when the seat body 710 is located in the position facing the front of the vehicle, the rear end portion 707*a* of the swing base 707 is engaged in the recess 724*b* of the anchor hook 724, so that the seat body 710 is prevented from excessive rotation.

The normal range of rotating the seat body 710 in the entry and exit of passengers (normal rotational range) is about 90° between the position facing the front of the vehicle and the position facing the door opening D. By engaging the rear end portion 707*a* of the swing base 707 with the recess 724*b* of the anchor hook 724, the seat body 710 is prevented from excessive rotation beyond this normal rotational range, that is, from rotating further to the interior side from the position facing the front of the vehicle.

Figure 67:
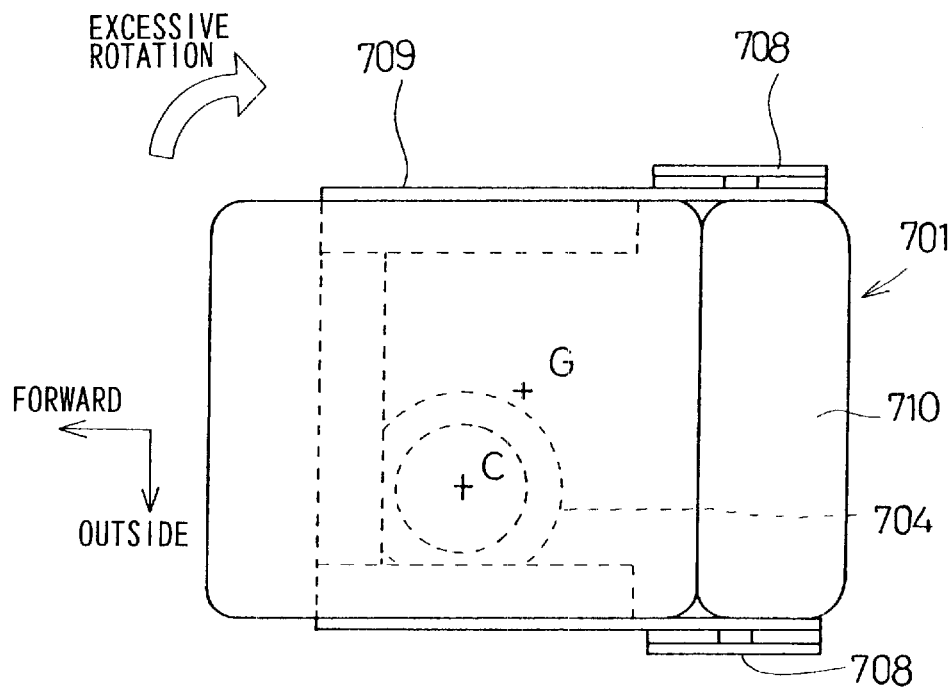
FIG. 67 is a plan view showing the positional relationship between the center of rotation of the seat body (which is also the center of rotation of the seat holder and the swing base and is the same throughout this specification) and the center of gravity of the seat body, in which a seat body and a seat holder are shown.

As shown in FIG. 67, when the center of rotation C of the seat body 710 (the position of the rotary disc 704) is displaced to the exterior side with respect to the center of gravity G of the seat body 710 (including the seat holder 709 and the swing base 707; the center of gravity G being the same throughout this specification), if the vehicle is subjected to a strong impact from behind, by a collision from behind or similar causes, the seat body 710 is subjected to a force in a direction of rotating the seat body 710 to the interior side, as shown by an arrow in FIG. 67, by the positional relationship between the center of rotation C and the center of gravity G.

Figure 68:
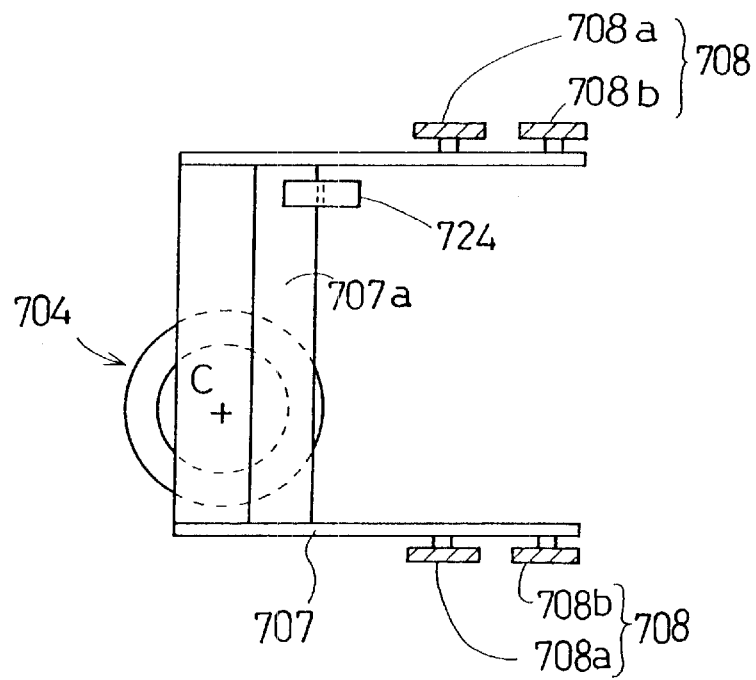
FIG. 68 is also a plan view showing the positional relationship between the center of rotation and the center of gravity of the seat body, in which the seat body and the seat holder are removed and a swing base is shown.

However, with the above-described structure for preventing excessive rotation, as shown in FIG. 68, the anchor hook 724 engages the rear end portion 707*a* of the swing base 707 on the end of the interior side (the end of the upper side as viewed in the drawing), thus preventing the swing base 707 from rotating clockwise in the drawing. Therefore, in the event of a collision from behind, as described above, the seat body 710 can be reliably held in a predetermined position (facing the front of the vehicle). The rotational position of the seat body 710 is retained by a separately provided rotation lock mechanism, but can be further reliably retained by this mechanism to prevent excessive rotation.

Further, because the rear end portion 707*a* of the swing base 707 is engaged in the recess 724*b* of the anchor hook 724 when the seat body 710 is located in the position facing the front of the vehicle, a strong upward force (a force in the direction of raising the seat body 710) that will be applied to the swing base 707 through the seat belt can also be received by the anchor hook 724. Consequently, the rigidity of the seat body 701 against the so-called seat sled load (a strong impact load applied through the seat belt in the event of a forward collision) can be enhanced.

Various changes or modifications may be added to the above-described embodiment. For example, although in this embodiment, the rotating seat has been described as being installed on the left side in the vehicle, the swing lock mechanism of this embodiment can be also applied to the rotating seat installed on the right side.

Further, although the lock holder 722 has been described as being returned to the unlocking direction under its own weight or by the tension spring 725, a torsion spring or a compression spring may be used instead of the tension spring 725.

Further, although excessive rotation of the seat body 710 has been described as being prevented by engagement between the anchor hook 724 and the rear end portion 707*a* of the swing base 707, if a normally provided rotation lock mechanism can sufficiently prevent the excessive rotation, the anchor hook 724 as means for preventing the excessive rotation may be omitted.

An embodiment (a ninth embodiment) of the invention as described in claims 11 and 12 will now be explained with reference to FIGS. 69 to 75.

Figure 73:
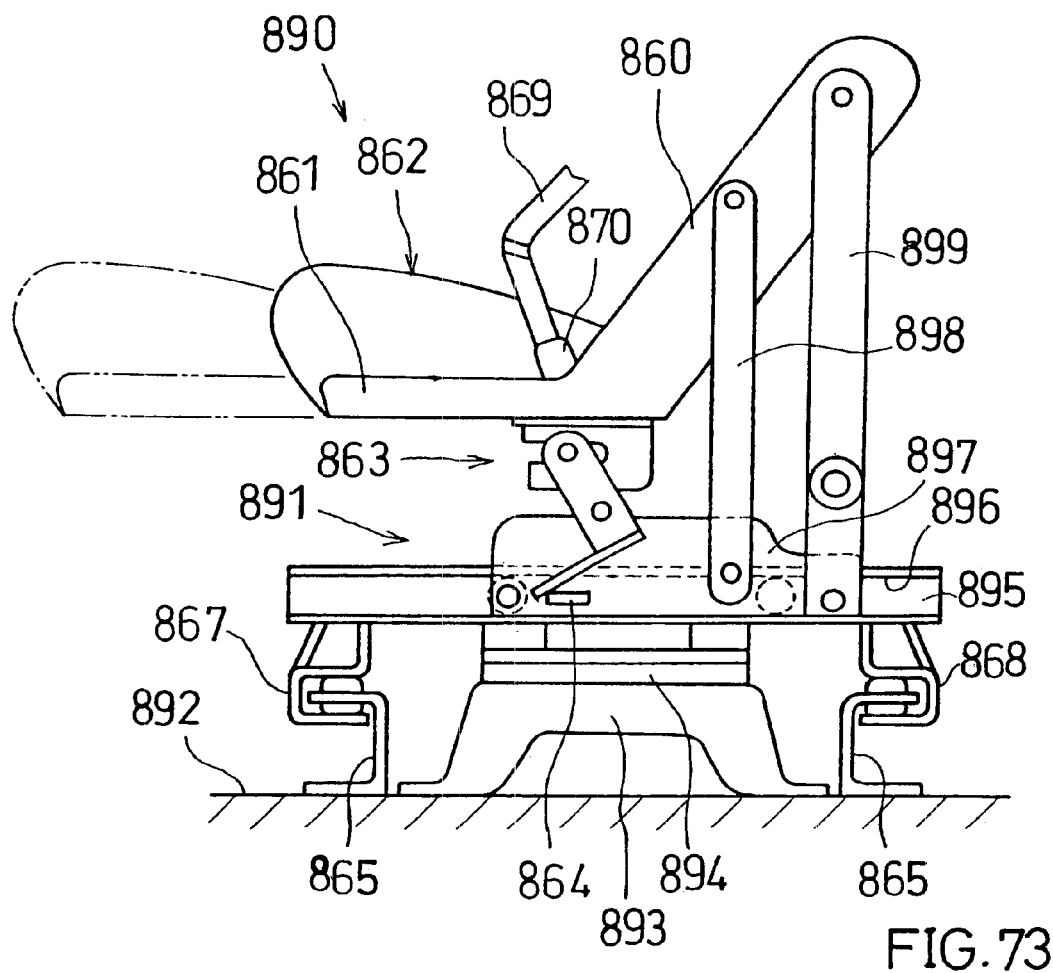
FIG. 73 is a side view of a known rotating vehicle seat.
Figure 74:
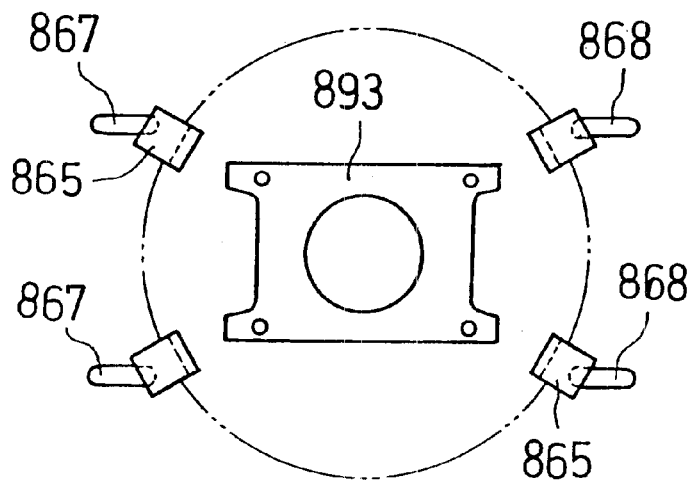
FIG. 74 is a plan view of a seat stand and components therearound.
Figure 75:
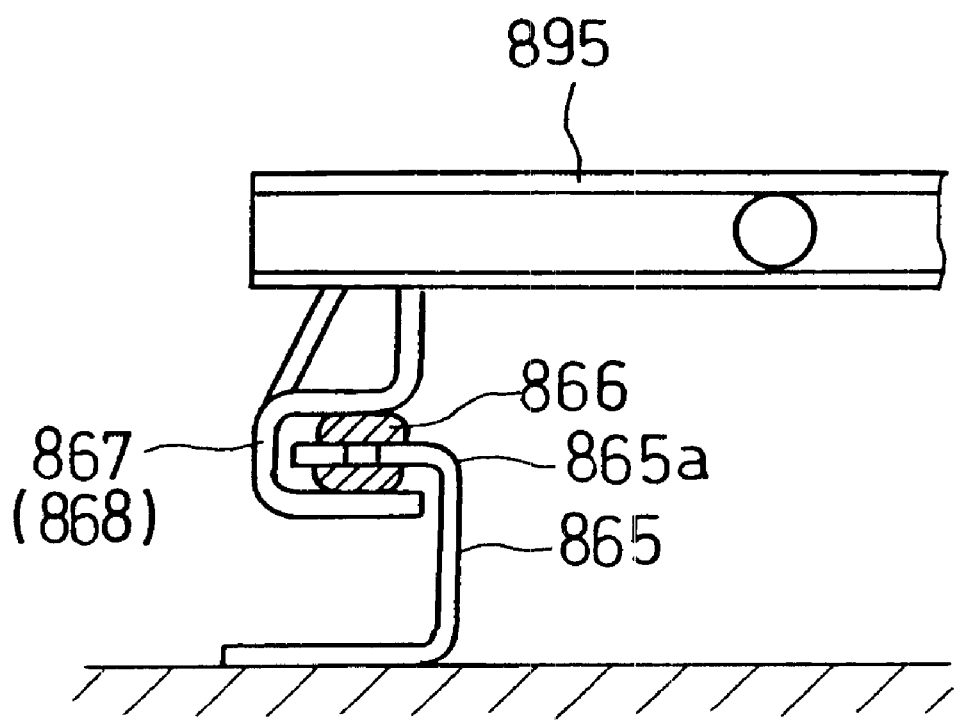
FIG. 75 is a sectional view illustrating an engagement between a seat slide rail and a hook racket.

A seat sliding mechanism 891 of a rotating vehicle seat 890 is shown in FIGS. 73 to 75. The rotating vehicle seat 890 is applied to a passenger's seat next to a driver's seat. A seat stand 893 is installed on a vehicle floor 892 in a predetermined position, and a rotary disc 894 is mounted on the seat stand 893. A pair of right and left parallel seat slide rails 895 are mounted on the rotary disc 894 with a predetermined spacing therebetween and each of the rails 895 has a predetermined length and has a slide groove 896. A base 897 is mounted on the seat slide rails 895 via slide members (not shown) to permit longitudinal movement along the seat slide rails 895.

The lower ends of a pair of quadric link arms 898,899 are pivotally connected to the rear portions of both sides of the base 897, and generally L-shaped right and left extending arms 860 are pivotally connected to the upper ends of the quadric link arms 898,899. A reinforcing frame extends across horizontal portions 861 of the extending arms 860, and a seat body 862 is mounted on the horizontal portions 861. A swing lock mechanism 863 and a stopper mechanism 864 are removably disposed between the base 897 and the underside of the horizontal portions 861.

The seat body 862 is directed to the front of the vehicle in the state shown in FIG. 73, and the seat slide rails 895 also extend longitudinally with respect to the vehicle. In this state, as shown in FIG. 74, four hook brackets 865 are mounted below the seat slide rails 895 and on the floor 892 in predetermined locations around the seat stand 893. Each of the hook brackets 865 has a generally U-shaped cross section. As shown in FIG. 75, a cushion 866 is provided on and under an upper portion of the hook brackets 865. A front hook 867 and a rear hook 868 are mounted to each of the right and left seat slide rails 895 and engage with the hook brackets 865. Further, a seat belt anchor 870 of a seat belt 869 is mounted, for example, on the seat body 862 or the extending arm 860.

The rotating vehicle seat 890 thus constructed is directed to the door opening side by rotating the seat slide rails 895 to the door opening side via the rotary disc 894.

At the same time, the hooks 867,868 are disengaged from the hook brackets 865. In this state, when the base 897 is moved forward of the seat, the swing lock mechanism 863 is disengaged from the stopper mechanism 864, and thus the claw portion mounted to the underside of the horizontal portion 861 is disengaged. Thereafter, when an actuator (not shown) of the quadric link arms 898,899 is actuated, the seat body 862 is extended to the outside via the extending arms 860. At the same time, the seat body 862 is swung down to a predetermined vertical position above the road surface, so that the passenger can change, for example, to a wheelchair. On the other hand, the seat body 862 is returned to an original position inside the vehicle by reversing the above procedures.

However, the seat slide rails 895, which form a seat sliding mechanism 891 of the rotating vehicle seat 890, are mounted on the upper surface of the rotary disc 894. Further, the front and rear hooks 867,868 mounted to the seat slide rails 895 engage the hook brackets 865 mounted on the floor 892 when the seat body 862 is directed to the position facing the front of the vehicle. Thus, it is constructed such that the impact load transmitted from the seat belt 869 is allowed to escape to the floor 892. Therefore, during rotation of the seat body 862, the front and rear hooks 867,868 interfere with the cushions 866 of the hook brackets 865 and the cushions 866 may be removed. As a result, the rotating operation is deteriorated. Further, the number of components is increased in order to absorb the impact load transmitted from the seat belt, thus resulting in cost increase. The invention as described in claim 11 or 12 has been made in view of the above-noted problems, and its object is to provide a seat sliding mechanism that can stabilize the longitudinal sliding movement of the seat body by a simple construction and can absorb the impact load from the seat belt.

Figure 69:
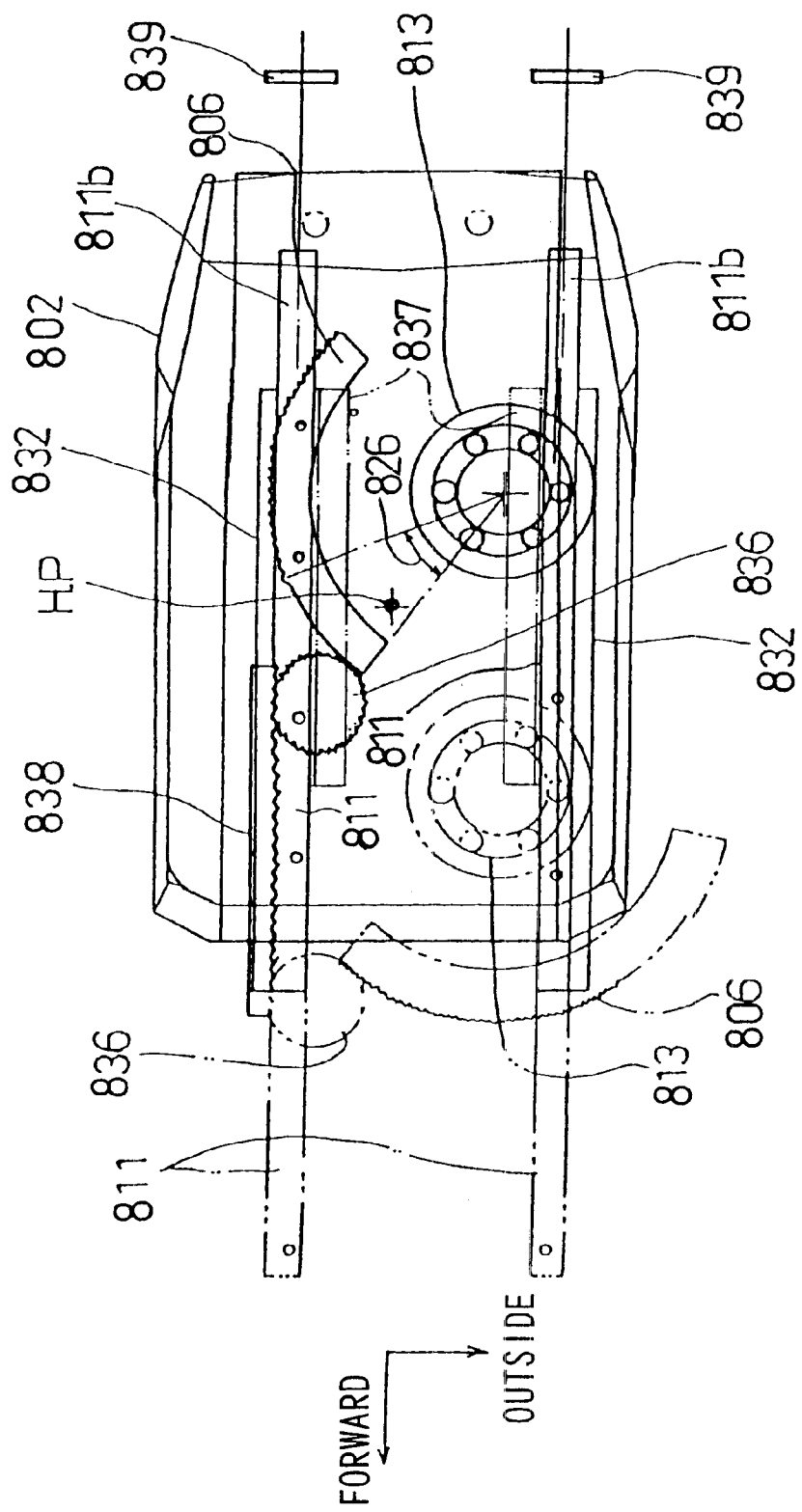
FIG. 69 is a plan view showing a ninth embodiment of the invention, in which a mechanism for coupling the rotational movement and the longitudinal movement of the seat body is shown.
Figure 70:
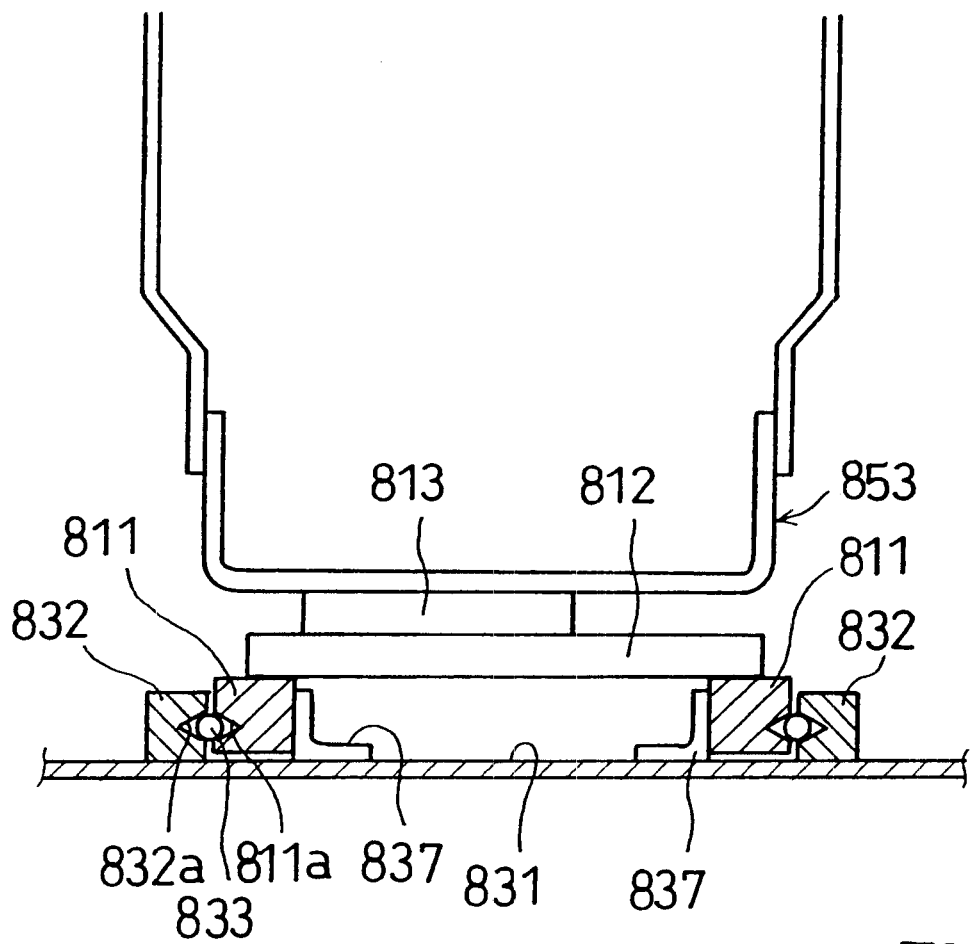
FIG. 70 is a sectional view of linear slide mechanisms of the longitudinal support base and the rotating support base.

In the ninth embodiment which will now be explained, the same points as the foregoing embodiments will not be described. As shown in FIG. 70, a V-shaped groove 811a is formed on the outer side surface of each of two inner rails 811 on the rotating support base as shown in FIG. 69. Two parallel outer rails 832 are mounted on and extend along both sides of a base 831 of the longitudinal support base with a predetermined spacing therebetween. The outer rails 832 are disposed on and along the outer side of the inner rails 811. A V-shaped groove 832a, which is similar to the groove 811a, is also formed in each of the outer rails 832 on the side surface facing the inner rails 811. The groove 832a is disposed facing the groove 811a. A plurality of steel balls 833 (or rolling elements) are fitted into the grooves 811a, 832a between the inner rails 811 and the outer rails 832, to thereby form a pair of left and right linear guide mechanisms 834. Further, a guard rail 837 having a generally L-shaped cross section is mounted on the base 831 and extends a predetermined length along and on the inner side of each of the inner rails 811. The guard rails 837 serve to support the inner rails 811 in a manner that permits the inner rails 811 to slide and is prevented from being disengaged from the outer rails 832. By providing the guard rails 837 in addition to the linear guide mechanisms 834, the rotating support base and thus the lift-up mechanism and the seat body 802 can be more smoothly moved in the longitudinal direction of the vehicle without rattling. Although it is not shown, the base 831 of the longitudinal support base is secured to the vehicle floor by bolts. Thus, the rotating seat is installed in a predetermined position (the position of a passenger's seat). Although steel balls 833 have been described as the rolling elements, a cylindrical roller, for example, may be used.

Figure 71:
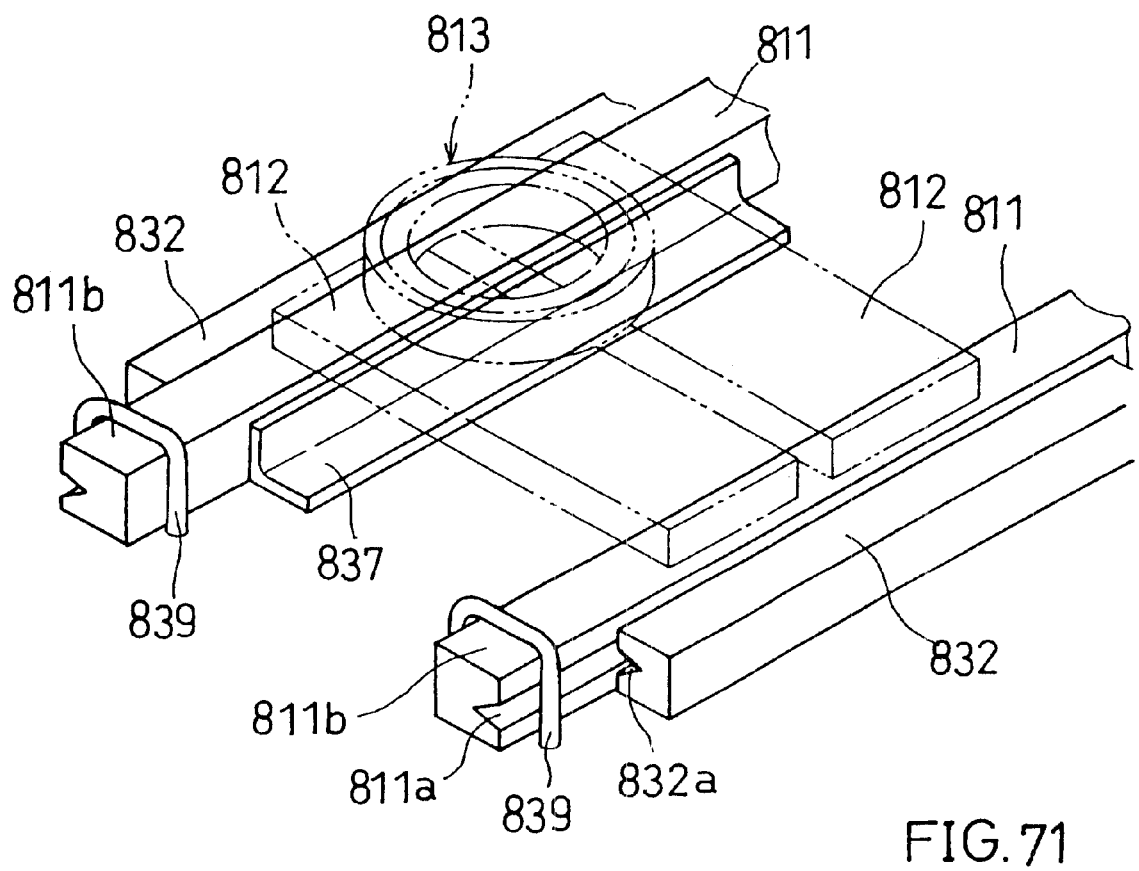
FIG. 71 is a perspective view of rear portions of the longitudinal support base and the rotating support base.
Figure 72:
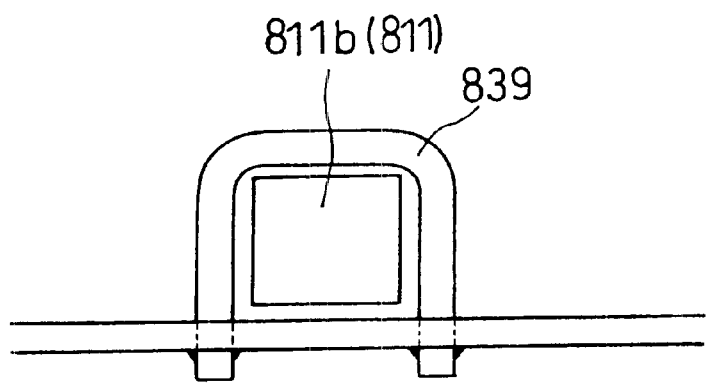
FIG. 72 is a sectional view illustrating a relationship between an inner rail and a hook.

Further, as shown in FIGS. 71 and 72, when the rotating vehicle seat is in the slide locked state in the rear end position of the longitudinal sliding range (in the state in which the cylindrical portion 83a is inserted into the lock hole 31a in FIG. 9), extending portions 811b of the inner rails 811 on the rear end extend rearward by a predetermined length. A generally inverted U-shaped hook 839 is disposed on the vehicle floor side on the travelling path of each of the extending portions 811b, and the extending portion 811b is removably inserted through the hook 839.

With the rotating vehicle seat thus constructed according to the ninth embodiment, the inner rails 811 on which the rotary disc 813 of the rotating support base is mounted can be moved longitudinally via the plurality of steel balls 833 disposed between the outer rails 832, which are mounted on the base 831 of the longitudinal support base, and the inner rails 811. Further, the extending portions 811b of a predetermined length extend on the rear end of the inner rails 811 and are removably inserted through the hooks 839 that are disposed on the vehicle floor side. Therefore, when the seat body 2 is in the interior side position W0 (in the state shown in FIG. 11(A)), the extending portions 811b of the inner rails 811 are inserted through the hooks 839. Thus, the inner rails 811 can be prevented from being raised by a belt load that will act on the seat belt in the event of hard braking or collision when the vehicle is running. Further, the belt load can be transferred from the hooks 839 to the floor side, so damage to the linear guide mechanism 834 can be prevented.

Further, because the guard rail 837 is provided on the base 831 on and along the inner side of the inner rails 811 and extends in parallel to the outer rails 832, the deformation of the inner rails 811 can be minimized and removal of the steel balls 833 can be prevented, so that the longitudinal movement of the linear guide mechanism 834 can be maintained with stability.

An embodiment (a tenth embodiment) of the invention as described in claim 13 will now be explained with reference to FIGS. 76 to 82. The same components as the first embodiment will be identified by the same numerals. A rotating vehicle seat 950 is constructed to couple the longitudinal sliding movement of a seat body 902 and the rotational movement of the seat body 902 to the door opening D. The rotating vehicle seat 950 includes a rotating support base 910 that slides longitudinally with respect to the vehicle via slide rails 932 mounted on the vehicle floor as shown in FIG. 81, and the seat body 902 that rotates via a rotary disc 913 mounted on the rotating support base 910. A rotation/slide coupling mechanism 905 includes a rack 955 mounted on the vehicle floor side, an intermediate gear 956 mounted on the rotating support base 910, and a circular-arc pinion gear 957 mounted on the side of the seat body 902.

The intermediate gear 956 always engages the rack 955. When the seat body 902 rotates by a predetermined angle α to the exterior side, the pinion gear 957 starts to engage the intermediate gear 956. As shown in FIG. 81, the pinion gear 957 has a circular-arc shape extending in a range of about 90° and no engagement teeth are provided within a predetermined angular range α on the initial engagement side (the end in the counterclockwise direction). Therefore, the pinion gear 957 does not engage the intermediate gear 956 within the initial range of about the angle of α at the beginning of rotation, in which the seat body 902 is rotated from the initial seated position (the position facing the front of the vehicle, as shown by a solid line in FIG. 81) to the door opening side (in the counterclockwise direction). Thus, the seat body 902 only rotates without moving forward (in the "non-coupling range").

When the seat body 902 is rotated by the angle α to the door opening side, the pinion gear 957 starts to engage the intermediate gear 956. Thereafter, the seat body 902 moves forward with respect to the vehicle in synchronization with the rotational movement (in the "coupling range").

Thus, with the above-described rotation/slide coupling mechanism 950, when the seat body 902 is rotated by the predetermined angle α to the door opening side (downward as viewed in FIG. 81), the seat body 902 thereafter moves forward with respect to the vehicle (to the left as viewed in FIG. 81) in synchronization with the rotational movement. Thus, the two movements can be achieved by a single operation, so that the usability of this type of the rotating vehicle seat can be further improved.

Figure 82:
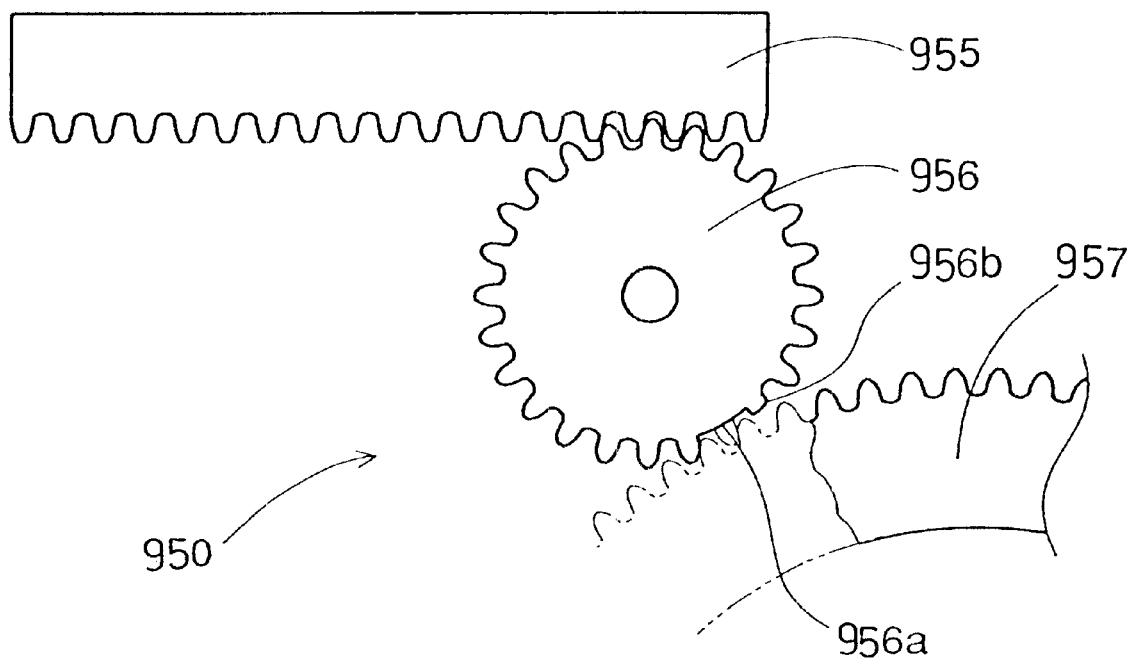
FIG. 82 is a plan view showing engagement between a pinion gear and the intermediate gear in the known rotation/slide coupling mechanism.

However, a further improvement of the rotation/slide coupling mechanism 950 is desirable. As shown in FIG. 82, in the rotation/slide coupling mechanism 950, in order to achieve a smooth engagement between the pinion gear 957 and the intermediate gear 956 at the beginning of the engagement (when the seat body 902 is rotated by the angle of a from the position facing the front of the vehicle to the door opening side), the intermediate gear 956 has a toothless portion 956a and a shortened tooth 956 adjacent to the toothless portion 956a, while the pinion gear 957 has normal teeth. The toothless portion 956a is formed on the initial engagement portion by removing one tooth.

With the above-described configuration, the rotation/slide coupling mechanism 950 can achieve a smooth engagement at the beginning of engagement when shifting from the non-coupling range to the coupling range. However, at the end of engagement when shifting from the coupling range to the non-coupling range (when the seat body 902 is rotated to a point of the angular distance of a away from the position facing the front of the vehicle in the process of returning the seat body 902 from the position facing the door opening side to the position facing the front of the vehicle), the pinion gear 957 does not engage the shortened tooth 956b of the intermediate gear 956. Thus, the rotational movement of the seat body 902 is not coupled to the sliding movement. As a result, the seat body 902 is returned to the position facing the front of the vehicle in the rotational direction while being not returned exactly to the seated position in the rear end sliding position.

When such a malfunction occurs, for example, in the case that the slide lock mechanism 80 (see FIG. 9 of the first embodiment) that is actuated in synchronization with the rotational movement of the seat body 902 is provided, the slide lock mechanism 80 will be actuated in the state in which the seat body 902 is not returned to the rear end sliding position. As a result, the slide lock mechanism 80 will not actually function on the rear sliding end.

The invention as described in claim 10 has been made in view of the above problem, and its object is to provide a rotation/slide coupling mechanism in the rotating vehicle seat which can achieve a smooth and reliable engagement of each gear at the end of the engagement as well as at the beginning of the engagement.

This embodiment features a rotation/slide coupling mechanism 900 for coupling the rotational movement and the longitudinal sliding movement of the seat body 902. The remaining components do not require any particular modifications and thus, such description will be omitted.

Figure 80:
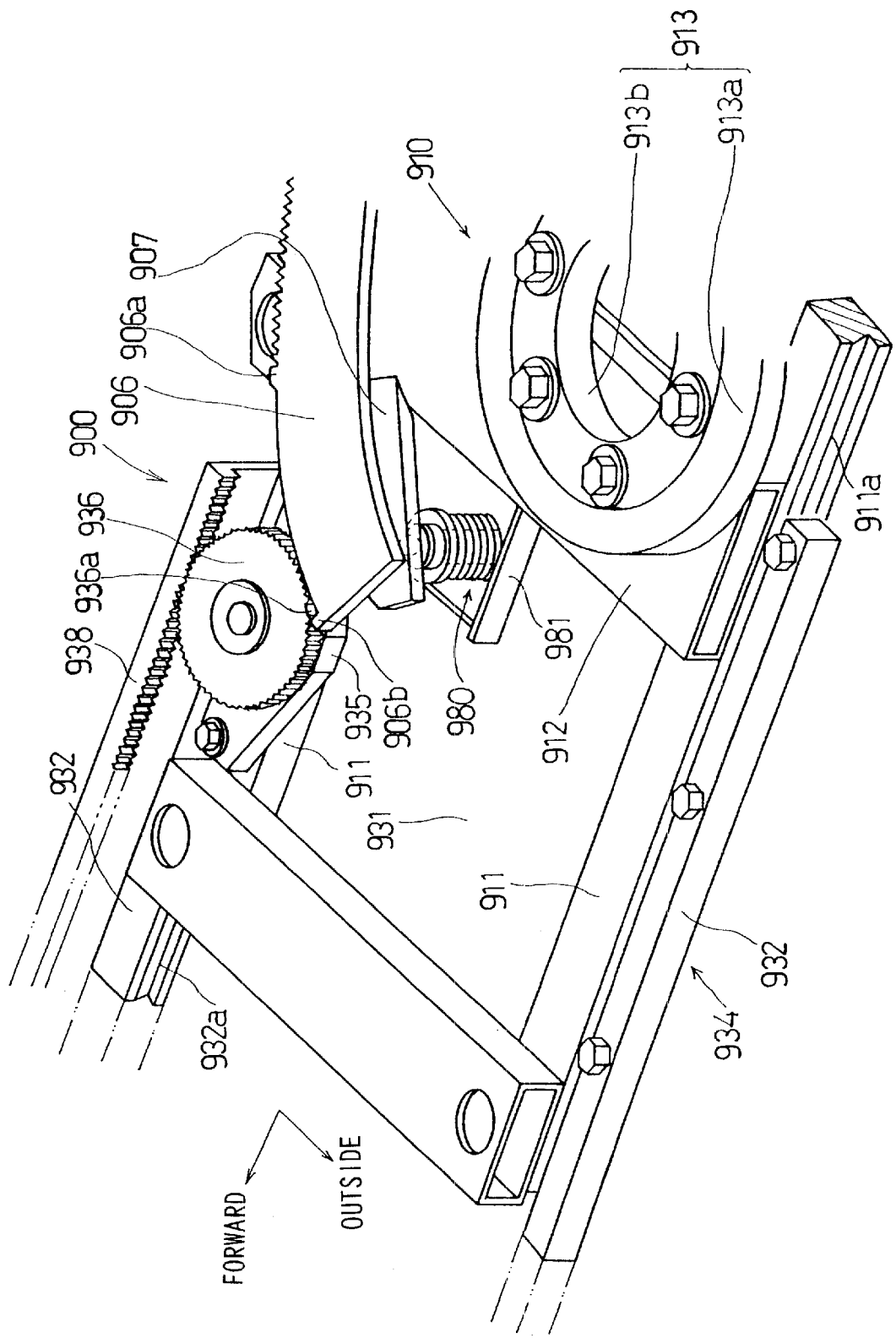
FIG. 80 is a perspective view of a rotation/slide coupling mechanism and a slide lock mechanism.
Figure 81:
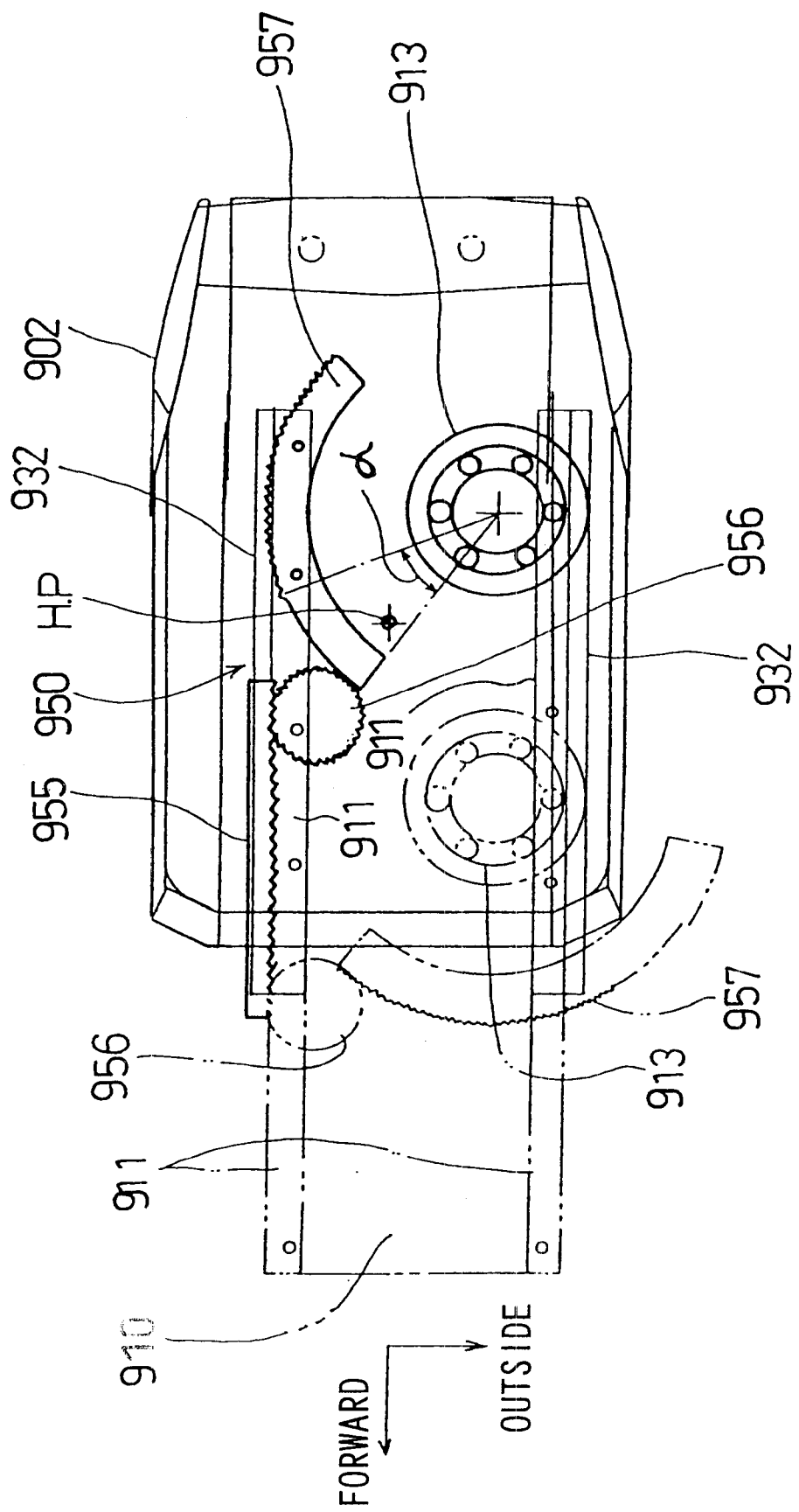
FIG. 81 a plan view of a known rotation/slide coupling mechanism.

As shown in FIG. 80, a rack 938 is mounted on and along the side surface of a fixed longitudinal slide rail 932 on the interior side. An intermediate gear 936 is rotatably mounted on the top surface of a moving slide rail 911 on the interior side via a support plate 935. The intermediate gear 936 engages the rack 938. The position and length of the rack 938 are set such that this engagement is maintained over the entire longitudinal moving range of the seat body 902.

Figure 76:
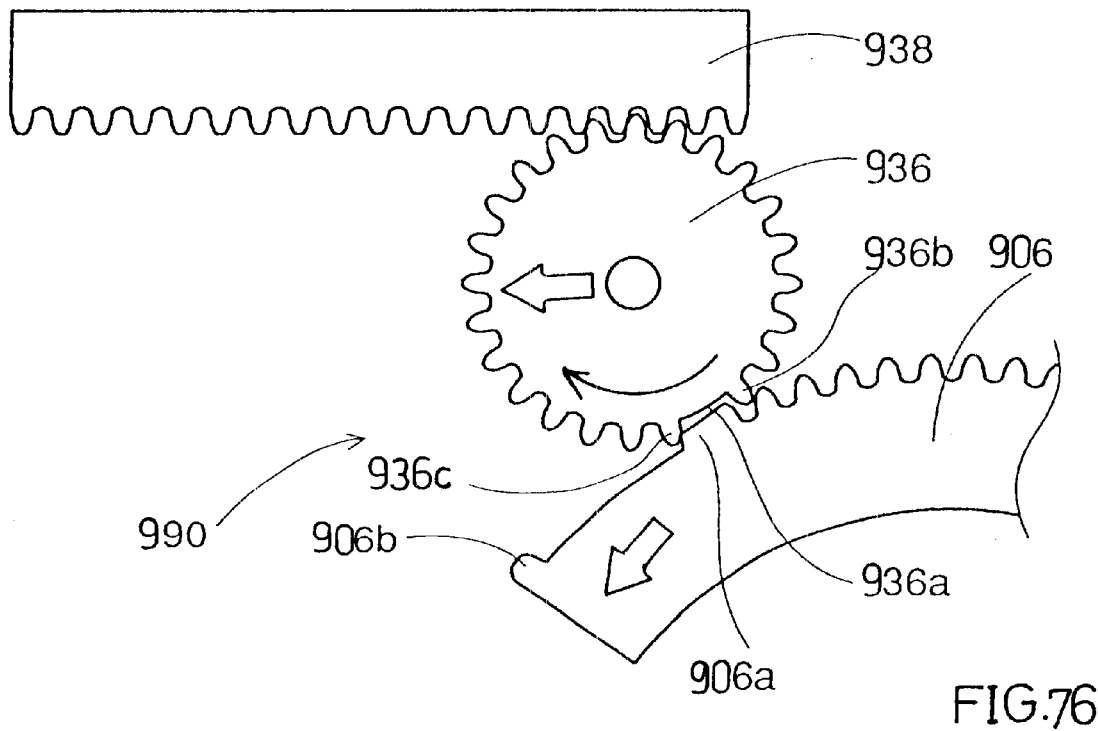
FIG. 76 is a plan view of a pinion gear, an intermediate gear and a rack at the beginning of engagement of a rotation/slide coupling mechanism.
Figure 78:
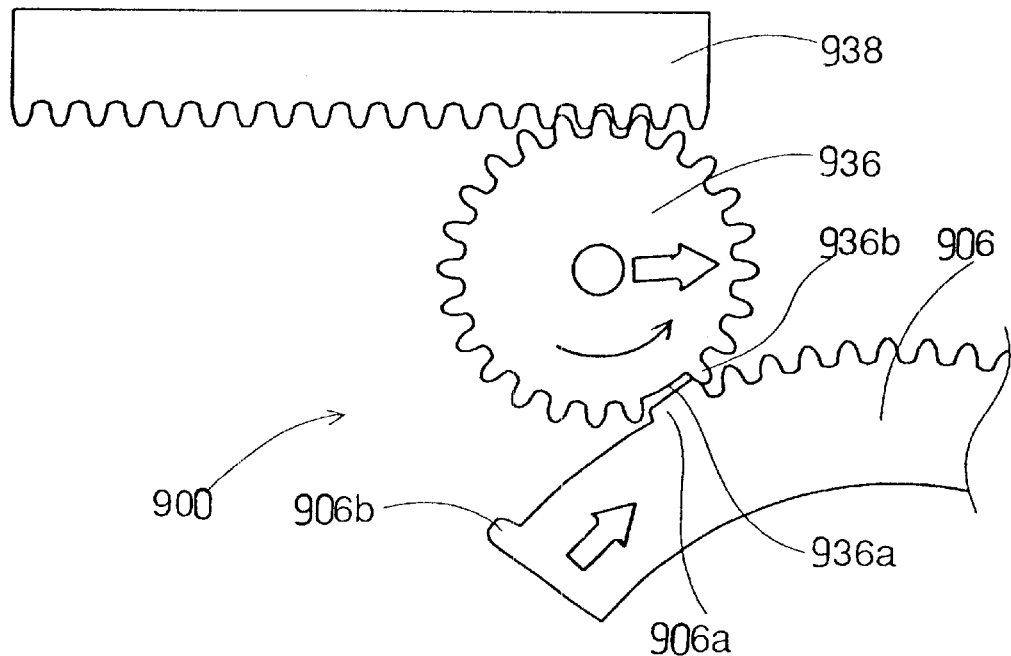
FIG. 78 is a plan view of a pinion gear, an intermediate gear and a rack at the end of engagement of the rotation/slide coupling mechanism.
Figure 79:
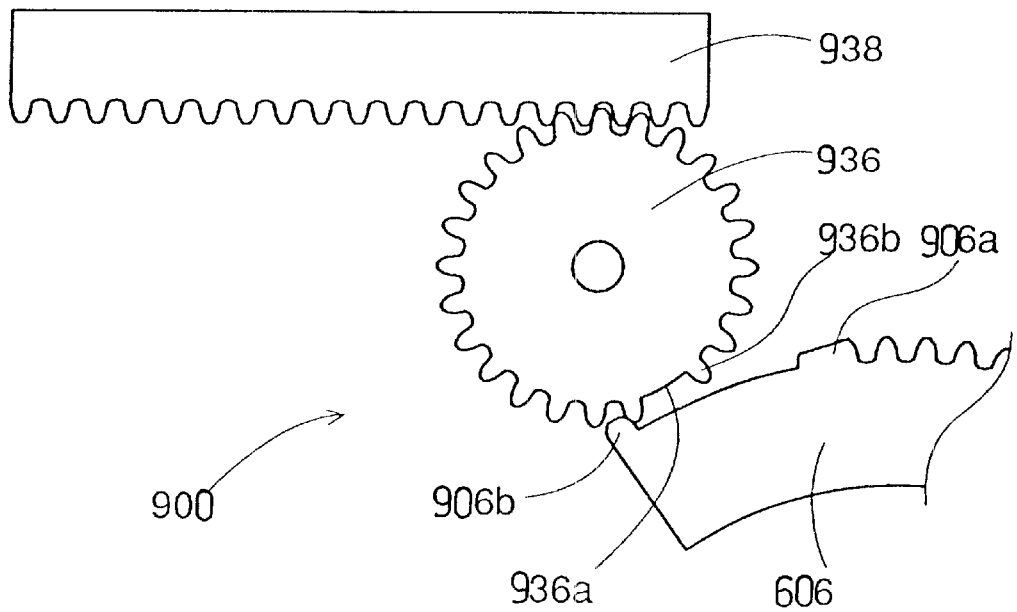
FIG. 79 is a plan view showing engagement between a backlash prevention tooth and the intermediate gear.

As shown in FIGS. 76, 78 and 79, similar to the above-described known intermediate gear 956, the intermediate gear 936 has a toothless portion 936a formed by removing one tooth on the initial engagement portion. However, a tooth 936b adjacent to the toothless portion 936a is a normal tooth and is not shortened like the shortened tooth 956b of the intermediate gear 956.

The pinion gear 906 has a circular-arc shape extending in a range of about 90°, similar to the known pinion gear, and no engagement teeth other than a backlash prevention tooth 906b are provided within a predetermined angular range α (about 26° in this embodiment) on the initial engagement side (the end in the counterclockwise direction).

Figure 77:
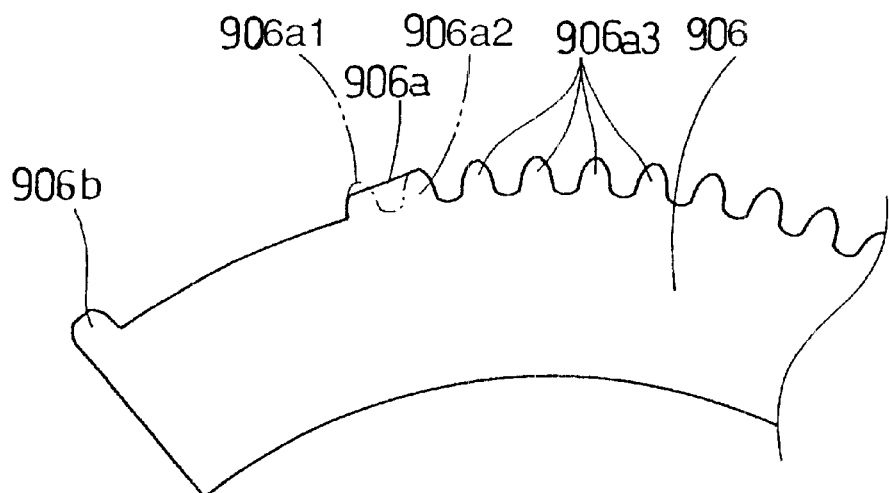
FIG. 77 is an enlarged view of a deformed tooth of the pinion gear.

As shown in FIG. 77, a deformed tooth 906a is formed by filling a gap between two teeth (a first tooth 906a1 and a second tooth 906a2, which the intermediate gear 936 engages first and then second, respectively, when the seat body 902 is rotated to the door opening side) so as to have a continuous shape. As shown in the drawing, the end of the deformed tooth 906a on the side of the second tooth 906a2 has the same height as normal teeth 906a3, but the height is decreased toward the first tooth 906a1 that is engaged at the beginning (the side at the beginning of engagement; the left side as viewed in the drawing).

As shown in FIG. 76, the deformed tooth 906a has a thickness substantially corresponding to the length of the toothless portion 936a of the intermediate gear 936. Therefore, the deformed tooth 906a fits snugly in the toothless portion 936a.

Further, the backlash prevention tooth 906b is formed on the end of the pinion gear 906 which is the end of the non-coupling range. When the seat body 902 is located in the position facing the front of the vehicle, as shown in FIG. 79, the backlash prevention tooth 906b meshes with the intermediate gear 936, thus preventing backlash between the intermediate gear 936 and the rack 938.

With the rotation/slide coupling mechanism 900, the pinion gear 906 does not engage the intermediate gear 936 within the initial range of about 26° at the beginning of rotation, in which the seat body 902 is rotated from the initial seated position (the position facing the front of the vehicle) to the door opening side. Thus, the seat body 902 only rotates without moving forward (in the "non-coupling range").

When the seat body 902 further rotates to the door opening side, the pinion gear 906 starts to engage the intermediate gear 936. Thus, the intermediate gear 936 rotates in synchronization with the rotational movement of the seat body 902. By being in engagement with the rack 938, the intermediate gear 936 moves forward of the vehicle while rotating. As a result, the rotating support base 910 moves forward of the vehicle, and thus the seat body 902 rotates while moving forward (in the "coupling range").

The instant when the pinion gear 906 starts to engage the intermediate gear 936 with the rotational movement of the seat body 902 to the door opening side will now be explained. At this time, the pinion gear 906 is rotating in the direction of an arrow in FIG. 76 (in the direction of starting engagement). The deformed tooth 906a is formed on the initial engagement portion of the pinion gear 906 by filling the gap between the two teeth (the first tooth 906a1 and the second tooth 906a2) so as to have a continuous shape. Therefore, at the beginning of engagement between the pinion gear 906 and the intermediate gear 936, a tooth 936b of the intermediate gear 936 does not enter between the first and second teeth 906a1 and 906a2, so that a reliable state of starting the engagement without tooth disengagement can be achieved. If tooth disengagement occurs between the pinion gear 906 and the intermediate gear 936, the longitudinal slide lock mechanism 80 and the rotation lock mechanism 70 (see FIG. 7 of the first embodiment) will not function properly. However, the tooth disengagement does not occur by provision of the deformed tooth 906a, so that the slide lock mechanism 80 and the rotation lock mechanism 70 can properly function.

Further, as shown in FIG. 77, the height of the deformed tooth 906a of the pinion gear 906 is decreased from the side of the second tooth 906a2 (normal tooth) toward the first tooth 906a1. Therefore, the deformed tooth 906a engages the toothless portion 936a without interfering with the tooth 936b (the tooth 936b on the rearward side of the toothless portion 936a in the direction of starting the engagement). As a result, the pinion gear 906 can smoothly engage the intermediate gear 936.

The height of the deformed tooth 906a on the side of the first tooth 906a1 is decreased such that the deformed tooth 906a does not engage the tooth 936b on the rearward side of the toothless portion 936a in the rotational direction, but engages a tooth 936c on the frontward side of the toothless portion 936a in the rotational direction.

On the other hand, when the seat body 902 returns from the position facing the door opening side to the position facing the front of the vehicle, as shown in FIG. 78, the pinion gear 906 rotates clockwise. At this time, the end portion of the deformed tooth 906a of the pinion gear 906 on the side of the second tooth 906a2, engages the tooth 936b of the intermediate gear 936. Because the end portion of the deformed tooth 906a on the side of the second tooth 906a2 has the same height as normal teeth, the deformed tooth 906a securely engages the tooth 936b of the intermediate gear 936. Therefore, the engagement of the pinion gear 906 with the intermediate gear 936 is reliably maintained until the seat body 902 has returned all the way to the rear end sliding position. In this respect, in the known rotation/slide coupling mechanism 950, the pinion gear 957 does not engage the shortened tooth 956b of the intermediate gear 956, which results in the seat body 902 not being returned to the rear end sliding position. Such a problem does not occur with the rotation/slide coupling mechanism 900 of this embodiment.

The timing when the steel ball 85 is disengaged from the slide lock automatic release plate 7 to release the slide lock (when it comes to the relative position (b) in FIG. 9) is set to be immediately before the deformed tooth 906a of the pinion gear 906 engages the toothless portion 936a of the intermediate gear 936 by rotation of the seat body 902. Specifically, within the initial range of about 26° at the beginning of rotation of the seat body 902 from the initial seated position to the door opening side, the steel ball 85 abuts against the slide lock automatic release plate 7 and the cylindrical portion 83a of the retainer 83 is held inserted within the lock hole 31a (in the relative position (a) in FIG. 9). Thus, the seat body 902 is held locked to prevent movement in the longitudinal direction.

When the seat body 902 rotates by about 26°, the steel ball 85 is disengaged from the slide lock automatic release plate 7 to release the slide lock (in the relative position (b) in FIG. 9). Then, the retainer 83 is displaced upwardly by the biasing force of the compression spring 84, and thus the cylindrical portion 83a is moved out of the lock hole 31a (in the relative position (c) in FIG. 9). Consequently, the seat body 902 is allowed to move longitudinally (i.e. "automatic release of the slide lock"). Thereafter, the steel ball 85 is held pressed against the underside of the pinion gear 906 and thus the slide lock released state is maintained until the seat body 902 reaches the sideways position facing the door opening side.

On the other hand, while the seat body 902 is being rotated by about 64° from the sideways position facing the door opening side toward the seated position, the retainer 83 of the slide lock mechanism 80 is held displaced upwardly, so that the slide lock is released. Thus, the seat body 902 moves rearward while rotating toward the seated position (clockwise). When the seat body 902 rotates by about 64° from the sideways position to the seated position, the seat body 902 returns to the rearmost position in the longitudinal direction with respect to the vehicle. At the same time, the steel ball 85 is engaged with the slide lock automatic release plate 7. As a result, the retainer 83 is depressed against the biasing force of the compression spring 84 and the cylindrical portion 83a is inserted again into the lock hole 31a. Thus, the seat body 902 is locked to prevent longitudinal movement in the rearmost position (in the relative position (a) in FIG. 9). Thereafter, the seat body 902 only rotates about 26° to return to the seated position facing the front of the vehicle.

Thus, the automatic locking and unlocking of the slide lock mechanism 80 is timed to the coupling of the rotation and the longitudinal movement of the seat body 902. The slide lock automatic release plate 7 is configured to have a proper dimension and shape and is mounted in such a position that allows such locking and unlocking.

In the known rotation/slide coupling mechanism 950, as described above, because the pinion gear 957 does not engage the shortened tooth 956b of the intermediate gear 956, the seat body 902 may be returned to the position facing the front of the vehicle while not being returned to the rear end sliding position. In this case, when the steel ball 85 in the slide lock mechanism 80 engages the slide lock automatic release plate 7 and the retainer 83 is depressed, the lock hole 31a may not yet be located below the cylindrical portion 83a. In such a case, the retainer 83 is located between the slide lock automatic release plate 7 and the base 31 of the longitudinal support base 30, which causes not only a malfunction of the slide lock mechanism 80 but also a malfunction of the seat body 902 in the rotational movement.

On the other hand, with the rotation/slide coupling mechanism 900 of the tenth embodiment, because the engagement between the pinion gear 906 and the intermediate gear 936 is maintained all the way (until the seat body 902 is returned all the way to the rear end sliding position), when the steel ball 85 is engaged with the slide lock automatic release plate 7, the lock hole 31a is reliably located below the cylindrical portion 83a. Therefore, a malfunction of the slide lock mechanism 80 as described above does not occur.

With the rotation/slide coupling mechanism 900 of the tenth embodiment, the toothless portion 936a is formed on the initial engagement portion of the intermediate gear 936 (while the shortened tooth 956b is not provided). Further, the deformed tooth 906a is formed on an initial engagement portion of the pinion gear 906 so as to fit in the toothless portion 936a of the intermediate gear 936, and the deformed tooth 906a is shorter on the side of the first tooth 906a1 than the normal teeth 906a3. Therefore, at the beginning of engagement when rotating the seat body 902 to the door opening side, the deformed tooth 906a fits into the toothless portion 936a without interference of the portion of the deformed tooth 906a on the side of the first tooth 906a1 with the tooth 936b of the intermediate gear 936. As a result, the pinion gear 906 can smoothly engage the intermediate gear 936 without tooth disengagement.

On the other hand, at the end of the engagement to rotate the seat body 902 to the interior side, because the deformed tooth 906a on the side of the second tooth 906a2 has the same height as normal teeth, the deformed tooth 906a securely engages the tooth of the intermediate gear 936, so that the engagement of the pinion gear 906 with the intermediate gear 936 is reliably maintained. Thus, the intermediate gear 936 can be rotated completely to the end to thereby permit the seat body 902 to be moved all the way back to the rear end sliding position.

As described above, with the rotation/slide coupling mechanism 900 of this embodiment, at the beginning of the engagement, the pinion gear 906 can smoothly engage the intermediate gear 936 without tooth disengagement. At the end of the engagement, the engagement between the pinion gear 906 and the intermediate gear 936 is maintained all the way until the seat body 902 is returned entirely to the rear end sliding position. Therefore, when the seat body 902 is thereafter further rotated to the interior side to actuate the slide lock mechanism 80, the cylindrical portion 83a of the retainer 83 is reliably inserted into the lock hole 31a. Thus, the slide lock mechanism 80 can function properly and reliably.

Various changes or modifications may be added to the above-described tenth embodiment. For example, in the above embodiment, it has been described that the pinion gear 906 indirectly engages the rack 938 via the intermediate gear 936. However, it may be constructed such that a pinion gear directly engages a rack without disposing the intermediate gear 936 therebetween. In this case, in order to ensure matching in the rotational direction and in the sliding direction of the seat body 902, although it is not shown, the rack must be mounted along the slide rail on the exterior side (the lower slide rail as viewed in FIG. 80), that is, on the opposite side of the rack 938 of the tenth embodiment.

Even in such a case in which the pinion gear directly engages the rack without disposing the intermediate gear 936, the same effect as the tenth embodiment can be obtained by forming a toothless portion on the initial engagement portion of the rack and forming a deformed tooth on the initial engagement portion of the pinion gear, which deformed tooth is shorter on the initial engagement side than normal teeth.

What is claimed is:

1. A rotating vehicle seat, comprising a rotating support base for supporting a seat body in a manner that permits rotation around a center of rotation that is located at a point that is displaced to a door opening side with respect to a center of a seat cushion, a longitudinal support base for supporting the rotating support base to permit movement in a longitudinal direction of a vehicle, and coupling means for coupling the rotational movement and the longitudinal movement of the seat body, said coupling means including a pinion gear mounted beneath the seat body to the interior side of said center of rotation and a rack mounted on and extending in a longitudinal direction of said longitudinal support base, said rack engaging said pinion gear via an intermediate gear.

2. The rotating vehicle seat as defined in claim 1, further comprising a lateral support base for moving the seat body in a lateral direction of the vehicle and a stopper member for preventing longitudinal movement of the seat body during lateral movement of the seat body, wherein the stopper member is disposed on the longitudinal support base to permit movement into and out of a longitudinal traveling path of the seat body, such that, when the longitudinal support base is moved to an interior side end of the lateral support base, the stopper member moves out of the traveling path of the seat body to thereby allowing the seat body to move longitudinally, while, when the longitudinal support base moves from the interior side end to the exterior side of the lateral support base, the stopper member moves into the traveling path of the seat body to thereby prevent longitudinal movement of the seat body.

3. The rotating vehicle seat as defined in claim 1, further comprising a lateral support base for moving the seat body in a lateral direction of the vehicle, the lateral support base being disposed between the rotating support base and the seat body and being constructed to move the seat body to a lower position as the seat body moves to the outside in the lateral direction of the vehicle.

4. The rotating vehicle seat as defined in claim 3, wherein the seat body can be detached from the lateral support base so as to be used as a wheelchair.

5. The rotating vehicle seat as claimed in claim 3, wherein at least one of the longitudinal support base and the lateral support base has a linear slide mechanism that consists of an outer rail, an inner rail and a plurality of steel balls disposed between the outer and inner rails.

6. The rotating vehicle seat as defined in claim 1, further comprising a swing extending mechanism that essentially consists of a quadric link mechanism, wherein the seat body can be moved lateral with respect to the vehicle by the swing extending mechanism and wherein the seat body can be detached from the swing extending mechanism so as to be used as a wheelchair.

7. The rotating vehicle seat as defined in claim 1, further comprising a swing extending mechanism that essentially consists of a quadric link mechanism, wherein the seat body can be moved laterally with respect to the vehicle by the swing extending mechanism and wherein the seat body can be detached from the swing extending mechanism so as to be used as a seat of a wheelchair.

8. The rotating vehicle seat as defined in claim 1, further comprising a swing extending mechanism that essentially consists of a quadric link mechanism, wherein the seat body can be moved laterally with respect to the vehicle by the swing extending mechanism and wherein an electric motor is used as a driving source for the swing extending mechanism, the motor having a threaded shaft oriented to the front of the seat.

9. The rotating vehicle seat as defined in claim 1, further comprising a swing extending mechanism that essentially consists of a quadric link mechanism, wherein the seat body can be moved laterally with respect to the vehicle by the swing extending mechanism, and further comprising a swing lock mechanism that functions only when an impact is applied while the vehicle is running, so as to prevent the seat body from moving forward with respect to the vehicle by the swing extending mechanism, while, in normal operations when the vehicle is stopped, permitting the seat body to be moved laterally with respect to the vehicle.

10. The rotating vehicle seat as defined in claim 1, further comprising a swing extending mechanism that essentially consists of a quadric link mechanism, wherein the seat body can be moved laterally with respect to the vehicle by the swing extending mechanism, and further comprising a swing lock mechanism that functions to prevent the seat body from being moved forward with respect to the vehicle by the swing extending mechanism with the seat body is located in a position facing the front of the vehicle, while permitting the seat body to be moved laterally with respect to the vehicle by the swing extending mechanism when the seat body is rotated to the door opening side.

11. The rotating vehicle seat as defined in claim 1, wherein the longitudinal support base includes a linear slide mechanism that consists of a fixed rail, a moving rail and a plurality of rolling elements disposed between the fixed rail and the moving rail, and wherein a guide rail is provided on and along one side of the moving rail, which is opposite to the side of the fixed rail and supports the moving rail to permit the moving rail to slide.

12. The rotating vehicle seat as defined in claim 11, further including a hook that is provided on a travelling path of the moving rail such that a rear end portion of the moving rail can slide into and out of the hook.

13. The rotating vehicle seat as defined in claim 1, wherein a toothless portion is formed on an initial engagement portion of the intermediate gear and a deformed tooth is formed on an initial engagement portion of the pinion gear and engages the toothless portion, the deformed tooth having a thickness substantially corresponding to a length of the toothless portion, a height of the deformed tooth on a front end in a direction of starting engagement being smaller than normal teeth, and a height of the deformed tooth on a rear end in the direction of starting engagement being equal to normal teeth.

* * * * *